US010909524B2

(12) United States Patent
Van Os et al.

(10) Patent No.: US 10,909,524 B2
(45) Date of Patent: Feb. 2, 2021

(54) USER INTERFACES FOR TRANSFER ACCOUNTS

(71) Applicant: Apple Inc., Cupertino, CA (US)

(72) Inventors: Marcel Van Os, San Francisco, CA (US); Hanwen Fan, Cupertino, CA (US); Christine Franco, Menlo Park, CA (US); Morgan Grainger, Waterloo (CA); Aaron Melim, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/428,875

(22) Filed: May 31, 2019

(65) Prior Publication Data

US 2019/0370781 A1  Dec. 5, 2019

Related U.S. Application Data

(60) Provisional application No. 62/852,590, filed on May 24, 2019, provisional application No. 62/679,865, filed on Jun. 3, 2018.

(51) Int. Cl.
*G06Q 20/32* (2012.01)
*G06F 9/451* (2018.01)
*G06F 21/35* (2013.01)
*G06Q 20/40* (2012.01)

(52) U.S. Cl.
CPC ......... *G06Q 20/3278* (2013.01); *G06F 9/451* (2018.02); *G06F 21/35* (2013.01); *G06Q 20/4014* (2013.01)

(58) Field of Classification Search
None
See application file for complete search history.

(56) References Cited

U.S. PATENT DOCUMENTS

| 3,586,261 A | 6/1971 | Paine et al. |
| 4,516,207 A | 5/1985 | Moriyama et al. |
| 5,802,208 A | 9/1998 | Podilchuk et al. |

(Continued)

FOREIGN PATENT DOCUMENTS

| AU | 2017101425 A4 | 11/2017 |
| CN | 105320864 A | 2/2016 |

(Continued)

OTHER PUBLICATIONS

Office Action received for Australian Patent Application No. 2019100592, dated Aug. 21, 2019, 4 pages.

(Continued)

*Primary Examiner* — Scott C Anderson
(74) *Attorney, Agent, or Firm* — Dentons US LLP

(57) ABSTRACT

The present disclosure generally relates to managing the use of transfer accounts using an electronic device. In accordance with some embodiments, user interfaces for inputting information about a secure credential to an electronic device are described. In accordance with some embodiments, user interfaces for managing the use of a credential provisioned on an electronic device that operates on stored power are described. In accordance with some embodiments, user interfaces for managing the use of a transfer account associated with different credentials on an electronic device are described.

36 Claims, 82 Drawing Sheets

(56) References Cited

U.S. PATENT DOCUMENTS

| | | | |
|---|---|---|---|
| 5,917,913 A | 6/1999 | Wang | |
| 6,076,928 A | 6/2000 | Fateh et al. | |
| 6,212,548 B1 | 4/2001 | DeSimone et al. | |
| 6,256,129 B1 | 7/2001 | Kim et al. | |
| 6,282,656 B1 | 8/2001 | Wang | |
| 6,612,928 B1* | 9/2003 | Bradford | G06F 21/31 463/29 |
| 6,822,769 B1 | 11/2004 | Drinkwater et al. | |
| 6,993,489 B1 | 1/2006 | Miglautsch | |
| 7,155,411 B1 | 12/2006 | Blinn et al. | |
| 7,529,563 B1 | 5/2009 | Pitroda | |
| 7,664,638 B2 | 2/2010 | Cooper et al. | |
| 8,827,153 B1 | 9/2014 | Rhoades et al. | |
| 8,924,292 B1 | 12/2014 | Ellis et al. | |
| 8,959,360 B1 | 2/2015 | Barra | |
| 9,189,778 B1 | 11/2015 | Sh. Al-Rashidi | |
| 9,779,585 B2 | 10/2017 | Dupuis et al. | |
| 9,825,934 B1 | 11/2017 | Alexander | |
| 9,842,330 B1 | 12/2017 | Van Os et al. | |
| 9,923,930 B2* | 3/2018 | Zhang | H04L 63/0861 |
| 10,032,100 B2 | 7/2018 | Mullen et al. | |
| 10,223,631 B2 | 3/2019 | Mullen et al. | |
| 10,255,545 B2 | 4/2019 | Mullen et al. | |
| 10,783,576 B1 | 9/2020 | Van Os et al. | |
| 2002/0023215 A1 | 2/2002 | Wang et al. | |
| 2003/0061157 A1 | 3/2003 | Hirka et al. | |
| 2004/0006479 A1 | 1/2004 | Tanaka | |
| 2004/0225609 A1 | 11/2004 | Greene | |
| 2005/0131816 A1 | 6/2005 | Britto et al. | |
| 2005/0210394 A1 | 9/2005 | Crandall et al. | |
| 2005/0219223 A1 | 10/2005 | Kotzin et al. | |
| 2006/0000900 A1 | 1/2006 | Fernandes et al. | |
| 2006/0064372 A1 | 3/2006 | Gupta | |
| 2007/0254712 A1 | 11/2007 | Chitti | |
| 2008/0078831 A1 | 4/2008 | Johnson et al. | |
| 2008/0208681 A1 | 8/2008 | Hammad et al. | |
| 2009/0005011 A1 | 1/2009 | Christie et al. | |
| 2009/0030793 A1 | 1/2009 | Fordyce, III | |
| 2009/0048959 A1 | 2/2009 | Omura et al. | |
| 2009/0050687 A1 | 2/2009 | Kon et al. | |
| 2009/0094134 A1 | 4/2009 | Toomer et al. | |
| 2009/0119678 A1 | 5/2009 | Shih et al. | |
| 2009/0182674 A1 | 7/2009 | Patel et al. | |
| 2009/0195469 A1 | 8/2009 | Lim et al. | |
| 2009/0227296 A1 | 9/2009 | Kim | |
| 2010/0001980 A1 | 1/2010 | Kim et al. | |
| 2010/0042517 A1 | 2/2010 | Paintin et al. | |
| 2010/0078472 A1 | 4/2010 | Lin et al. | |
| 2010/0082445 A1 | 4/2010 | Hodge et al. | |
| 2010/0161434 A1 | 6/2010 | Herwig et al. | |
| 2010/0217808 A1 | 8/2010 | Benninger | |
| 2011/0166992 A1 | 7/2011 | Dessert et al. | |
| 2011/0184820 A1 | 7/2011 | Mon et al. | |
| 2011/0202417 A1 | 8/2011 | DeWakar et al. | |
| 2011/0218849 A1 | 9/2011 | Rutigliano et al. | |
| 2011/0244796 A1 | 10/2011 | Khan et al. | |
| 2011/0251892 A1 | 10/2011 | Laracey | |
| 2011/0282697 A1 | 11/2011 | Fitzgerald et al. | |
| 2012/0078788 A1 | 3/2012 | Gandhi | |
| 2012/0095918 A1 | 4/2012 | Jurss | |
| 2012/0101881 A1 | 4/2012 | Taylor et al. | |
| 2012/0101887 A1 | 4/2012 | Harvey et al. | |
| 2012/0109764 A1 | 5/2012 | Martin et al. | |
| 2012/0110456 A1 | 5/2012 | Larco et al. | |
| 2012/0136781 A1 | 5/2012 | Fridman et al. | |
| 2012/0150750 A1 | 6/2012 | Law et al. | |
| 2012/0191603 A1 | 7/2012 | Nuzzi | |
| 2012/0197743 A1 | 8/2012 | Grigg et al. | |
| 2012/0215647 A1 | 8/2012 | Powell et al. | |
| 2012/0232968 A1 | 9/2012 | Calman et al. | |
| 2012/0245941 A1 | 9/2012 | Cheyer | |
| 2012/0310760 A1 | 12/2012 | Phillips et al. | |
| 2012/0317023 A1 | 12/2012 | Moon et al. | |
| 2012/0330830 A1 | 12/2012 | Mason et al. | |
| 2013/0006746 A1 | 1/2013 | Moore | |
| 2013/0024371 A1 | 1/2013 | Hariramani et al. | |
| 2013/0124319 A1 | 5/2013 | Hodge et al. | |
| 2013/0151360 A1 | 6/2013 | Scipioni et al. | |
| 2013/0159178 A1 | 6/2013 | Colon et al. | |
| 2013/0179304 A1 | 7/2013 | Swist | |
| 2013/0200146 A1 | 8/2013 | Moghadam | |
| 2013/0218721 A1 | 8/2013 | Borhan et al. | |
| 2013/0238455 A1 | 9/2013 | Laracey | |
| 2013/0275300 A1 | 10/2013 | Killian et al. | |
| 2013/0282533 A1 | 10/2013 | Foran-owens et al. | |
| 2013/0332826 A1 | 12/2013 | Karunamuni et al. | |
| 2014/0019352 A1 | 1/2014 | Shrivastava | |
| 2014/0020068 A1 | 1/2014 | Desai et al. | |
| 2014/0052794 A1 | 2/2014 | Tucker et al. | |
| 2014/0067654 A1 | 3/2014 | Hanson et al. | |
| 2014/0074569 A1 | 3/2014 | Francis et al. | |
| 2014/0122331 A1 | 5/2014 | Vaish et al. | |
| 2014/0129435 A1 | 5/2014 | Pardo et al. | |
| 2014/0149198 A1 | 5/2014 | Kim et al. | |
| 2014/0172533 A1 | 6/2014 | Andrews et al. | |
| 2014/0207679 A1 | 7/2014 | Cho | |
| 2014/0215361 A1 | 7/2014 | Hwang et al. | |
| 2014/0244495 A1 | 8/2014 | Davis et al. | |
| 2014/0279474 A1 | 9/2014 | Evans et al. | |
| 2014/0279530 A1 | 9/2014 | Douglas et al. | |
| 2014/0279543 A1 | 9/2014 | Ruhrig | |
| 2014/0297385 A1 | 10/2014 | Ryan | |
| 2014/0372920 A1 | 12/2014 | Choi et al. | |
| 2014/0379341 A1 | 12/2014 | Seo et al. | |
| 2015/0005039 A1 | 1/2015 | Liu et al. | |
| 2015/0012425 A1 | 1/2015 | Mathew | |
| 2015/0044964 A1 | 2/2015 | Khan et al. | |
| 2015/0046989 A1* | 2/2015 | Oberheide | G06F 21/44 726/6 |
| 2015/0115028 A1 | 4/2015 | Montealegre | |
| 2015/0186871 A1 | 7/2015 | Laracey | |
| 2015/0213560 A1 | 7/2015 | Aabye et al. | |
| 2015/0264111 A1 | 9/2015 | Aleksandrov | |
| 2015/0278814 A1 | 10/2015 | Jaffe | |
| 2015/0340025 A1 | 11/2015 | Shima | |
| 2015/0348001 A1 | 12/2015 | Van os et al. | |
| 2015/0348002 A1 | 12/2015 | Van os et al. | |
| 2016/0011768 A1 | 1/2016 | Yim et al. | |
| 2016/0055487 A1* | 2/2016 | Votaw | G06F 21/316 705/44 |
| 2016/0080525 A1* | 3/2016 | Ward | G06Q 50/01 709/203 |
| 2016/0086166 A1 | 3/2016 | Pomeroy et al. | |
| 2016/0104159 A1 | 4/2016 | Butterfield et al. | |
| 2016/0117670 A1 | 4/2016 | Davis | |
| 2016/0156574 A1 | 6/2016 | Hum et al. | |
| 2016/0171481 A1 | 6/2016 | Mcelmurry et al. | |
| 2016/0180316 A1 | 6/2016 | Wang et al. | |
| 2016/0180325 A1 | 6/2016 | Davis et al. | |
| 2016/0189717 A1 | 6/2016 | Kannan et al. | |
| 2016/0203483 A1 | 7/2016 | Bridgewater et al. | |
| 2016/0210623 A1 | 7/2016 | Voege | |
| 2016/0232516 A1 | 8/2016 | Dayan et al. | |
| 2016/0267447 A1 | 9/2016 | Davis et al. | |
| 2016/0277342 A1 | 9/2016 | Shi | |
| 2016/0352667 A1 | 12/2016 | Pickett et al. | |
| 2016/0358167 A1 | 12/2016 | Van os et al. | |
| 2016/0358168 A1 | 12/2016 | Van os et al. | |
| 2016/0358199 A1 | 12/2016 | Van os et al. | |
| 2016/0364715 A1 | 12/2016 | Cho et al. | |
| 2016/0378186 A1 | 12/2016 | Kim | |
| 2017/0046111 A1 | 2/2017 | Chu et al. | |
| 2017/0061405 A1* | 3/2017 | Bryant | G06Q 20/3278 |
| 2017/0091745 A1 | 3/2017 | Castinado et al. | |
| 2017/0123498 A1 | 5/2017 | Dillon et al. | |
| 2017/0193501 A1 | 7/2017 | Cole et al. | |
| 2017/0228704 A1 | 8/2017 | Zhou et al. | |
| 2017/0235936 A1* | 8/2017 | de los Rios | G06F 21/36 726/19 |
| 2017/0339347 A1 | 11/2017 | Cho et al. | |
| 2017/0344526 A1 | 11/2017 | Smith et al. | |
| 2018/0053157 A1 | 2/2018 | Roffey | |
| 2018/0053169 A1 | 2/2018 | James | |
| 2018/0068313 A1 | 3/2018 | Van os et al. | |

(56) References Cited

U.S. PATENT DOCUMENTS

| | | |
|---|---|---|
| 2018/0082282 A1 | 3/2018 | Van os et al. |
| 2018/0082285 A1 | 3/2018 | Prabhakar et al. |
| 2018/0218359 A1 | 8/2018 | Kim et al. |
| 2018/0335928 A1 | 11/2018 | Van os et al. |
| 2018/0336543 A1 | 11/2018 | Van os et al. |
| 2019/0149539 A1* | 5/2019 | Scruby .................. H04L 9/3234 713/168 |
| 2019/0370805 A1 | 12/2019 | Van Os et al. |
| 2020/0143353 A1 | 5/2020 | Van Os et al. |
| 2020/0211047 A1 | 7/2020 | Van Os et al. |
| 2020/0302517 A1 | 9/2020 | Van Os et al. |
| 2020/0302519 A1 | 9/2020 | Van Os et al. |

FOREIGN PATENT DOCUMENTS

| | | |
|---|---|---|
| CN | 105787718 A | 7/2016 |
| CN | 105844468 A | 8/2016 |
| EP | 2701107 A1 | 2/2014 |
| EP | 2980741 A1 | 2/2016 |
| EP | 3062271 A1 | 8/2016 |
| EP | 3096275 A1 | 11/2016 |
| EP | 3047622 B1 | 8/2017 |
| EP | 3349400 A1 | 7/2018 |
| GB | 2528948 A | 2/2016 |
| JP | 2003-67210 A | 3/2003 |
| JP | 2004-37998 A | 2/2004 |
| JP | 2006-221468 A | 8/2006 |
| JP | 2007-226794 A | 9/2007 |
| JP | 2009-134521 A | 6/2009 |
| JP | 2011-503711 A | 1/2011 |
| JP | 2012-114676 A | 6/2012 |
| JP | 2012-198625 A | 10/2012 |
| JP | 2013-157959 A | 8/2013 |
| JP | 2013-218663 A | 10/2013 |
| JP | 2013-229656 A | 11/2013 |
| JP | 2014-41616 A | 3/2014 |
| JP | 2014-517366 A | 7/2014 |
| JP | 2014-520296 A | 8/2014 |
| JP | 2015-534664 A | 12/2015 |
| JP | 2016-53766 A | 4/2016 |
| JP | 2016-71655 A | 5/2016 |
| JP | 2017-41098 A | 2/2017 |
| JP | 2018-506103 A | 3/2018 |
| JP | 2018-524679 A | 8/2018 |
| KR | 10-2004-0027236 A | 4/2004 |
| KR | 10-2006-0098024 A | 9/2006 |
| KR | 10-2010-0045059 A | 5/2010 |
| KR | 10-1184865 B1 | 9/2012 |
| KR | 10-2013-0112339 A | 10/2013 |
| KR | 10-2014-0018019 A | 2/2014 |
| KR | 10-2014-0027029 A | 3/2014 |
| KR | 10-2014-0131093 A | 11/2014 |
| KR | 10-2014-0139982 A | 12/2014 |
| KR | 10-2016-0054573 A | 5/2016 |
| KR | 10-2016-0105279 A | 9/2016 |
| KR | 10-2017-0011784 A | 2/2017 |
| KR | 10-2018-0051556 A | 5/2018 |
| WO | 2011/037134 A1 | 3/2011 |
| WO | 2012/129231 A1 | 9/2012 |
| WO | 2014/033939 A1 | 3/2014 |
| WO | 2015/009581 A1 | 1/2015 |
| WO | 2015/030912 A1 | 3/2015 |
| WO | 2015/051361 A1 | 4/2015 |
| WO | 2015/057320 A1 | 4/2015 |
| WO | 2015/187608 A1 | 12/2015 |
| WO | 2016/032534 A1 | 3/2016 |
| WO | 2016/126775 A1 | 8/2016 |
| WO | 2017/030642 A1 | 2/2017 |
| WO | 2017/041641 A1 | 3/2017 |
| WO | 2017/072589 A2 | 5/2017 |
| WO | 2017/078792 A1 | 5/2017 |

OTHER PUBLICATIONS

Office Action received for Danish Patent Application No. PA201770502, dated Sep. 9, 2019, 2 pages.
Office Action received for Korean Patent Application No. 10-2019-7033768, dated Mar. 13, 2020, 6 pages (2 pages of English Translation and 4 pages of Official Copy).
Advisory Action received for U.S. Appl. No. 15/274,910, dated Aug. 12, 2019, 3 pages.
International Search Report and Written Opinion received for PCT Patent Application No. PCT/US2019/035064, dated Aug. 9, 2019, 12 pages.
Invitation to Pay Additional Fees received for PCT Patent Application No. PCT/US2019/024702, dated Jul. 22, 2019, 11 pages.
Non-Final Office Action received for U.S. Appl. No. 15/981,817, dated Jan. 2, 2020, 31 pages.
Office Action received for Chinese Patent Application No. 201610371856.9, dated Dec. 18, 2019, 6 pages (3 pages of English Translation and 3 pages of Official Copy).
Office Action received for Chinese Patent Application No. 201780002648.4, dated Nov. 26, 2019, 10 pages (4 pages of English Translation and 6 pages of Official Copy).
Notice of Allowance received for U.S. Appl. No. 14/871,635, dated Jan. 15, 2020, 3 pages.
International Search Report and Written Opinion received for PCT Patent Application No. PCT/US2019/024702, dated Sep. 13, 2019, 17 pages.
Office Action received for Danish Patent Application No. PA201770503, dated Sep. 20, 2019, 5 pages.
Summons to Attend Oral Proceedings received for European Patent Application No. 16803996.4, dated Oct. 2, 2019, 16 pages.
Extended European Search Report received for European Patent Application No. 17835789.3, dated Jun. 23, 2020, 12 pages.
Non-Final Office Action received for U.S. Appl. No. 15/823,269, dated Jun. 23, 2020, 14 pages.
Notice of Allowance received for Korean Patent Application No. 10-2019-7033768, dated Jun. 3, 2020, 6 pages (2 pages of English Translation and 4 pages of Official Copy).
Office Action received for Japanese Patent Application No. 2017-562050, dated Sep. 30, 2019, 5 pages (2 pages of English Translation and 3 pages of Official Copy).
Applicant-Initiated Interview Summary received for U.S. Appl. No. 15/274,910, dated Jul. 9, 2020, 3 pages.
European Search Report received for European Patent Application No. 20180033.1, dated Jul. 6, 2020, 4 pages.
Office Action received for European Patent Application No. 18730556.0, dated Jun. 23, 2020, 11 pages.
Notice of Allowance received for Japanese Patent Application No. 2017-562050, dated Jun. 1, 2020, 4 pages (1 page of English Translation and 3 pages of Official Copy).
Notice of Allowance received for U.S. Appl. No. 15/981,817, dated May 28, 2020, 16 pages.
Invitation to Pay Search Fees received for European Patent Application No. 18730556.0, dated Mar. 2, 2020, 3 pages.
Office Action received for Australian Patent Application No. 2017324176, dated Feb. 27, 2020, 3 pages.
Applicant Initiated Interview Summary received for U.S. Appl. No. 15/884,195, dated Apr. 28, 2020, 5 pages.
Applicant Initiated Interview Summary received for U.S. Appl. No. 15/981,817, dated Apr. 22, 2020, 5 pages.
Decision to Refuse Application received for the European Patent Application No. 16803996.4, dated Apr. 14, 2020, 28 pages.
Non-Final Office Action received for U.S. Appl. No. 16/736,704, dated May. 1, 2020, 41 pages.
Office Action received for Australian Patent Application No. 2017324176, dated Apr. 21, 2020, 3 pages.
Decision to Refuse Application received for the European Patent Application No. 16803996.4, dated Apr. 3, 2020, 25 pages.
Non-Final Office Action received for U.S. Appl. No. 15/274,910, dated Apr. 6, 2020, 33 pages.
Notice of Allowance received for Korean Patent Application No. 10-2020-7004737, dated Mar. 31, 2020, 4 pages (1 page of English Translation and 3 pages of Official Copy).

(56) References Cited

OTHER PUBLICATIONS

Advisory Action received for U.S. Appl. No. 14/869,715, dated Feb. 8, 2017, 3 pages.
Advisory Action received for U.S. Appl. No. 14/869,715, dated May 18, 2017, 6 pages.
Decision to Refuse received for European Patent Application No. 18154163.2, dated May 17, 2019, 22 pages.
Extended European Search Report received for European Patent Application No. 16803996.4, dated Feb. 7, 2018, 8 pages.
Extended European Search Report received for European Patent Application No. 18154163.2, dated Mar. 2, 2018, 4 pages.
Final Office Action received for U.S Appl. No. 14/871,654, dated Nov. 16, 2017, 32 pages.
Final Office Action received for U.S. Appl. No. 14/869,715, dated Jun. 17, 2016, 35 pages.
Final Office Action received for U.S. Appl. No. 14/869,715, dated Mar. 7, 2017, 41 pages.
Final Office Action received for U.S. Appl. No. 14/869,715, dated Oct. 6, 2016, 37 pages.
Final Office Action received for U.S. Appl. No. 14/871,635, dated Jan. 18, 2018, 33 pages.
Final Office Action Received for U.S. Appl. No. 14/871,635, dated May 3, 2019, 32 pages.
Final Office Action received for U.S. Appl. No. 15/274,910, dated May 31, 2019, 31 pages.
International Preliminary Report on Patentability received for PCT Patent Application No. PCT/US2016/033751, dated Dec. 14, 2017, 11 pages.
International Preliminary Report on Patentability received for PCT Patent Application No. PCT/US2017/49500, dated Mar. 21, 2019, 14 pages.
International Search Report and Written Opinion received for PCT Patent Application No. PCT/US2018/033054, dated Oct. 30, 2018, 32 pages.
International Search Report and Written Opinion received for PCT Patent Application No. PCT/US2016/033751, dated Oct. 5, 2016, 14 pages.
International Search Report and Written Opinion received for PCT Patent Application No. PCT/US2017/49500, dated Jan. 18, 2018, 18 pages.
Invitation to Pay Additional Fee received for PCT Patent Application No. PCT/US2017/49500, dated Nov. 14, 2017, 3 pages.
Invitation to Pay Additional Fees received for PCT Patent Application No. PCT/US2016/033751, dated Jul. 22, 2016, 2 pages.
Invitation to Pay Additional Fees received for PCT Patent Application No. PCT/US2018/033054, dated Sep. 4, 2018, 25 pages.
Minutes of the Oral Proceedings received for European Patent Application No. 18154163.2, dated May 17, 2019, 7 pages.
Non-Final Office Action received for U.S. Appl. No. 14/869,715, dated Jan. 29, 2016, 62 pages.
Non-Final Office Action received for U.S. Appl. No. 14/869,715, dated Oct. 11, 2016, 37 pages.
Non-Final Office Action received for U.S. Appl. No. 14/871,635, dated May 5, 2017, 23 pages.
Non-Final Office Action Received for U.S. Appl. No. 14/871,635, dated Nov. 16, 2018, 36 pages.
Non-Final Office Action received for U.S. Appl. No. 14/871,654, dated May 4, 2017, 23 pages.
Non-Final Office Action received for U.S. Appl. No. 15/274,086, dated Jan. 11, 2017, 21 pages.
Non-Final Office Action received for U.S. Appl. No. 15/274,910, dated Oct. 18, 2018, 26 pages.
Notice of Allowance received for Japanese Patent Application No. 2018-008937, dated Jul. 2, 2018, 4 pages (1 page of English Translation and 3 pages of Official copy).
Notice of Allowance received for Japanese Patent Application No. 2018-504997, dated Aug. 3, 2018, 4 pages (1 page of English Translation and 3 pages of Official copy).
Notice of Allowance received for Korean Patent Application No. 10-2017-7034677, dated May 27, 2019, 5 pages (2 pages of English Translation and 3 pages of Official Copy).
Notice of Allowance received for Korean Patent Application No. 10-2018-7001854, dated Aug. 21, 2018, 4 pages (1 page of English Translation and 3 pages of Official Copy).
Notice of Allowance received for U.S. Appl. No. 14/869,715, dated Dec. 19, 2017, 32 pages.
Notice of Allowance received for U.S. Appl. No. 14/871,654, dated May 22, 2018, 22 pages.
Notice of Allowance received for U.S. Appl. No. 15/274,086, dated Jun. 7, 2017, 8 pages.
Notice of Allowance received for U.S. Appl. No. 15/274,086, dated Oct. 19, 2017, 9 pages.
Office Action received for Australian Patent Application No. 2016100795, dated Aug. 12, 2016, 6 pages.
Office Action received for Australian Patent Application No. 2016100795, dated Feb. 6, 2017, 3 pages.
Office Action received for Australian Patent Application No. 2016270775, dated May 29, 2019, 3 pages.
Office Action received for Australian Patent Application No. 2016270775, dated Nov. 26, 2018, 5 pages.
Office Action received for Australian Patent Application No. 2017100328, dated May 16, 2017, 3 pages.
Office Action received for Australian Patent Application No. 2017100328, dated Oct. 16, 2017, 6 pages.
Office Action received for Australian Patent Application No. 2018200485, dated Feb. 20, 2019, 6 pages.
Office Action received for Australian Patent Application No. 2018200485, dated Mar. 15, 2018, 3 pages.
Office Action received for Australian Patent Application No. 2018200485, dated Mar. 15, 2019, 4 pages.
Office Action received for Chinese Patent Application No. 201610371856.9, dated Dec. 19, 2018, 12 pages (5 pages of English Translation and 7 pages of Official Copy).
Office Action received for Chinese Patent Application No. 201620509362.8, dated Feb. 10, 2017, 2 pages (Official Copy only) (See Communication under 37 CFR § 1.98(a) (3)).
Office Action received for Chinese Patent Application No. 201620509362.8, dated Oct. 21, 2016, 3 pages (1 page of English Translation and 2 pages of Official Copy).
Office Action received for Chinese Patent Application No. 201780002648.4, dated Dec. 5, 2018, 13 pages (5 pages of English Translation and 8 pages of Official Copy).
Office Action received for Danish Patent Application No. PA201670363, dated Feb. 12, 2018, 2 pages.
Office Action received for Danish Patent Application No. PA201670363, dated Jun. 1, 2017, 5 pages.
Office Action received for Danish Patent Application No. PA201670363, dated Nov. 4, 2016, 11 pages.
Office Action received for Danish Patent Application No. PA201670709, dated Jul. 21, 2017, 4 pages.
Office Action received for Danish Patent Application No. PA201670709, dated Nov. 30, 2016, 10 pages.
Office Action received for Danish Patent Application No. PA201670710, dated Dec. 8, 2016, 10 pages.
Office Action received for Danish Patent Application No. PA201670710, dated Sep. 25, 2017, 6 pages.
Office Action received for Danish Patent Application No. PA201770502, dated Dec. 14, 2018, 7 pages.
Office Action received for Danish Patent Application No. PA201770503, dated Dec. 19, 2018, 6 pages.
Office Action received for Danish Patent Application No. PA201770503, dated Nov. 24, 2017, 10 pages.
Office Action received for Danish Patent Application No. PA201770505, dated Jul. 27, 2018, 4 pages.
Office Action received for Danish Patent Application No. PA201770505, dated May 20, 2019, 7 pages.
Office Action received for Danish Patent Application No. PA201770505, dated Sep. 19, 2017, 10 pages.
Office Action received for European Patent Application No. 16803996.4, dated Nov. 29, 2018, 12 pages.

(56) References Cited

OTHER PUBLICATIONS

Office Action received for European Patent Application No. 18154163.2, dated Apr. 11, 2018, 6 pages.
Office Action received for Japanese Patent Application No. 2017-562050, dated Feb. 1, 2019, 15 pages (8 pages of English Translation and 7 pages of Official Copy).
Office Action received for Korean Patent Application No. 10-2017-7034677, dated Nov. 1, 2018, 5 pages (2 pages of English Translation and 3 pages of Official Copy).
Office Action received for Korean Patent Application No. 10-2018-7001854, dated Apr. 2, 2018, 13 pages (6 pages of English Translation and 7 pages of Official Copy).
Preliminary Opinion before Oral Proceedings received for European Patent Application No. 18154163.2, dated Apr. 16, 2019, 12 pages.
Search Report and Opinion received for Danish Patent Application No. PA201770502, dated Nov. 10, 2017, 10 pages.
Summons to Attend Oral Proceedings received for European Patent Application No. 18154163.2, dated Nov. 29, 2018, 9 pages.
Intention to Grant received for Danish Patent Application No. PA201770503, dated Nov. 11, 2019, 2 pages.
International Preliminary Report on Patentability received for PCT Patent Application No. PCT/US2018/033054, dated Nov. 28, 2019, 21 pages.
Notice of Allowance received for Korean Patent Application No. 10-2019-7025322, dated Nov. 20, 2019, 5 pages (2 pages of English Translation and 3 pages of Official Copy).
Notice of Allowance received for U.S. Appl. No. 14/871,635, dated Nov. 14, 2019, 14 pages.
Office Action received for Australian Patent Application No. 2019100592, dated Nov. 25, 2019, 3 pages.
Smart Card Alliance, "Security of Proximity Mobile Payments", Online Available at: https://www.securetechalliance.org/resources/pdf/Security_of_Proximity_Mobile_Payments.pdf, May 2009, pp. 1-39.
Non-Final Office Action received for U.S. Appl. No. 16/152,139, dated May 20, 2020, 9 pages.
Notice of Allowance received for Chinese Patent Application No. 201610371856.9, dated May 11, 2020, 2 pages (1 page of English Translation and 1 page of Official copy).
Office Action received for Australian Patent Application No. 2020100388, dated May 7, 2020, 5 pages.
Office Action received for Danish Patent Application No. PA201770502, dated May 7, 2020, 5 pages.
Teather et al., "Assessing the Effects of Orientation and Device on (Constrained) 30 Movement Techniques", IEEE Symposium on 30 User Interfaces. Reno, Nevada, USA., Mar. 8-9, 2008, 8 pages.
Notice of Acceptance received for Australian Patent Application No. 2018269512, dated Jan. 28, 2020, 3 pages.
Notice of Allowance received for U.S. Appl. No. 14/871,635, dated Feb. 3, 2020, 3 pages.
Office Action received for Danish Patent Application No. PA201770502, dated Jan. 20, 2020, 2 pages.
Office Action received for Danish Patent Application No. PA201770505, dated Jan. 17, 2020, 7 pages.
Office Action received for Australian Patent Application No. 2016270775, dated Nov. 26, 2019, 3 pages.
Office Action received for Chinese Patent Application No. 201610371856.9, dated Jul. 10, 2019, 6 pages (3 pages of English Translation and 3 pages of Official Copy).
Office Action received for Chinese Patent Application No. 201780002648.4, dated Jun. 12, 2019, 11 pages (5 pages of English Translation and 6 pages of Official Copy).
Certificate of Examination received for Australian Patent Application No. 2019100592, dated Feb. 6, 2020, 2 pages.
Decision to Grant received for Danish Patent Application No. PA201770503, dated Feb. 14, 2020, 3 pages.
Non-Final Office Action received for U.S. Appl. No. 15/884,195, dated Feb. 27, 2020, 18 pages.
Office Action received for Japanese Patent Application No. 2018-158482, dated Jan. 10, 2020, 9 pages (5 pages of English Translation and 4 pages of Official Copy).
Result of Consultation received for European Patent Application No. 16803996.4, dated Feb. 17, 2020, 14 pages.
Nomad, Studio, "Hajimete-no-smartphone-no-komatta-wo-sakutto-kaiketsu (Easy solution to troubles at your first smartphone)", Kazukuni Saito of Shuwa System Co., Ltd., 1st Ed, 20 pages Jul. 1, 2016, 20 pages (Official Copy only) (See Communication under 37 CFR § 1.98(a) (3)).
Office Action received for European Patent Application No. 20180033.1, dated Jul. 17, 2020, 7 pages.
Notice of Allowance received for Japanese Patent Application No. 2018-158482, dated Sep. 7, 2020, 4 pages (1 page of English Translation and 3 pages of Official Copy).
Office Action received for Australian Patent Application No. 2017324176, dated Aug. 17, 2020, 5 pages.
Advisory Action received for U.S. Appl. No. 16/581,614, dated Sep. 11, 2020, 8 pages.
Applicant Initiated Interview Summary received for U.S. Appl. No. 15/823,269, dated Sep. 17, 2020, 3 pages.
Applicant Initiated Interview Summary received for U.S. Appl. No. 16/581,614, dated Apr. 30, 2020, 4 pages.
Applicant Initiated Interview Summary received for U.S. Appl. No. 16/581,614, dated Aug. 26, 2020, 3 pages.
Applicant-Initiated Interview Summary received for U.S. Appl. No. 16/581,569, dated May 1, 2020, 3 pages.
Final Office Action received for U.S. Appl. No. 15/884,195, dated Sep. 29, 2020, 20 pages.
Final Office Action received for U.S. Appl. No. 16/581,614, dated Jul. 10, 2020, 21 pages.
International Search Report and Written Opinion received for PCT Patent Application No. PCT/US2020/020414, dated Jul. 27, 2020, 27 pages.
Invitation to Pay Additional Fees received for PCT Patent Application No. PCT/US2020/020414, dated Jun. 4, 2020, 24 pages.
Non-Final Office Action received for U.S. Appl. No. 16/581,569, dated Feb. 13, 2020, 32 pages.
Non-Final Office Action received for U.S. Appl. No. 16/581,614, dated Jan. 29, 2020, 13 pages.
Notice of Allowance received for U.S. Appl. No. 16/581,569, dated May 27, 2020, 43 pages.
Office Action received for Korean Patent Application No. 10-2020-7025711, dated Sep. 11, 2020, 12 pages (5 pages of English Translation and 7 pages of Official Copy).
Certificate of Examination received for Australian Patent Application No. 2020100388, dated Sep. 28, 2020, 2 pages.
Final Office Action received for U.S. Appl. No. 15/274,910, dated Oct. 16, 2020, 34 pages.
Final Office Action received for U.S. Appl. No. 16/736,704, dated Oct. 13, 2020, 62 pages.
Intention to Grant received for Danish Patent Application No. PA201770502, dated Oct. 6, 2020, 2 pages.
Applicant Initiated Interview Summary received for U.S. Appl. No. 16/736,704, dated Aug. 27, 2020, 5 pages.
Office Action received for Japanese Patent Application No. 2019-572834, dated Jul. 17, 2020, 13 pages (7 pages of English Translation and 6 pages of Official Copy).
Applicant-Initiated Interview Summary received for U.S. Appl. No. 16/152,139, dated Aug. 10, 2020, 3 pages.

* cited by examiner

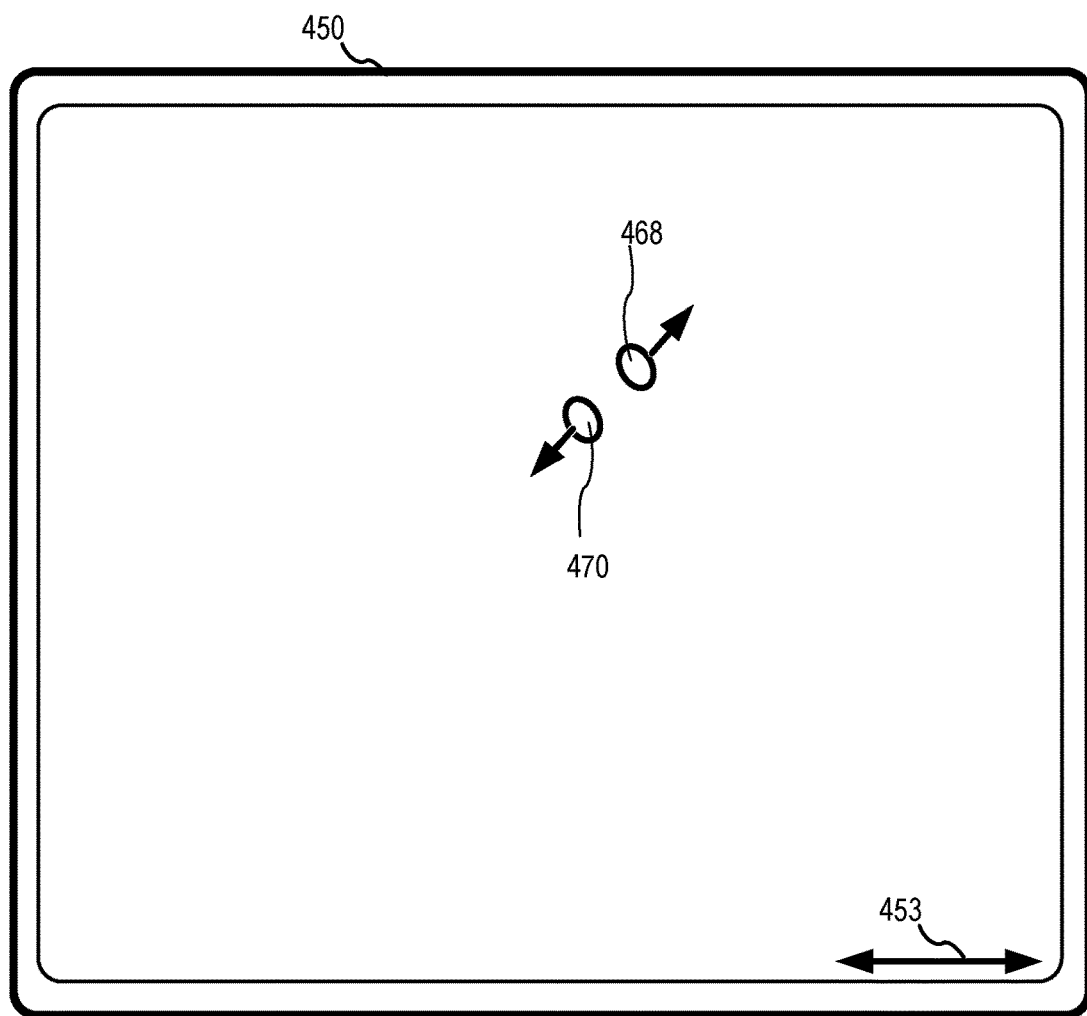
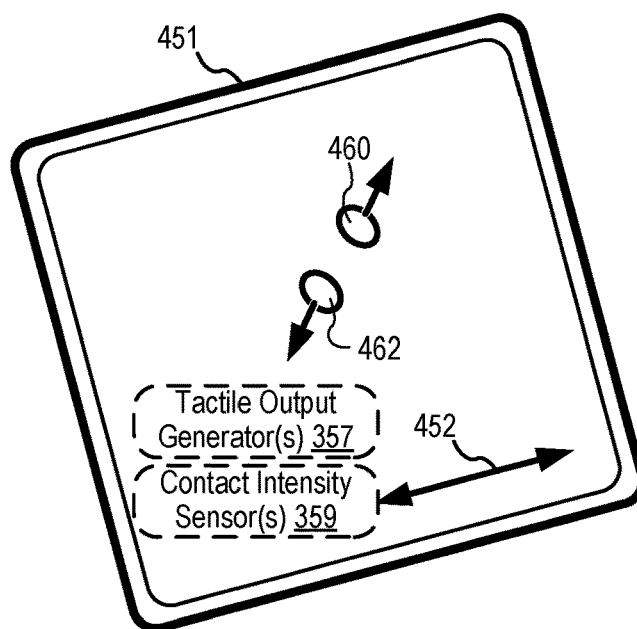
FIG. 4B

806
In accordance with a determination that the device was operating in a first context when the request to add the secure credential was received, initiate a first process for inputting information about the secure credential to the electronic device

Ⓐ

Wherein the secure credential is associated with an issuer of the information associated with the secure credential, and wherein initiating the first process for inputting information about the secure credential to the electronic device includes:

808
Receive an input corresponding to identification of the issuer of the information associated with the secure credential

810
In response to receiving the input corresponding to identification of the issuer of the information associated with the secure credential, display a plurality of types of information issued by the issuer of the information, the plurality of types of information including at least a first type of information and a second type of information, different from the first type of information

*FIG. 8B*

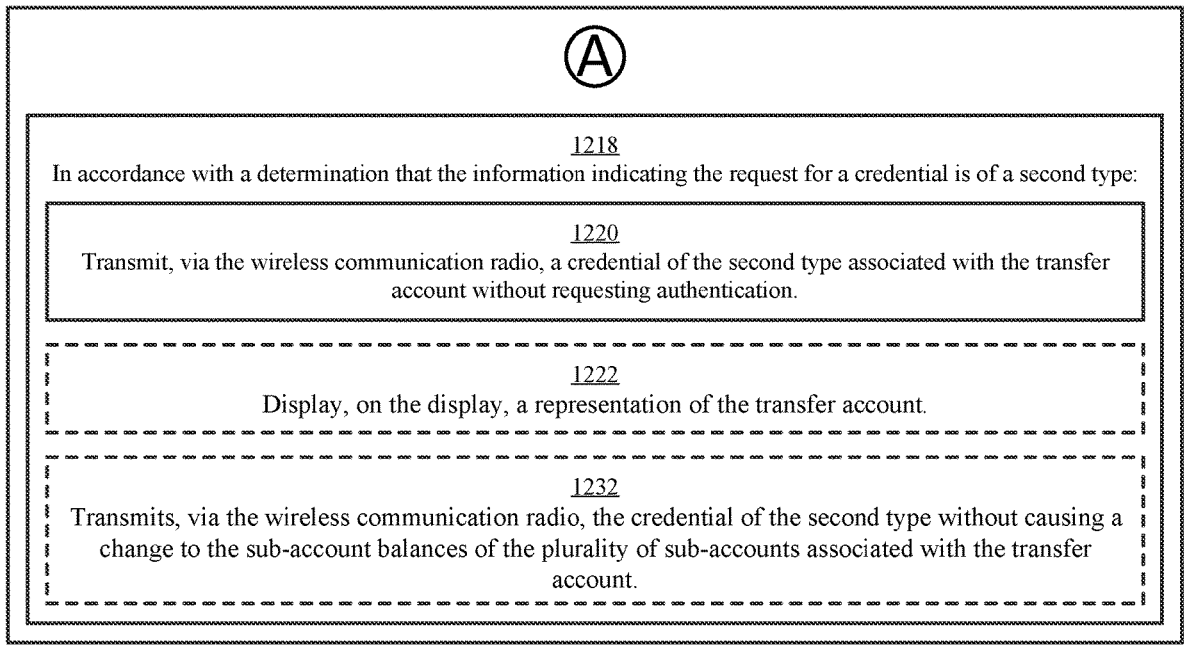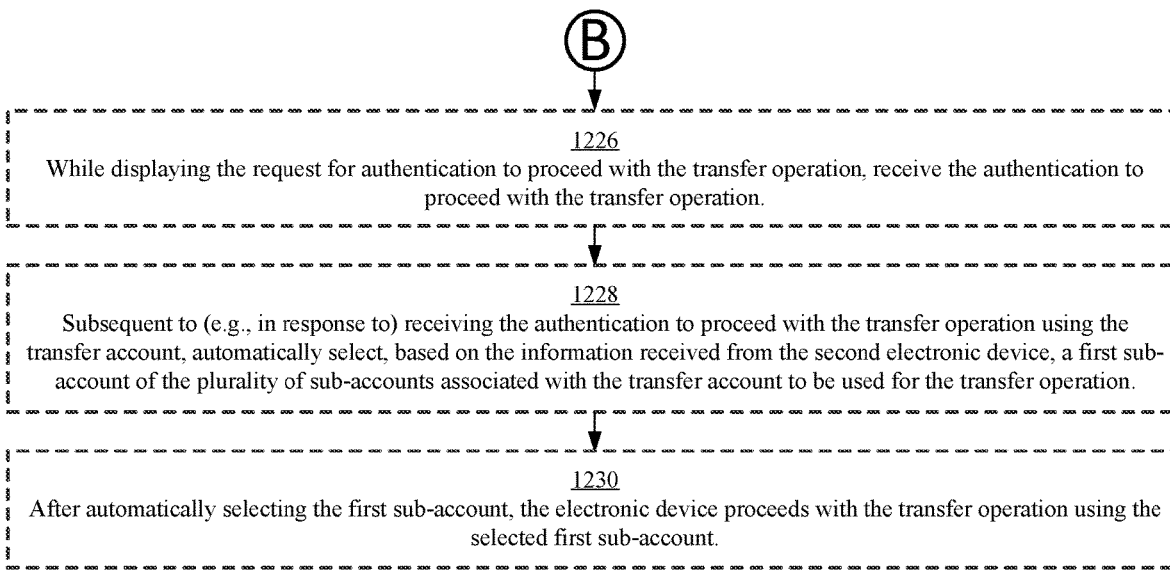
FIG. 12B

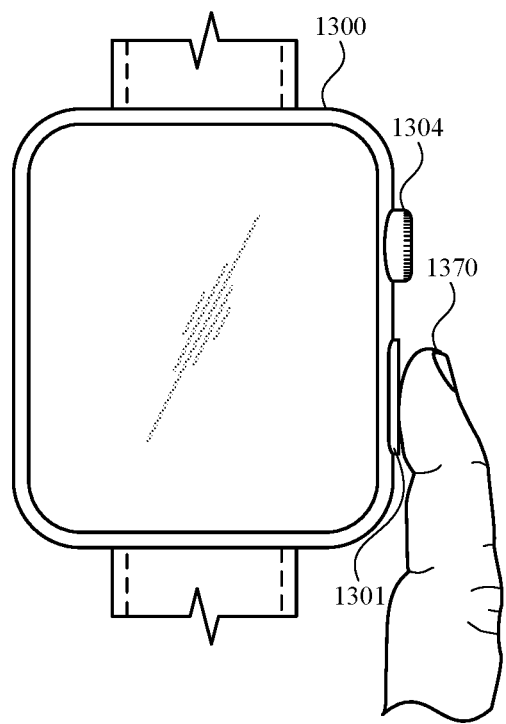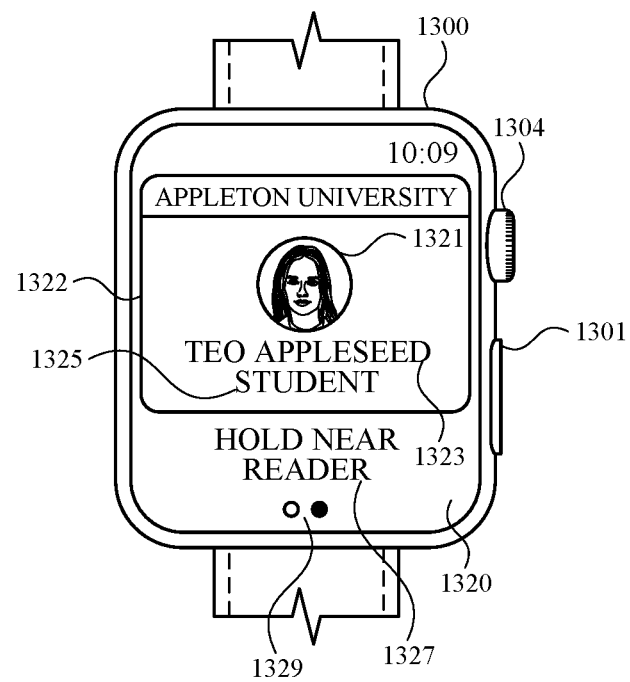
*FIG. 13C*          *FIG. 13D*

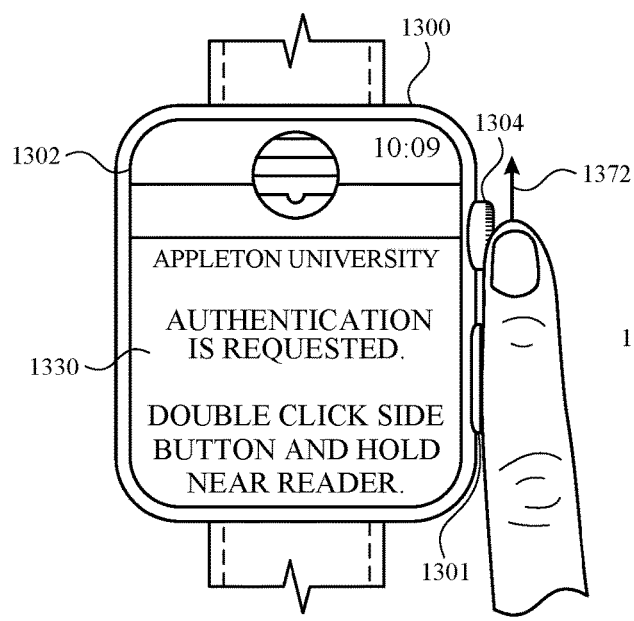
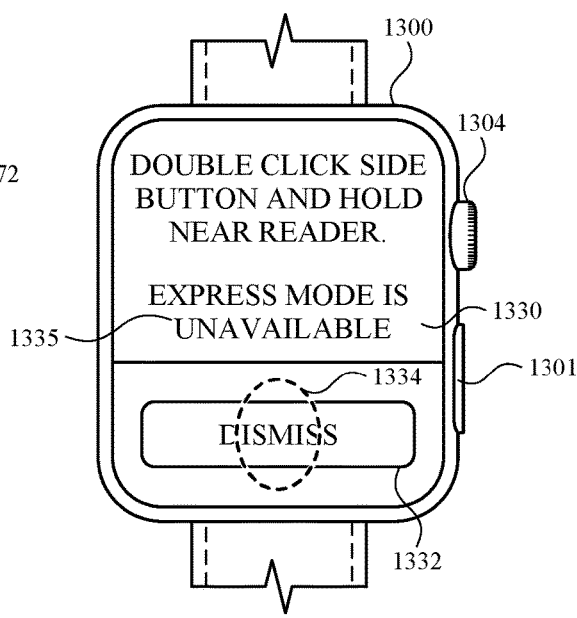
*FIG. 13M*          *FIG. 13N*

1400

1402
Receive from a communication terminal, via the one or more wireless communication radios, a request for a credential.

↓

1404
In response to receiving the request for the credential:

1406
In accordance with a determination that authentication has been provided for the first account, transmit, via the one or more wireless communication radios, the credential of the first account without requesting authentication.

1408
In accordance with a determination that authentication has not been provided for the first account, that the first account has been set up at the electronic device to provide credentials without requiring authentication, and authentication is required by the communication terminal, request authentication at the electronic device without transmitting the credential of the first account.

1410
In accordance with a determination that authentication has not been provided for the first account such that the electronic device is not in the authentication provided state for the first account, that the first account has been set up at the electronic device to provide credentials without requiring authentication, and authentication is not required by the communication terminal, transmit, via the one or more wireless communication radios, the credential of the first account without requesting authentication at the electronic device.

1412
In accordance with a determination that authentication has not been provided for the first account and that the first account has not been set up at the device to provide credentials without requiring authentication, request authentication at the electronic device without transmitting the credential of the first account.

*FIG. 14*

USER INTERFACES FOR TRANSFER ACCOUNTS

CROSS-REFERENCE TO RELATED APPLICATIONS

This application claims priority to U.S. Provisional Patent Application Ser. No. 62/852,590, entitled "USER INTERFACES FOR TRANSFER ACCOUNTS", filed on May 24, 2019, and U.S. Provisional Patent Application Ser. No. 62/679,865, entitled "USER INTERFACES FOR TRANSFER ACCOUNTS", filed on Jun. 3, 2018. The contents of each of these applications are hereby incorporated by reference in their entireties.

FIELD

The present disclosure relates generally to computer user interfaces, and more specifically to techniques for managing the use of transfer accounts using an electronic device.

BACKGROUND

The use of electronic devices to perform transfer operations, such as transactions, with a second electronic device such as a contactless terminal has increased significantly in recent years. Exemplary contactless terminals include Near Field Communication-enabled (NFC-enabled) terminals, Bluetooth-enabled terminals, and barcode scanner-enabled terminals. An electronic device can be used in conjunction with these exemplary terminals to enable the user of the electronic device to perform a transfer operation using a transfer account available for use via the electronic device.

BRIEF SUMMARY

Some techniques for managing the use of transfer accounts using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more secure, and more efficient methods and interfaces for managing the use of transfer accounts. Such methods and interfaces optionally complement or replace other methods for managing the use of transfer accounts. Such methods and interfaces reduce the cognitive burden on a user and produce a more efficient human-machine interface. For battery-operated computing devices, such methods and interfaces conserve power and increase the time between battery charges. In addition, such methods and interfaces reduce the number of inputs required at an electronic device, such a smartphone and/or a smartwatch, to perform a transfer operation using (e.g., a credential associated with) a transfer account. Further, such methods and interfaces enable enhanced user convenience when using (e.g., a credential associated with) a transfer account in a transfer operation.

In accordance with some embodiments, a method performed at an electronic device with a display is described. The method comprises: displaying, on the display, an initiation user interface including an affordance for adding a secure credential to the electronic device; receiving a request to add the secure credential to the electronic device, wherein the request corresponds to the affordance for adding the secure credential; and in response to receiving the request to add the secure credential to the electronic device: in accordance with a determination that the device was operating in a first context when the request to add the secure credential was received, initiating a first process for inputting information about the secure credential to the electronic device; and in accordance with a determination that the device was operating in a second context, different from the first context, when the request to add the secure credential to the device was received, initiating a second process for inputting information about the secure credential to the electronic device, the second process being different from the first process.

In accordance with some embodiments, a non-transitory computer-readable storage medium storing one or more programs configured to be executed by one or more processors of an electronic device with a display is described. The one or more programs including instructions for: displaying, on the display, an initiation user interface including an affordance for adding a secure credential to the electronic device; receiving a request to add the secure credential to the electronic device, wherein the request corresponds to the affordance for adding the secure credential; and in response to receiving the request to add the secure credential to the electronic device: in accordance with a determination that the device was operating in a first context when the request to add the secure credential was received, initiating a first process for inputting information about the secure credential to the electronic device; and in accordance with a determination that the device was operating in a second context, different from the first context, when the request to add the secure credential to the device was received, initiating a second process for inputting information about the secure credential to the electronic device, the second process being different from the first process.

In accordance with some embodiments, a transitory computer-readable storage medium storing one or more programs configured to be executed by one or more processors of an electronic device with a display is described. The one or more programs including instructions for: displaying, on the display, an initiation user interface including an affordance for adding a secure credential to the electronic device; receiving a request to add the secure credential to the electronic device, wherein the request corresponds to the affordance for adding the secure credential; and in response to receiving the request to add the secure credential to the electronic device: in accordance with a determination that the device was operating in a first context when the request to add the secure credential was received, initiating a first process for inputting information about the secure credential to the electronic device; and in accordance with a determination that the device was operating in a second context, different from the first context, when the request to add the secure credential to the device was received, initiating a second process for inputting information about the secure credential to the electronic device, the second process being different from the first process.

In accordance with some embodiments, an electronic device comprising a display; one or more processors; and memory storing one or more programs configured to be executed by the one or more processors is described. The one or more programs including instructions for: displaying, on the display, an initiation user interface including an affordance for adding a secure credential to the electronic device; receiving a request to add the secure credential to the electronic device, wherein the request corresponds to the affordance for adding the secure credential; and in response to receiving the request to add the secure credential to the electronic device: in accordance with a determination that the device was operating in a first context when the request to add the secure credential was received, initiating a first process for inputting information about the secure credential to the electronic device; and in accordance with a determination that the device was operating in a second context, different from the first context, when the request to add the secure credential to the device was received, initiating a second process for inputting information about the secure credential to the electronic device, the second process being different from the first process.

In accordance with some embodiments, an electronic device is described. The electronic device comprises a display; a means for displaying, on the display, an initiation user interface including an affordance for adding a secure credential to the electronic device; a means for receiving a request to add the secure credential to the electronic device, wherein the request corresponds to the affordance for adding the secure credential; and in response to receiving the request to add the secure credential to the electronic device: in accordance with a determination that the device was operating in a first context when the request to add the secure credential was received, a means for initiating a first process for inputting information about the secure credential to the electronic device; and in accordance with a determination that the device was operating in a second context, different from the first context, when the request to add the secure credential to the device was received, a means for initiating a second process for inputting information about the secure credential to the electronic device, the second process being different from the first process.

In accordance with some embodiments, a method performed at an electronic device with a display and one or more input devices is described. The method comprises: while the electronic device is operating on stored power, detecting a request to wake the electronic device; and in response to detecting the request to wake the electronic device: in accordance with a determination that the electronic device has more than a threshold amount of available power, displaying, on the display, a wake screen user interface; in accordance with a determination that the electronic device has less than the threshold amount of available power and that a credential of a first type is provisioned on the electronic device, concurrently displaying, on the display, an indication that the electronic device has less than the threshold amount of available power and an indication that the credential of the first type is available for use via the electronic device; and in accordance with a determination that the electronic device has less than the threshold amount of available power and that a credential of the first type is not available for use via the electronic device, displaying, on the display, the indication that the electronic device has less than the threshold amount of available power without displaying the indication that the credential is available for use via the electronic device.

In accordance with some embodiments, a non-transitory computer-readable storage medium storing one or more programs configured to be executed by one or more processors of an electronic device with a display and one or more input devices is described. The one or more programs including instructions for: while the electronic device is operating on stored power, detecting a request to wake the electronic device; and in response to detecting the request to wake the electronic device: in accordance with a determination that the electronic device has more than a threshold amount of available power, displaying, on the display, a wake screen user interface; in accordance with a determination that the electronic device has less than the threshold amount of available power and that a credential of a first type is provisioned on the electronic device, concurrently displaying, on the display, an indication that the electronic device has less than the threshold amount of available power and an indication that the credential of the first type is available for use via the electronic device; and in accordance with a determination that the electronic device has less than the threshold amount of available power and that a credential of the first type is not available for use via the electronic device, displaying, on the display, the indication that the electronic device has less than the threshold amount of available power without displaying the indication that the credential is available for use via the electronic device.

In accordance with some embodiments, a transitory computer-readable storage medium storing one or more programs configured to be executed by one or more processors of an electronic device with a display and one or more input devices is described. The one or more programs including instructions for: while the electronic device is operating on stored power, detecting a request to wake the electronic device; and in response to detecting the request to wake the electronic device: in accordance with a determination that the electronic device has more than a threshold amount of available power, displaying, on the display, a wake screen user interface; in accordance with a determination that the electronic device has less than the threshold amount of available power and that a credential of a first type is provisioned on the electronic device, concurrently displaying, on the display, an indication that the electronic device has less than the threshold amount of available power and an indication that the credential of the first type is available for use via the electronic device; and in accordance with a determination that the electronic device has less than the threshold amount of available power and that a credential of the first type is not available for use via the electronic device, displaying, on the display, the indication that the electronic device has less than the threshold amount of available power without displaying the indication that the credential is available for use via the electronic device.

In accordance with some embodiments, an electronic device comprising a display; one or more input devices; one or more processors; and memory storing one or more programs configured to be executed by the one or more processors is described. The one or more programs including instructions for: while the electronic device is operating on stored power, detecting a request to wake the electronic device; and in response to detecting the request to wake the electronic device: in accordance with a determination that the electronic device has more than a threshold amount of available power, displaying, on the display, a wake screen user interface; in accordance with a determination that the electronic device has less than the threshold amount of available power and that a credential of a first type is provisioned on the electronic device, concurrently displaying, on the display, an indication that the electronic device has less than the threshold amount of available power and an indication that the credential of the first type is available for use via the electronic device; and in accordance with a determination that the electronic device has less than the threshold amount of available power and that a credential of the first type is not available for use via the electronic device, displaying, on the display, the indication that the electronic device has less than the threshold amount of available power without displaying the indication that the credential is available for use via the electronic device.

In accordance with some embodiments, an electronic device is described. The electronic device comprises a display; one or more input devices; means, while the electronic device is operating on stored power, for detecting a request to wake the electronic device; and means, in response to detecting the request to wake the electronic device, for: in accordance with a determination that the electronic device has more than a threshold amount of available power, displaying, on the display, a wake screen user interface; in accordance with a determination that the electronic device has less than the threshold amount of available power and that a credential of a first type is provisioned on the electronic device, concurrently displaying, on the display, an indication that the electronic device has less than the threshold amount of available power and an indication that the credential of the first type is available for use via the electronic device; and in accordance with a determination that the electronic device has less than the threshold amount of available power and that a credential of the first type is not available for use via the electronic device, displaying, on the display, the indication that the electronic device has less than the threshold amount of available power without displaying the indication that the credential is available for use via the electronic device.

In accordance with some embodiments, a method performed at an electronic device with a display and a wireless communication radio is described. The method comprises: receiving, via the wireless communication radio, information indicating a request for a credential from a second electronic device; and in response to receiving the information indicating the request for a credential from the second electronic device: in accordance with a determination that the information indicating the request for the credential is of a first type, displaying, on the display, a request for authentication to proceed with a transfer operation using a transfer account associated with the electronic device; and in accordance with a determination that the information indicating the request for a credential is of a second type, transmitting, via the wireless communication radio, a credential of the second type associated with the transfer account without requesting authentication.

In accordance with some embodiments, a non-transitory computer-readable storage medium storing one or more programs configured to be executed by one or more processors of an electronic device with a display and a wireless communication radio is described. The one or more programs including instructions for: receiving, via the wireless communication radio, information indicating a request for a credential from a second electronic device; and in response to receiving the information indicating the request for a credential from the second electronic device: in accordance with a determination that the information indicating the request for the credential is of a first type, displaying, on the display, a request for authentication to proceed with a transfer operation using a transfer account associated with the electronic device; and in accordance with a determination that the information indicating the request for a credential is of a second type, transmitting, via the wireless communication radio, a credential of the second type associated with the transfer account without requesting authentication.

In accordance with some embodiments, a transitory computer-readable storage medium storing one or more programs configured to be executed by one or more processors of an electronic device with a display and a wireless communication radio is described. The one or more programs including instructions for: receiving, via the wireless communication radio, information indicating a request for a credential from a second electronic device; and in response to receiving the information indicating the request for a credential from the second electronic device: in accordance with a determination that the information indicating the request for the credential is of a first type, displaying, on the display, a request for authentication to proceed with a transfer operation using a transfer account associated with the electronic device; and in accordance with a determination that the information indicating the request for a credential is of a second type, transmitting, via the wireless communication radio, a credential of the second type associated with the transfer account without requesting authentication.

In accordance with some embodiments, an electronic device comprising a display; a wireless communication radio; one or more processors; and memory storing one or more programs configured to be executed by the one or more processors is described. The one or more programs including instructions for: receiving, via the wireless communication radio, information indicating a request for a credential from a second electronic device; and in response to receiving the information indicating the request for a credential from the second electronic device: in accordance with a determination that the information indicating the request for the credential is of a first type, displaying, on the display, a request for authentication to proceed with a transfer operation using a transfer account associated with the electronic device; and in accordance with a determination that the information indicating the request for a credential is of a second type, transmitting, via the wireless communication radio, a credential of the second type associated with the transfer account without requesting authentication.

In accordance with some embodiments, an electronic device is described. The electronic device comprises: a display; a wireless communication radio; means for receiving, via the wireless communication radio, information indicating a request for a credential from a second electronic device; and means, in response to receiving the information indicating the request for a credential from the second electronic device, for: in accordance with a determination that the information indicating the request for the credential is of a first type, displaying, on the display, a request for authentication to proceed with a transfer operation using a transfer account associated with the electronic device; and in accordance with a determination that the information indicating the request for a credential is of a second type, transmitting, via the wireless communication radio, a credential of the second type associated with the transfer account without requesting authentication.

In accordance with some embodiments, a method performed at an electronic device with one or more wireless communication radios, wherein the electronic device is storing information for a first account, is described. The method comprises: receiving from a communication terminal, via the one or more wireless communication radios, a request for a credential; and in response to receiving the request for the credential: in accordance with a determination that authentication has been provided for the first account, transmitting, via the one or more wireless communication radios, the credential of the first account without requesting authentication; and in accordance with a determination that authentication has not been provided for the first account, that the first account has been set up at the electronic device to provide credentials without requiring authentication, and authentication is required by the communication terminal, requesting authentication at the electronic device without transmitting the credential of the first account; and in accordance with a determination that authentication has not been provided for the first account such that the electronic device is not in the authentication provided state for the first account, that the first account has been set up at the electronic device to provide credentials without requiring authentication, and authentication is not required by the communication terminal, transmitting, via the one or more wireless communication radios, the credential of the first account without requesting authentication at the electronic device.

In accordance with some embodiments, a non-transitory computer-readable storage medium is described. The non-transitory computer-readable storage medium stores one or more programs configured to be executed by one or more processors of an electronic device with one or more wireless communication radios, wherein the electronic device is storing information for a first account, the one or more programs including instructions for: receiving from a communication terminal, via the one or more wireless communication radios, a request for a credential; and in response to receiving the request for the credential: in accordance with a determination that authentication has been provided for the first account, transmitting, via the one or more wireless communication radios, the credential of the first account without requesting authentication; in accordance with a determination that authentication has not been provided for the first account, that the first account has been set up at the electronic device to provide credentials without requiring authentication, and authentication is required by the communication terminal, requesting authentication at the electronic device without transmitting the credential of the first account; and in accordance with a determination that authentication has not been provided for the first account such that the electronic device is not in the authentication provided state for the first account, that the first account has been set up at the electronic device to provide credentials without requiring authentication, and authentication is not required by the communication terminal, transmitting, via the one or more wireless communication radios, the credential of the first account without requesting authentication at the electronic device.

In accordance with some embodiments, a transitory computer-readable storage medium is described. The transitory computer-readable storage medium stores one or more programs configured to be executed by one or more processors of an electronic device with one or more wireless communication radios, wherein the electronic device is storing information for a first account, the one or more programs including instructions for: receiving from a communication terminal, via the one or more wireless communication radios, a request for a credential; and in response to receiving the request for the credential: in accordance with a determination that authentication has been provided for the first account, transmitting, via the one or more wireless communication radios, the credential of the first account without requesting authentication; in accordance with a determination that authentication has not been provided for the first account, that the first account has been set up at the electronic device to provide credentials without requiring authentication, and authentication is required by the communication terminal, requesting authentication at the electronic device without transmitting the credential of the first account; and in accordance with a determination that authentication has not been provided for the first account such that the electronic device is not in the authentication provided state for the first account, that the first account has been set up at the electronic device to provide credentials without requiring authentication, and authentication is not required by the communication terminal, transmitting, via the one or more wireless communication radios, the credential of the first account without requesting authentication at the electronic device.

In accordance with some embodiments, an electronic device is described. The electronic device comprises: one or more wireless communication radios; one or more processors; and memory storing one or more programs configured to be executed by the one or more processors, wherein the electronic device is storing information for a first account, the one or more programs including instructions for: receiving from a communication terminal, via the one or more wireless communication radios, a request for a credential; and in response to receiving the request for the credential: in accordance with a determination that authentication has been provided for the first account, transmitting, via the one or more wireless communication adios, the credential of the first account without requesting authentication; in accordance with a determination that authentication has not been provided for the first account, that the first account has been set up at the electronic device to provide credentials without requiring authentication, and authentication is required by the communication terminal, requesting authentication at the electronic device without transmitting the credential of the first account; and in accordance with a determination that authentication has not been provided for the first account such that the electronic device is not in the authentication provided state for the first account, that the first account has been set up at the electronic device to provide credentials without requiring authentication, and authentication is not required by the communication terminal, transmitting, via the one or more wireless communication radios, the credential of the first account without requesting authentication at the electronic device.

In accordance with some embodiments, an electronic device is described. The electronic device comprises: one or more wireless communication radios, wherein the electronic device is storing information for a first account; means for receiving from a communication terminal, via the one or more wireless communication radios, a request for a credential; and means, responsive to receiving the request for the credential, for: in accordance with a determination that authentication has been provided for the first account, transmitting, via the one or more wireless communication radios, the credential of the first account without requesting authentication; in accordance with a determination that authentication has not been provided for the first account, that the first account has been set up at the electronic device to provide credentials without requiring authentication, and authentication is required by the communication terminal, requesting authentication at the electronic device without transmitting the credential of the first account; and in accordance with a determination that authentication has not been provided for the first account such that the electronic device is not in the authentication provided state for the first account, that the first account has been set up at the electronic device to provide credentials without requiring authentication, and authentication is not required by the communication terminal, transmitting, via the one or more wireless communication radios, the credential of the first account without requesting authentication at the electronic device.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing transfer accounts, thereby increasing the effectiveness, efficiency, and user satisfaction with such devices. Such methods and interfaces may complement or replace other methods for managing transfer accounts.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 8A-8C are a flow diagram illustrating a method for inputting information about a secure credential to an electronic device, in accordance with some embodiments.

FIGS. 12A-12C are a flow diagram illustrating a method for managing the use of a transfer account associated with different credentials on an electronic device, in accordance with some embodiments.

FIG. 14 is a flow diagram illustrating a method for managing the use of credentials, in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for the use of transfer accounts using an electronic device. For example, there is a need for electronic devices that provide efficient methods and interfaces for provisioning a transfer account onto the electronic device (or adding a secure credential to the electronic device). For another example, there is a need for electronic devices that provide efficient methods and interfaces for using a transfer account (e.g., a particular type of transfer account), via the electronic device, for a transfer operation while the electronic device is operating on a low-power state. For another example, there is a need for electronic devices that provide efficient methods and interfaces for using a transfer account, via the electronic device, where the transfer account is linked to a plurality of different sub-accounts and/or linked to an identification account. Such techniques can reduce the cognitive burden on a user who accesses transfer accounts using an electronic device, thereby enhancing productivity. Further, such techniques can reduce processor and battery power otherwise wasted on redundant user inputs.

Figure 4A:
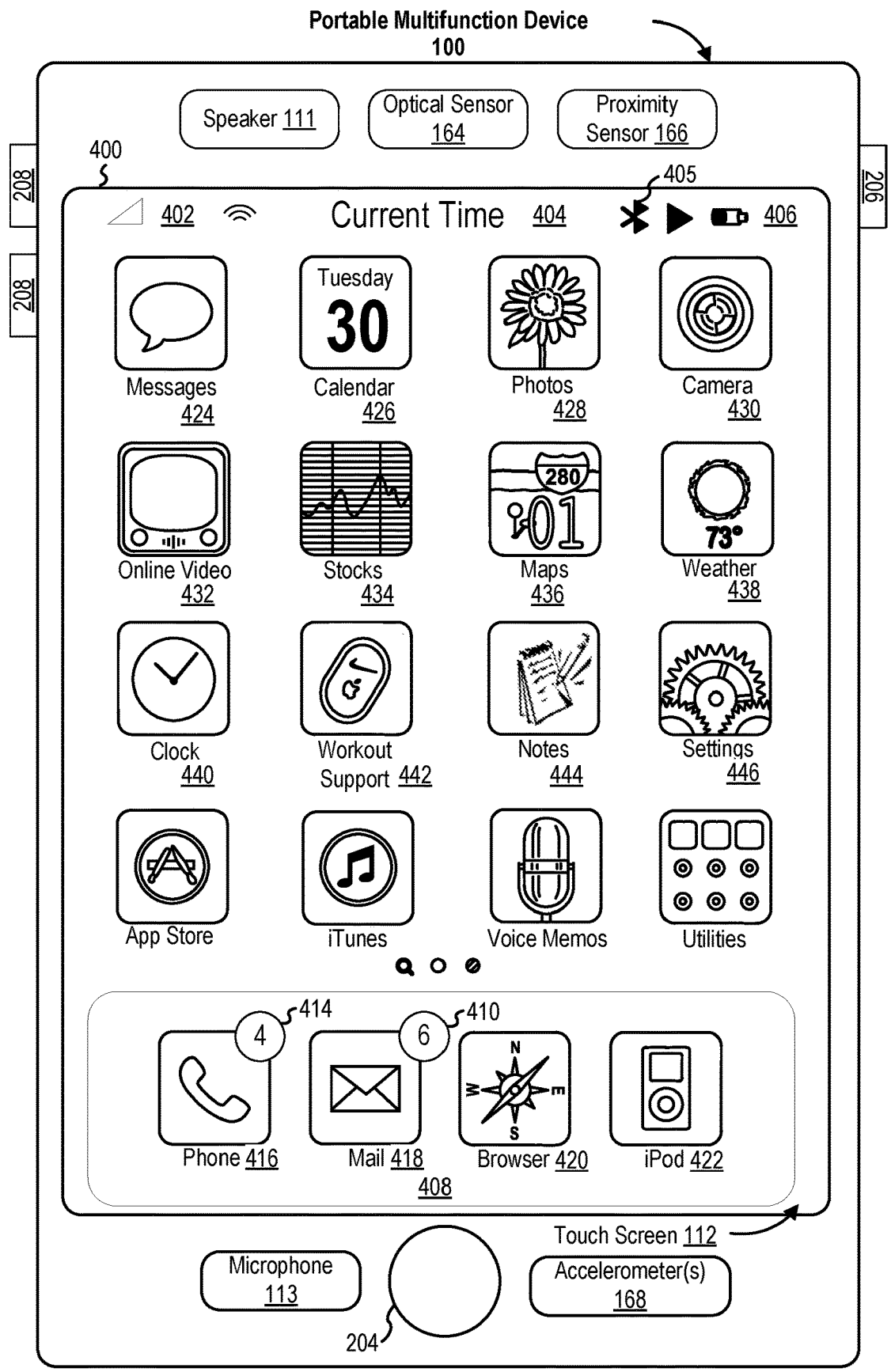
FIG. 4A illustrates an exemplary user interface for a menu of applications on a portable multifunction device in accordance with some embodiments.
Figure 5A:
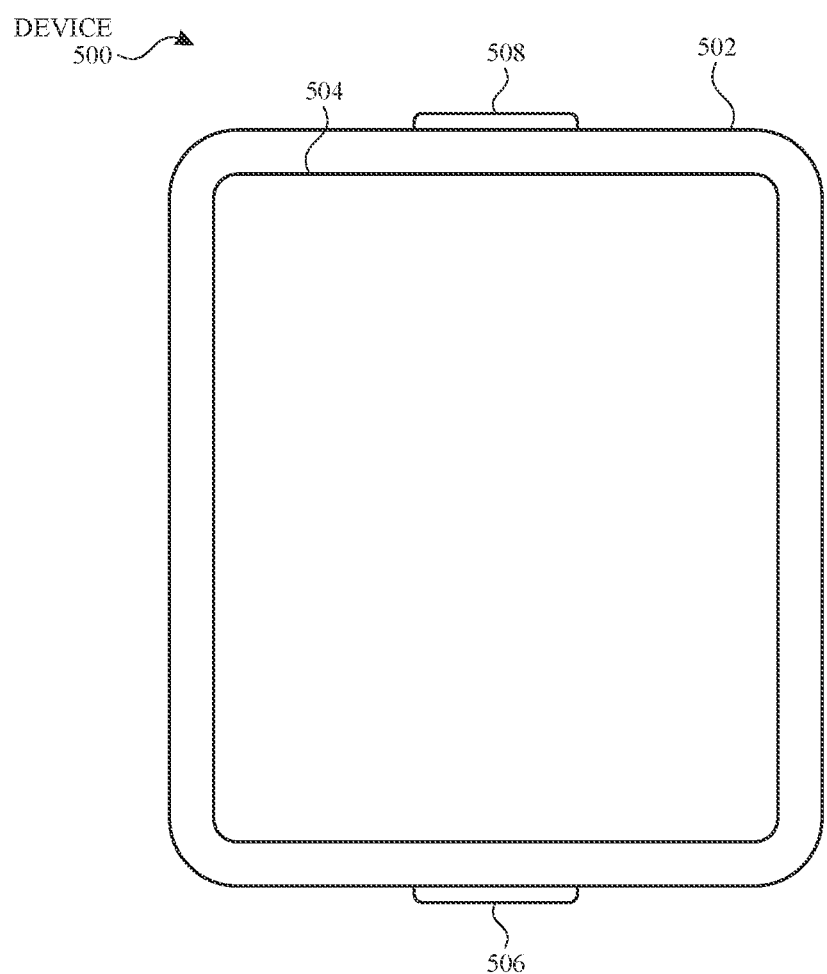
FIG. 5A illustrates a personal electronic device in accordance with some embodiments.
Figure 5B:
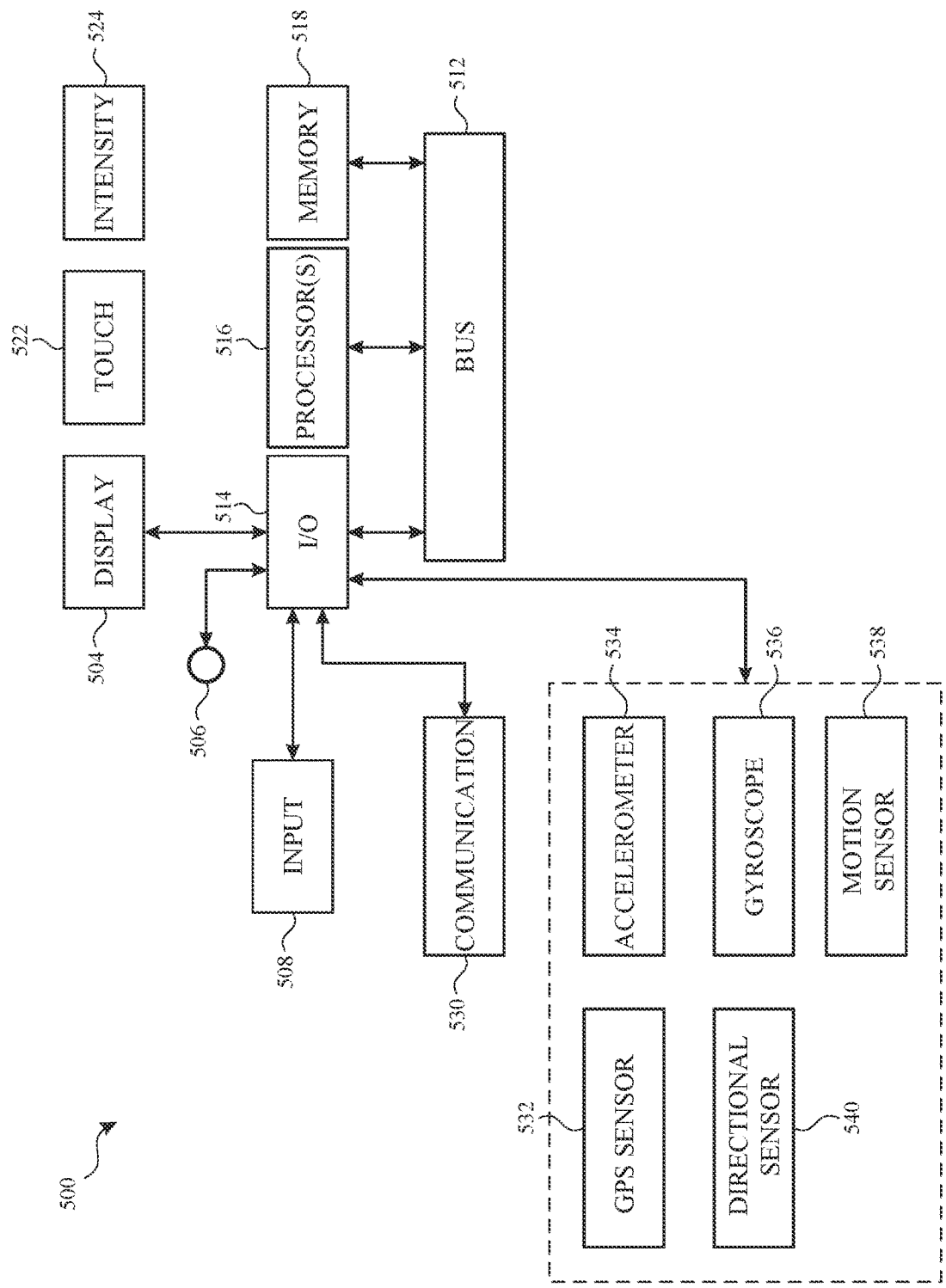
FIG. 5B is a block diagram illustrating a personal electronic device in accordance with some embodiments.
Figure 6:
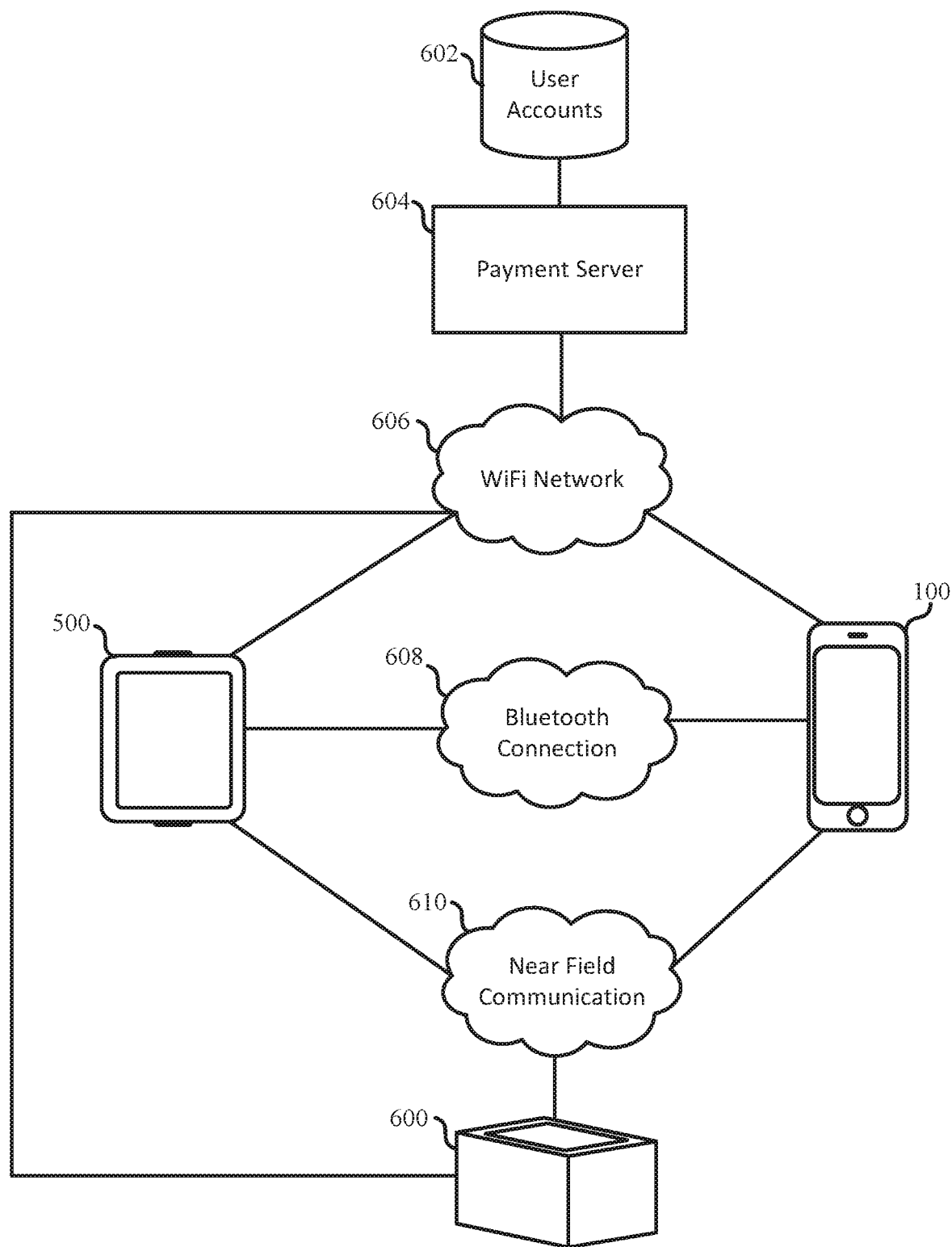
FIG. 6 illustrates exemplary devices connected via one or more communication channels, in accordance with some embodiments.
Figure 7A:
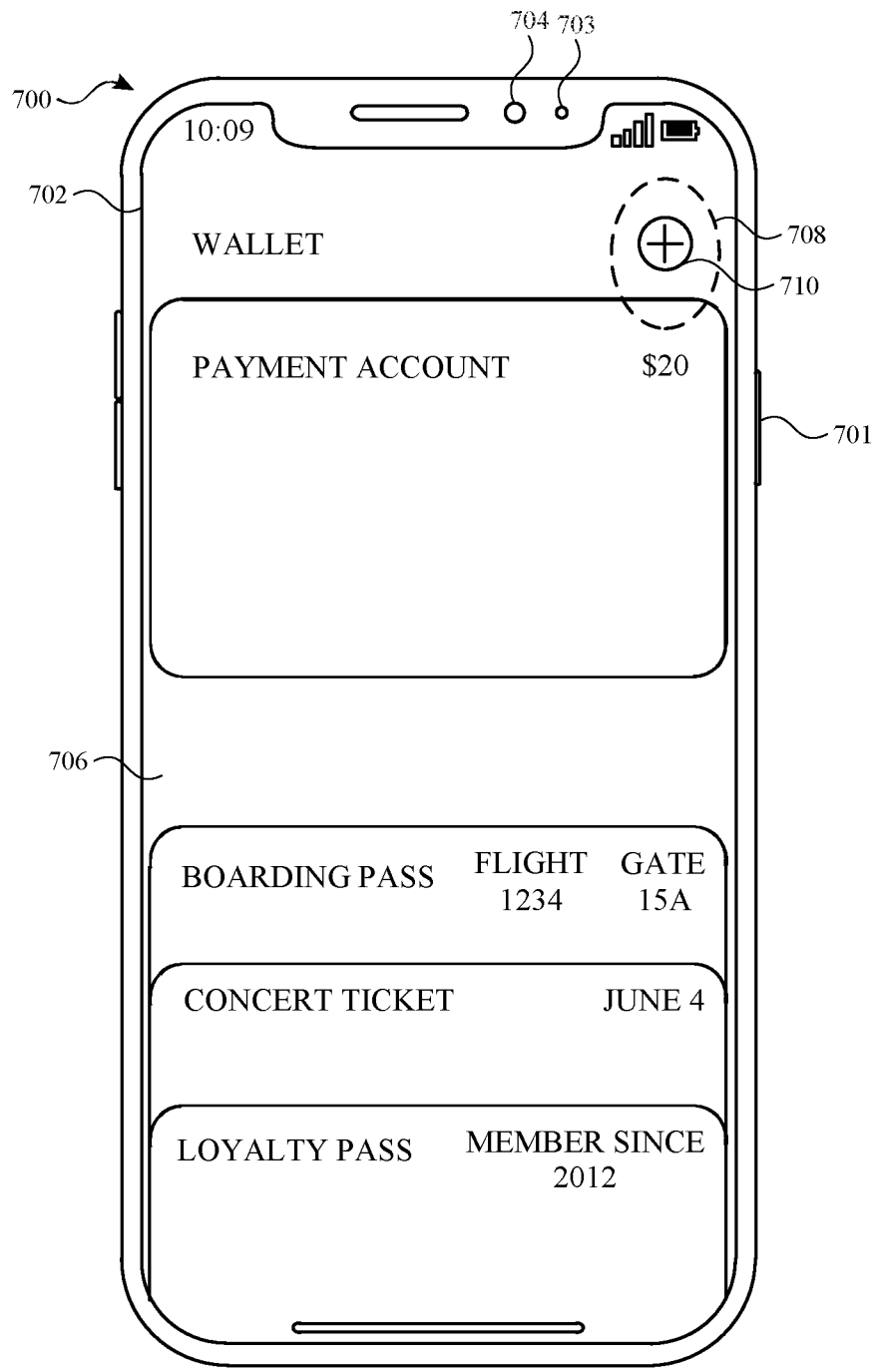
FIGS. 7A-7O illustrate exemplary user interface for inputting information about a secure credential to an electronic device, in accordance with some embodiments.
Figure 7O:
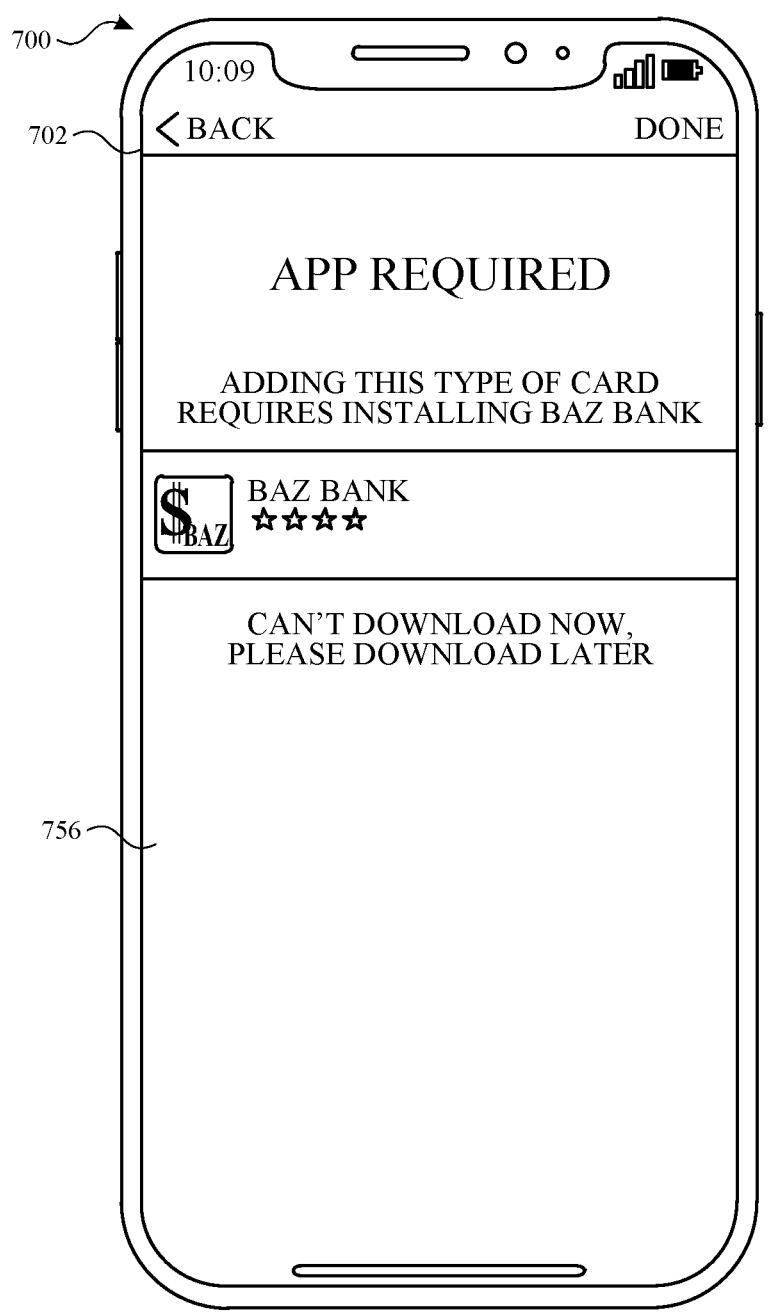
Figure 8A:
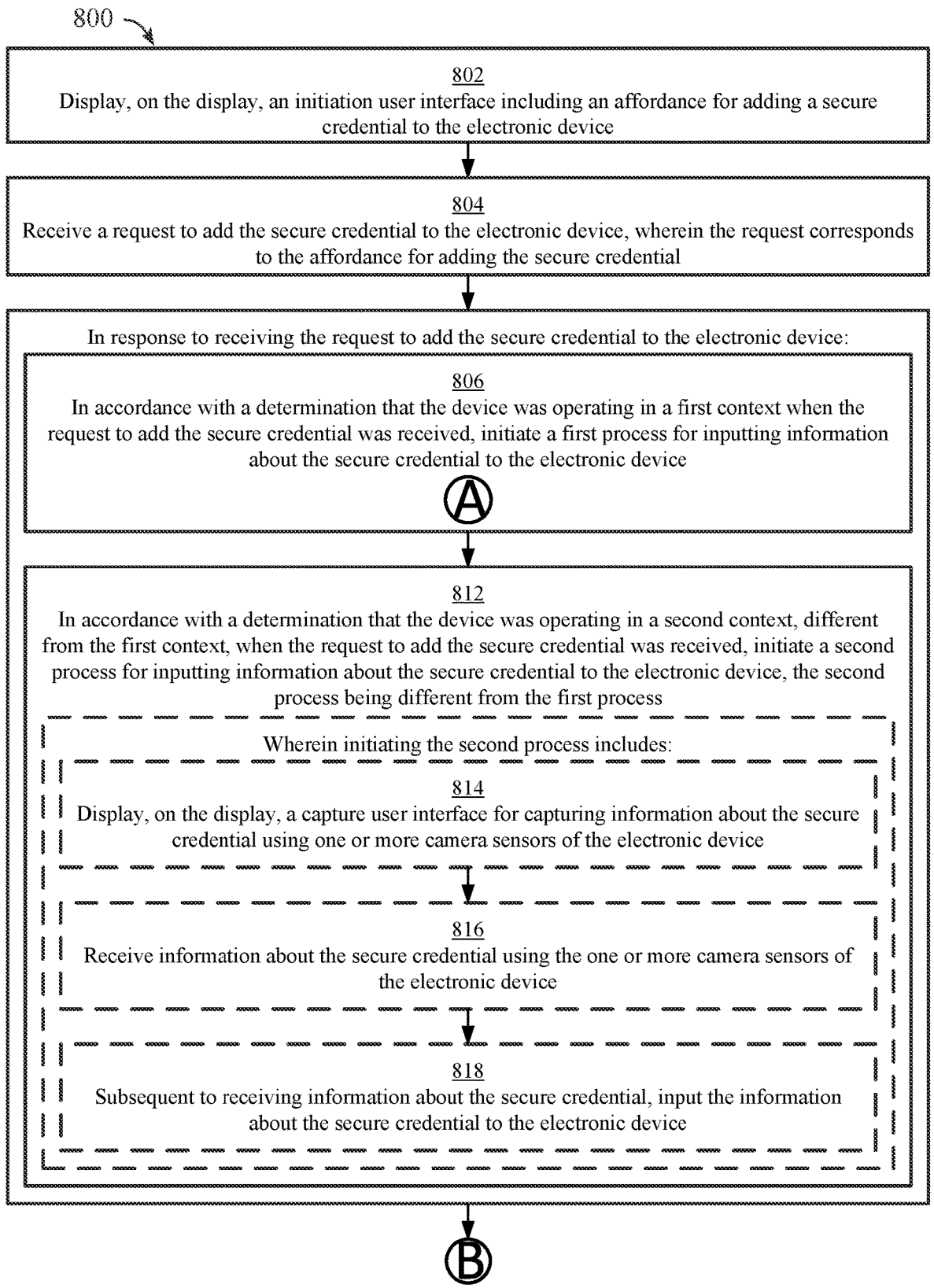
Figure 8C:
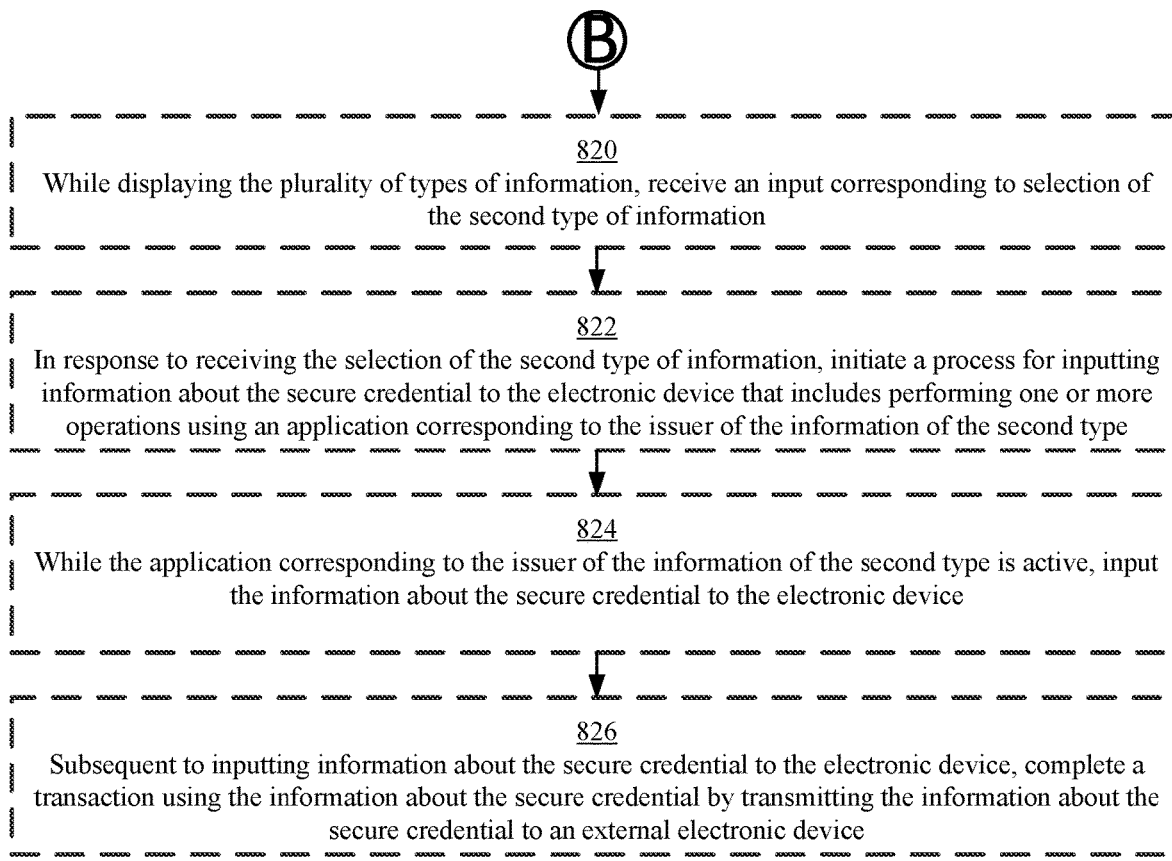
Figure 10A:
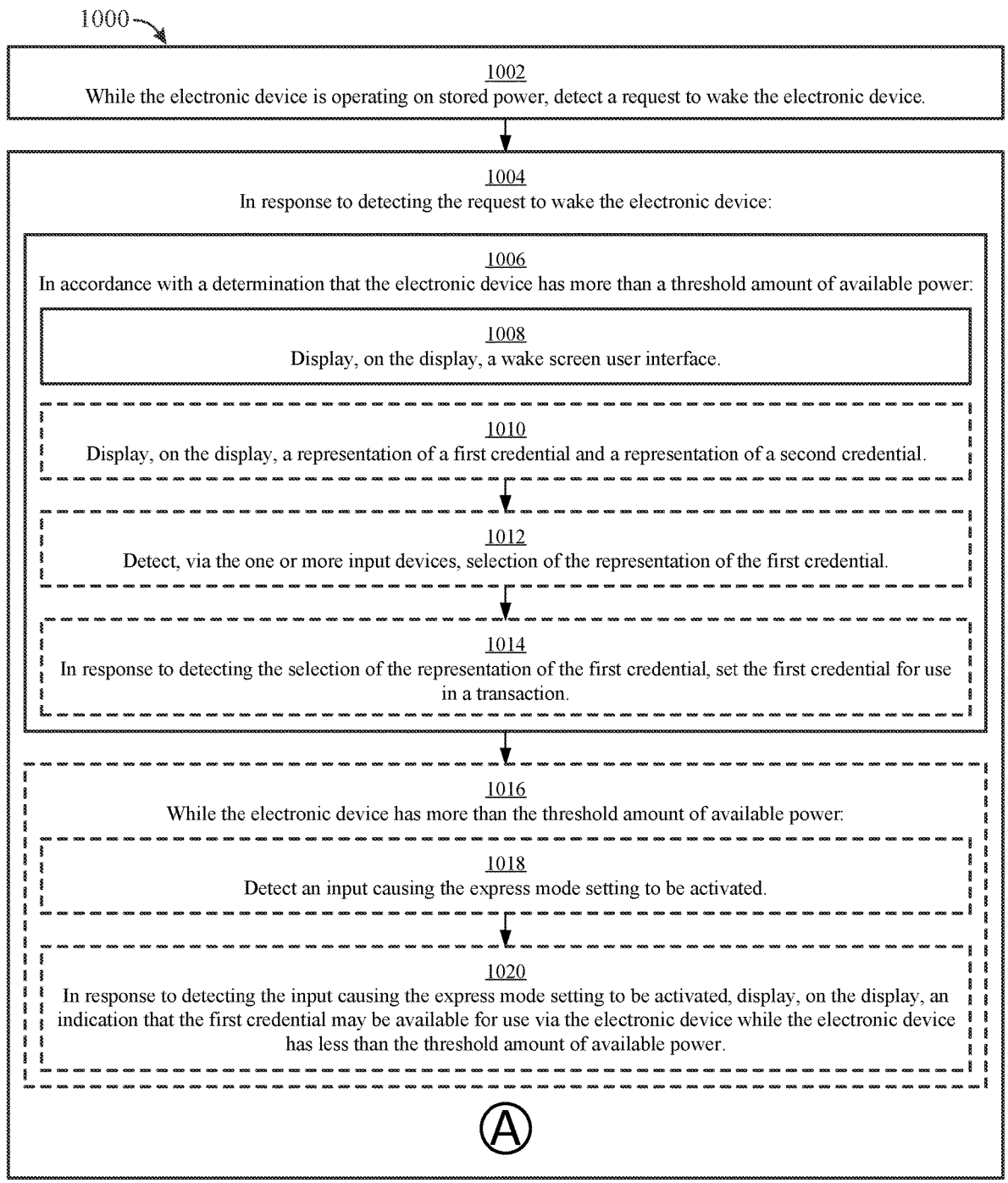
FIGS. 10A-10C are a flow diagram illustrating a method for managing the use of a credential provisioned on an electronic device that operates on stored power, in accordance with some embodiments.
Figure 10B:
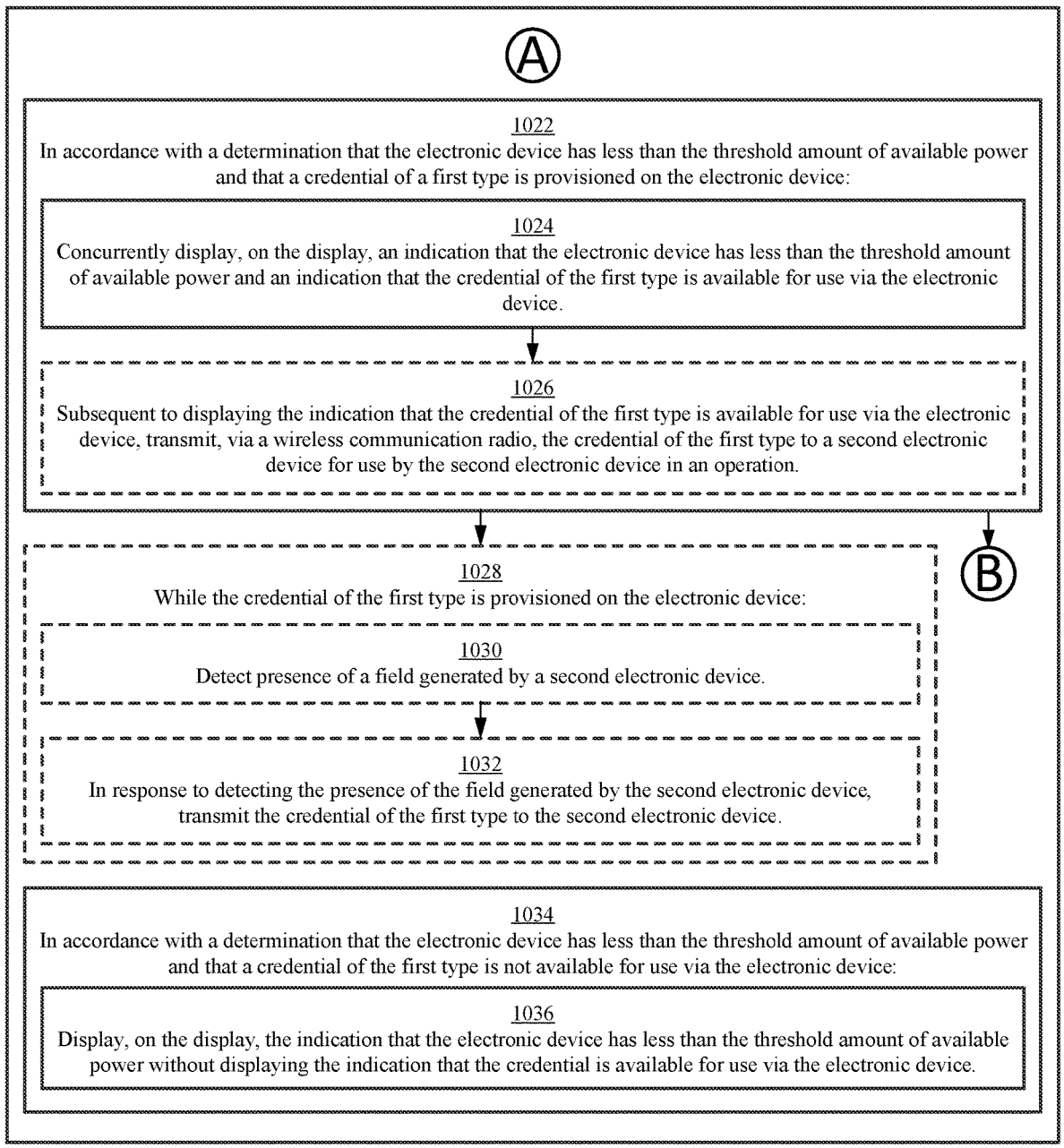
Figure 10C:
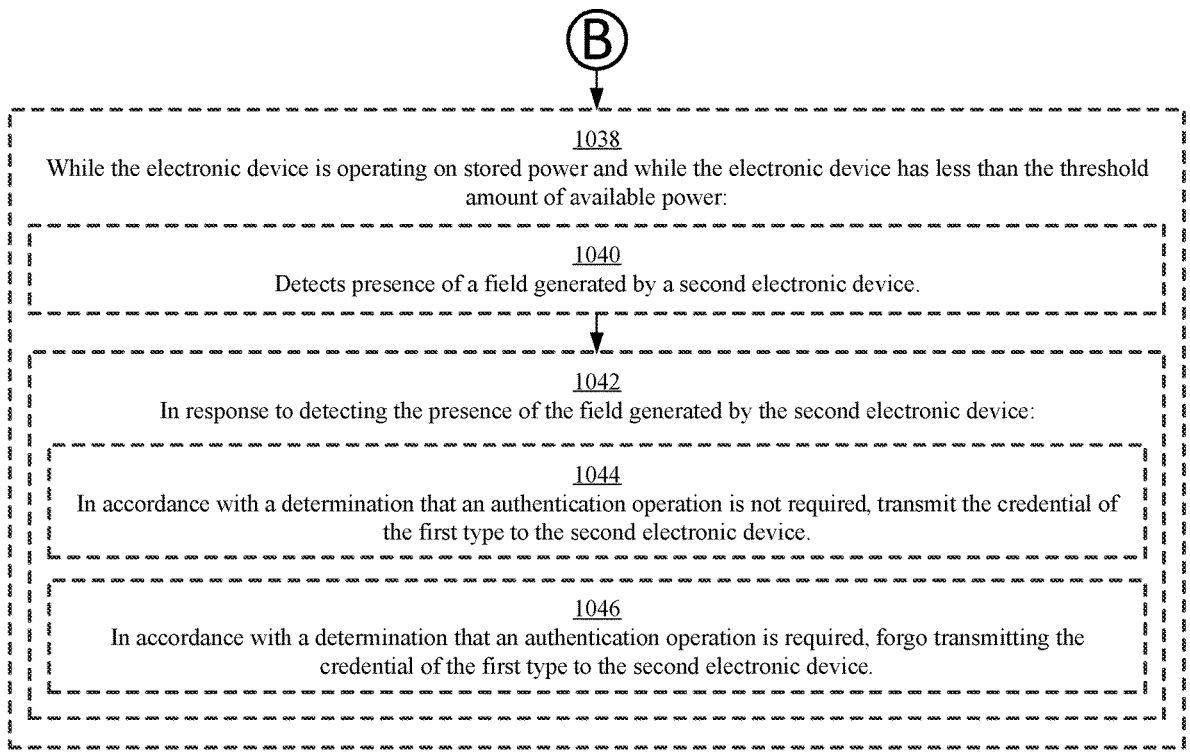
Figure 11A:
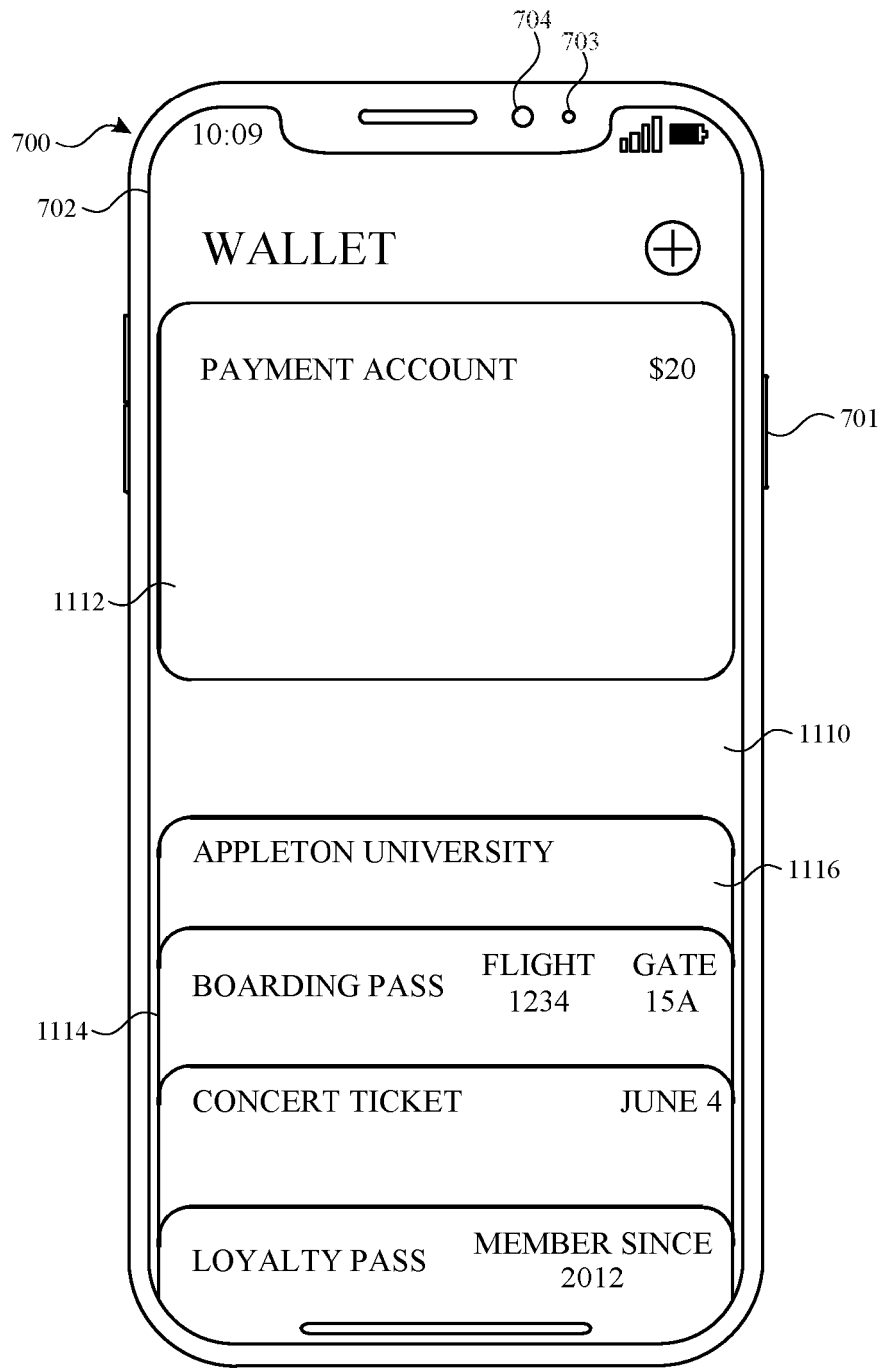
FIGS. 11A-11V illustrate exemplary user interfaces for managing the use of a transfer account associated with different credentials on an electronic device, in accordance with some embodiments.
Figure 11V:
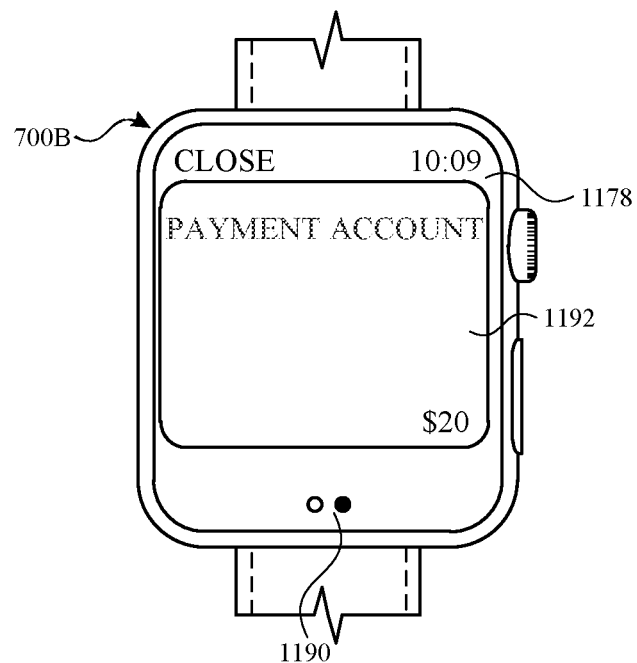
Figure 12A:
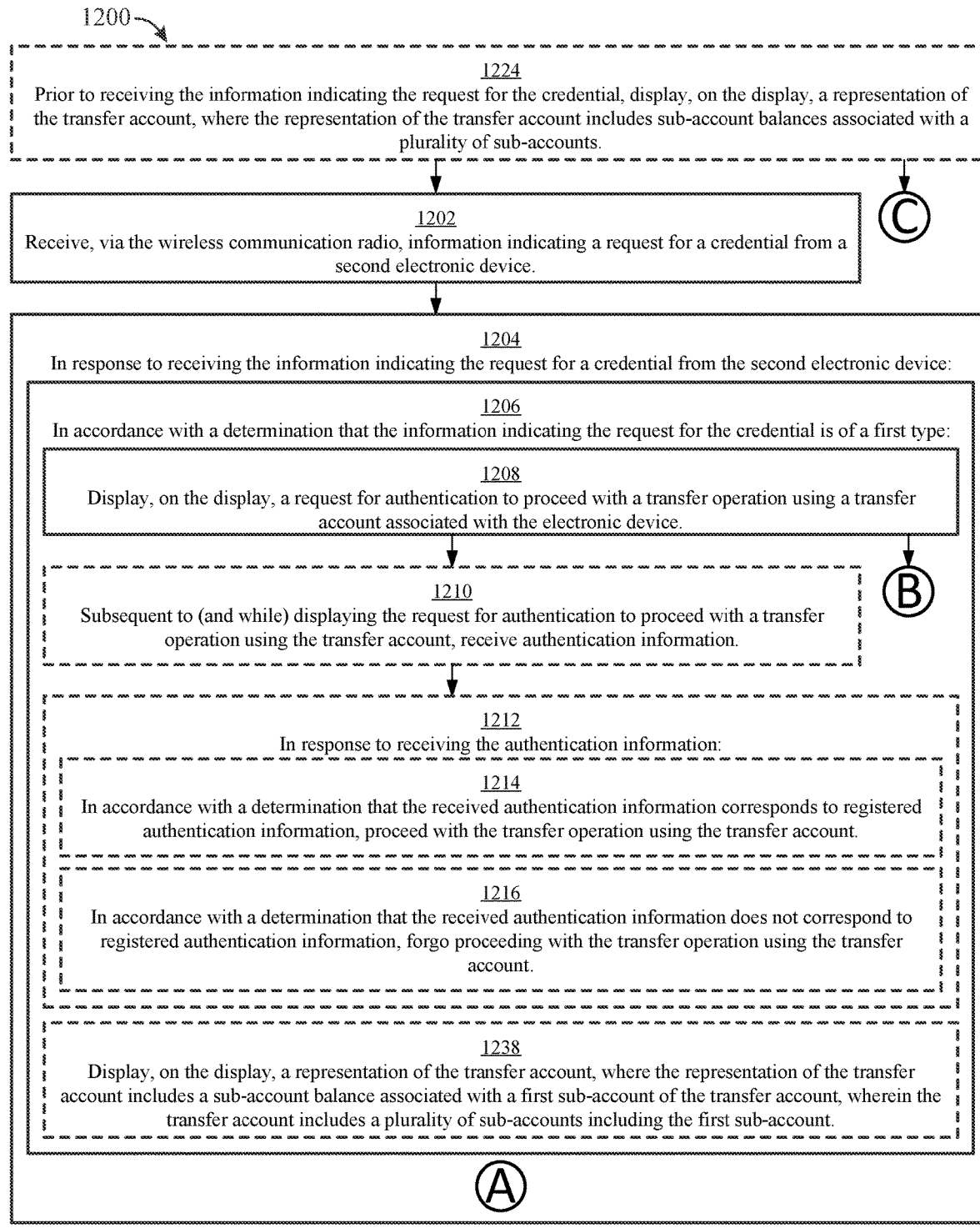
Figure 12C:
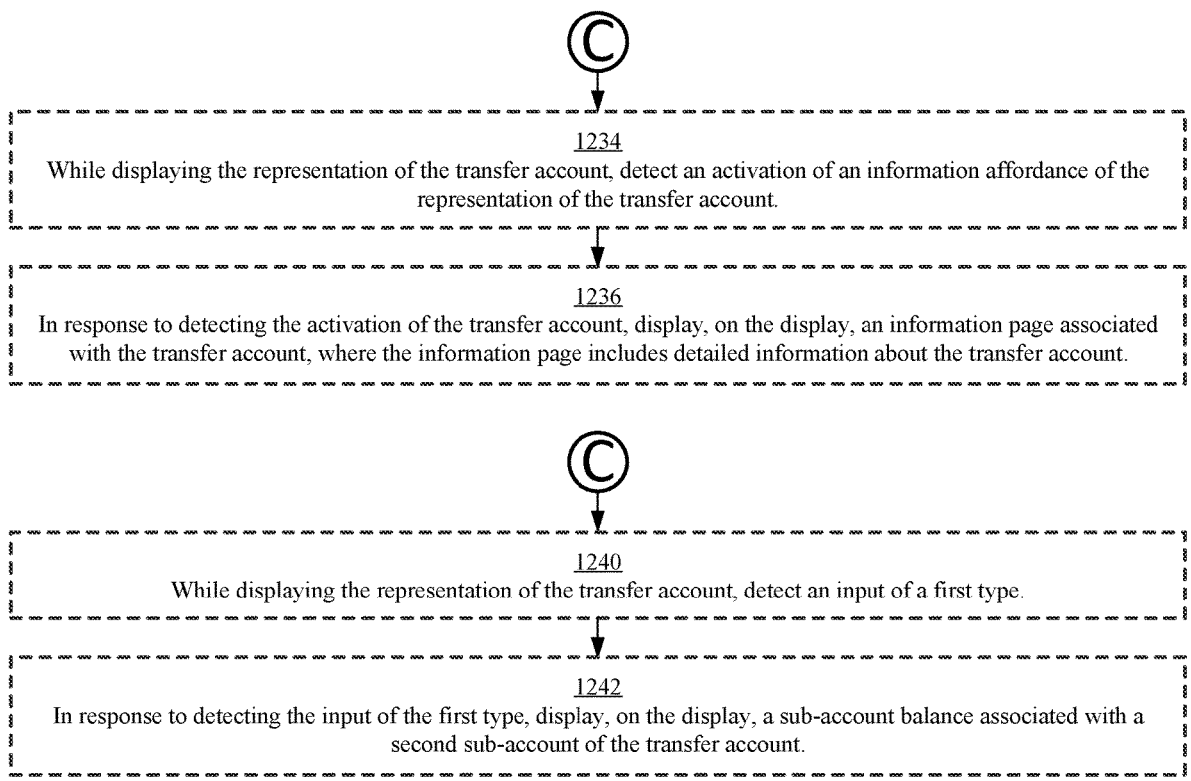
Figure 13A:
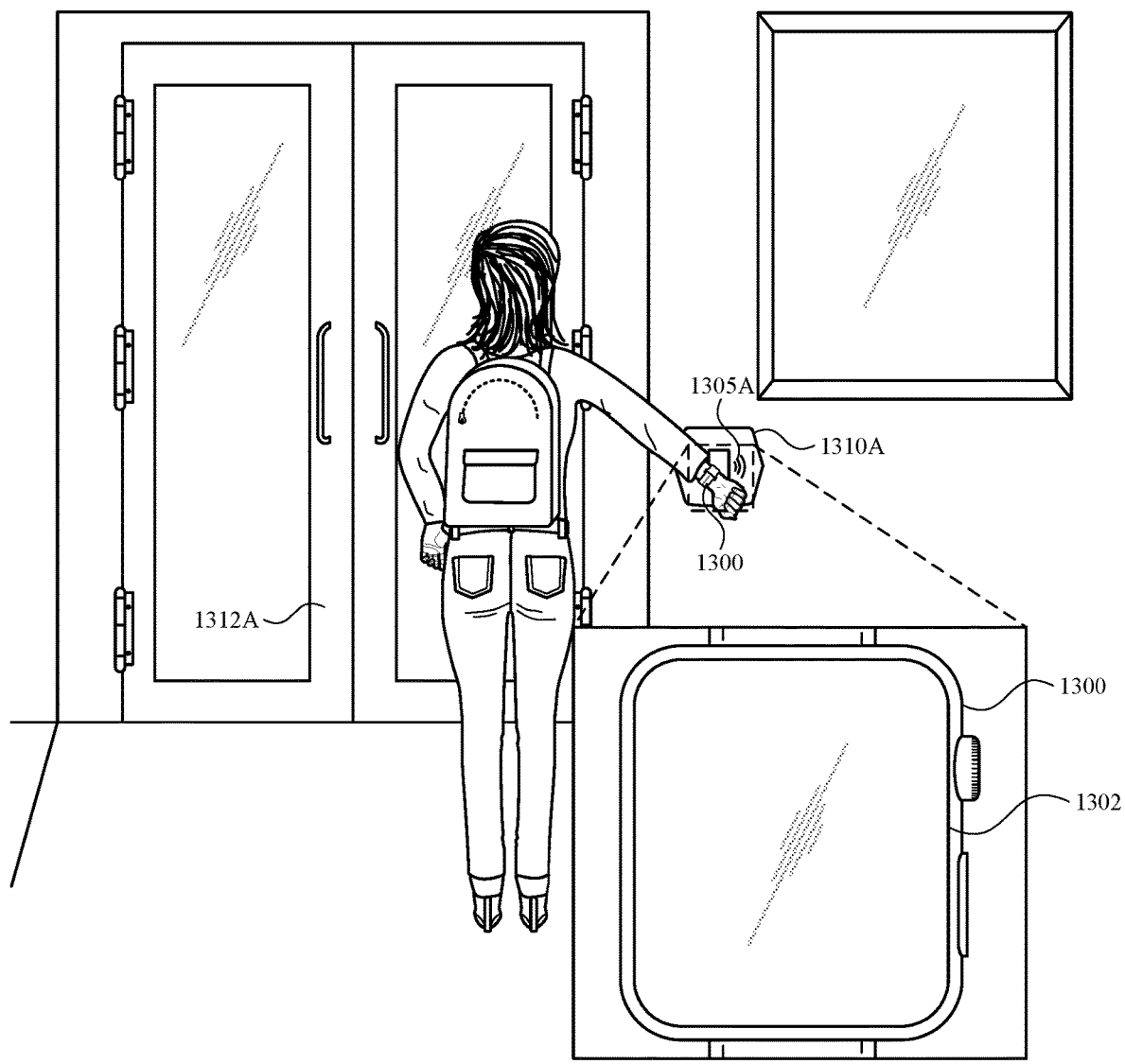
FIGS. 13A-13W illustrate exemplary techniques and user interfaces for managing the use of credentials, in accordance with some embodiments.
Figure 13B:
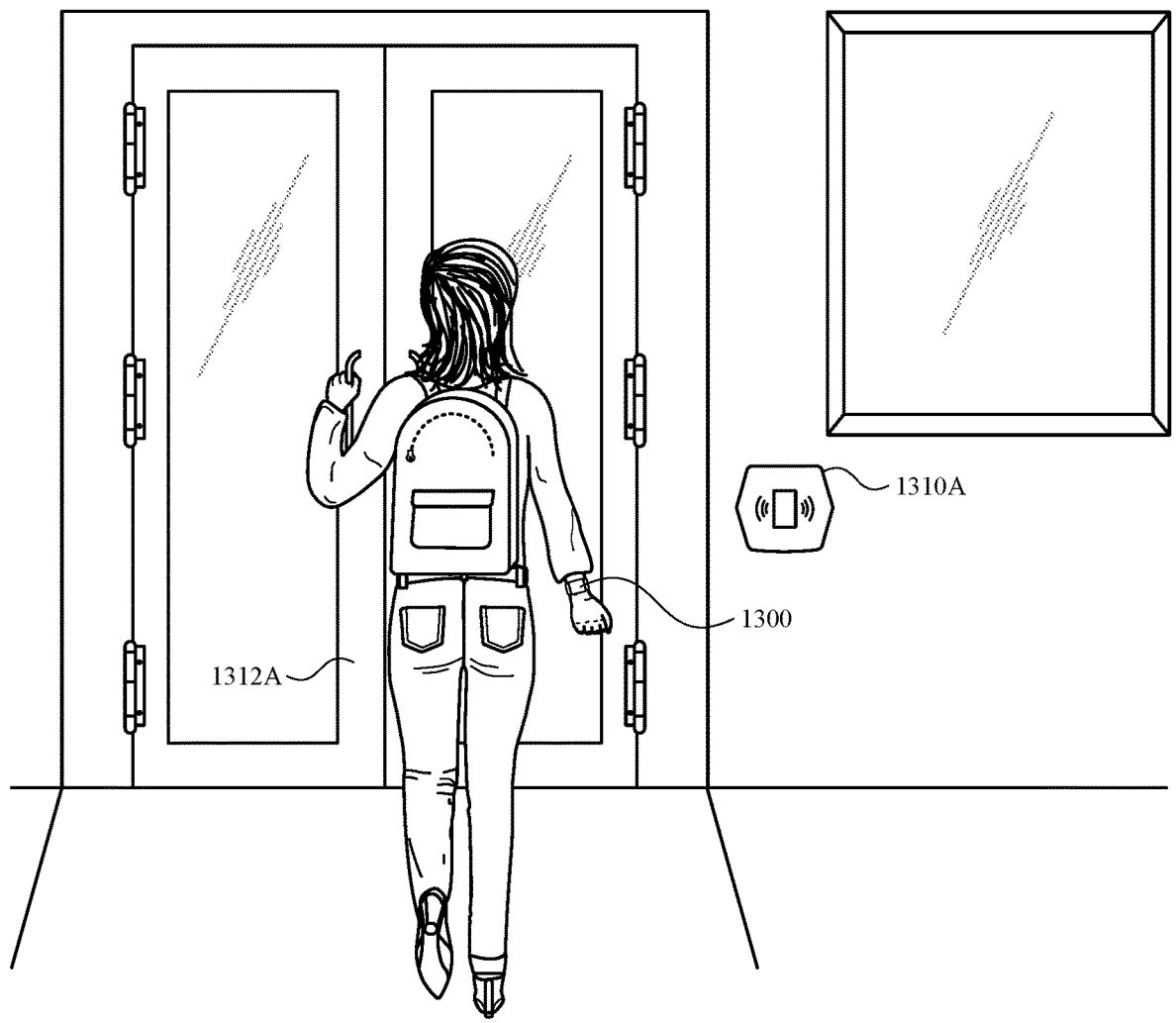

Below, FIGS. 1A-1B, 2, 3, 4A-4B, 5A-5B, and 6 provide a description of exemplary devices for performing the techniques for managing transfer accounts. FIG. 6 illustrates exemplary devices connected via one or more communication channels, in accordance with some embodiments. FIGS. 7A-7O illustrate exemplary user interface for inputting information about a secure credential to an electronic device, in accordance with some embodiments. FIGS. 8A-8C are a flow diagram illustrating a method for inputting information about a secure credential to an electronic device, in accordance with some embodiments. The user interfaces in FIGS. 7A-7O are used to illustrate the processes described below, including the processes in FIGS. 8A-8C. FIGS. 9A-9J illustrate exemplary user interfaces for managing the use of a credential provisioned on an electronic device that operates on stored power. FIGS. 10A-10C are a flow diagram illustrating a method for managing the use of a credential provisioned on an electronic device that operates on stored power, in accordance with some embodiments. The user interfaces in FIGS. 9A-9J are used to illustrate the processes described below, including the processes in FIGS. 10A-10C. FIGS. 11A-11V illustrate exemplary user interfaces for managing the use of a transfer account associated with different credentials on an electronic device. FIGS. 12A-12C are a flow diagram illustrating a method for managing the use of a transfer account associated with different credentials on an electronic device, in accordance with some embodiments. The user interfaces in FIGS. 11A-11V are used to illustrate the processes described below, including the processes in FIGS. 12A-12C. FIGS. 13A-13W illustrate exemplary techniques and user interfaces for managing the use of credentials, in accordance with some embodiments. FIG. 14 is a flow diagram illustrating a method for managing the use of credentials, in accordance with some embodiments. The user interfaces in FIGS. 13A-13W are used to illustrate the processes described below, including the processes in FIG. 14.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
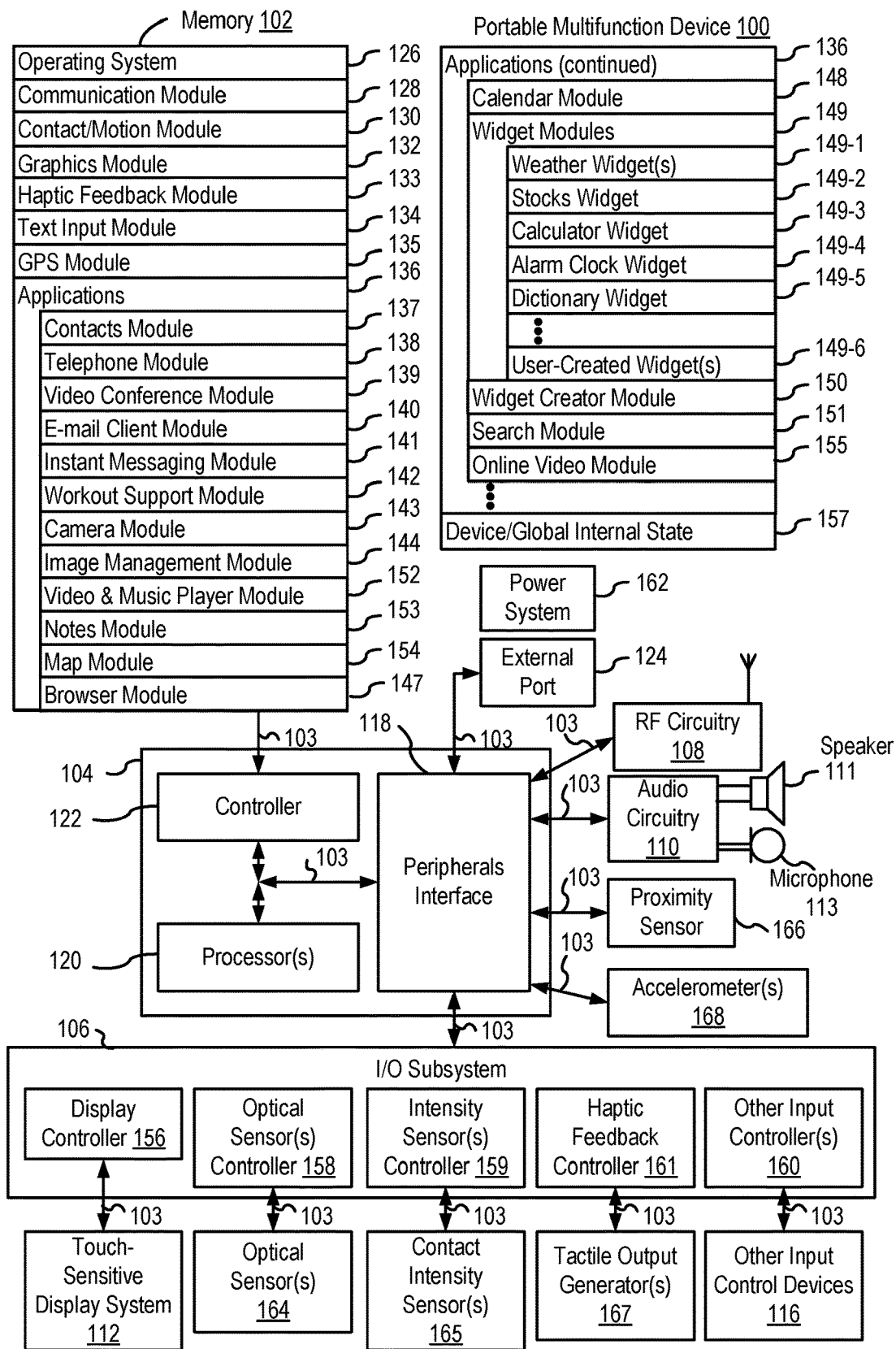
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050170059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
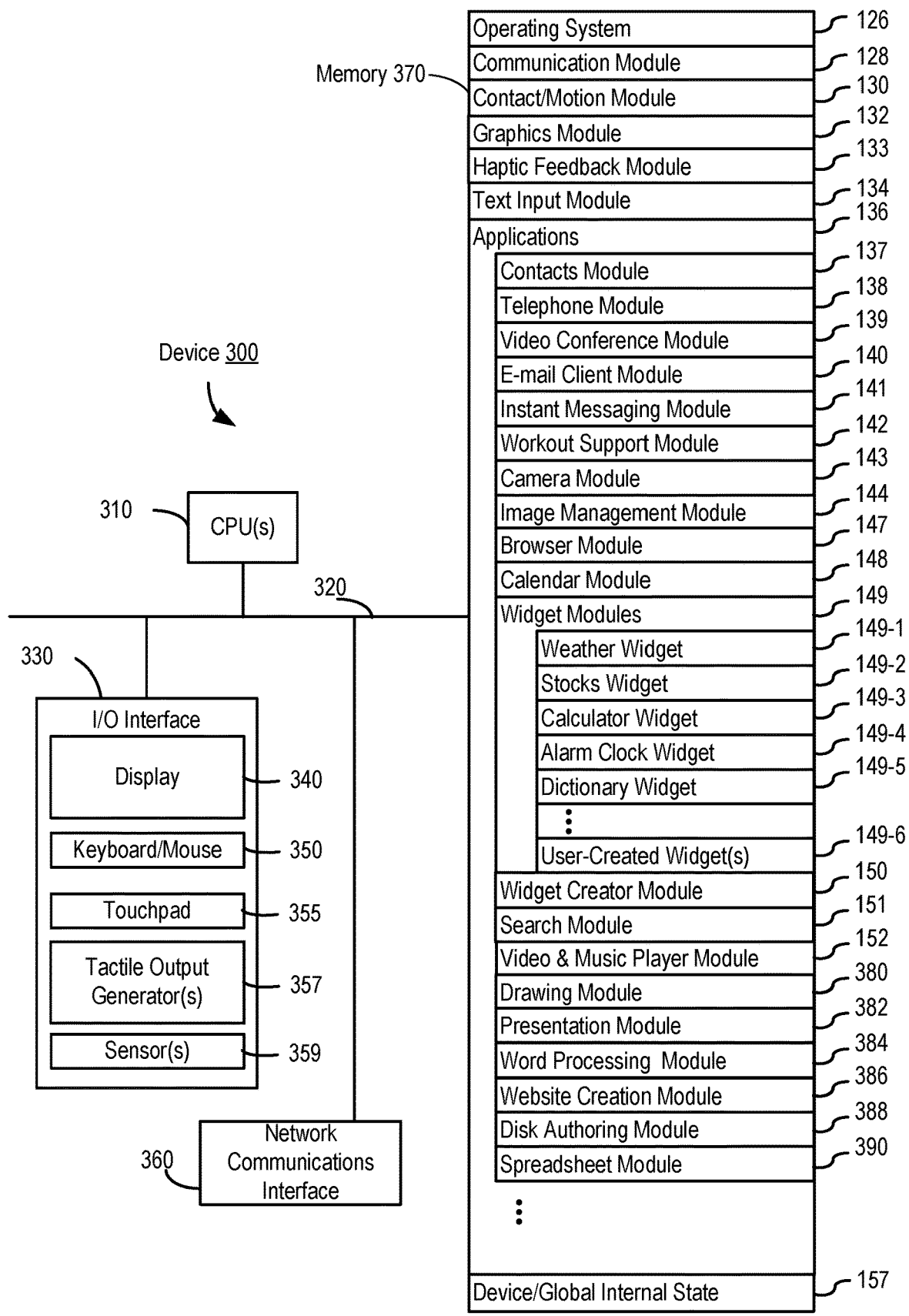
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);

Telephone module 138;

Video conference module 139;

E-mail client module 140;

Instant messaging (IM) module 141;

Workout support module 142;

Camera module 143 for still and/or video images;

Image management module 144;

Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
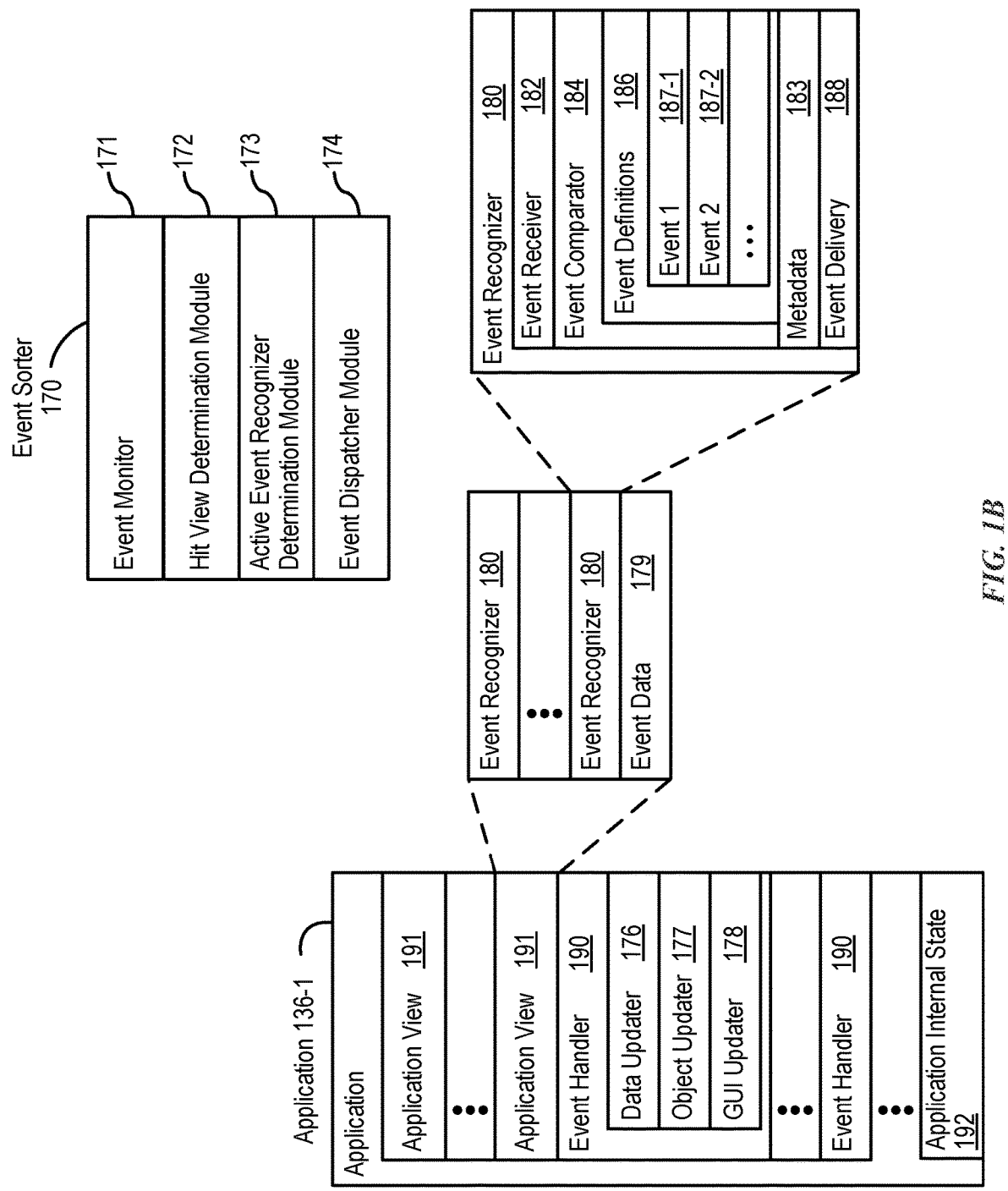
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113

(through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
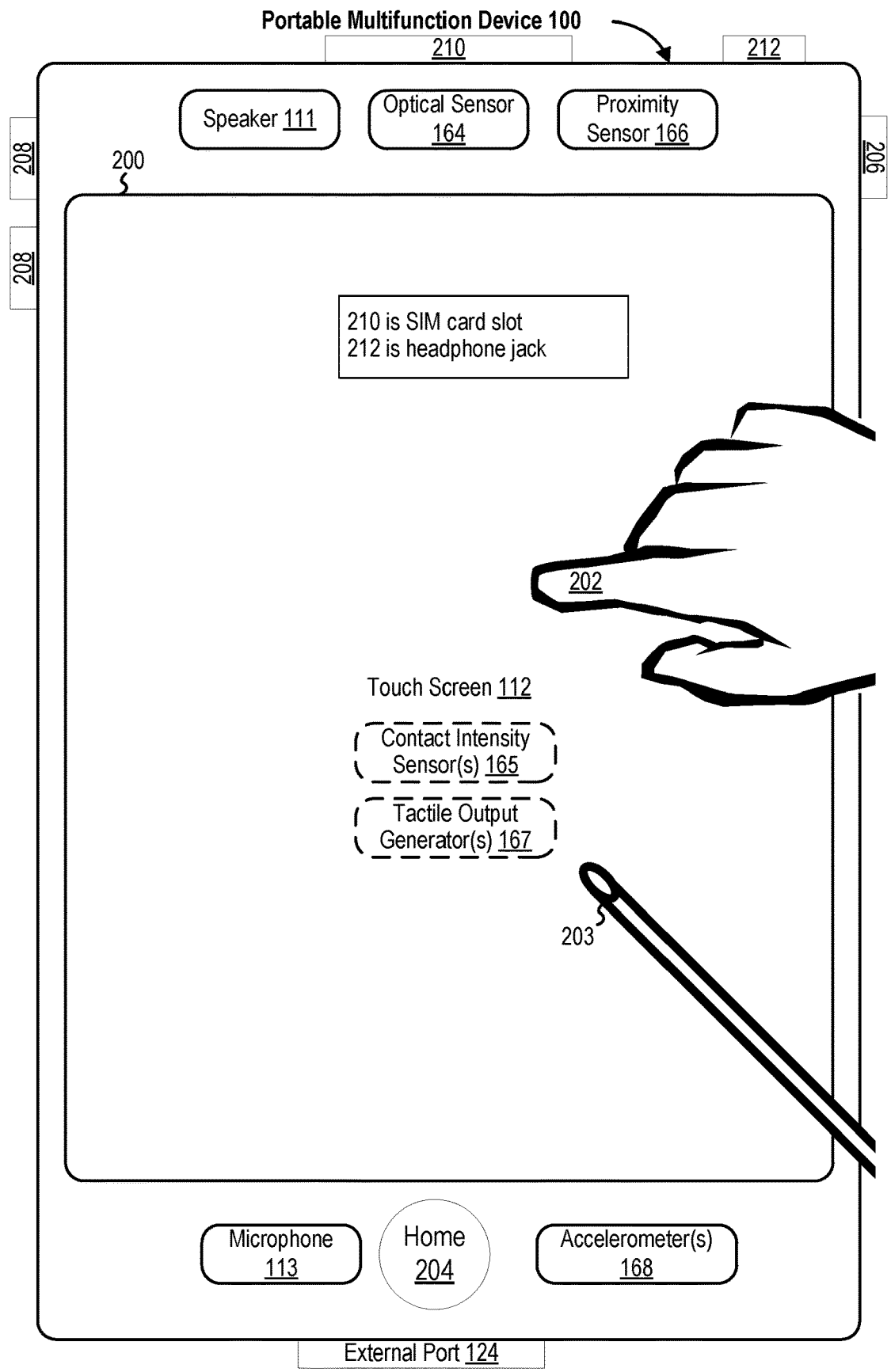
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some embodiments.

Input mechanism 508 is, optionally, a microphone, in some embodiments. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 800 (FIGS. 8A-8C), 1000 (FIGS. 10A-10C), 1200 (FIGS. 12A-12C), and 1400 (FIG. 14). A computer-readable storage medium can be any medium that can tangibly contain or store computer-executable instructions for use by or in connection with the instruction execution system, apparatus, or device. In some embodiments, the storage medium is a transitory computer-readable storage medium. In some embodiments, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

FIG. 6 illustrates exemplary devices connected via one or more communication channels to participate in a transaction in accordance with some embodiments. One or more exemplary electronic devices (e.g., devices 100, 300, and 500) are configured to optionally detect input (e.g., a particular user input, an NFC field) and optionally transmit payment information (e.g., using NFC). The one or more electronic devices optionally include NFC hardware and are configured to be NFC-enabled.

The electronic devices (e.g., devices 100, 300, and 500) are optionally configured to store payment account information associated with each of one or more payment accounts. Payment account information includes, for example, one or more of: a person's or company's name, a billing address, a login, a password, an account number, an expiration date, a security code, a telephone number, a bank associated with the payment account (e.g., an issuing bank), and a card network identifier. In some embodiments, payment account information includes include an image, such as a picture of a payment card (e.g., taken by the device and/or received at the device). In some embodiments, the electronic devices receive user input including at least some payment account information (e.g., receiving user-entered credit, debit, account, or gift card number and expiration date). In some embodiments, the electronic devices detect at least some payment account information from an image (e.g., of a payment card captured by a camera sensor of the device). In some embodiments, the electronic devices receive at least some payment account information from another device (e.g., another user device or a server). In some embodiments, the electronic device receives payment account information from a server associated with another service for which an account for a user or user device previously made a purchase or identified payment account data (e.g., an app for renting or selling audio and/or video files).

In some embodiments, a payment account is added to an electronic device (e.g., device 100, 300, and 500), such that payment account information is securely stored on the electronic device. In some embodiments, after a user initiates such process, the electronic device transmits information for the payment account to a transaction-coordination server, which then communicates with a server operated by a payment network for the account (e.g., a payment server) to ensure a validity of the information. The electronic device is optionally configured to receive a script from the server that allows the electronic device to program payment information for the account onto the secure element.

In some embodiments, communication among electronic devices 100, 300, and 500 facilitates transactions (e.g., generally or specific transactions). For example, a first electronic device (e.g., 100) can serve as a provisioning or managing device, and can send notifications of new or updated payment account data (e.g., information for a new account, updated information for an existing account, and/or an alert pertaining to an existing account) to a second electronic device (e.g., 500). In another example, a first electronic device (e.g., 100) can send data to a second election device, wherein the data reflects information about payment transactions facilitated at the first electronic device. The information optionally includes one or more of: a payment amount, an account used, a time of purchase, and whether a default account was changed. The second device (e.g., 500) optionally uses such information to update a default payment account (e.g., based on a learning algorithm or explicit user input).

Electronic devices (e.g., 100, 300, 500) are configured to communicate with each other over any of a variety of networks. For example, the devices communicate using a Bluetooth connection 608 (e.g., which includes a traditional Bluetooth connection or a Bluetooth Low Energy connection) or using a WiFi network 606. Communications among user devices are, optionally, conditioned to reduce the possibility of inappropriately sharing information across devices. For example, communications relating to payment information requires that the communicating devices be paired (e.g., be associated with each other via an explicit user interaction) or be associated with a same user account.

In some embodiments, an electronic device (e.g., 100, 300, 500) is used to communicate with a point-of-sale (POS) payment terminal 600, which is optionally NFC-enabled. The communication optionally occurs using a variety of communication channels and/or technologies. In some embodiments, electronic device (e.g., 100, 300, 500) communicates with payment terminal 600 using an NFC channel 610. In some embodiments, payment terminal 600 communicates with an electronic device (e.g., 100, 300, 500) using a peer-to-peer NFC mode. Electronic device (e.g., 100, 300, 500) is optionally configured transmit a signal to payment terminal 600 that includes payment information for a payment account (e.g., a default account or an account selected for the particular transaction).

In some embodiments, proceeding with a transaction includes transmitting a signal that includes payment information for an account, such as a payment account. In some embodiments, proceeding with the transaction includes reconfiguring the electronic device (e.g., 100, 300, 500) to respond as a contactless payment card, such as an NFC-enabled contactless payment card, and then transmitting credentials of the account via NFC, such as to payment terminal 600. In some embodiments, subsequent to transmitting credentials of the account via NFC, the electronic device reconfigures to not respond as a contactless payment card (e.g., requiring authorization before again reconfigured to respond as a contactless payment card via NFC).

In some embodiments, generation of and/or transmission of the signal is controlled by a secure element in the electronic device (e.g., 100, 300, 500). The secure element optionally requires a particular user input prior to releasing payment information. For example, the secure element optionally requires detection that the electronic device is being worn, detection of a button press, detection of entry of a passcode, detection of a touch, detection of one or more option selections (e.g., received while interacting with an application), detection of a fingerprint signature, detection of a voice or voice command, and or detection of a gesture or movement (e.g., rotation or acceleration). In some embodiments, if a communication channel (e.g., an NFC communication channel) with another device (e.g., payment terminal 600) is established within a defined time period from detection of the input, the secure element releases payment information to be transmitted to the other device (e.g., payment terminal 600). In some embodiments, the secure element is a hardware component that controls release of secure information. In some embodiments, the secure element is a software component that controls release of secure information.

In some embodiments, protocols related to transaction participation depend on, for example, device types. For example, a condition for generating and/or transmitting payment information can be different for a wearable device (e.g., device 500) and a phone (e.g., device 100). For example, a generation and/or transmission condition for a wearable device includes detecting that a button has been pressed (e.g., after a security verification), while a corresponding condition for a phone does not require button-depression and instead requires detection of particular interaction with an application. In some embodiments, a condition for transmitting and/or releasing payment information includes receiving particular input on each of multiple devices. For example, release of payment information optionally requires detection of a fingerprint and/or passcode at the device (e.g., device 100) and detection of a mechanical input (e.g., button press) on another device (e.g., device 500).

Payment terminal 600 optionally uses the payment information to generate a signal to transmit to a payment server 604 to determine whether the payment is authorized. Payment server 604 optionally includes any device or system configured to receive payment information associated with a payment account and to determine whether a proposed purchase is authorized. In some embodiments, payment server 604 includes a server of an issuing bank. Payment terminal 600 communicates with payment server 604 directly or indirectly via one or more other devices or systems (e.g., a server of an acquiring bank and/or a server of a card network).

Payment server 604 optionally uses at least some of the payment information to identify a user account from among a database of user accounts (e.g., 602). For example, each user account includes payment information. An account is, optionally, located by locating an account with particular payment information matching that from the POS communication. In some embodiments, a payment is denied when provided payment information is not consistent (e.g., an expiration date does not correspond to a credit, debit or gift card number) or when no account includes payment information matching that from the POS communication.

In some embodiments, data for the user account further identifies one or more restrictions (e.g., credit limits); current or previous balances; previous transaction dates, locations and/or amounts; account status (e.g., active or frozen), and/or authorization instructions. In some embodiments, the payment server (e.g., 604) uses such data to determine whether to authorize a payment. For example, a payment server denies a payment when a purchase amount added to a current balance would result in exceeding an account limit, when an account is frozen, when a previous transaction amount exceeds a threshold, or when a previous transaction count or frequency exceeds a threshold.

In some embodiments, payment server 604 responds to POS payment terminal 600 with an indication as to whether a proposed purchase is authorized or denied. In some embodiments, POS payment terminal 600 transmits a signal to the electronic device (e.g., 100, 300, 500) to identify the result. For example, POS payment terminal 600 sends a receipt to the electronic device (e.g., 100, 300, 500) when a purchase is authorized (e.g., via a transaction-coordination server that manages a transaction app on the user device). In some instances, POS payment terminal 600 presents an output (e.g., a visual or audio output) indicative of the result.

Payment can be sent to a merchant as part of the authorization process or can be subsequently sent.

In some embodiments, the electronic device (e.g., 100, 300, 500) participates in a transaction that is completed without involvement of POS payment terminal 600. For example, upon detecting that a mechanical input has been received, a secure element in the electronic device (e.g., 100, 300, 500) releases payment information to allow an application on the electronic device to access the information (e.g., and to transmit the information to a server associated with the application).

In some embodiments, the electronic device (e.g., 100, 300, 500) is in a locked state or an unlocked state. In the locked state, the electronic device is powered on and operational but is prevented from performing a predefined set of operations in response to the user input. The predefined set of operations may include navigation between user interfaces, activation or deactivation of a predefined set of functions, and activation or deactivation of certain applications. The locked state may be used to prevent unintentional or unauthorized use of some functionality of the electronic device or activation or deactivation of some functions on the electronic device. In the unlocked state, the electronic device 100 is power on and operational and is not prevented from performing at least a portion of the predefined set of operations that cannot be performed while in the locked state.

When the device is in the locked state, the device is said to be locked. In some embodiments, the device in the locked state may respond to a limited set of user inputs, including input that corresponds to an attempt to transition the device to the unlocked state or input that corresponds to powering the device off.

In some embodiments, a secure element is a hardware component (e.g., a secure microcontroller chip) configured to securely store data or an algorithm. In some embodiments, the secure element provides (or releases) payment information (e.g., an account number and/or a transaction-specific dynamic security code). In some embodiments, the secure element provides (or releases) the payment information in response to the device receiving authorization, such as a user authentication (e.g., fingerprint authentication; passcode authentication; detecting double-press of a hardware button when the device is in an unlocked state, and optionally, while the device has been continuously on a user's wrist since the device was unlocked by providing authentication credentials to the device, where the continuous presence of the device on the user's wrist is determined by periodically checking that the device is in contact with the user's skin). For example, the device detects a fingerprint at a fingerprint sensor (e.g., a fingerprint sensor integrated into a button) of the device. The device determines whether the fingerprint is consistent with a registered fingerprint. In accordance with a determination that the fingerprint is consistent with the registered fingerprint, the secure element provides (or releases) payment information. In accordance with a determination that the fingerprint is not consistent with the registered fingerprint, the secure element forgoes providing (or releasing) payment information.

Attention is now directed towards embodiments of user interfaces ("UI") and associated processes that are implemented on an electronic device, such as portable multifunction device 100, device 300, or device 500.

FIGS. 7A-7O illustrate exemplary user interfaces for inputting information about a secure credential to electronic device 700, in accordance with some embodiments. The user interfaces in these figures are used to illustrate the processes described below, including the processes in FIGS. 8A-8C. In some embodiments, electronic device 700 includes some or all of the features of device 100, device 300, or device 500. In some embodiments, electronic device 700 includes display 702, one or more input devices (e.g., a touch-sensitive surface of display 702, mechanical input device 701, such as a power button, camera 703, a mic, a camera sensor located on the back of device 700 (e.g., optical sensor 164)), one or more output devices (e.g., a speaker), and one or more sensors (e.g., biometric sensor 704, such as a depth sensor, a fingerprint sensor). In some embodiments, one or more sensors (e.g., a biometric sensor, such as a fingerprint sensor) of electronic device 700 is integrated with/into a different component of the device (e.g., a fingerprint sensor is integrated with display 702).

At FIG. 7A, a user seeks to input information about a secure credential. In particular, the user seeks to input account information of a payment card (e.g., a credit card, a debit card) in order to add a secure credential to electronic device 700 (e.g., a token (e.g., a token corresponding to an account number or a device-specific number corresponding to an account number) stored in a secure element of electronic device 700). In some embodiments, the secure credential is linked to the account information of the payment card (e.g., linked by the issuer of the payment card). Thus, in some embodiments, information about the payment card is also information about the secure credential and vice versa. Using the secure credential, electronic device 700 can participate in transactions (e.g., authorize a payment to purchase a good or service) using the account linked to the payment card.

Electronic device 700 can input information associated with the payment card by using a camera sensor of electronic device 700. For example, electronic device 700 uses the camera sensor to capture images of the visible account information located on the payment card. Electronic device 700 then performs optical character recognition on the images to extract information associated with the payment card. However, some payment cards lack visible account information (e.g., credit card number, debit card number, expiration date, security code) or require (e.g., for security reasons) that the secure credential be added to electronic devices via a specific process (e.g., a process using an application provided by the issuer of the payment card). Payment cards without visible account information tend to be issued by banks that operate in certain countries. Thus, if electronic device 700 is located in one of these countries, an alternative process for receiving information associated with the payment card should be implemented since it is likely the payment card lacks visible account information that can be captured via the camera sensor.

As illustrated in FIG. 7A, electronic device 700 displays wallet user interface (UI) 706. While displaying wallet UI 706, electronic device 700 receives input 708 (e.g., a tap gesture) at add credential affordance 710.

Figure 7B:
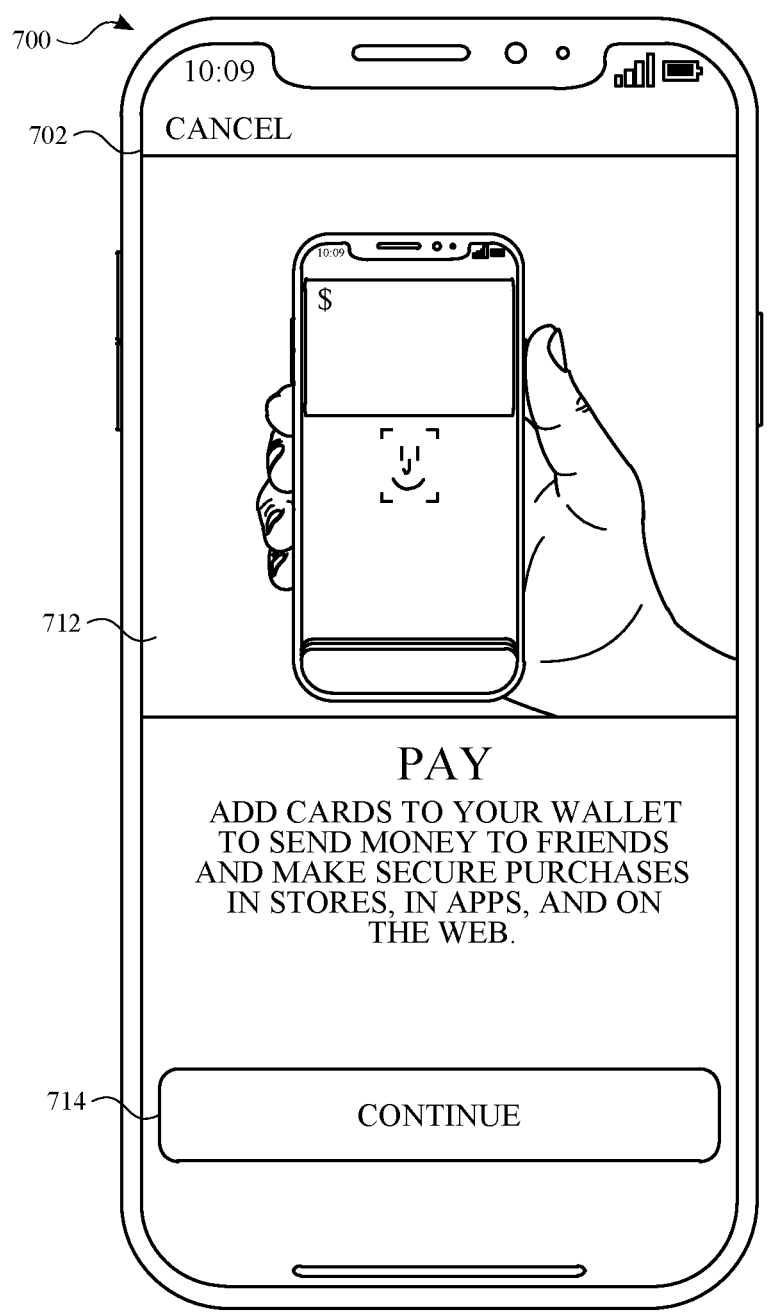

At FIG. 7B, in response to receiving input 708 at add credential affordance 710, electronic device 700 displays (e.g., replaces display of wallet UI 706 with) introduction UI 712 with continue affordance 714. Introduction UI 712 includes text explaining to the user the purpose of the process in which the user is currently engaged. To proceed with adding a secure credential to electronic device 700, a user selects continue affordance 714.

Figure 7C:
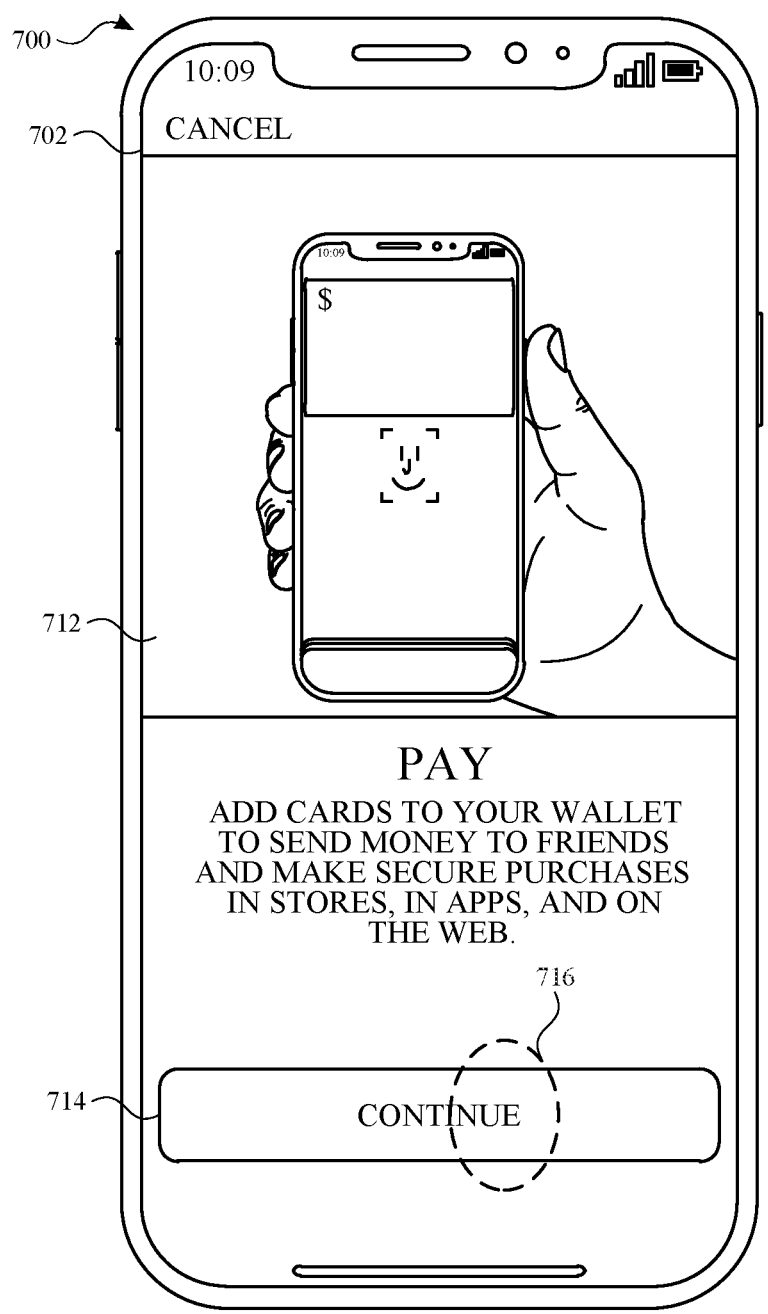

At FIG. 7C, while displaying introduction UI 712, electronic device 700 receives input 716 at continue affordance 714. In response to receiving input 716 at continue affordance 714, electronic device 700 determines whether the geographic location (e.g., location defined by GPS coordinates (e.g., as determined by GPS module 135)) of electronic device 700 is located in one of the countries in a list of predetermined countries. Each country in the list of predetermined countries has one or more issuers (e.g., banks) operating therein that issues payments cards without visible account information. Electronic device 700 determines that the geographic location of electronic device 700 is in one of the countries in the list of predetermined countries.

Upon determining that the geographic location of electronic device 700 is located in one of the countries in the list of predetermined countries, electronic device 700 determines whether the number of potential issuers of the payment card is less than some predetermined (or predefined) number (e.g., 5, 10, 15, 20). The potential issuers are issuers of payment cards without visible account information (or payment cards that require specific processes for adding the secure credential) who are operating in the country in which electronic device 700 is currently located. Subsequent to, or concurrent with, determining the geographic location, electronic device 700 determines that the number of potential issuers is not less than the predefined number (e.g., not less than 10).

Figure 7D:
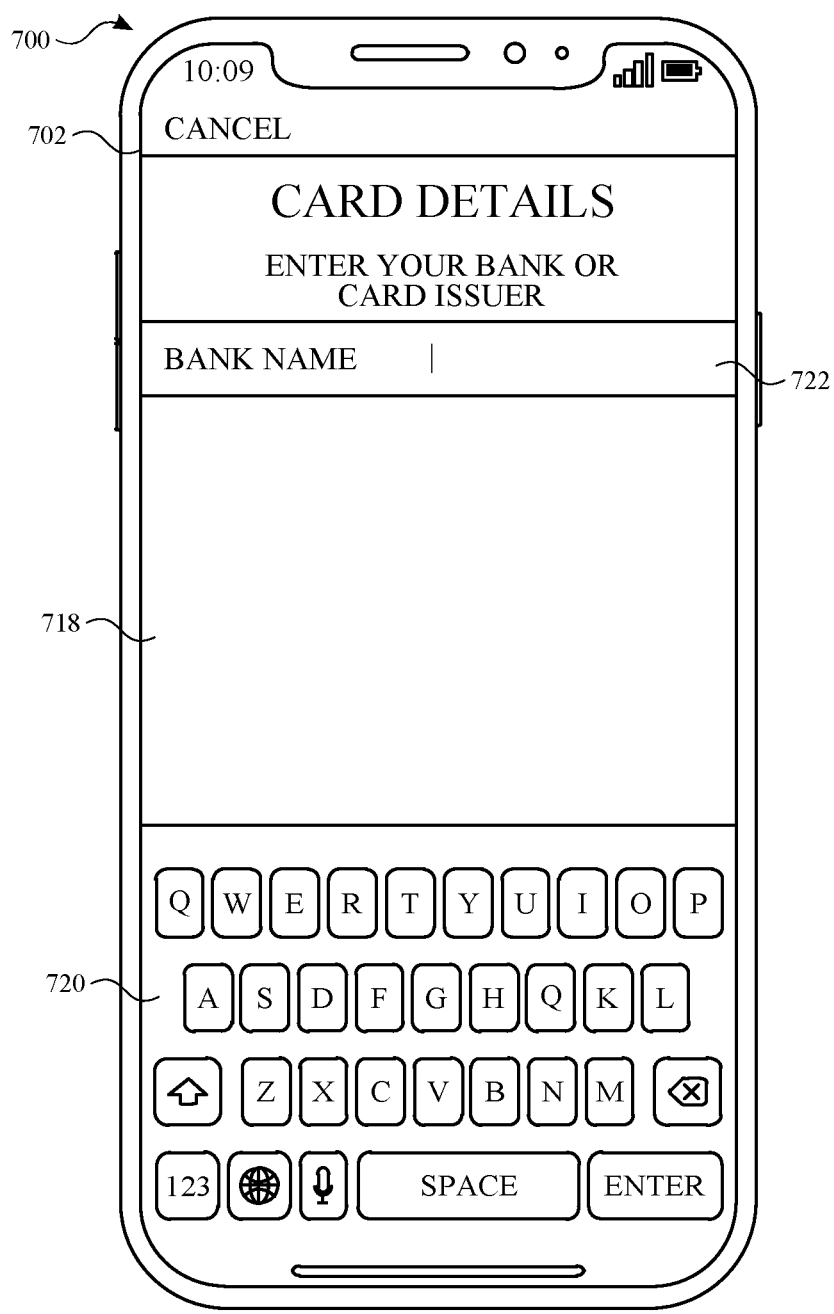

At FIG. 7D, upon determining that the number of potential issuers is not less than the predefined number, electronic device 700 displays (e.g., replaces display of introduction UI 712 with) issuer search UI 718. Issuer search UI 718 enables the user to search for the issuer of the payment card. Issuer search UI 718 includes virtual keyboard 720, which is used to enter the name of the issuer of the payment card. Issuer search UI also includes text entry field 722, which displays the one or more characters entered via virtual keyboard 720. As a user enters one or more characters via virtual keyboard 720, electronic device 700 displays results in real-time, where only the issuers that match or correspond to the entered one or more characters are displayed.

Figure 7E:
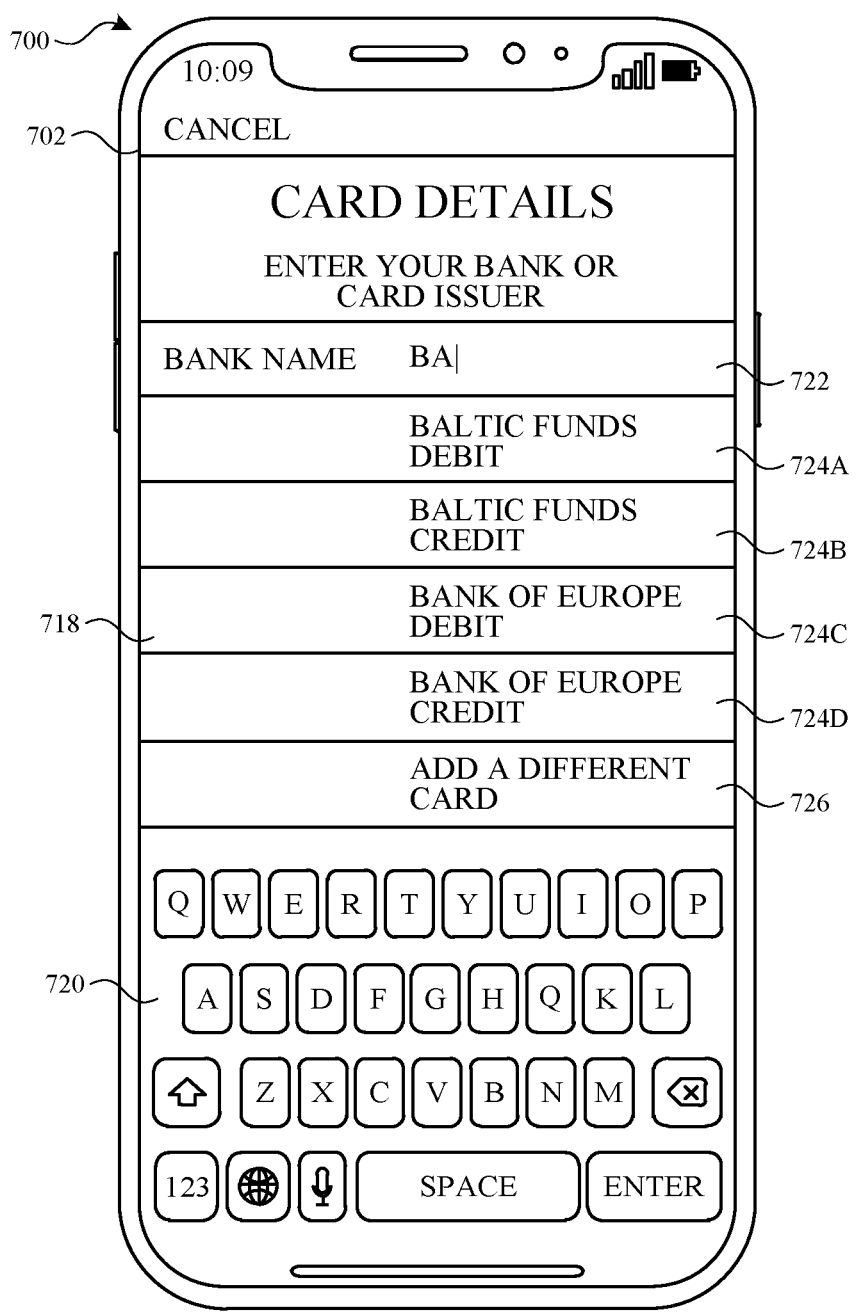

At FIG. 7E, while displaying issuer search UI 718, electronic device 700 receives input via virtual keyboard 720. In response to receiving input via virtual keyboard 720, electronic device 700 displays the entered characters ("B" and "A") in text entry field 722. Further in response to receiving input via virtual keyboard 720, electronic device 700 displays issuer affordances 724*a-d*, which include a name of the issuer and an account type (e.g., credit, debit). Issuer affordances 724*a-d* are selected for display based on the name of the issuer associated with the issuer affordance. For example, issuer affordances 724*a-d* are displayed because the name of the issuer (i.e., Baz Bank) corresponds to the entered characters (e.g., the name of the issuer includes one or more of the entered characters). Further in response to receiving input via virtual keyboard 720, electronic device 700 displays alternative card affordance 726, which, when activated, results in initiating a process for capturing information about the secure credential using the camera sensor of electronic device 700. In some embodiments, electronic device 700 displays alternative card affordance 726 in issuer search UI 718 of FIG. 7D.

Figure 7F:
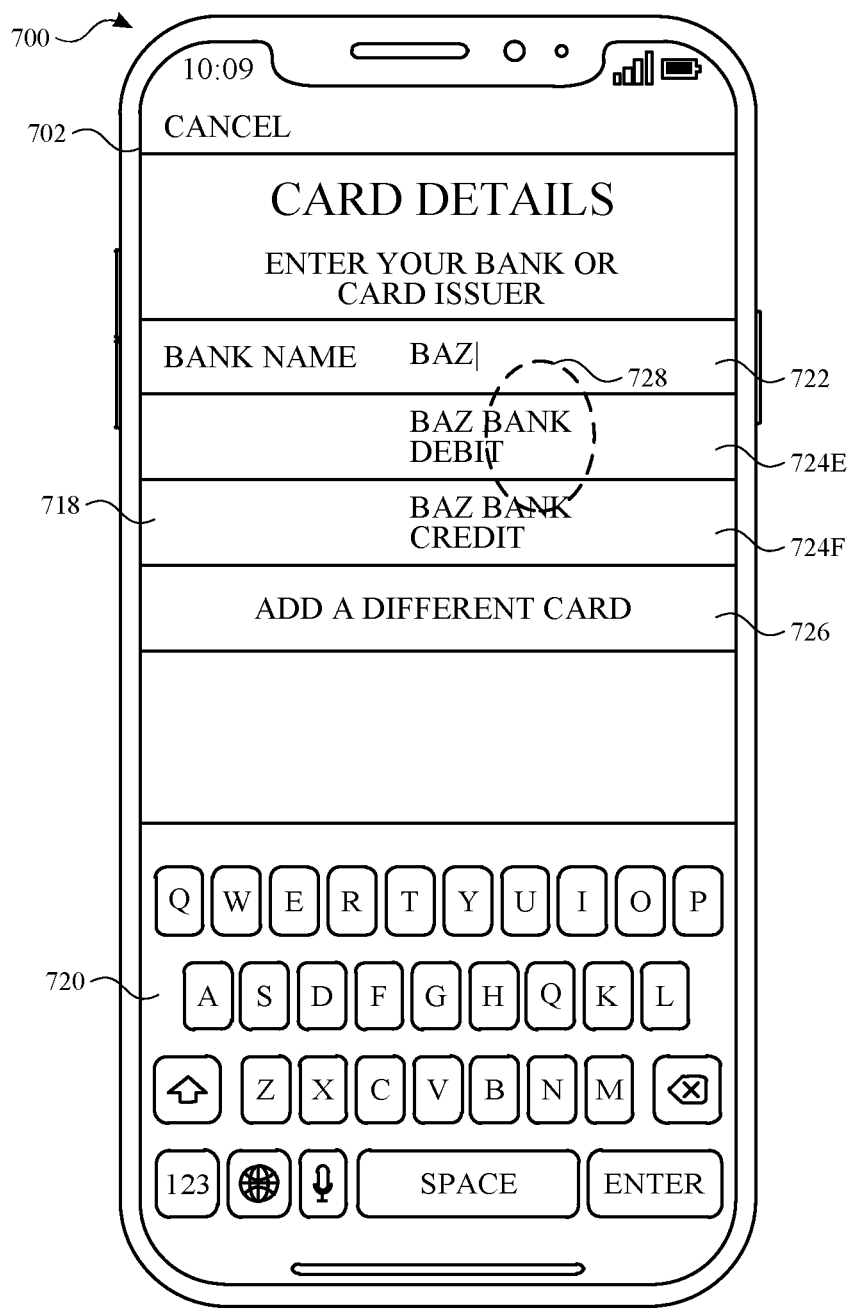

At FIG. 7F, while displaying issuer search UI 718, electronic device 700 receives additional input ("Z") via virtual keyboard 720 and, in response, updates the results of the search for the issuer of the payment card. That is, in response to receiving additional input via virtual keyboard 720, electronic device 700 ceases to display issuer affordances 724*a-d*. Further in response to receiving additional input via virtual keyboard 720, electronic device 700 displays issuer affordances 724*e-f*.

The user seeks to input information about the payment card (e.g., a debit card issued by Baz Bank), so the user taps on issuer affordance 724*e*. While displaying issuer search UI 718, electronic device receives input 728 (e.g., tap gesture) at issuer affordance 724*e*. In response to receiving input 728 at issuer affordance 724*e*, electronic device 700 determines (e.g., after an initial determination that the payment account associated with affordance 724*e* is an account associated with a payment card that does not have visible information or that requires provisional via a specific application) whether the application corresponding to the issuer (e.g., Baz Bank application) associated with issuer affordance 724*e* is already installed on electronic device 700. Electronic device 700 determines that the Baz Bank application is not installed on electronic device 700.

Figure 7G:
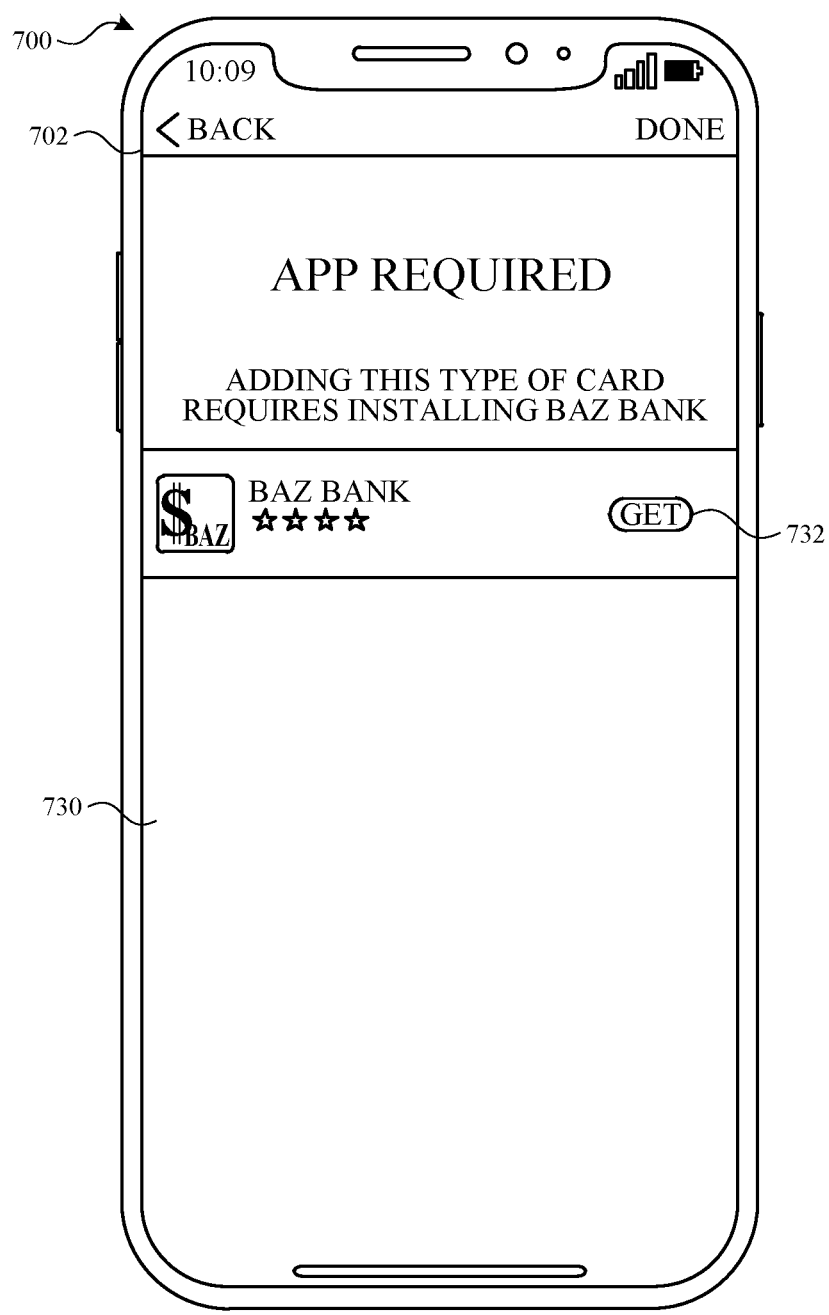

At FIG. 7G, upon determining that the Baz Bank application is not installed on electronic device 700, electronic device 700 displays (e.g., replaces display of issuer search UI 718 with) app required UI 730 with app store affordance 732. App required UI 730 prompts the user to use the Baz Bank application to continue with adding the secure credential to electronic device 700.

Figure 7H:
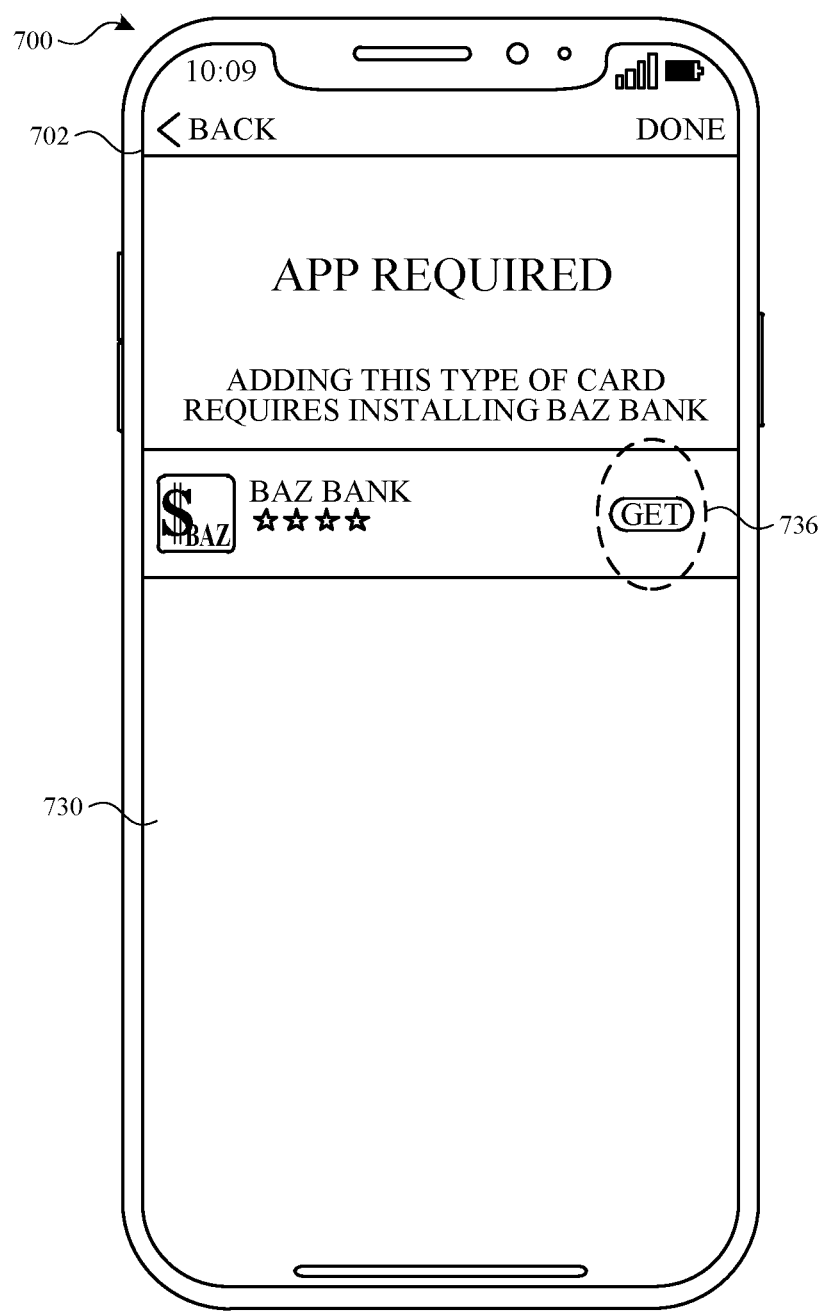

At FIG. 7H, the user seeks to download the Baz Bank application, so the user taps on app store affordance 732. While displaying app required UI 730, electronic device 700 receives input 736 at app store affordance 732.

Figure 7I:

At FIG. 7I, in response to receiving input 736 at app store affordance 732, electronic device 700 displays (e.g., replaces display of app required UI 730 with) app store UI 738. App store UI 738 includes a landing page for the Baz Bank application with download affordance 740. To input information about the secure credential, the user downloads the application. While displaying app store UI 738, electronic device 700 receives an input (e.g., a tap gesture) at download affordance 740. In response to receiving the input at download affordance 740, electronic device 700 initiates a process for downloading the Baz Bank application. This process can require user authentication prior to downloading the Baz Bank application. After downloading the application, electronic device 700 receives an input for launching (or opening) the Baz Bank application. After launching the Baz Bank application, electronic device 700 receives input (e.g., user account information (e.g., username, password), billing address) about the secure credential. Electronic device 700 uses this input to add a secure credential to electronic device 700, thereby enabling electronic device 700 to use the secure credential in future transactions.

Figure 7J:
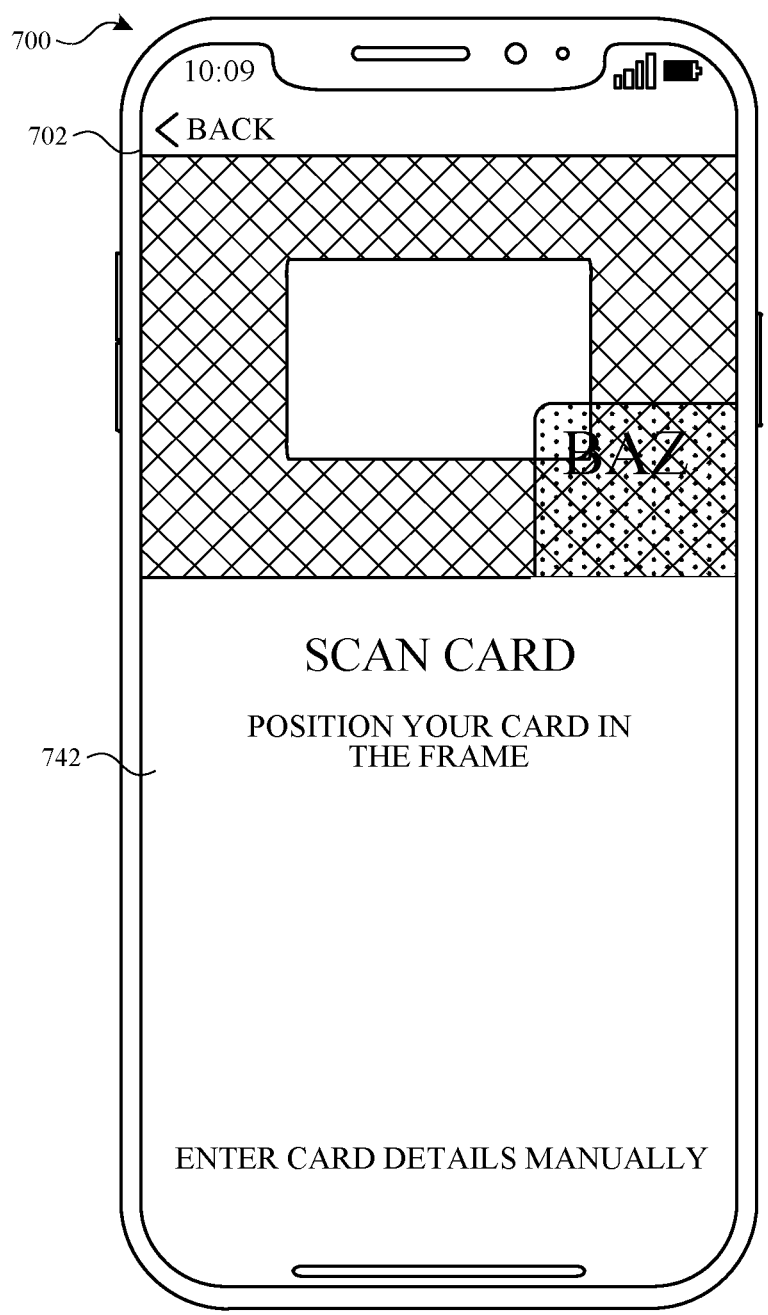

FIG. 7J illustrates a different process for inputting information about the secure credential using the camera sensor of electronic device 700. Using camera capture UI, electronic device 700 can receive information about the secure credential by capturing images of visible account information located on a payment card. As shown in FIG. 7J, a portion of a payment card is positioned within the field of view of a rear-facing camera of electronic device 700. After a card is adequately positioned, electronic device 700 then performs optical character recognition on the images (e.g., captured images) to extract information associated with the payment card. Electronic device 700 subsequently inputs the information to add a secure credential to the electronic device. As discussed above, FIG. 7C illustrates that while displaying introduction UI 712, electronic device 700 receives input 716 at continue affordance 714. In response to receiving input 716 at continue affordance 714, electronic device 700 determines whether the geographic location (e.g., location defined by GPS coordinates) of electronic device 700 is located in one of the countries in a list of predetermined countries. In some embodiments, upon determining that the geographic location of electronic device 700 is not in one of the countries in the list of predetermined countries, electronic device 700 displays camera capture UI 742, as shown in FIG. 7J (instead of issuer search UI 718 shown in FIG. 7D and issuer selection UI 744 shown in FIG. 7K).

As discussed above, FIGS. 7E-7F and FIGS. 7K-7L illustrate user interfaces that include alternative card affordance 726. In some embodiments, upon activation of alternative card affordance 726, electronic device 700 displays camera capture UI 742, as shown in FIG. 7J (e.g., replaces the display of the user interface that includes alternative card affordance 726 with camera capture UI 742).

As discussed above, FIGS. 7E-7F and FIG. 7L illustrate user interfaces that include affordances with account types (e.g., debit, credit). In some embodiments, upon activation of an affordance with a credit account type (e.g., 724*b*, 724*d*, 724*f*, and 752*b*), electronic device 700 displays camera capture UI 742, as shown in FIG. 7J (e.g., replaces the display of the user interface that includes the affordance with the credit account type with camera capture UI 742).

Figure 7K:
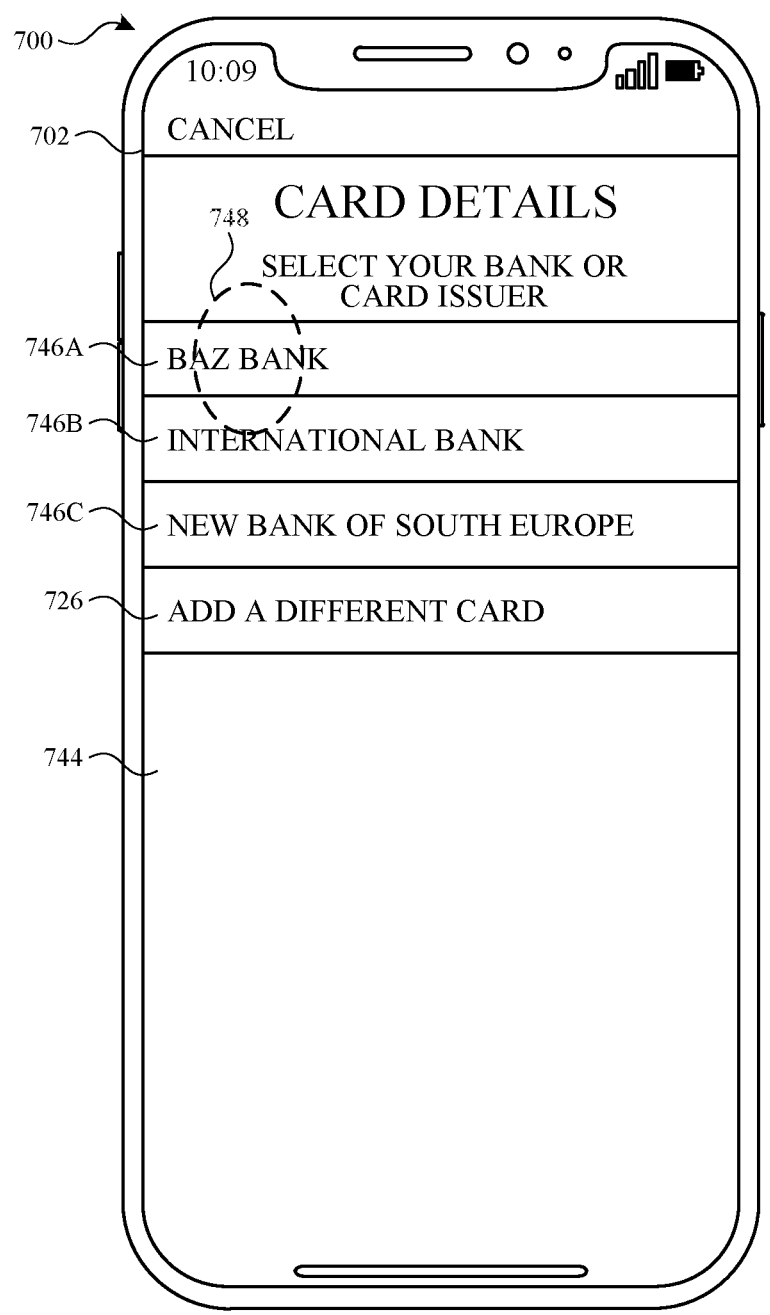

FIG. 7K illustrates a different process for finding the issuer of a payment card. As discussed above with respect to FIG. 7C, upon determining that the geographic location of electronic device 700 is in one of the countries in the list of predetermined countries, electronic device 700 determines whether the number of potential issuers of the payment card is less than some predefined number (e.g., 5, 10, 15, 20). In some embodiments, upon determining that the number of potential issuers of the payment card is less than the predefined number, electronic device 700 displays issuer selection UI 744 shown in FIG. 7K (instead of issuer search UI 718 shown in FIG. 7D). Issuer selection UI 744 includes issuer affordances 746*a-c*, which includes the names of potential issuers operating in the geographic location of electronic device 700. In some embodiments, issuer selection UI 744 includes alternative card affordance 726.

At FIG. 7K, the user seeks to select Baz Bank as the issuer of the payment card, and taps on issuer affordance 746*a*. In some embodiments, while displaying issuer selection UI 744, electronic device 700 receives input 748 at issuer affordance 746*a*.

Figure 7L:
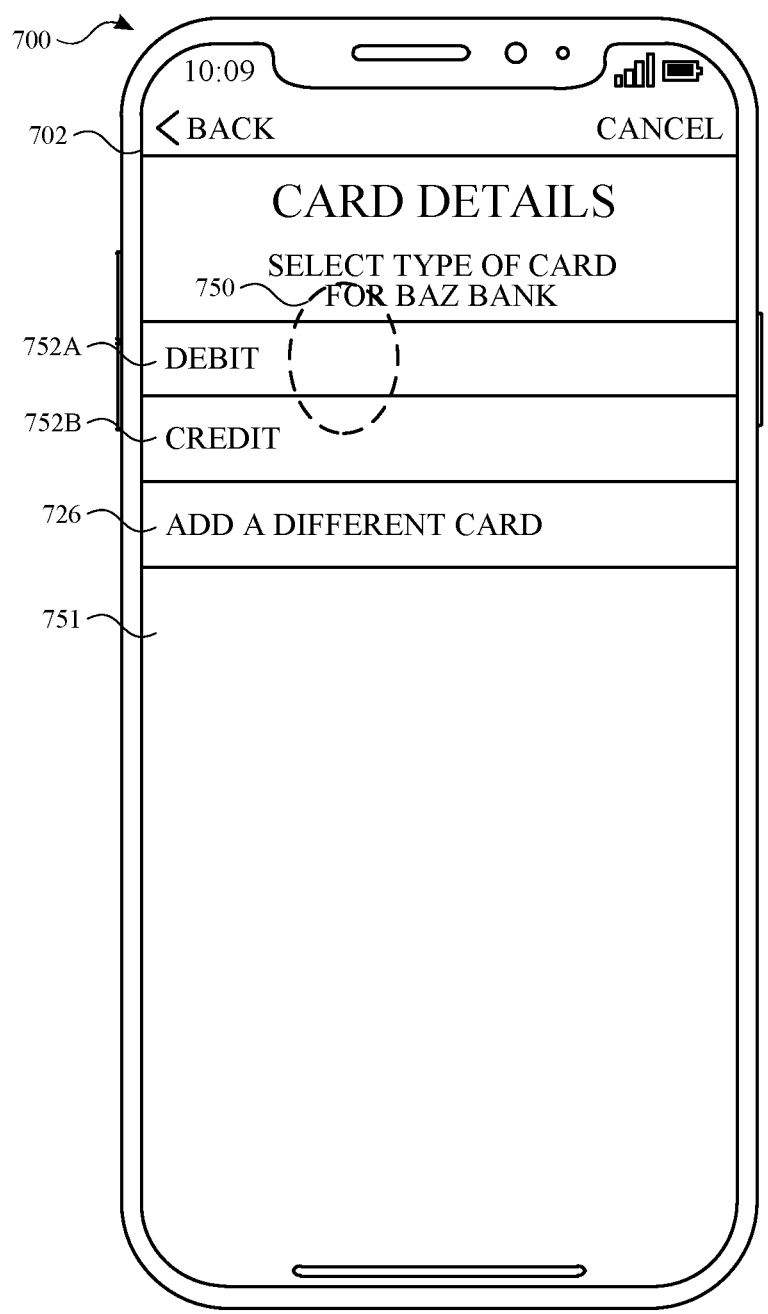

At FIG. 7L, in response to receiving input 748 at issuer affordance 746*a*, electronic device 700 displays (e.g., replaces display of issuer selection UI 744 with) type selection UI 751 with type affordances 752*a-b*, which show the different account types (e.g., debit, credit) of cards issued by Baz Bank. In some embodiments type selection UI 751 includes alternative card affordance 726. The user seeks to input information about a debit card issued by Baz Bank, so the user taps on type affordance 752*a*. Thus, electronic device 700 receives input 750 at type affordance 752*a*. In response to receiving input 750 at type affordance 752*a*, electronic device 700 determines whether the application corresponding to type affordance 752*a* (i.e., Baz Bank application) is already installed on electronic device 700. In some embodiments, electronic device 700 determines that the Baz Bank application is not installed, and in response, displays app required UI 730 with app store affordance 732, as shown in FIG. 7G. In some embodiments, electronic device 700 determines that the Baz Bank application is already installed on electronic device 700.

Figure 7M:

At FIG. 7M, upon determining that the Baz Bank application is already installed on electronic device 700, electronic device 700 displays (e.g., replaces display of type selection UI 751 with) app required UI 730 with launch affordance 754. Receiving input at launch affordance 754 results in electronic device 700 launching (or opening) the Baz Bank application. After launching the Baz Bank application, electronic device 700 receives input (e.g., user account information (e.g., username, password), billing address) about the secure credential. Electronic device 700 uses this input to add a secure credential to electronic device 700, thereby enabling electronic device 700 for use in transactions.

In some embodiments, the user interface of FIG. 7M is displayed in response to input 728 while displaying the user interface of FIG. 7F, after the electronic device 700 determinates that the relevant application is already installed on electronic device 700.

Turning back to FIG. 7L, electronic device 700 can display user interfaces other than the interface of FIG. 7M, in response to receiving input 750 that corresponds to the selection of an account type. In some embodiments, in response to input 750, electronic device 700 displays interfaces similar to those of FIGS. 7G to 7I, after determining that the Baz Bank application is not installed on electronic device 700.

Figure 7N:
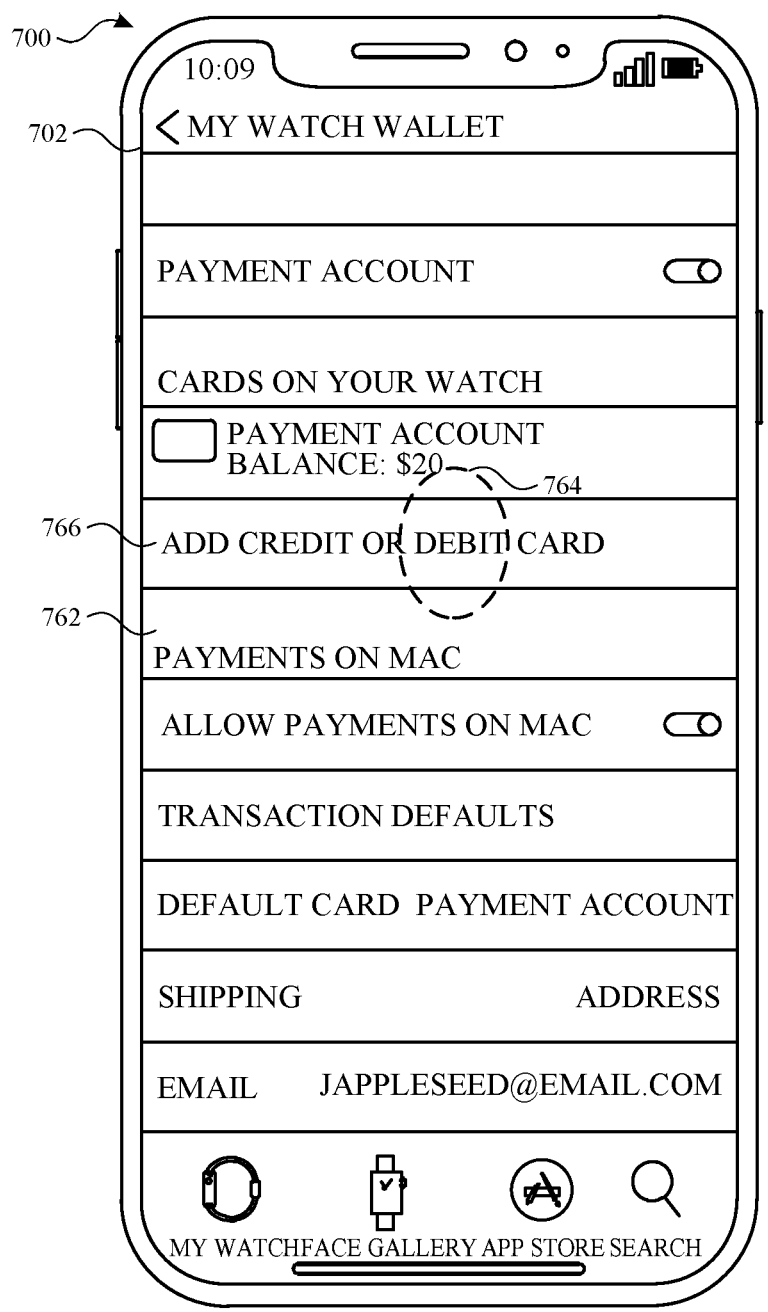

FIG. 7N depicts user interface 762 of an application for managing and configuring a companion electronic device (e.g., a smartwatch (e.g., electronic device 500)) that is paired and wirelessly connected with electronic device 700. User interface 762 includes affordance 766 that can be used to initiate a process for inputting information about a secure credential (e.g., a credential that has also been inputted into electronic device 700 or a secure credential that has not been inputted into device 700) to the companion device. While displaying user interface 762, electronic device 700 receives input 764 at affordance 766. In some embodiments, in response to receiving input 764 at affordance 766, electronic device 700 initiates a process for adding a secure credential to the companion device (e.g., the process includes some or all of the features and user interfaces described in FIGS. 7A-7M). In some embodiments, the process and user interfaces associated with the process are generated by the application for managing and configuring the companion electronic device, rather than a separate application, such as the wallet application of FIG. 7A.

During the process for adding the secure credential, the user identifies the issuer and/or type (e.g., credit, debit) associated with the payment card. As illustrated in FIG. 7O, upon receiving identification (e.g., selection) of the issuer and/or type associated with the payment card (e.g., using an interface similar or identical to that of FIG. 7F or 7L), electronic device displays app required UI 756, which prompts the user to download the application associated with the issuer (e.g., Baz Bank application) at a later time to input information about the secure credential. Sometimes, it is preferable to require the user to manually exit the application dedicated to the companion electronic device before downloading the application to ensure the user is aware of whether the application is being downloaded for electronic device 700 or the companion device. In some embodiments, after displaying app required UI 756, electronic device 700 outputs (e.g., outputs after a predetermined time has elapsed without the user downloading the application associated with the issuer) a prompt (e.g., notification) including an affordance which, when activated, results in displaying a landing page for the application associated with the issuer (e.g., a page similar to that of FIG. 7I).

FIGS. 8A-8C are a flow diagram illustrating method 800 for inputting information about a secure credential using an electronic device in accordance with some embodiments. Method 800 is performed at a device (e.g., 100, 300, 500) with a display. Some operations in method 800 are, optionally, combined, the orders of some operations are, optionally, changed, and some operations are, optionally, omitted.

As described below, method 800 provides an intuitive way for inputting information about a secure credential using an electronic device. The method reduces the cognitive burden on a user for inputting information about a secure credential using an electronic device, thereby creating a more efficient human-machine interface. For battery-operated computing devices, enabling a user to input information about a secure credential using an electronic device faster and more efficiently conserves power and increases the time between battery charges.

The electronic device (e.g., 700) displays (802), on the display (e.g., 702), an initiation user interface (e.g., 712) including an affordance (e.g., 714) for adding a secure credential (e.g., credit card, debit card, security token) to the electronic device (e.g., for inputting information about the secure credential). In some embodiments, the initiation user interface is an interface of the first party application (in some embodiments, the initiation user interface is an interface that corresponds to the first party application (e.g., it is an interface of a different first party application (e.g., both the initiation user interface and the first party application used to perform one or more steps of the first process are developed and/or released by the manufacturer of the electronic device, or developed and/or released by the developer of the operating system of the electronic device))).

The electronic device receives (804) a request (e.g., 716) to add the secure credential to the electronic device (e.g., to input information about the secure credential), wherein the request corresponds to the affordance for adding the secure credential (in some embodiments, receiving the request includes receiving an input (e.g., tap) at a location corresponding to the affordance) (in some embodiments, receiving the request includes receiving spoken user input to select the affordance).

The electronic device, in response to receiving (804) the request (e.g., 716) to add the secure credential to the electronic device, in accordance with a determination that the electronic device was operating in a first context when the request to add the secure credential was received (in some embodiments, the first context includes the electronic device being at a first location (e.g., a geographic location, a country, a predetermined location of a list of predetermined locations)), the electronic device initiates (806) a first process for inputting information about the secure credential to the electronic device (in some embodiments, initiating the first process for inputting information about the secure credential to the electronic device includes displaying a user interface (e.g., 718, 744) for identifying the issuer of the information (e.g., security token number, credit card number, debit card number, expiration date of credit or debit card) associated with the secure credential). Initiating the first process (e.g., a process that is alternative to the second process) upon determining that the electronic device was operating in the first context provides a user with a specific process for adding a secure credential to the electronic device, where the specific process is configured for the type of secure credential that is highly correlated with the first context. Initiating the first process when a set of conditions has been met without requiring a explicit request to perform that process enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, wherein the secure credential is associated with an issuer (e.g., an administrator, a regulator or monitor of activity associated with the secure credential) of the information associated with the secure credential, (e.g., the third party application is developed and/or released by the issuer of the information associated with the secure credential (e.g., an entity (e.g., a university) that issues an identification card with information associated with the secure credential; a bank that issues a bank card with information associated with the secure credential)) and wherein initiating the first process for inputting information about the secure credential to the electronic device includes the electronic device receiving (808) an input (e.g., 728, 748) corresponding to identification of the issuer of the information associated with the secure credential (e.g., receiving direct entry (e.g., via a keyboard) of the name of the issuer or receiving selection of the issuer from a list of potential issuers).

In some embodiments, initiating the first process for inputting information about the secure credential to the electronic device includes, in response to receiving the input corresponding to identification of the issuer of the information associated with the secure credential, the electronic device displays (810) a plurality of types of information (e.g., 724a-f, 752a-b) issued by the issuer of the information, the plurality of types of information including at least a first type of information (e.g., credit account information) (e.g., 724f, 752b) and a second type of information (e.g., debit account information) (e.g., 724, 752a), different from the first type of information. In some embodiments, the electronic device displays the first type of information in a user interface (e.g., 718, 751) for selecting the type of information.

In some embodiments, while displaying the plurality of types of information, the electronic device displays an alternative entry affordance (e.g., 726). In some embodiments, the electronic device receives an input corresponding to selection of the alternative entry affordance (e.g., an option for initiating the second process). In some embodiments, in response to receiving the selection of alternative entry affordance, the electronic device displays, on the display, a capture user interface (e.g., 742) for capturing information about the secure credential using one or more camera sensors of the electronic device (e.g., captures information presented on a card associated with the secure credential or from displayed content associated with the secure credential) (in some embodiments, the capture user interface is different from the initiation user interface (e.g., 712)) (in some embodiments, the capture user interface includes a live preview of images obtained by the one or more camera sensors) (in some embodiments, the capture user interface includes a manual entry affordance that, when selected, triggers display of one or more text entry fields and a virtual keyboard) (in some embodiments, displaying the plurality of types of information includes ceasing displaying the initiation user interface) (in some embodiments, the second process is executed as part of the first process when the first process proceeds to selection of information of a first type). In some embodiments, while displaying the capture user interface, the electronic device receives information about the secure credential using the one or more camera sensors of the electronic device. In some embodiments, the electronic device, subsequent to receiving information about the secure credential, inputs the information (e.g., the information received via the one or more camera sensors, information that is determined based on the information received via the one or more camera sensors) about the secure credential to the electronic device (in some embodiments, information about the secure credential is used to generate (or issue) a secure credential that is stored in a secure element of the electronic device) (in some embodiments, the secure credential stored in the secure element subsequently releases only when proper authorization is provided) (in some embodiments, the information received via the one or more camera sensors is extracted from images obtained by the one or more camera sensors using optical character recognition).

In some embodiments, while displaying the plurality of types of information, the electronic device receives an input corresponding to selection of the first type of information (e.g., credit account information). In some embodiments, in response to receiving the selection of the first type of information, the electronic device displays, on the display, a capture user interface (e.g., 742) for capturing information about the secure credential using one or more camera sensors of the electronic device (e.g., captures information presented on a card associated with the secure credential or from displayed content associated with the secure credential) (in some embodiments, the capture user interface is different from the initiation user interface (e.g., 712) (in some embodiments, the capture user interface includes a live preview of images obtained by the one or more camera sensors) (in some embodiments, the capture user interface includes a manual entry affordance that, when selected, triggers display of one or more text entry fields and a virtual keyboard) (in some embodiments, displaying the plurality of types of information includes ceasing displaying the initiation user interface) (in some embodiments, the second process is executed as part of the first process when the first process proceeds to selection of information of a first type).

In some embodiments, while displaying the capture user interface, the electronic device receives information about the secure credential using the one or more camera sensors of the electronic device. In some embodiments, subsequent to receiving information about the secure credential, the electronic device inputs the information (e.g., the information received via the one or more camera sensors, information that is determined based on the information received via the one or more camera sensors) about the secure credential to the electronic device (in some embodiments, information about the secure credential is used to generate (or issue) a secure credential that is stored in a secure element of the electronic device) (in some embodiments, the secure credential stored in the secure element subsequently releases only when proper authorization is provided).

The electronic device, further in response to receiving (804) the request (e.g., 716) to add the secure credential to the electronic device, in accordance with a determination that the device was operating in a second context (in some embodiments, the second context includes the electronic device being at a second location different from the first location (e.g., a location that does not match a list of predetermined locations)), different from the first context, when the request to add the secure credential to the device was received, the electronic device initiates (812) a second process for inputting information about the secure credential to the electronic device, the second process being different from the first process (in some embodiments, initiating the second process for inputting information about the secure credential to the electronic device includes displaying a user interface (e.g., 742) for capturing information (e.g., security token number, credit card number, debit card number, expiration date of credit or debit card) associated with the secure credential via one or more camera sensors). In some embodiments, the first context includes the electronic device being at a first location (e.g., a geographic location, a country; a predetermined location of a list of predetermined locations) (in some embodiments, the electronic device is in the first context (e.g., the device is in a first mode) in accordance with (e.g., based on) a determination (e.g., based on GPS data) that the electronic device is at a first location that corresponds to the first process (e.g., is highly correlated with information associated with the secure credential(s) that correspond to a first process for inputting the information)). In some embodiments, the second context includes the electronic device being at a second location different from the first location (e.g., a location that does not match a list of predetermined locations) (in some embodiments, the electronic device is in the second context (e.g., the device is in a second mode) in accordance with (e.g., based on) a determination (e.g., based on GPS data) that the electronic device is at a second location that does not correspond to the first process (e.g., the second process is default process) or that corresponds (e.g., specifically corresponds) to the second process (e.g., is highly correlated with information associated with the secure credential(s) that correspond to the second process for inputting the information)). Initiating the second process (e.g., a default process) upon determining that the electronic device was operating in the second context provides a user with a specific process for adding a secure credential to the electronic device, where the specific process is configured for the type of secure credential that is highly correlated with the second context. Initiating the second process when a set of conditions has been met without requiring a explicit request to perform that process enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, initiating the second process includes the electronic device displaying (814), on the display, a capture user interface (e.g., 742) for capturing information about the secure credential using one or more camera sensors of the electronic device (e.g., captures information presented on a card associated with the secure credential or from displayed content associated with the secure credential) (in some embodiments, the capture user interface being different from the initiation user interface (e.g., 712)) (in some embodiments, the capture user interface includes a live preview of images obtained by the one or more camera sensors) (in some embodiments, the capture user interface includes a manual entry affordance that, when selected, triggers display of one or more text entry fields and a virtual keyboard) (in some embodiments, initiating the second process includes ceasing displaying the initiation user interface including the affordance for adding the secure credential to the electronic device).

In some embodiments, initiating the second process further includes the electronic device receiving (816) information about the secure credential using the one or more camera sensors of the electronic device.

In some embodiments, initiating the second process further includes, subsequent to receiving information about the secure credential, the electronic device inputs (818) the information (e.g., the information received via the one or more camera sensors, information that is determined based on the information received via the one or more camera sensors) about the secure credential to the electronic device (in some embodiments, information about the secure credential is used to generate (or issue) a secure credential that is stored in a secure element of the electronic device) (in some embodiments, the secure credential stored in the secure element subsequently releases only when proper authorization is provided).

In some embodiments, the second process includes performing one or more operations using a first party application (e.g., corresponding to 742) of the electronic device (e.g., an application developed and/or released by the manufacturer of the electronic device, or developed and/or released by the developer of the operating system of the electronic device). In some embodiments, the first process includes performing one or more operations using a third party application of the electronic device (e.g., an application that is not developed and/or released by the manufacturer of the electronic device, or not developed and/or released by the developer of the operating system of the electronic device; an application that is developed and/or released by an entity other than the manufacturer of the device and/or operating system) that is different from the first party application, the third party application corresponding to an issuer (e.g., an administrator, a regulator or monitor of activity associated with the secure credential) of the information associated with the secure credential (e.g., the third party application is developed and/or released by the issuer of the information associated with the secure credential (e.g., an entity (e.g., a university) that issues an identification card with information associated with the secure credential; a bank that issues a bank card with information associated with the secure credential)). Performing the second process using a first party application improves the security of the device by ensuring that information about the secure credential is transmitted and/or stored securely.

In some embodiments, wherein the secure credential is associated with an issuer (e.g., an administrator, a regulator or monitor of activity associated with the secure credential) of the information associated with the secure credential (e.g., the third party application is developed and/or released by the issuer of the information associated with the secure credential (e.g., an entity (e.g., a university) that issues an identification card with information associated with the secure credential; a bank that issues a bank card with information associated with the secure credential)) and wherein initiating the first process for inputting information about the secure credential to the electronic device includes: in accordance with a determination that a total number of candidate (e.g., possible, potential) issuers of the information associated with the secure credential is less than a predetermined threshold (e.g., 5, 10, 20), the electronic device displays a list (e.g., as a plurality of affordances (e.g., 746a-c)) of the candidate issuers. In some embodiments, in accordance with a determination that the total number of candidate issuers of the information associated with the secure credential is not less than a predetermined threshold, the electronic device concurrently displays one or more text entry fields (e.g., 722) and a virtual keyboard (e.g., 720) with a plurality of character keys for inputting characters into the one or more text entry fields (in some embodiments, the text entry field(s) and virtual keyboard are displayed without displaying the list of candidate issuers). Displaying a list of candidate issuers upon determining that the number of potential issuers of the payment card is less than the predefined number provides a user with an efficient method for selecting the issuer associated with the secure credential. Displaying the list of candidate issuers when a set of conditions has been met without requiring an explicit request for displaying that list enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. For example, when the number of candidate issuers is small, it can be more efficient for a user to select a candidate issuer from a list instead of searching for an issuer using a virtual keyboard. Displaying a user interface for searching for an issuer upon determining that the number of potential issuers of the payment card is not less than the predefined number provides a user with an efficient method for selecting the issuer associated with the secure credential. Displaying the user interface for searching for an issuer when a set of conditions has been met without requiring an explicit request for displaying that user interface enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. For example, when the number of candidate issuers is large, it can be more efficient for a user to search for an issuer using a virtual keyboard instead of scrolling through a list to find the desired issuer.

In some embodiments, while displaying the plurality of types of information, the electronic device receives (820) an input (e.g., 728, 750) corresponding to selection of the second type of information (e.g., debit account information) (e.g., 724e).

In some embodiments, in response to receiving the selection of the second type of information, the electronic device initiates (822) a process for inputting information about the secure credential to the electronic device that includes performing one or more operations using an application corresponding to the issuer (e.g., an administrator, a regulator or monitor of activity associated with the secure credential) of the information of the second type (e.g., the third party application is developed and/or released by the issuer of the information associated with the secure credential (e.g., an entity (e.g., a university) that issues an identification card with information associated with the secure credential; a bank that issues a bank card with information associated with the secure credential)). In some embodiments, the process for inputting information about the secure credential includes performing one or more operations using an application provided by the issuer of the information associated with the secure credential when the information associated with the secure credential is information of a second (e.g., certain (e.g., debit)) type. In such embodiments, the information about the secure credential is provided directly to the electronic device by the application provided by the issuer.

In some embodiments, wherein initiating the process for inputting information about the secure credential to the electronic device that includes performing one or more operations using the application corresponding to the issuer of the information of the second type includes, in accordance with a determination that application corresponding to the issuer of the information of the second type is installed (e.g., already installed) on the electronic device, the electronic device initiates the application corresponding to the issuer of the information of the second type or displays an affordance (e.g., 754) that, when selected, initiates the application corresponding to the issuer of the information of the second type (in some embodiments, initiating the application includes launching the application). In some embodiments, in accordance with a determination that application corresponding to the issuer of the information of the second type is not installed (e.g., not currently installed) on the electronic device, the electronic device initiates a process of downloading the application corresponding to the issuer of the information of the second type or displaying an affordance (e.g., 732) (e.g., of a user interface (e.g., 730)) that, when selected, initiates a process to download the application corresponding to the issuer of the information of the second type (e.g., an affordance (e.g., 732) that, when selected, displays a user interface (e.g., 738) for downloading the application (e.g., a user interface of a application store or application library with an affordance (e.g., 740) for initiating a download of the application)) (in some embodiments, initiating the application is different from initiating a process to download the application). Displaying an affordance for initiating the application corresponding to the issuer of the information of the second type prompts the user to continue with the process for adding the secure credential to the electronic device. Prompting the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Similarly, displaying an affordance for initiating a download of the application corresponding to the issuer of the information of the second type prompts the user to continue with the process for adding the secure credential to the electronic device. Prompting the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while the application corresponding to the issuer of the information of the second type is active, the electronic device inputs (824) the information about the secure credential to the electronic device. In some embodiments, information about the secure credential is used to generate (or issue) a secure credential that is stored in a secure element of the electronic device. In some embodiments, the secure credential stored in the secure element subsequently releases only when proper authorization is provided.

In some embodiments, subsequent to inputting information about the secure credential to the electronic device, the electronic device completes (826) a transaction using the information about the secure credential by transmitting (e.g., transmitting in an encoded and secure form) the information about the secure credential to an external electronic device (e.g., a terminal, a server).

Note that details of the processes described above with respect to method 800 (e.g., FIGS. 8A-8C) are also applicable in an analogous manner to the methods described below. For example, method 800 optionally includes one or more of the characteristics of the various methods described below with reference to method 1000. For example, information about a secure credential (e.g., first credential as described in method 1000) can be input on an electronic device using the provisioning processes of method 800. For another example, method 800 optionally includes one or more of the characteristics of the various methods described below with reference to method 1200. For example, information about a secure credential (e.g., credential as described in method 1200) can be input on an electronic device using the provisioning processes of method 800. For brevity, these details are not repeated below.

FIGS. 9A-9J illustrate exemplary user interfaces for managing the use of a credential provisioned on an electronic device that operates on stored power, in accordance with some embodiments. The user interfaces in these figures are used to illustrate the processes described below, including the processes in FIGS. 10A-10C.

Figure 9A:
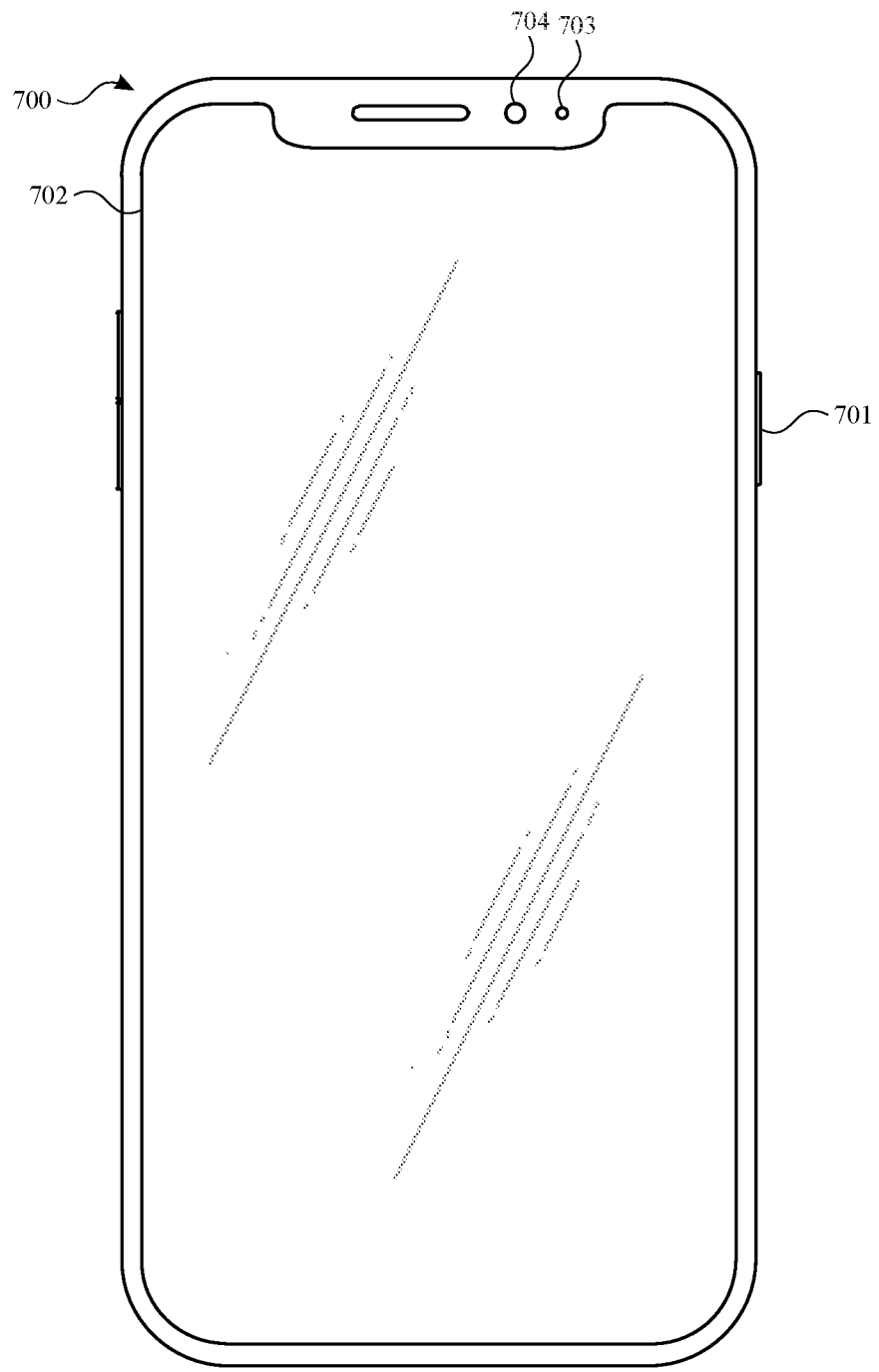
FIGS. 9A-9J illustrate exemplary user interfaces for managing the use of a credential provisioned on an electronic device that operates on stored power, in accordance with some embodiments.

FIG. 9A illustrates an electronic device 700 (e.g., a smartphone, a mobile device) similar to electronic device 700 described above with reference to FIGS. 7A-7O and electronic devices 700 and 700B described below with reference to FIGS. 11A-11V. In some embodiments, electronic device 700 includes a display 702, one or more input devices (e.g., a touch-sensitive surface of display 702, a mechanical input device 701, such as a power button, a camera 703, a mic), one or more output devices (e.g., a speaker), and one or more sensors (e.g., a biometric sensor 704, such as a depth sensor, a fingerprint sensor). In some embodiments, one or more sensors (e.g., a biometric sensor, such as a fingerprint sensor) of electronic device 700 is integrated with/into a different component of the device (e.g., a fingerprint sensor is integrated with display 702).

In some embodiments, electronic device 700 operates on stored (electrical) power, such as power stored in one or more (rechargeable) batteries, one or more capacitors, and/or other types of power storage devices. In some embodiments, electronic device 700 is in a low-power state (e.g., a low-battery state) when the device has less than (or equal to or less than) a threshold amount of stored power remaining as stored power (e.g., less than 1% of maximum power capacity, less than 3% of maximum power capacity, less than 5% of maximum power capacity) and is in a regular-power state (e.g., a non-low-battery state) when the device has more than (or equal to or more than) the threshold amount of stored power remaining as stored power.

Figure 9B:
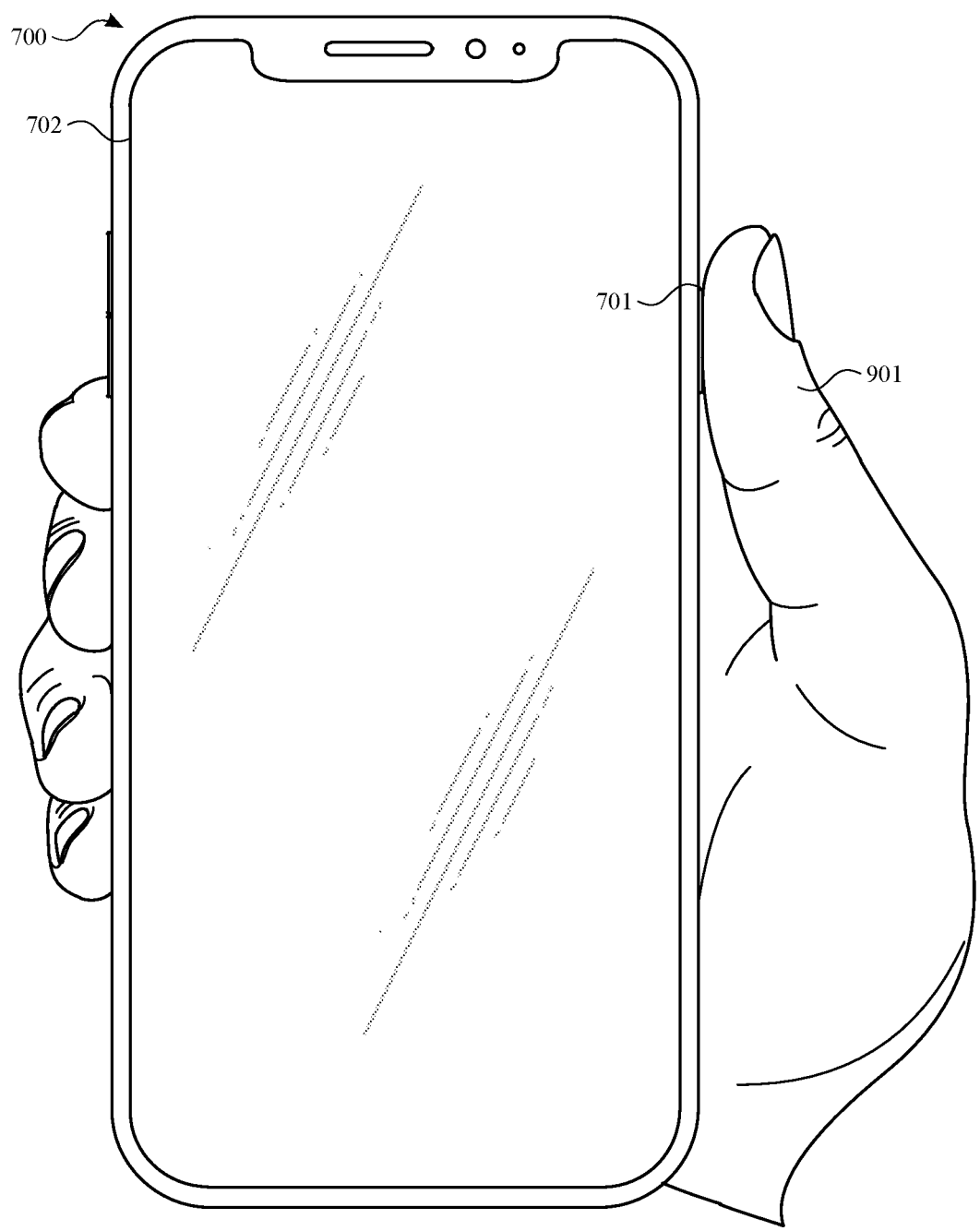

In FIG. 9A, display 702 of electronic device 700 is in an off state (but the device itself is in an on state). In FIG. 9B, while display 702 is in the off state, electronic device 700 receives an activation 901 (e.g., a single click/press input, a double click/press input) of mechanical input device 701. Alternatively, in other embodiments, electronic device 700 receives an activation (e.g., a single touch input, a double touch input) on display 702 (instead of activation 901 of mechanical input device 701).

Figure 9C:
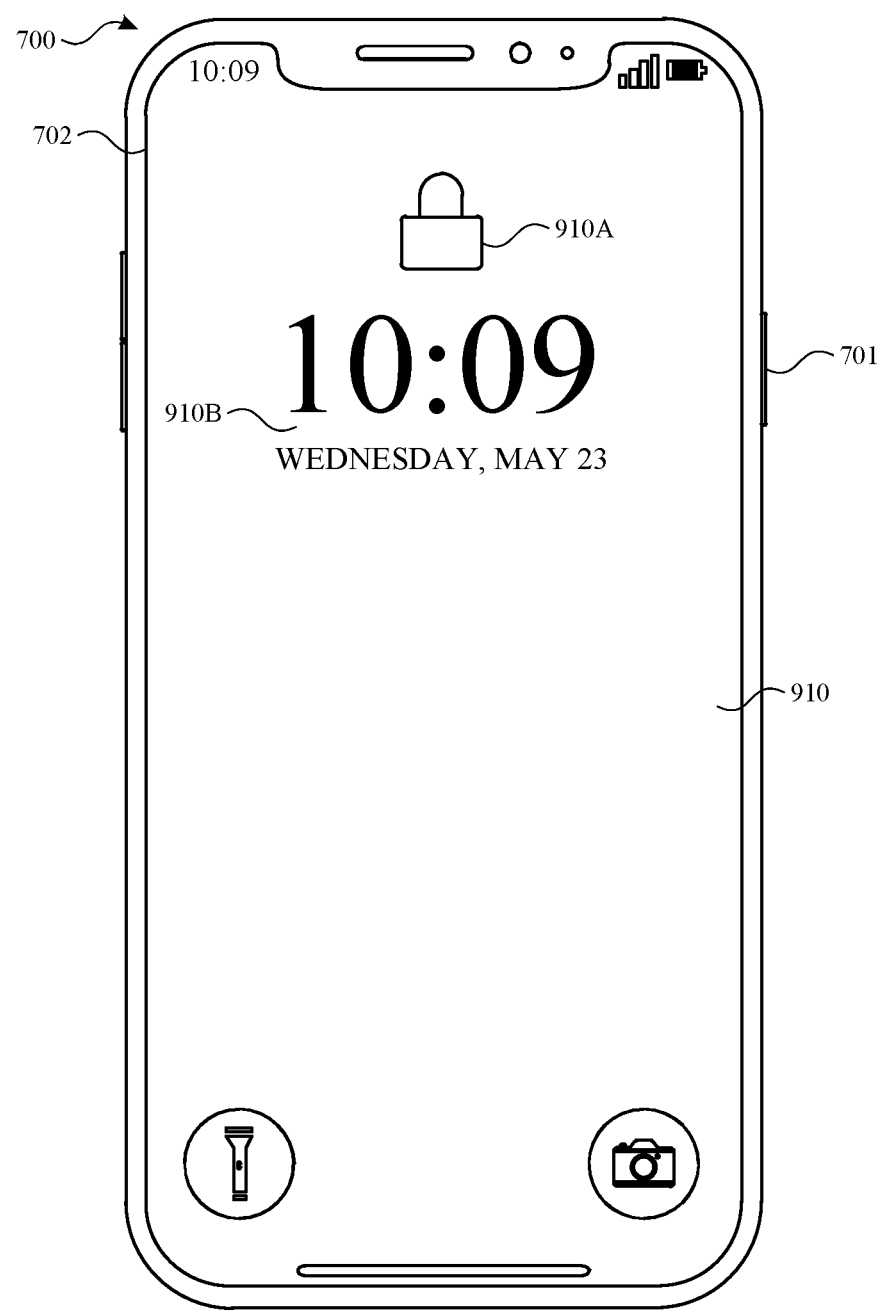

In some embodiments, electronic device 700 is in the regular-power state (e.g., a non-low-battery state) when the device receives activation 901 of mechanical input button 701. As shown in FIG. 9C, in response to detecting activation 901 while electronic device 700 is in the regular-power state, in accordance with a determination that activation 901 is a first type of activation input (e.g., a single-press click/input), electronic device 700 displays, on display 702, a lock screen user interface 910. In some embodiments, lock screen user interface 910 includes an indication 910A that electronic device 700 is currently in a user interface-locked state and an indication 910B of the current time and/or date.

Figure 9D:
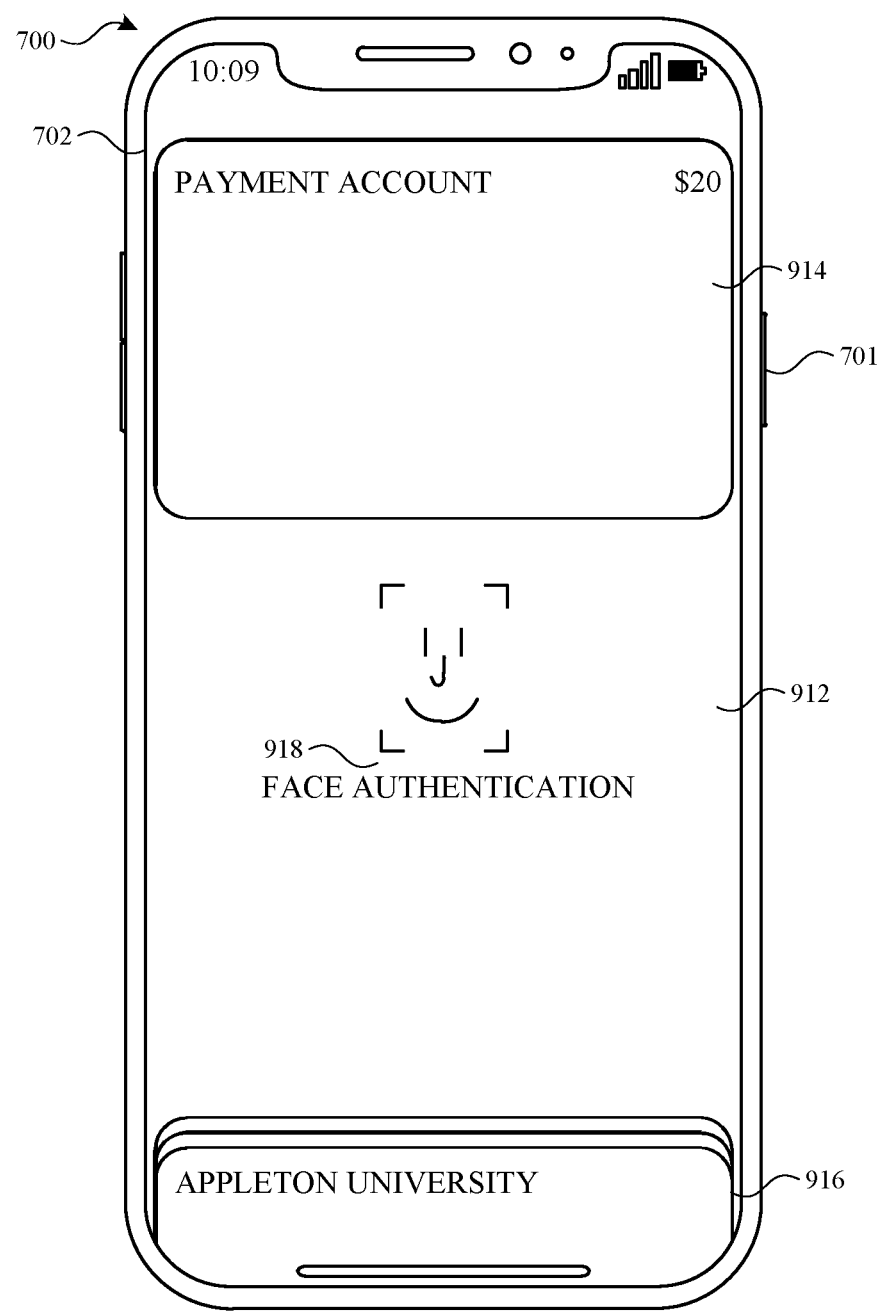

In some embodiments, electronic device 700 is in the regular-power state (e.g., a non-low-battery state) when the device receives activation 901 of mechanical input button 701. In some embodiments, in response to detecting activation 901 while electronic device 700 is in the regular-power state, in accordance with a determination that activation 901 is a second type of activation input (e.g., a double-press click/input) that is different from the first type of activation input (e.g., a single-press click/input), electronic device 700 displays, on display 702, a transfer application user interface 912 of a transfer application (e.g., a first-party electronic wallet application controlled by the operating system of the device), as shown in FIG. 9D. Transfer application user interface 912 includes a representation 914 of a transfer account (e.g., a payment account, a points account, a transit account, a stored-value account, a credit card account) corresponding to the transfer account currently selected for use in a transfer operation (e.g., a transaction, such as a payment transaction) and a stack 916 of one or more partially visible) representations of transfer accounts corresponding to other transfer accounts that are not currently selected for use in a transfer operation. Transfer application user interface 912 also includes an indication 918 requesting authentication (e.g., biometric authentication, such as facial recognition authentication, fingerprint authentication, or iris/retina scan authentication; passcode or password authentication) to provide authorization for proceeding with a transfer operation.

Figure 9E:
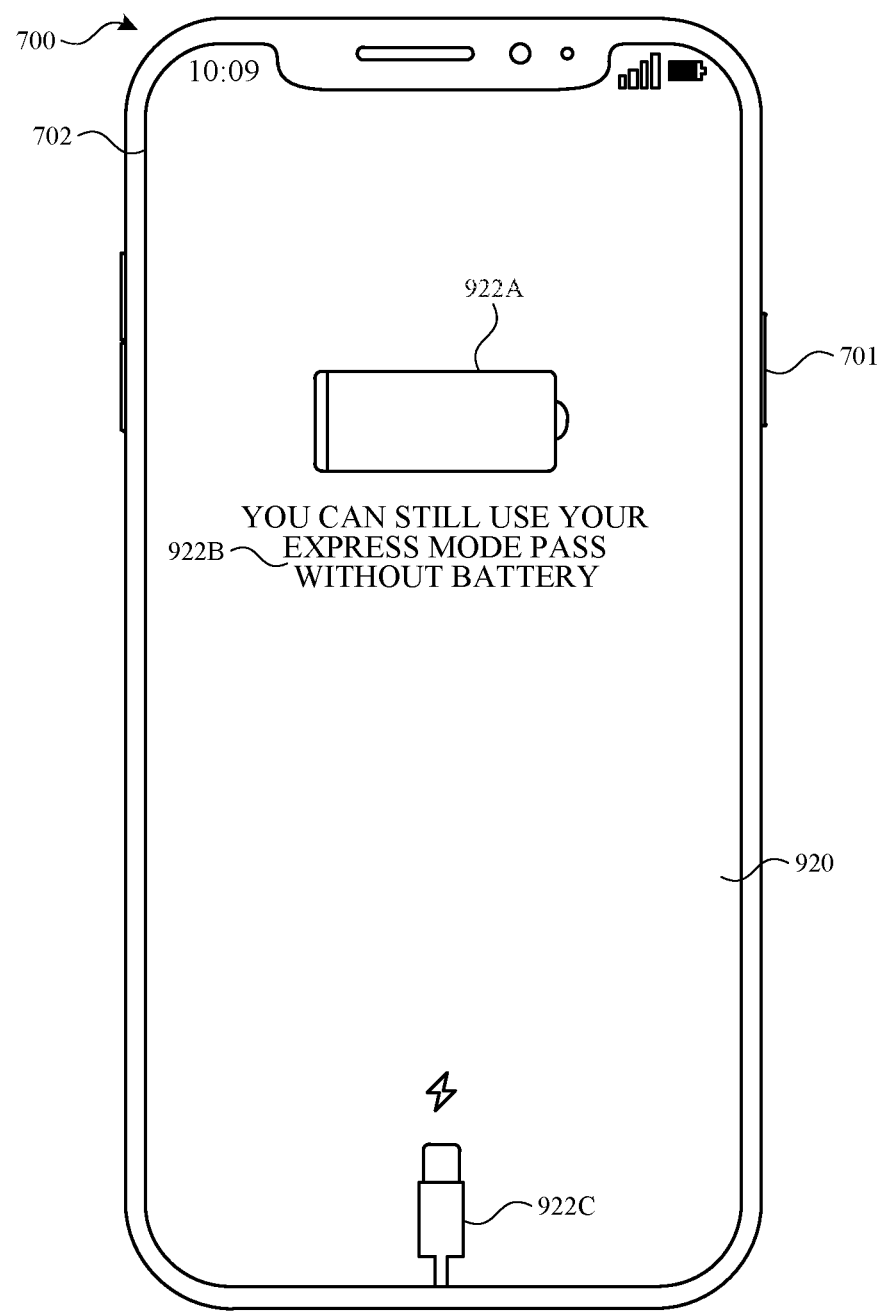

In some embodiments, electronic device 700 is in the low-power state (e.g., a low-battery state) when the device receives activation 901 of mechanical input button 701. In some embodiments, in response to detecting activation 901 while electronic device 700 is in the low-power state, electronic device 700 displays, on display 702, a low-power user interface 920, as shown in FIG. 9E. In some embodiments, low-power user interface 920 is only displayed by electronic device 700 when the device is in the low-power state (because it has less than the threshold amount of power remaining as stored power). Low-power user interface 920 includes an indication 922A that electronic device 700 is currently in the low-power state (e.g., visually indicative of the low-power state, such as a battery graphic/animation with low battery). Low-power user interface 920 also includes an indication 922B (e.g., stating "You Can Still Use Your Express Mode Pass Without Battery") that electronic device 700 can still perform one or more operations while in the low-power state. Lower-power user interface 920 further includes an indication 922C that electronic device 700 needs to be charged (to return to the regular-power state, in which the device can perform operations that can only be performed in the regular-power state and not in the low-battery state, such as an authentication operation).

Figure 9F:
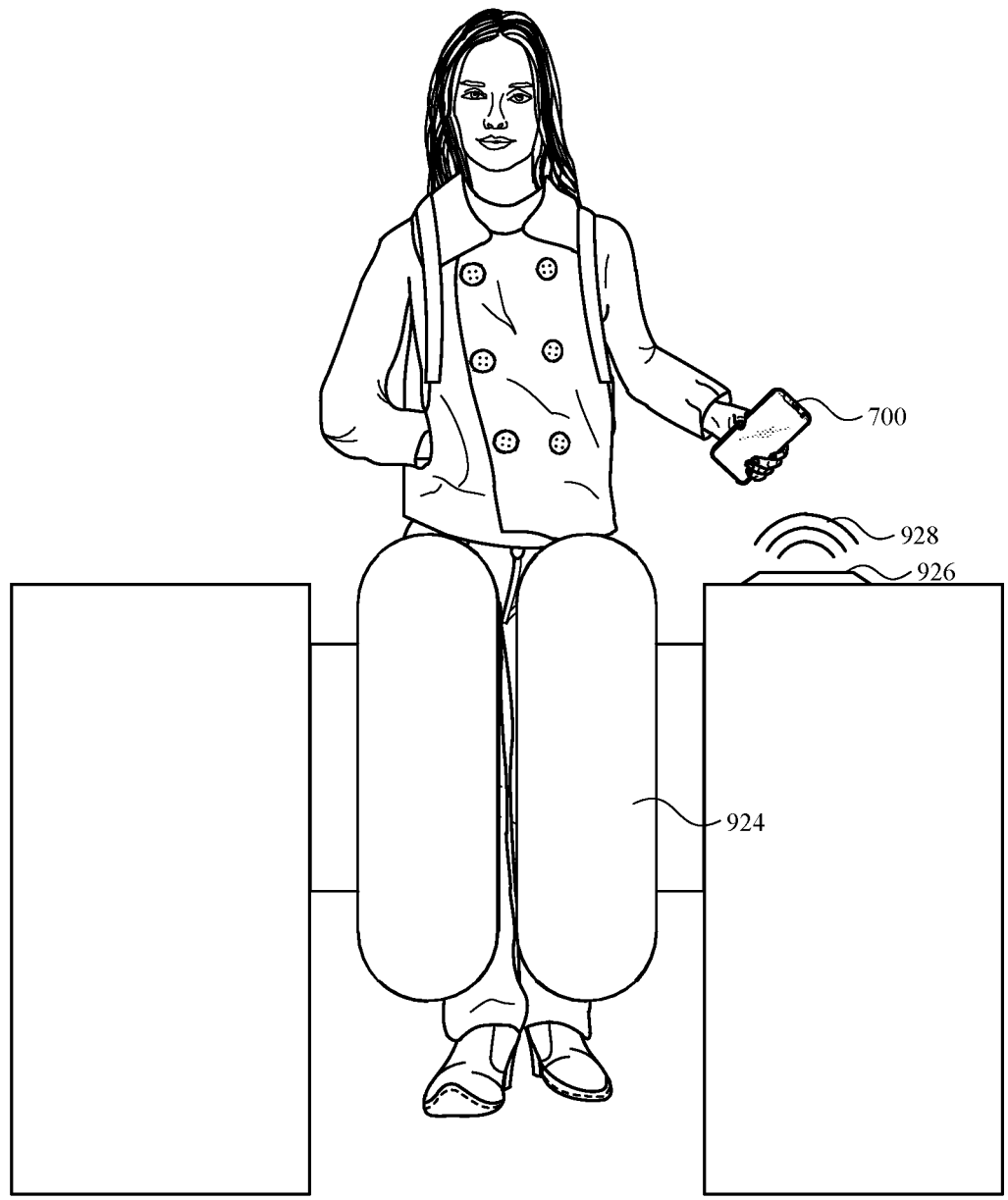

FIG. 9F illustrates electronic device 700 being held by a user of the device while the user is entering a transit gateway 924 of a transit station (e.g., a subway station, a train station, a bus station, an airport) and while the device is in the low-power state. In some embodiments, one or more transfer accounts (e.g., a payment account, a stored-value account, a transit account, a secure access card) provisioned on electronic device 700 is in an "express mode." In some embodiments, an account set to express mode can be used via electronic device 700 to perform a transfer operation with a second electronic device (e.g., a payment transaction terminal, such as transaction terminal 926 of transit gateway 924) without receiving authentication (e.g., biometric authentication, such as facial recognition authentication, fingerprint authentication, or iris/retina scan authentication; passcode or password authentication) from the user to authorize the transfer operation. In some embodiments, an account that is not set to express mode or an account that is not available for use in express mode requires authentication (e.g., biometric authentication, such as facial recognition authentication, fingerprint authentication, or iris/retina scan authentication; passcode or password authentication) from the user to authorize the transfer operation. In some embodiments, a first type of transfer account (e.g., a stored-value account, a secure access card, a stored-value account) can be used/set to express mode. In some embodiments, a second type of transfer account (e.g., a credit card account) cannot be used/set to express mode.

As shown in FIG. 9F, transaction terminal 926 of transit gateway 924 of the transit station is generating a field 928 (e.g., a near-field communication (NFC)-based field). In FIG. 9F, electronic device 700 is not held within range of field 928 of transaction terminal 926 by the user. Thus, electronic device 700 is not detecting (e.g., via a wireless communication radio of the device) the presence of field 928.

Figure 9G:
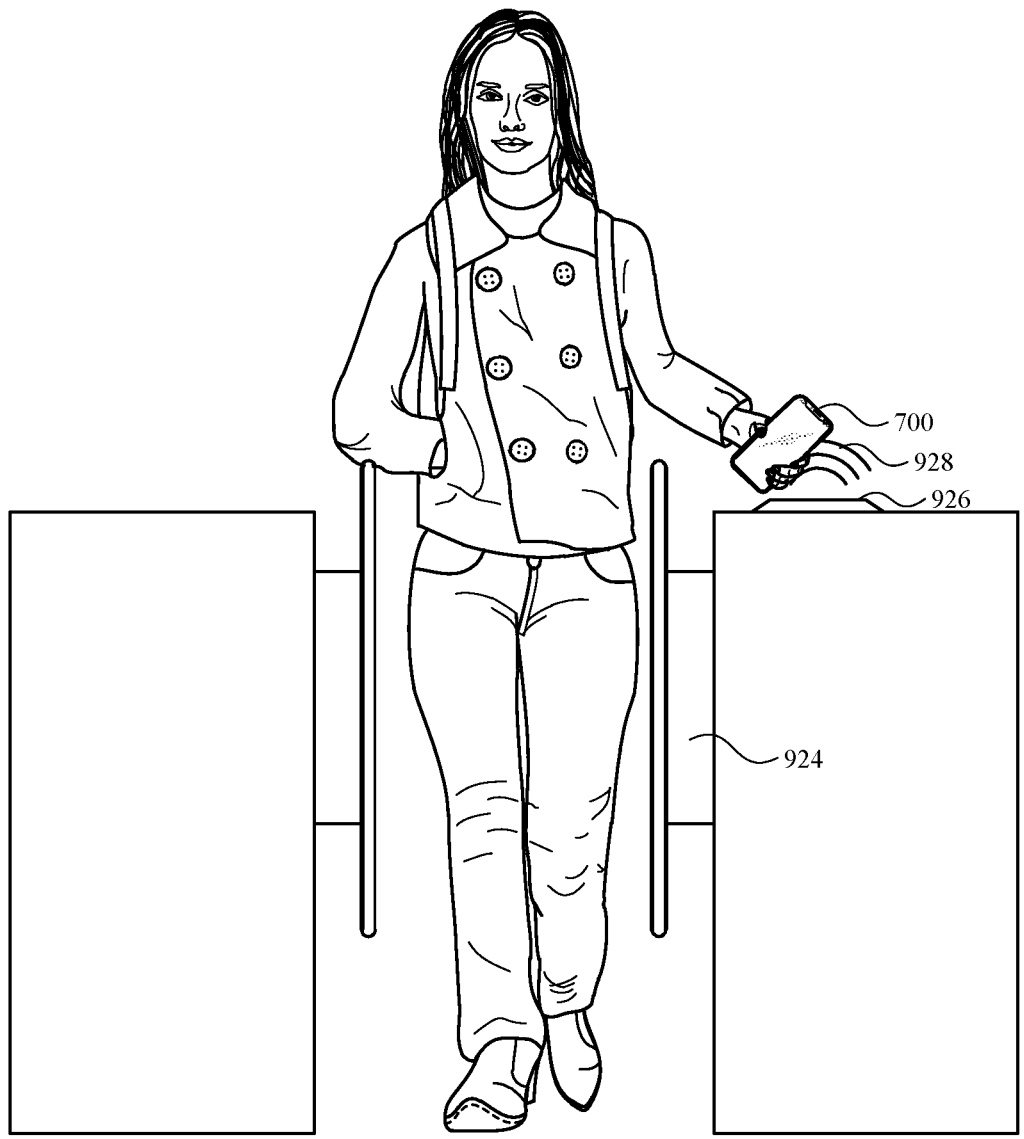

In FIG. 9G, while a transfer account (e.g., a transit account) available in (and set to) express mode is provisioned on electronic device 700 and while the device is in the low-power state, the device detects (e.g., via a wireless communication radio of the device) the presence of field 928 generated by transaction terminal 926 of transit gateway 924. In response to detecting field 928 (and in accordance with a determination that a transfer account set to express mode is available for use via the device), electronic device 700 transmits a credential (e.g., of a provisioned transit card, of a provisioned transit pass) associated with the transfer account to transaction terminal 926 of transit gateway 924 for use in a transaction (e.g., a payment or a pass to enter the transit station). In some embodiments, in accordance with a determination that a plurality of transfer accounts (that are set to express mode) are available for use, electronic device 700 automatically selects (e.g., based on an identifier or a tag detected based on field 928) a compatible transfer account for use in the transaction with transaction terminal 926.

In some embodiments, if the transfer operation between electronic device 700 and transaction terminal 926 involves a payment transaction (e.g., the transit fee), the transfer account associated with the transmitted credential is a stored-value account (e.g., a payment account) associated with funds (and the funds from the transfer account in the amount of the transit fee is used for the transfer operation). In some embodiments, if the transfer operation between electronic device 700 and transaction terminal 926 involves a transit pass (and not a transit fee), the transfer account associated with the transmitted credential is a transit pass account with a valid transit pass (e.g., a daily transit pass, a monthly transit pass).

In some embodiments, electronic device 700 displays, on display 702, low-power user interface 920 when field 928 is detected and the credential is transmitted to transaction terminal 926. In some embodiments, electronic device 700 forgoes detecting field 928 generated by transaction terminal 926 if display 702 is in the off state (and thus the device does not transmit the credential associated with the transfer account to transaction terminal 926).

As shown in FIG. 9G, transmitting the credential (e.g., of a provisioned transit card, of a provisioned transit pass) to transaction terminal 926 of transit gateway 924 causes the gateway to open, thus enabling the user of electronic device 700 to enter the transit station.

Figure 9H:
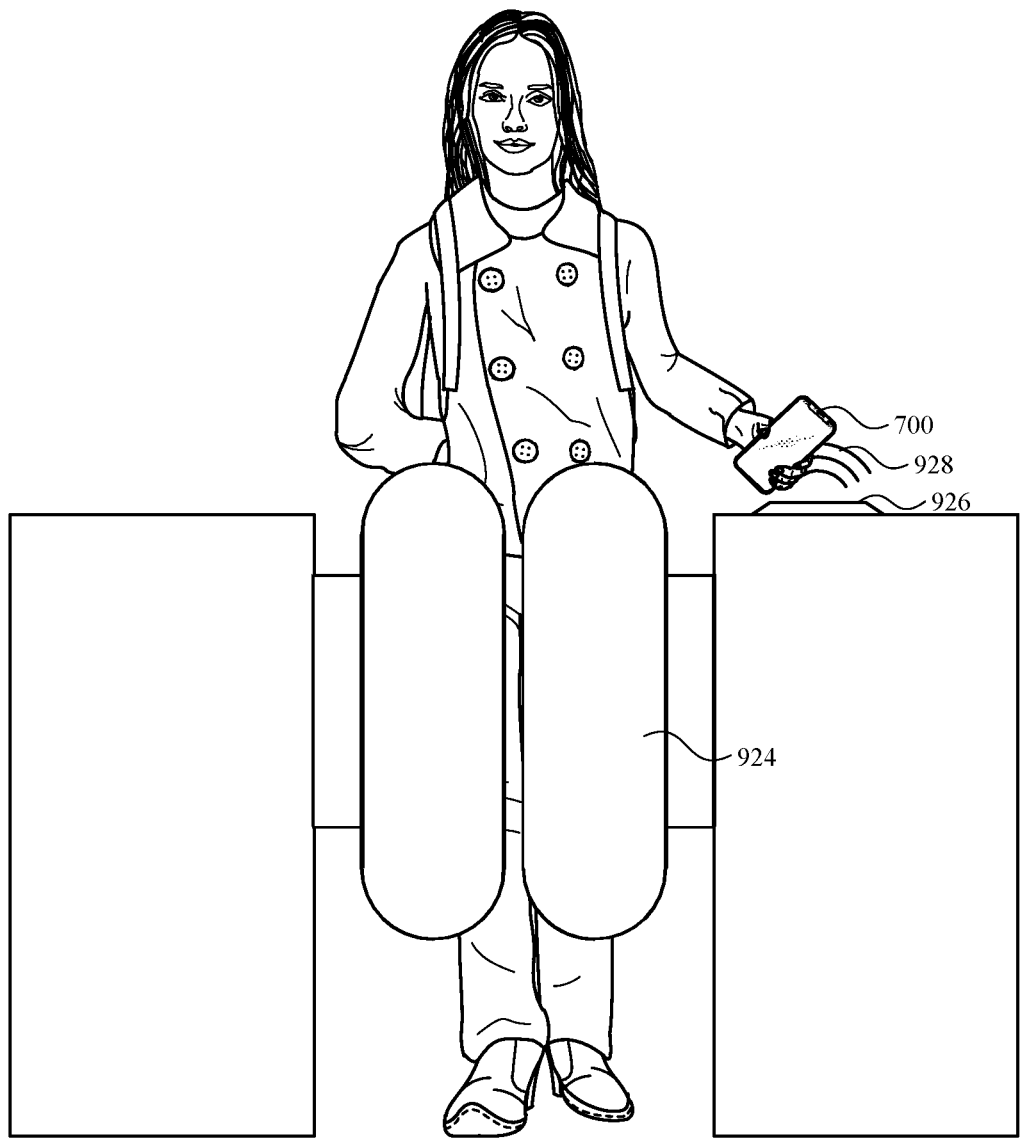

In FIG. 9H, while a transfer account that is available to be used in express is provisioned on electronic device 700 but is not set to express mode on (or while none of the transfer accounts that are provisioned on the device can be used in express mode), the device detects (e.g., via the wireless communication radio of the device) the presence of field 928 generated by transaction terminal 926 of transit gateway 924. In response to detecting field 928, electronic device 700 forgoes transmitting a credential associated with a transfer account provisioned on the device to transaction terminal 926 (because an express mode transfer account is not available on the device). As such, as shown in FIG. 9H, electronic device 700 does not cause transit gateway 924 to open, thus not enabling the user of the device to enter the transit station.

In some embodiments, if electronic device 700 is in the regular-power state, the device transmits a credential associated with a compatible transfer account to transaction terminal 926 of transit gateway 924 without receiving authentication if the compatible transfer account is set to express mode and transmits the credential associated with the compatible transfer account to transaction terminal 926 of transit gateway 924 after receiving successful authentication (e.g., biometric authentication, such as facial recognition authentication, fingerprint authentication, or iris/retina scan authentication; passcode or password authentication) if the compatible transfer account is not set to express mode (or is not available to be set to express mode).

Figure 9I:
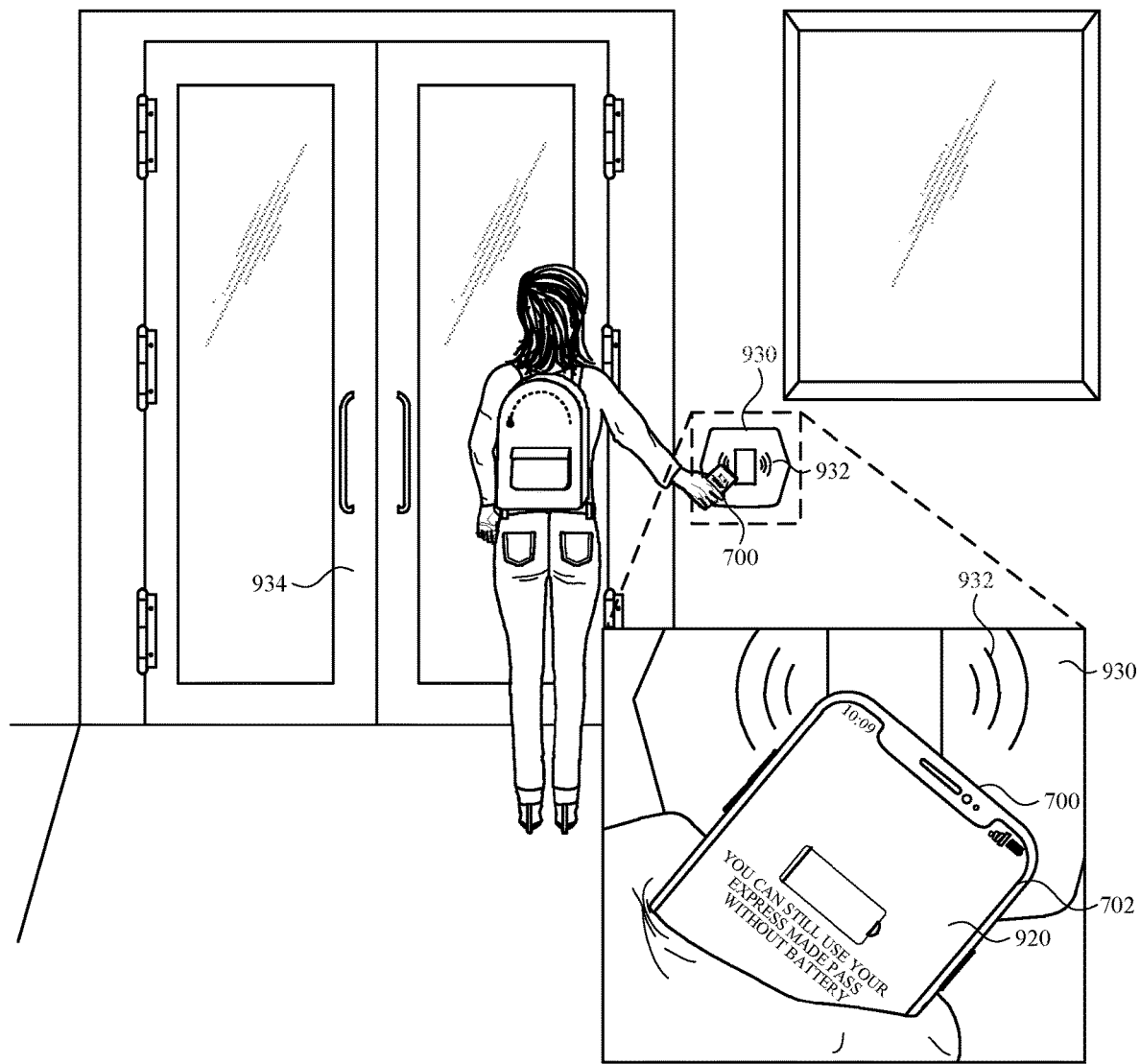
Figure 9J:

FIG. 9I illustrates electronic device 700 being held by the user of the device near a secure access terminal 930 associated with a secure location (e.g., a secure entrance to a secure location, such as a locked door to a secure room or building) while in the low-power state. In some embodiments, electronic device 700 is displaying, on display 702, a low-power user interface 920. In some embodiments, display 702 is in an off state (and thus not display low-power user interface 920).

In FIG. 9I, electronic device 700 detects (e.g., via a wireless communication radio of the device) the presence of a field 932 generated by secure access terminal 930. In some embodiments, secure access terminal 930 is configured to control access to a secure location (e.g., a room, a building) by locking/unlocking a secure door 934. In response to (or subsequent to, after) detecting the presence of field 932 generated by secure access terminal 930, electronic device 700 transmits (e.g., via a wireless communication radio of the device) a credential of a transfer account (e.g., a secure access account) to secure access terminal 930, where the transfer account is a secure access account that is pre-configured to be compatible with secure access terminal 930. As shown in FIG. 9I, transmitting the credential of the transfer account to secure access terminal 930 causes secure door 934 to open, thus enabling the user to enter the secure location. In some embodiments, as described in greater detail below with reference to FIGS. 11M-11N, electronic device 700 can also transmit the credential of the transfer account to secure access terminal 930 while in the regular-power state.

In some embodiments, if the transfer account is a secure access account that is not pre-configured to be compatible with secure access terminal 930, transmitting the credential of the transfer account to secure access terminal 930 does not cause secure door 934 to open, for a valid (compatible) secure access account was not presented to secure access terminal 930.

FIGS. 10A-10C are a flow diagram illustrating a method for managing the use of a credential provisioned on an electronic device that operates on stored power, in accordance with some embodiments. Method 1000 is performed at an electronic device (e.g., 100, 300, 500, 700, 700B) with a display (e.g., 702) and one or more input devices (e.g., a touch-sensitive surface of the display, a mechanical input device (e.g., 701), a mechanical home button, a mechanical power button). In some embodiments, the electronic device also includes one or more sensors (e.g., a camera, a biometric sensor, a depth sensor, a fingerprint sensor). Some operations in method 1000 are, optionally, combined, the orders of some operations are, optionally, changed, and some operations are, optionally, omitted.

As described below, method 1000 provides an intuitive way for managing the use of a credential provisioned on an electronic device that operates on stored power. The method reduces the cognitive burden on a user for managing the use of a credential provisioned on an electronic device that operates on stored power, thereby creating a more efficient human-machine interface. For battery-operated computing devices, enabling a user to manage the use of a credential provisioned on an electronic device that operates on stored power faster and more efficiently conserves power and increases the time between battery charges.

While the electronic device (e.g., 700) is operating on stored power (e.g., stored power such as battery power, power stored in a capacitor, or other type of stored power), the electronic device detects (1002) a request (e.g., 901) to wake the electronic device (e.g., a raise to wake gesture, a tap on a touch-sensitive surface of the display, a voice trigger, an activation of a mechanical input element such as a button press on a mechanical input device).

In response to detecting (1004) the request (e.g., 901) to wake the electronic device (e.g., 700), in accordance with a determination (1006) that the electronic device has more than a threshold amount of available power (e.g., stored power such as battery power, power stored in a capacitor, or other type of stored power), the electronic device displays (1008), on the display (e.g., 702), a wake screen user interface (e.g., 910, a lock screen or notification screen). Displaying, in accordance with the determination that the electronic device has more than a threshold amount of available power, the wake screen user interface in response to detecting the request to wake the device provides feedback about the current state of the device—that the device has and is operating on more than the threshold amount of available power. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with the determination (1006) that the electronic device (e.g., 700) has more than the threshold amount of available power (e.g., and subsequent to displaying the wake screen user interface), the electronic device displays (1010), on the display (e.g., 702), a representation of a first credential (e.g., 914, either of the first type or a second type) and a representation of a second credential (e.g., either of the first type or the second type). Displaying the representation of the first credential and the representation of the second credential enables the user to quickly and easily choose between the two different types of credentials. Providing additional control of the device enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the representation of the first credential (e.g., 914) and the representation of the second credential are displayed in a user interface of a payment application, such as an electronic wallet application. In some embodiments, the electronic device detects (1012), via the one or more input devices (e.g., a touch-sensitive surface of the display), selection of the representation of the first credential. In some embodiments, in response to detecting the selection of the representation of the first credential, the electronic device sets (1014) the first credential for use in a transaction.

In some embodiments, while the electronic device (e.g., 700) has (1016) more than the threshold amount of available power, while a first credential that is not of the second type (e.g., that is not associated with a credit card or a debit card) is provisioned on the electronic device and an express mode setting (e.g., represented by an express mode affordance, such as a toggle, that is either in an "on" mode or an "off" mode; if in the off mode (and thus non-express mode), the electronic device requires authentication, such as biometric authentication, for the credential of the first type to be available for use via the electronic device; if in the on mode (and thus express mode), the electronic device does not require authentication for the credential of the first type to be available for use via the electronic device) associated with the first credential is not activated (e.g., is in a non-express mode), the electronic device detects (1018) an input (e.g., a user input, such as a touch input, on the displayed express mode affordance) causing the express mode setting to be activated (e.g., is in an express mode).

In some embodiments, in response to detecting the input causing the express mode setting to be activated, the electronic device displays (1020), on the display (e.g., 702), an indication (e.g., an alert, a notification, a prompt) that the first credential may be available for use via the electronic device while the electronic device has less than the threshold amount of available power. Displaying the indication that the first credential may be available for use via the electronic device while the electronic device has less than the threshold amount of available power in response to detecting the input causing the express mode setting to be activated improves feedback by enabling the user to quickly and easily recognize that the first credential may be available for use even while the electronic device has less than the threshold amount of available power. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the indication indicates that the first credential will be available for use via the electronic device while the electronic device has less than the threshold amount of available power but more than no amount of available power (e.g., the electronic device has no amount of available power when the stored power is totally/entirely discharged). In some embodiments, the indication indicates that the first credential will not be available for use via the electronic device while the electronic device has no amount of available power. In some embodiments, the indication indicates that the first credential will be available for use via the electronic device while the electronic device has more than the threshold amount of available power.

In response to detecting (1004) the request (e.g., 901) to wake the electronic device (e.g., 700), in accordance with a determination (1022) that the electronic device has less than the threshold amount of available power (e.g., the device is in a low-battery state) and that a credential of a first type (e.g., an express transit card, an express stored-value account, an ID card; a card not requiring authentication) is provisioned on the electronic device, the electronic device concurrently displays (1024), on the display (e.g., 702), an indication (e.g., 922A, a low-battery graphic) that the electronic device has less than the threshold amount of available power and an indication (e.g., 922B) that the credential of the first type is available for use via the electronic device (e.g., for a transaction, for a payment). Displaying the indication that the electronic device has less than the threshold amount of available power in response to detecting the request to wake the electronic device improves feedback by enabling the user to quickly and easily recognize that the device has and is operating on less than the threshold amount of available power. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Displaying the indication that the credential of the first type is available for use via the electronic device while the device has less than the threshold amount of available power improves feedback and enhances the operability of the device by enabling the user to recognize that access to certain functions of the device is still available even while the device has less than the threshold amount of available power, thus making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device (e.g., 700) includes a wireless communication radio (e.g., for NFC connections). In some embodiments, subsequent to displaying the indication (e.g., 922B) that the credential of the first type is available for use via the electronic device (e.g., and while the electronic device has less than the threshold amount of available power), the electronic device transmits (1026), via the wireless communication radio (e.g., through a NFC connection), the credential of the first type to a second electronic device (e.g., 926, 930, a transaction terminal, a payment terminal, a secure access terminal) for use by the second electronic device in an operation (e.g., a payment transaction, a secure access authorization). (Automatically) transmitting the credential of the first type to the second electronic device without requiring user selection of the credential allows the user to quickly and easily proceed with the operation. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while the credential of the first type (e.g., an express transit card, an express stored-value account, an ID card; a card not requiring authentication) is provisioned (1028) on the electronic device (e.g., 700) (e.g., and while the device has less than the threshold amount of available power), the electronic device detects (1030) (e.g., via a wireless communication radio of the device, and while displaying the indication (e.g., 922B) that the credential of the first type is available for use via the electronic device) presence of a field (e.g., 928, 932, a NFC field) generated by a second electronic device (e.g., 926, 930, a transaction terminal, a transit terminal, a secure access terminal such as a wireless badge reader for reading wireless identification information and determining whether to provide access to a secure resource/location (e.g., unlocking a door, unlocking a computer terminal, or the like) based on the identification information). In some embodiments, the field generated by the second electronic device encodes a request for the credential.

In some embodiments, in response to detecting the presence of the field generated by the second electronic device, the electronic device transmits (1032) (e.g., via the wireless communication radio of the device) the credential of the first type to the second electronic device (e.g., without first requiring authentication from the user, such as biometric authentication or passcode/password authentication). (Automatically) transmitting the credential of the first type to the second electronic device without requiring user selection of the credential allows the user to quickly and easily proceed with the operation. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the electronic device forgoes generating feedback (e.g., visual feedback, haptic feedback, audio feedback) upon transmitting the credential of the first type to the second electronic device, while the device has less than the threshold amount of available power. In some embodiments, the electronic device generates feedback upon transmitting the credentials, while the device has more than the threshold amount of available power. Forgoing generating feedback while the device has less than the threshold amount of available power and generating the feedback while the device has more than the threshold amount of available power improves operability of the device by utilizing the available power of the device in a more efficient manner, thereby reducing power usage and improving battery life of the device.

In some embodiments, displaying the indication (e.g., 922B) that the credential of the first type is available for use via the electronic device (e.g., 700) comprises displaying the indication that the credential of the first type is available for use via the electronic device in accordance with a determination that an express mode setting (associated with the credential of the first type) of the electronic device is in an on state. In some embodiments, in accordance with a determination that the express mode setting is in an off state, the electronic device forgoes displaying the indication that the credential of the first type is available for use via the electronic device even upon determining that the device has less than the threshold amount of available power (e.g., the device is in a low-battery state). In some embodiments, the electronic device applies the same express mode setting to all credentials of the first type that are provisioned on the electronic device. In some embodiments, each credential of the first type provisioned on the electronic device is associated with its respective express mode setting. In some embodiments, the express mode setting can be adjusted (turned "on" or "off") by the user of the electronic device, either for all provisioned credentials of the first type globally or for each provisioned credential of the first type individually. Allowing the user to adjust the express mode setting provides the user with more control of the device and improves device security by enabling the user to allow certain credentials to be used in express mode (and thus not require authentication) and certain credentials to be used in non-express mode (and thus require authentication). Providing additional control of the device enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In response to detecting (1004) the request (e.g., 901) to wake the electronic device (e.g., 700), in accordance with a determination (1034) that the electronic device has less than the threshold amount of available power and that a credential of the first type is not available for use via the electronic device, the electronic device displays (1036), on the display (e.g., 702), the indication (e.g., 922A) that the electronic device has less than the threshold amount of available power without displaying the indication that the credential is available for use via the electronic device. Displaying the indication that the electronic device has less than the threshold amount of available power without displaying the indication that the credential is available for use via the electronic device improves feedback by enabling the user to quickly and easily recognize that the device has and is operating on less than the threshold amount of available power but that a credential is not available for use via the device while the device is operating on less than the threshold amount of available power. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the credential of the first type is available for use via the electronic device (e.g., 700) while the electronic device has less than the threshold amount of available power (e.g., the device is in a low-battery state), and a credential of a second type different from the first type is not available for use via the electronic device while the electronic device has less than the threshold amount of available power. In some embodiments, the credential of the second type requires authentication (e.g., biometric authentication, such as facial recognition authentication, fingerprint authentication, or iris/retina scan authentication; passcode or password authentication) to be used via the electronic device (e.g., for a transaction, such as a payment transaction). In some embodiments, the electronic device cannot perform authentication while the device has less than the threshold amount of available power. Thus, in some embodiments, because the credential of the second type requires authentication to be used via the electronic device, the credential of the second type cannot be used via the electronic device (e.g., for a transaction, such as a payment transaction) when the electronic device has less than the threshold amount of available power; the credential of the second type can only be used via the electronic device when the electronic device as much as or more than the threshold amount of available power.

In some embodiments, the credential of the first type does not require authentication (e.g., biometric authentication, such as facial recognition authentication, fingerprint authentication, or iris/retina scan authentication; passcode or password authentication) to be used via the electronic device (e.g., 700) (e.g., for a transaction or a payment), and a credential of a second type different from the first type requires authentication to be used via the electronic device.

In some embodiments, the electronic device (e.g., 700) enables an authentication operation (e.g., for authenticating a provisioned credential for use via the electronic device in a transaction, a payment, or a secure access request) while the electronic device has more than the threshold amount of available power, and the electronic device disables the authentication operation while the electronic device has less than the threshold amount of available power. Enabling the authentication operation while the electronic device has more than the threshold amount of available power and disabling the authentication operation while the electronic device has less than the threshold amount of available power enhances the operability of the device by enabling the device to use its resources in a more efficient manner, thereby reducing power usage and improves battery life of the device. In some embodiments, the authentication operation involves biometric authentication (e.g., facial recognition authentication, fingerprint authentication, iris/retina scan authentication). In some embodiments, the authentication operation involves passcode or password authentication.

In some embodiments, while the electronic device (e.g., 700) is operating on stored power and while the electronic device has less than the threshold amount of available power (e.g., and while the display of the device is off) (1038), the electronic device detects (1040) (e.g., via a wireless communication radio of the device) presence of a field (e.g., 928, 932, a NFC field) generated by a second electronic device (e.g., 926, 930, a transaction terminal, a payment terminal, a secure access terminal). In some embodiments, in response to detecting (1042) the presence of the field generated by the second electronic device (e.g., corresponding to a request to perform a transaction or a corresponding to a request for credentials), the electronic device, in accordance with a determination (e.g., based on information obtained from the second electronic device) that an authentication operation is not required (e.g., to proceed with a payment transaction or a secure access authorization), transmits (1044) (e.g., via the wireless communication radio of the device) the credential of the first type to the second electronic device (e.g., for use in the payment transaction or the secure access authorization). In some embodiments, in response to detecting (1042) the presence of the field generated by the second electronic device (e.g., corresponding to a request to perform a transaction or a corresponding to a request for credentials), the electronic device, in accordance with a determination that an authentication operation is required, forgoes transmitting (1046) the credential of the first type to the second electronic device.

In some embodiments, while the electronic device (e.g., 700) has less than the threshold amount of available power (e.g., the device is in a low-battery state), the electronic device forgoes displaying a user interface different from the user interface associated with the indication (e.g., 922A, a low-battery graphic) that the electronic device has less than the threshold amount of available power. Thus, in some embodiments, the electronic device can only display the user interface (e.g., 922) associated with the indication that the device has less than the threshold amount of available power while in the low-battery state. In some embodiments, the electronic device is disabled from displaying a user interface different from the user interface associated with the indication that the device has less than the threshold amount of available power while in the low-battery state. Only displaying the user interface associated with the indication that the device has less than the threshold amount of available power while the device has less than the threshold amount of available power improves feedback by enabling the user to quickly and easily recognize that the device is operating on and has less than the threshold amount of battery power. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the credential of the first type corresponds to a transit account available for use via the electronic device (e.g., 700) (e.g., for a transit payment) at a transit terminal (e.g., 928, a transaction terminal of a subway station, a train station, a bus, a taxi). In some embodiments, the transit account is set with a transaction limit or a usage limit (e.g., a maximum amount per day or per transaction, such as $100 per day or $20 per transaction). In some embodiments, the transit account is or includes a commuter plan (e.g., a monthly pass, a 10-day pass, a ride pass, or the like). In some embodiments, while the electronic device has less than the threshold amount of available power, the electronic device detects presence of a field (e.g., 928) generated by the transit terminal (e.g., 926) and, based on information obtained from the transit terminal, automatically selects the credential corresponding to the commuter plan if the transit terminal is configured to accept the commuter plan. Automatically selecting the credential corresponding to the commuter plan if the transit terminal is configured to accept the commuter plan enables the user to quickly and easily use the device to be authorized to pass the transit terminal with minimal interaction with the device. Automatically performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device includes a plurality of credentials of the first type corresponding to different types of transit accounts (e.g., a transit account for a subway station, a transit account for a bus). In some embodiments, while the electronic device has less than the threshold amount of available power, the electronic device detects presence of a field (e.g., 928) generated by the transit terminal (e.g., 926) and, based on information obtained from the transit terminal, automatically selects the credential corresponding to the relevant type of transit account (e.g., the transit account for the subway station or the transit account for the bus) for use via the electronic device at that transit terminal. Automatically the credential corresponding to the relevant type of transit account for use via the electronic device at that transit terminal enables the user to quickly and easily use the device to be authorized to pass the transit terminal with minimal interaction with the device. Automatically performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the credential of the first type corresponds to an identification account available for use via the electronic device (e.g., 700) at a secure access terminal (e.g., 930, for access to a secure building or secure regions within a building, such as a particular room of the building). In some embodiments, the secure access terminal grants access to enter a secure building (e.g., through secure doors 934), such as an office building or a dormitory building. In some embodiments, while the electronic device has less than the threshold amount of available power, the electronic device detects presence of a field (e.g., 932) generated by the secure access terminal. In some embodiments, in response to detecting the presence of the field generated by the secure access terminal, the electronic device transmits the credential corresponding to the identification account to the secure access terminal, but forgoes displaying a representation of the identification account on the display. (Automatically) transmitting the credential corresponding to the identification account to the secure access terminal in response to detecting the presence of the field generated by the secure access terminal enables the user to quickly and easily use the device to be authorized to access the secure location secured by the secure access terminal with minimal interaction with the device. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 1000 (e.g., FIGS. 10A-10C) are also applicable in an analogous manner to the methods described above and below. For example, method 800 optionally includes one or more of the characteristics of the various methods described above with reference to method 1000. For example, a transfer account associated with a credential can be provisioned on an electronic device using the provisioning processes of method 800. For another example, method 1200 optionally includes one or more of the characteristics of the various methods described above with reference to method 1000. For example, a credential can be used via an electronic device in a regular-power state (in addition to in a low-power state) using the processes described in method 1200. For brevity, these details are not repeated below.

FIGS. 11A-11V illustrate exemplary user interfaces for managing the use of a transfer account associated with different credentials on an electronic device, in accordance with some embodiments. The user interfaces in these figures are used to illustrate the processes described below, including the processes in FIGS. 12A-12C.

FIG. 11A illustrates an electronic device 700 (e.g., a smartphone, a mobile device) similar to electronic device 700 described above with reference to FIGS. 7A-7O and electronic device 700 described above with reference to FIGS. 9A-9J. Electronic device 700 includes a display 702 and a wireless communication radio (e.g., for near-field communication (NFC), Bluetooth, WiFi, LTE connections). In some embodiments, electronic device 700 includes one or more input devices (e.g., a touch-sensitive surface of display 702, a mechanical input device 701, such as a power button, a camera 703, a mic), one or more output devices (e.g., a speaker), and one or more sensors (e.g., a biometric sensor 704, such as a depth sensor, a fingerprint sensor). In some embodiments, one or more sensors (e.g., a biometric sensor, such as a fingerprint sensor) of electronic device 700 is integrated with/into a different component of the device (e.g., a fingerprint sensor is integrated with display 702).

In FIG. 11A, electronic device 700 is displaying, on display 702, a transfer application user interface 1110 of a transfer application (e.g., a first-party electronic wallet application controlled by the operating system of the device). Transfer application user interface 1110 includes a representation 1112 of a transfer account (e.g., a payment account, a points account, a transit account, a stored-value account, a credit card account) corresponding to the transfer account currently selected for use in a transfer operation (e.g., a transaction, such as a payment transaction, a secure access request) and a stack 1114 of (partially visible) representations of transfer accounts corresponding to other transfer accounts that are not currently selected for use in a transfer operation.

In some embodiments, a transfer-identification account (e.g., an identification account, such as a student ID card, that is also associated with one or more sub-accounts that are associated with funds, points, and/or credit) is provisioned on electronic device 700. In some embodiments, the transfer-identification account is provisioned on electronic device 700 via the provisioning process described above with reference to FIGS. 7A-7O and method 800. In some embodiments, the transfer-identification account is a student identification account/card and is controlled by/configured by an associated institution, such as the associated university (e.g., Appleton University). In some embodiments, transfer-identification account is a student identification account/card that is also associated with or linked to one or more sub-transfer accounts (e.g., a stored-value account, a debit account, a points account, such as a meal points account, a credit account, such as a printer credit account).

As shown in FIG. 11A, electronic device 700 displays a (partial) representation 1116 of the transfer-identification account within stack 1114 of transfer application user interface 1110. Alternatively, in some embodiments, electronic device 700 displays (partial) representation 1116 of the transfer-identification account in a region of transfer application user interface 1110 distinct from the region displaying stack 1114 and the region displaying representation 1112 corresponding to the currently-selected transfer account, as shown in FIG. 11B.

Figure 11B:
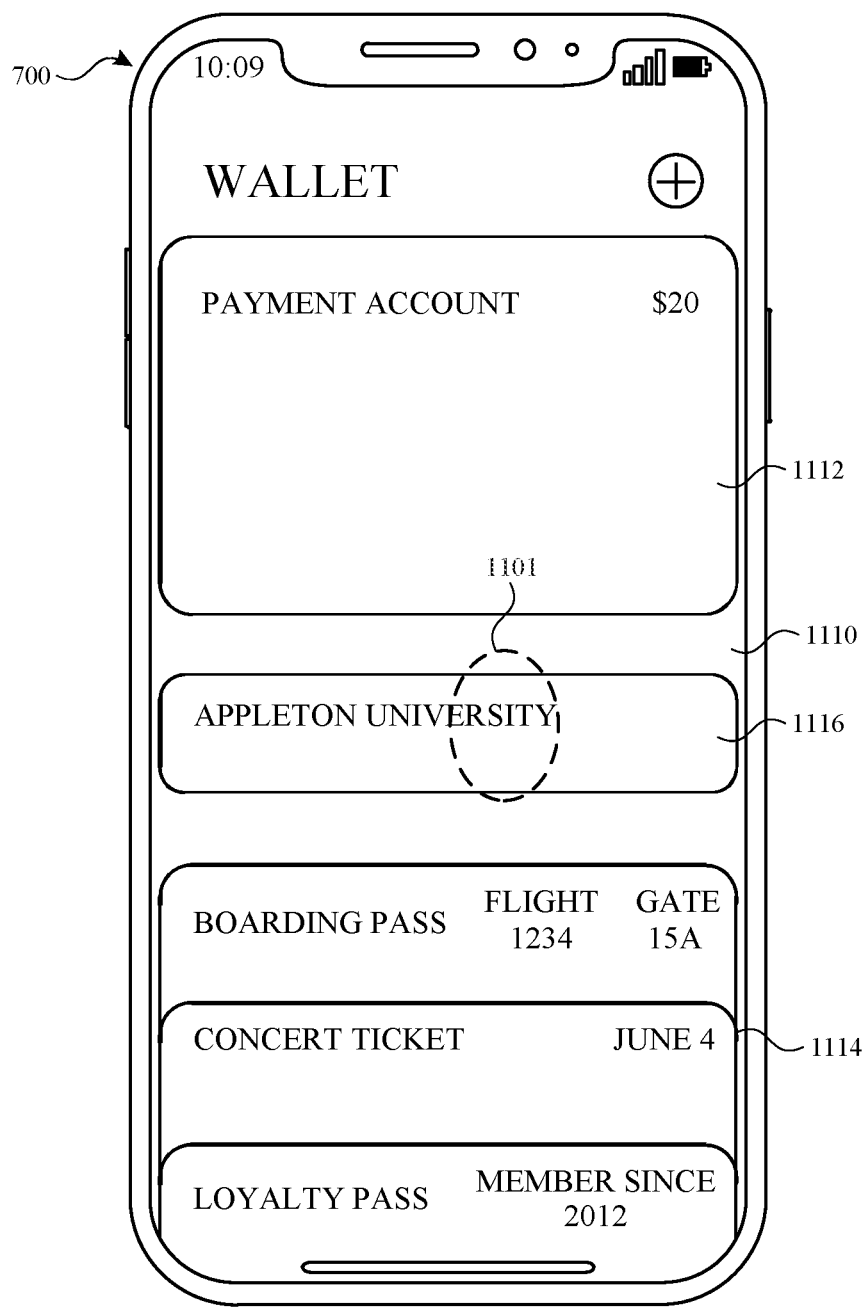

In FIG. 11B, while displaying, on display 702, transfer application user interface 1110 including (partial) representation 1116 of the transfer-identification account, electronic device 700 detects (e.g., via a touch-sensitive surface of display 702) an activation 1101 (e.g., a touch input) of (partial) representation 1116 of the transfer-identification account (thus setting the transfer-identification account as the currently-selected transfer account).

Figure 11C:
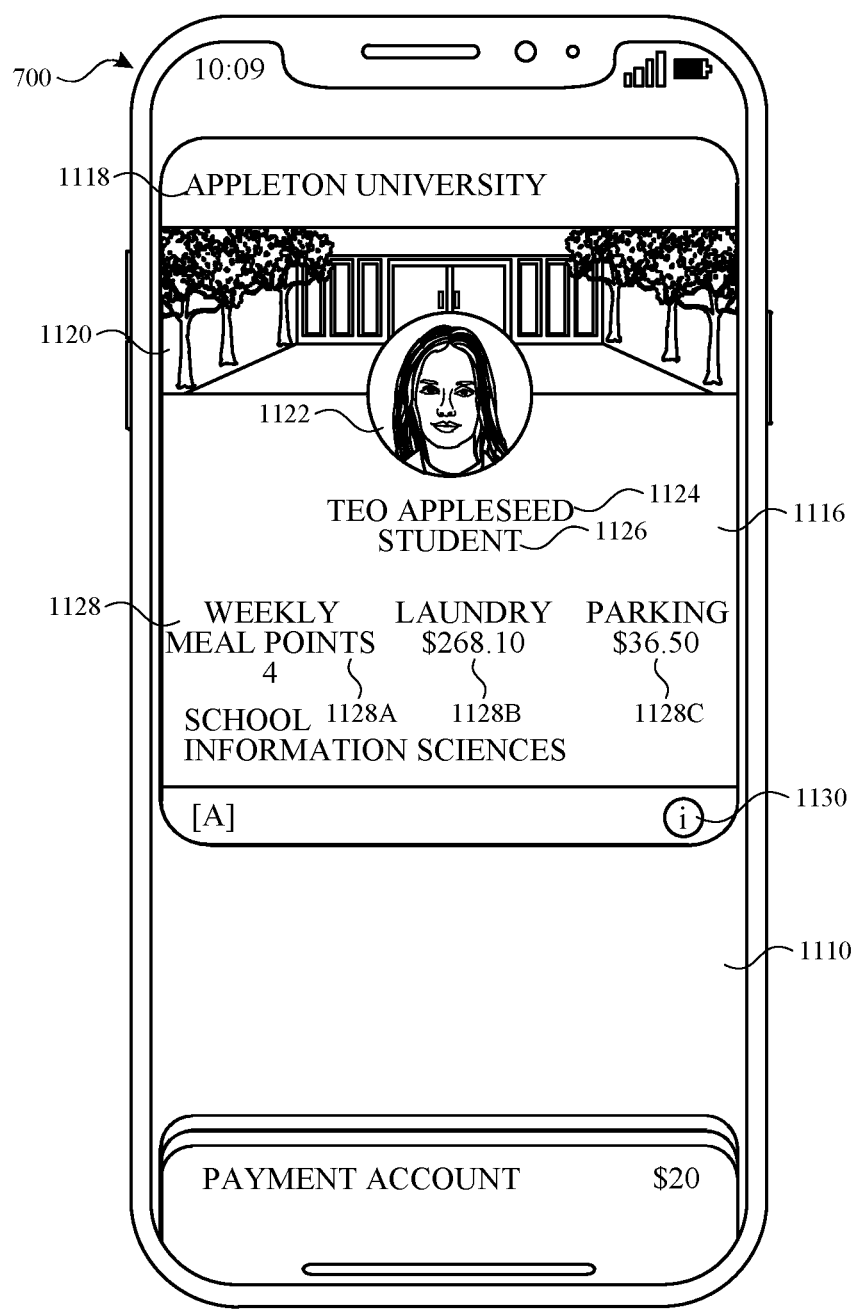

In FIG. 11C, in response to detecting activation 1101 of (partial) representation 1116 of the transfer-identification account, electronic device 700 displays, in transfer application user interface 1110 (e.g., by replacing display of representation 1112 corresponding to the currently-selected transfer account with) a full representation 1116 of the transfer-identification account.

As shown in FIG. 11C, representation 1116 of the transfer-identification account includes an indication 1118 and an image 1120 of the institution (e.g., university) associated with the account. Representation 1116 of the transfer-identification account also includes an image 1122, a name 1124 (e.g., Teo Appleseed), and a status 1126 (e.g., student, undergraduate student, graduate student, professor, staff) associated with the account-owner (e.g., Teo Appleseed), where the account-owner is affiliated with the institution (e.g., Appleton University) associated with the account. In this example, the account-owner Teo Appleseed is a student at the institution Appleton University.

As shown in FIG. 11C, representation 1116 of the transfer-identification account includes at least a portion of a plurality of sub-account balance information 1128 that is associated with or linked to/connected to the transfer-identification account, including a first sub-account balance information 1128A (e.g., a meal points balance), a second sub-account balance information 1128B (e.g., a laundry credit balance), and a third sub-account balance information 1128C (e.g., a parking credit balance). In some embodiments, the transfer-identification account is associated with one or more sub-accounts where the sub-account balance information is not shown in representation 1116 of the transfer-identification account shown in transfer application user interface 1110.

Representation 1116 of the transfer-identification account further includes an information affordance 1130 for viewing a detailed description page associated with the transfer-identification account, as described in greater detail below with reference to FIG. 11P.

Figure 11D:
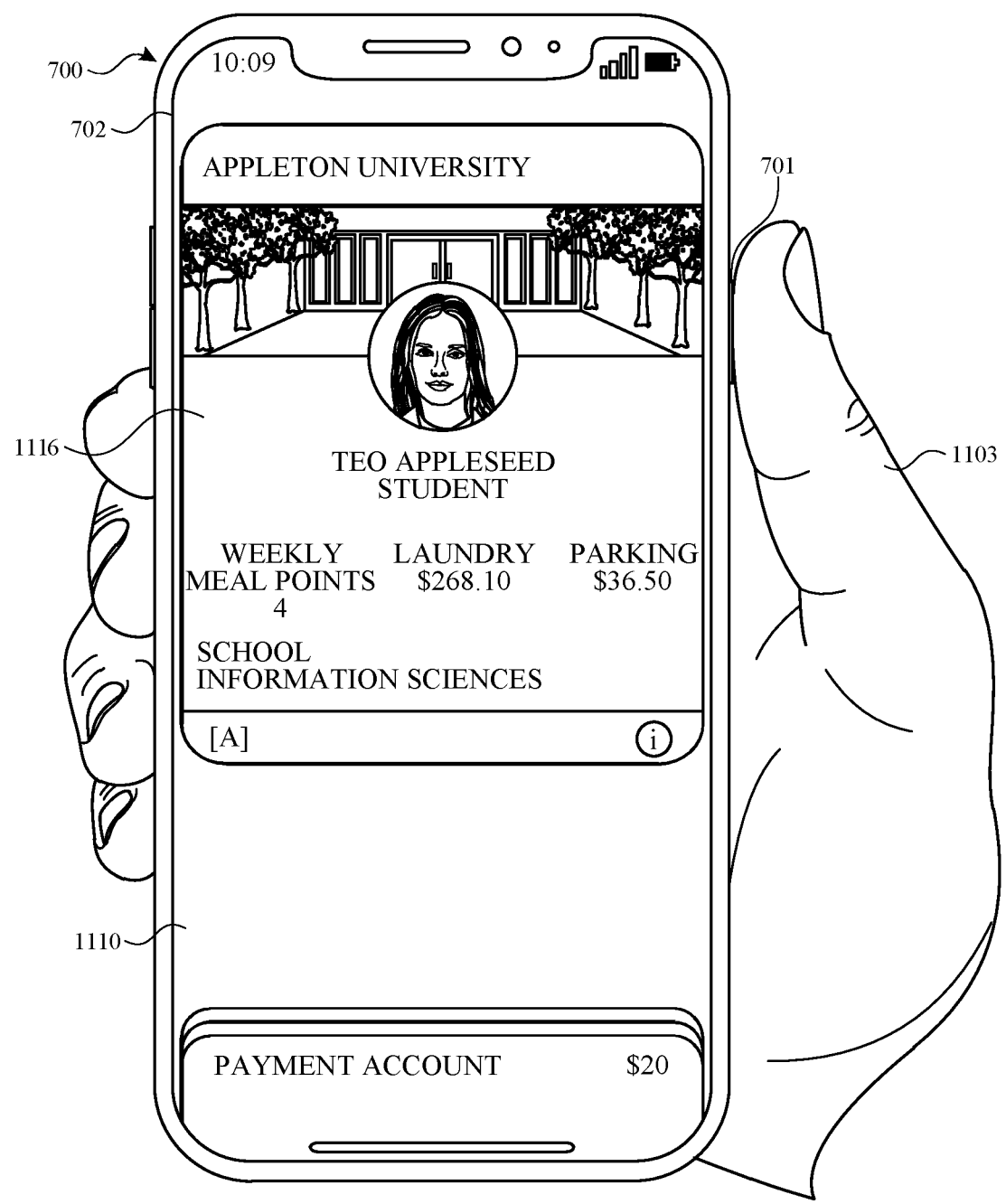

In FIG. 11D, while displaying, on display 702, representation 1116 of the transfer-identification account in the currently-selected region of transfer application user interface 1110 (thereby indicating that the transfer-identification account is currently selected for use in a transfer operation, such as a transaction or a secure access request), electronic device 700 receives an input 1103 (e.g., a double click/press) on mechanical input device 701.

Figure 11E:
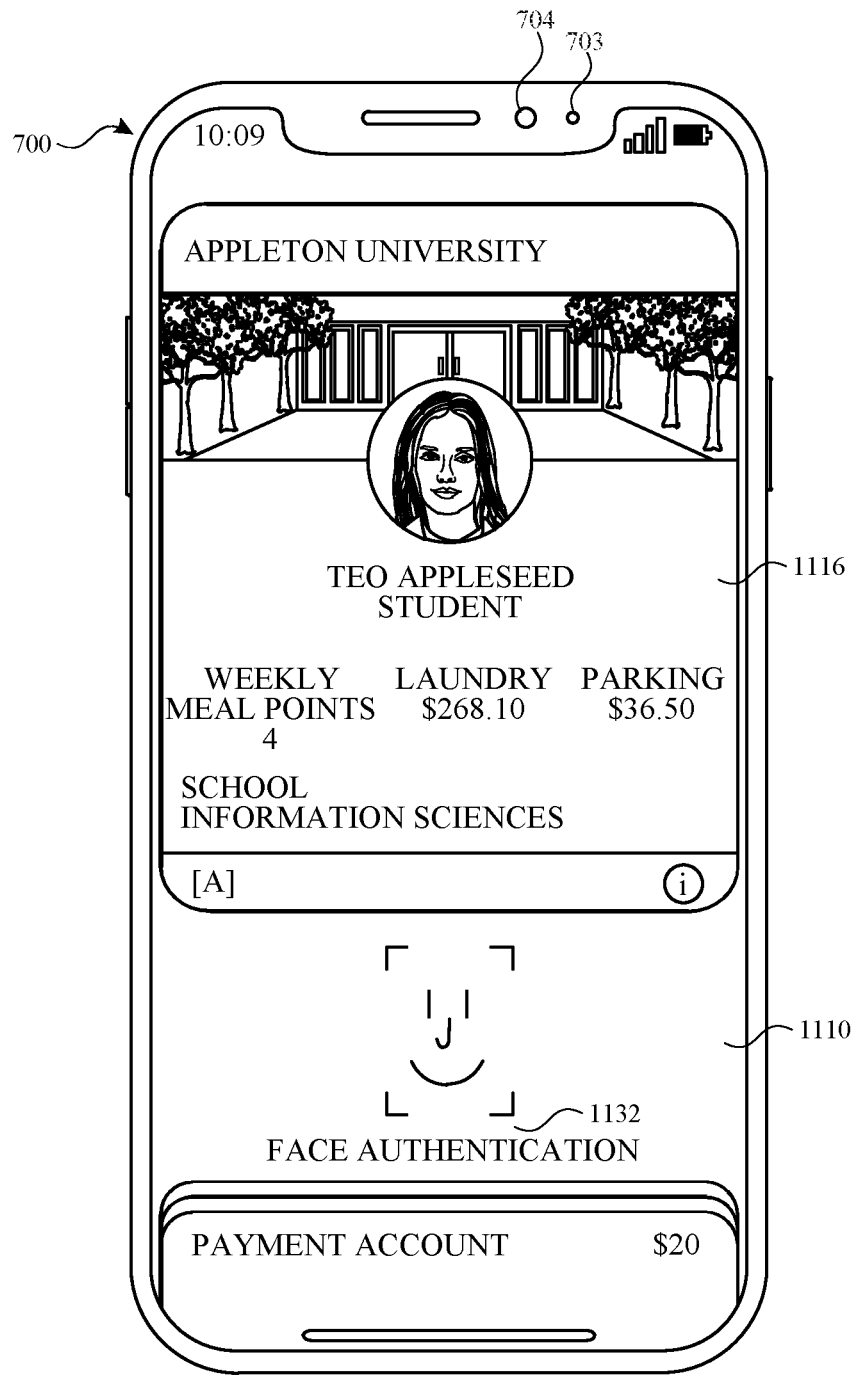

In FIG. 11E, in response to detecting input 1103 on mechanical input device 701 while displaying representation 1116 of the transfer-identification account in the currently-selected region of transfer application user interface 1110, electronic device 700 displays, in transfer application user interface 1110, an authentication request 1132 (e.g., a visual indication or animation) requesting authentication (e.g., biometric authentication, such as facial recognition authentication, fingerprint authentication, or iris/retina scan authentication; passcode or password authentication) to authorize and thus proceed with a transfer operation (e.g., a transaction or a secure access request) using the transfer-identification account.

Figure 11F:
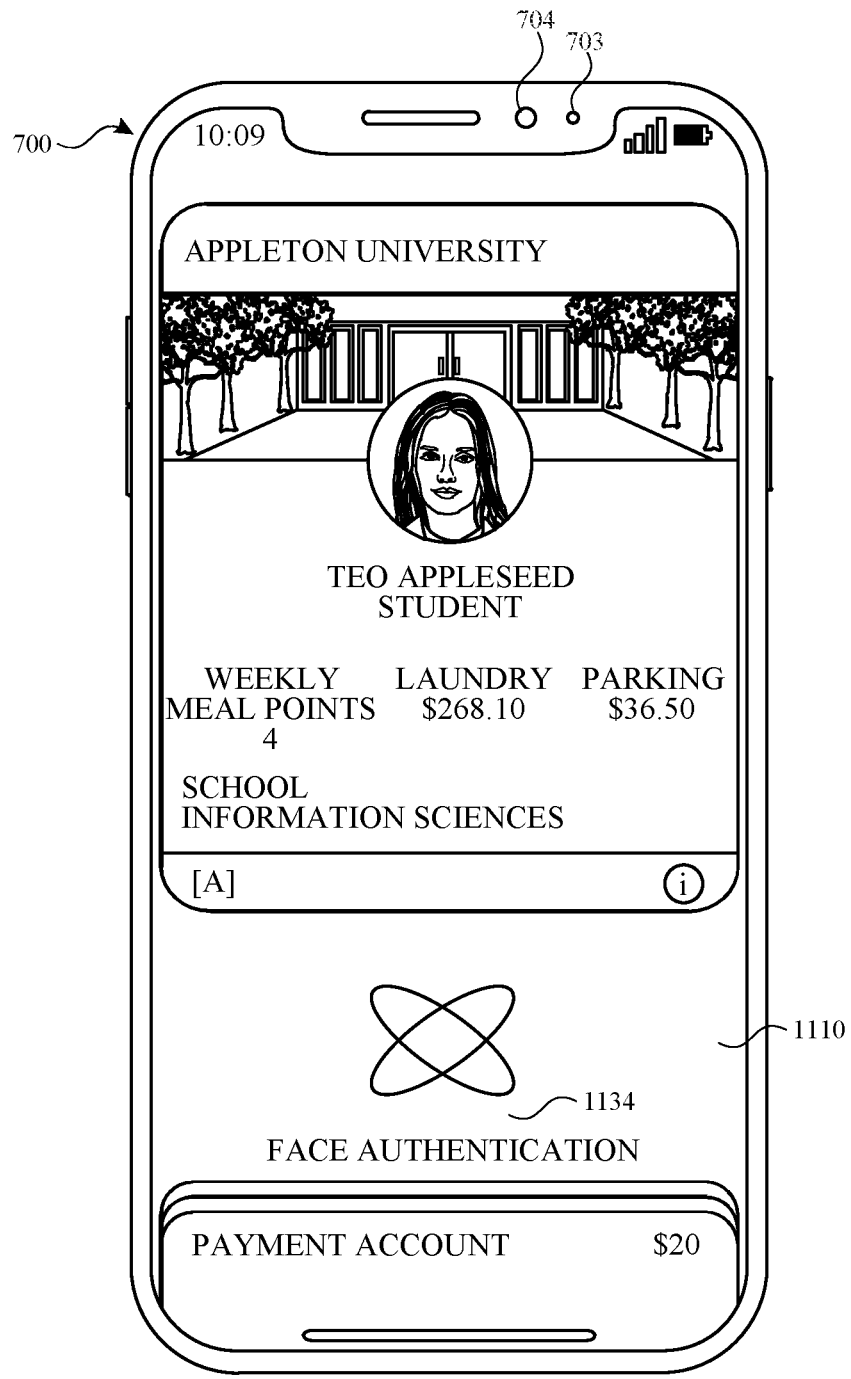

In FIG. 11F, in response to (or subsequent to, after) displaying authentication request 1132 and while displaying representation 1116 of the transfer-identification account, electronic device 700 receives/detects (e.g., via one or more input devices and/or one or more sensors, such as camera 703 and/or biometric sensor 704 (e.g., a depth sensor), or a fingerprint sensor) biometric information (e.g., the user's facial features information, the user's fingerprint information, the user's iris/retina scan information). As shown in FIG. 11F, while receiving/detecting the user's biometric information, electronic device 700 displays (e.g., replaces display of authentication request 1132 with), in transfer application user interface 1110, a processing indication 1134 (e.g., a visual indication, such as a graphical animation of twirling circular shapes) that the user's biometric information is being received/detected. In some embodiments, in addition to or alternatively to biometric information, electronic device 700 receives passcode or password authentication to authorize the device to proceed with the transfer operation using the transfer-identification account.

Figure 11G:
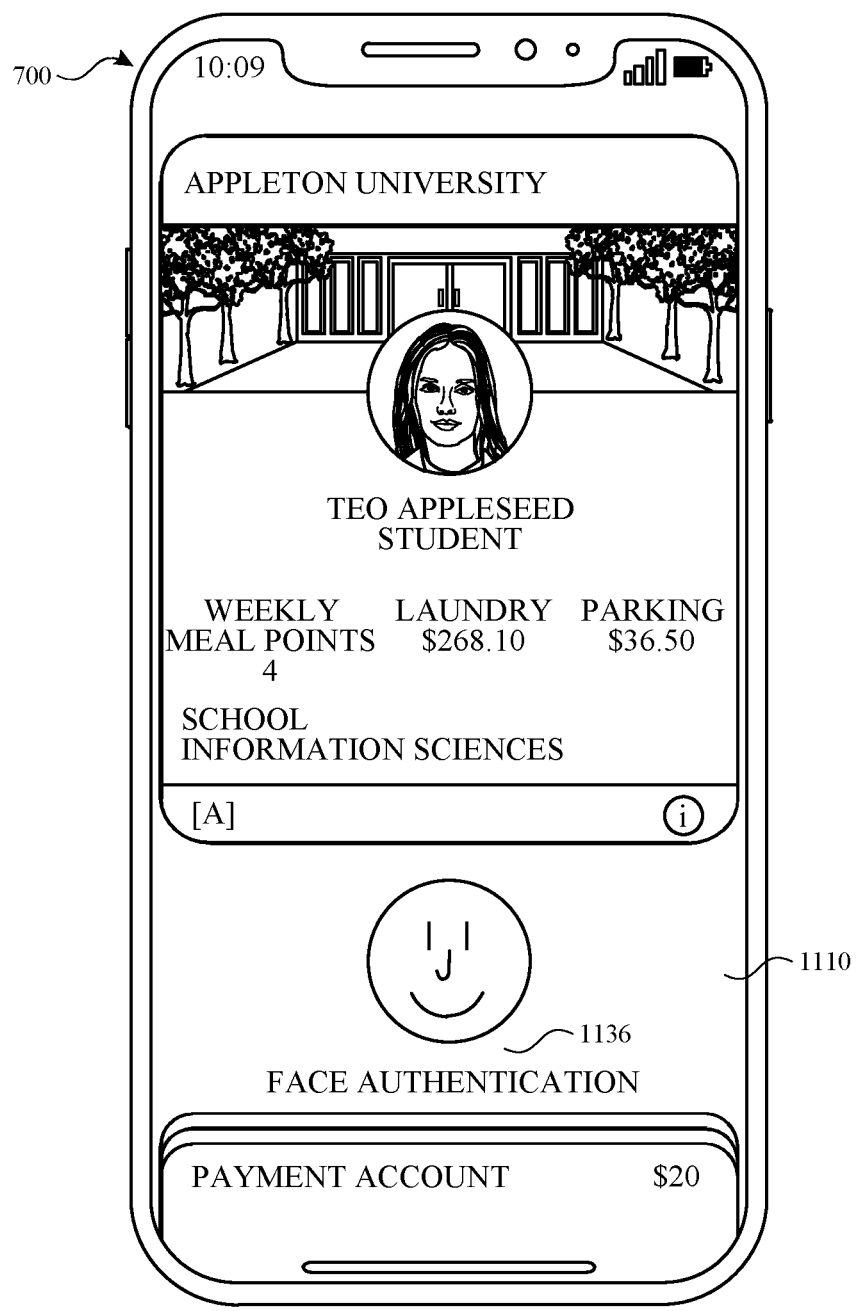

In FIG. 11G, in response to receiving successful authentication and while displaying representation 1116 of the transfer-identification account, electronic device 700 displays (e.g., replaces display of processing indication 1134 with), in transfer application user interface 1110, a success indication 1136 (e.g., a visual indication, such as a smiley-faced graphical object) that the authentication was successful (and thus that the device is authorized to proceed with the transfer operation using the transfer-identification account).

In some embodiments, authentication is successful when received or detected authentication information (e.g., received or detected biometric authentication information, received passcode/password authentication information) is consistent with authentication information that is already enrolled or registered on electronic device 700 (e.g., registered biometric authentication information or an enrolled passcode/password).

In some embodiments, in accordance with a determination that the authentication was not successful (e.g., because the received/detected biometric authentication information was not consistent with registered biometric authentication information), electronic device 700 forgoes authorizing the transfer operation (and thus the device is not authorized to proceed with the transfer operation using the transfer-identification account).

Figure 11H:
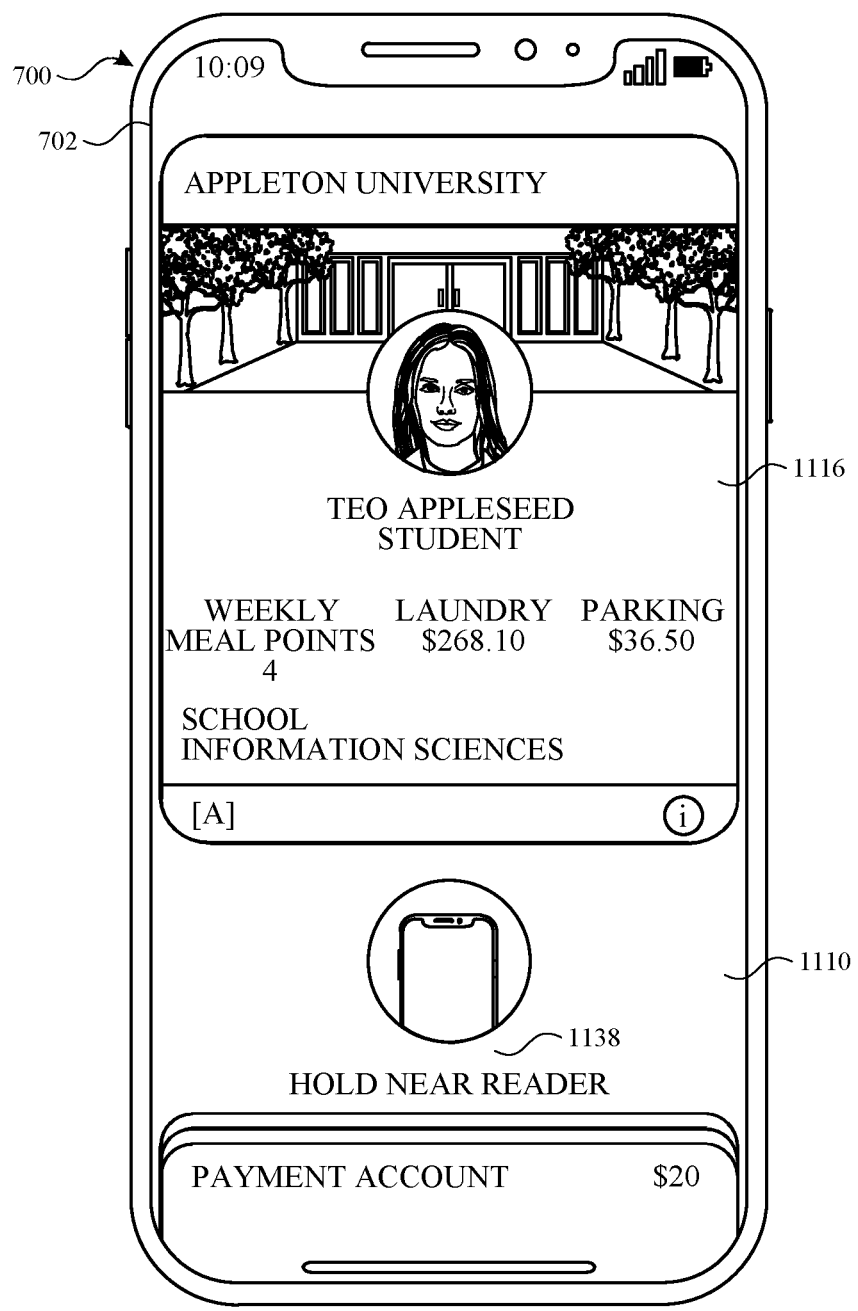
Figure 111:
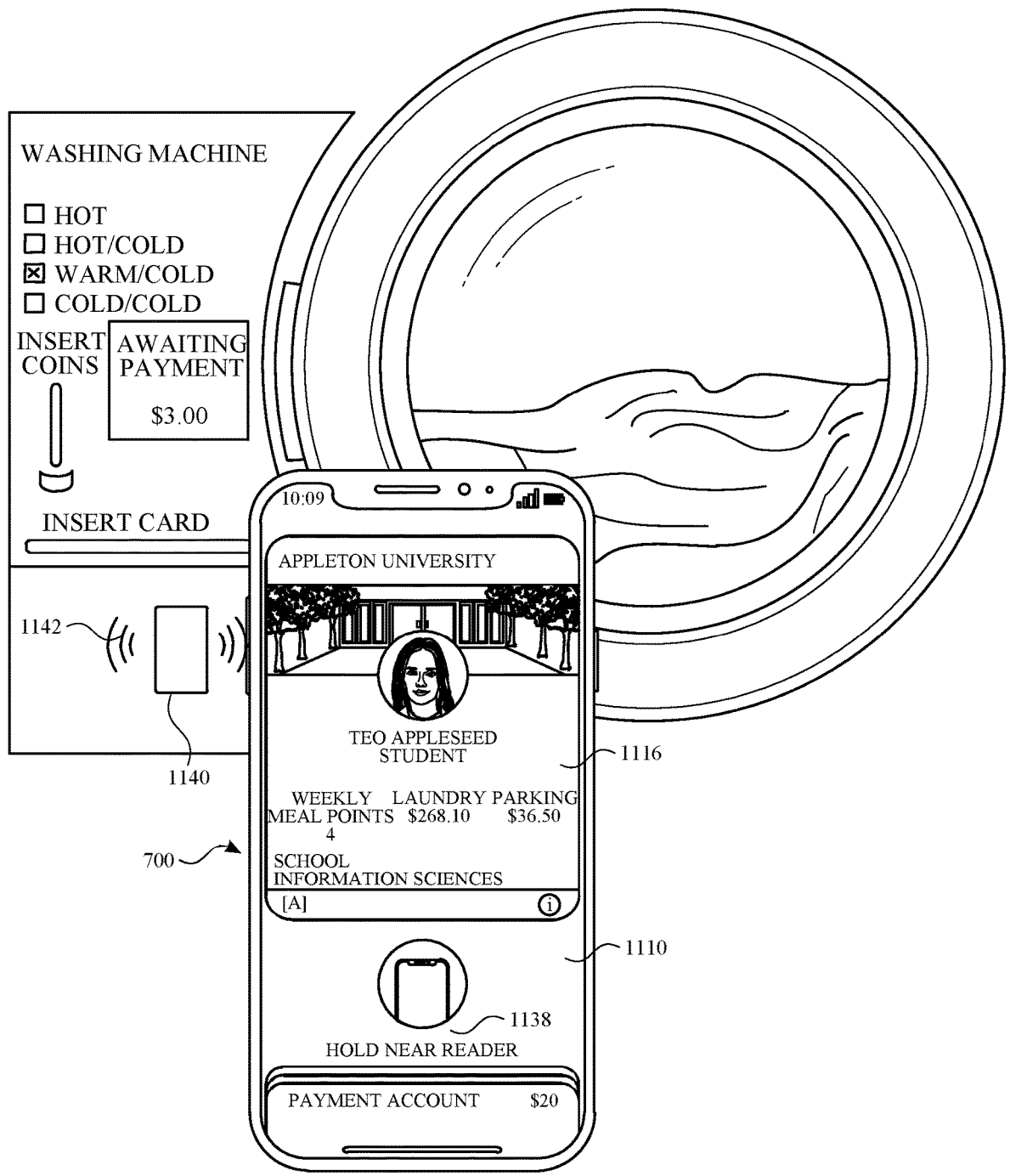

In FIG. 11H, subsequent to (e.g., a predetermined amount of time, such as 0.5 seconds, 1 second, or 3 seconds, after) displaying success indication 1136 and while displaying representation 1116 of the transfer-identification account, electronic device 700 displays (e.g., replaces display of success indication 1136 with), in transfer application user interface 1110, a hold-near-terminal request 1138 (e.g., including a visual indication, such as a graphical animation of the device moving, and/or a textual indication stating "Hold Near Reader") requesting that the device be placed near a terminal (e.g., a contactless payment transaction terminal, a transit terminal, a secure access terminal) such that the device can detect (e.g., via a wireless communication radio of the device) a field (e.g., a near-field communication (NFC)-based field) generated by the terminal.

In FIG. 11H, after receiving successful authentication (and thus displaying hold-near-terminal request 1138) and while displaying representation 1116 of the transfer-identification account in transfer application user interface 1110, electronic device 700 detects (e.g., via a wireless communication radio of the device) the presence of a field 1142 generated by a transaction terminal 1140 of a laundry machine. In some embodiments, transaction terminal 1140 of the laundry machine is associated with/controlled by the institution (e.g., Appleton University) associated with the transfer-identification account.

Figure 11J:
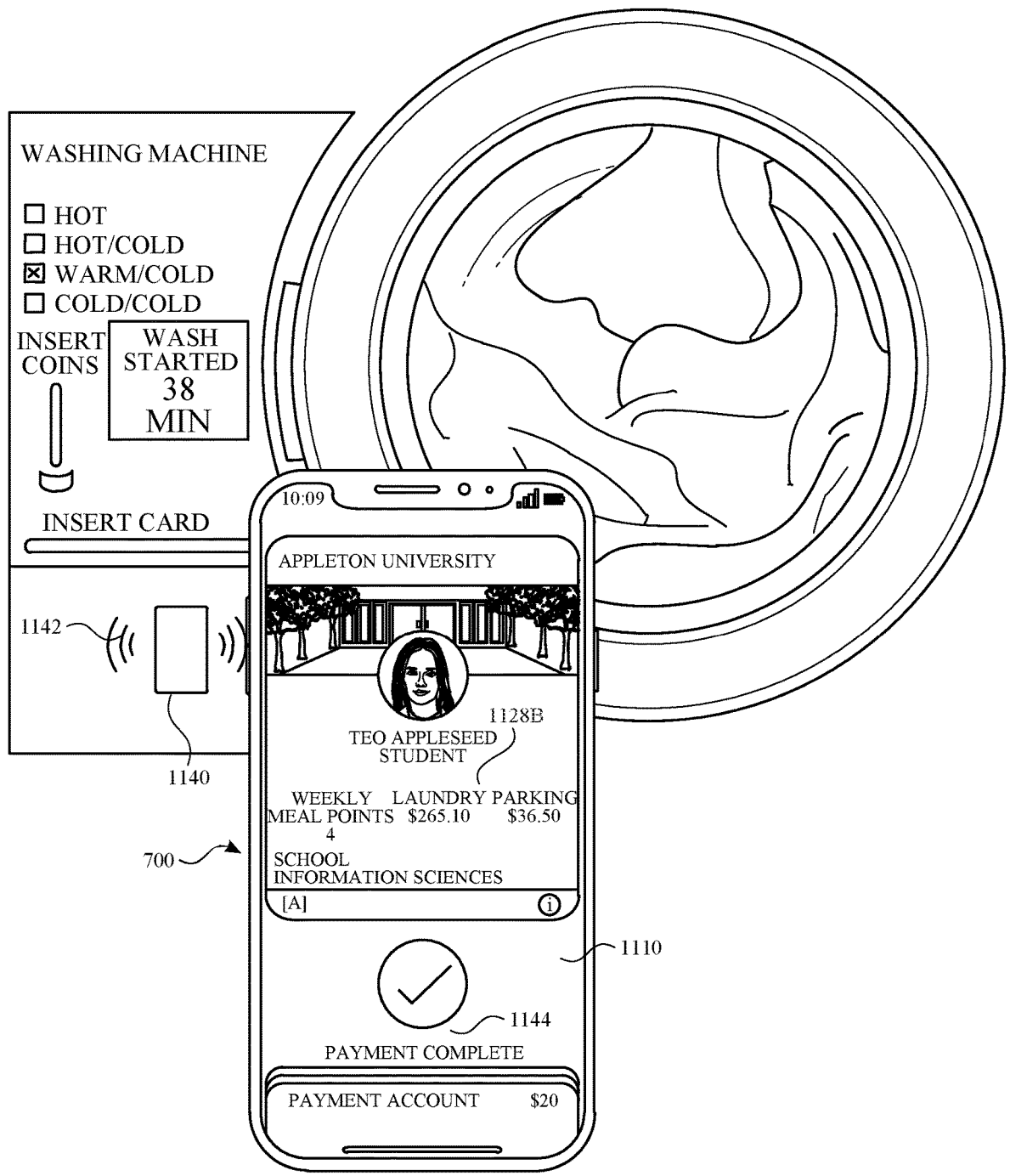

In FIG. 11J, in response (or subsequent to) detecting the presence of field 1142 generated by transaction terminal 1140 of the laundry machine, electronic device 700 transmits (e.g., via a wireless communication radio of the device) a credential of the second sub-account (e.g., the laundry credit account) to transaction terminal 1140 for use in a transfer operation (e.g., a payment of laundry credit to use the laundry machine) with transaction terminal 1140. In some embodiments, prior to transmitting the credential of the second sub-account, electronic device 700 automatically selects (e.g., based on an identifier or tag detected based on field 1142 of transaction terminal 1140) the second sub-account from the plurality of sub-accounts associated with/ linked to the transfer-identification account for use in the transfer operation.

As shown in FIG. 11J, in response to (or subsequent to) transmitting the credential of the second sub-account to transaction terminal 1140, electronic device 700 updates display of second sub-account balance information 1128B to reflect the remaining balance of the second sub-account (e.g., the laundry credit account) after the transfer operation (e.g., a payment of $3 from the laundry credit account for the laundry—thus, the remaining balance of the laundry credit account is decreased from $268.10 to $265.10). Electronic device 1100 also displays, in transfer application user interface 1110, a success indication 1144 (e.g., stating "Payment Complete") that the transfer operation (e.g., involving the use of laundry credit) has been successfully completed.

Figure 11K:
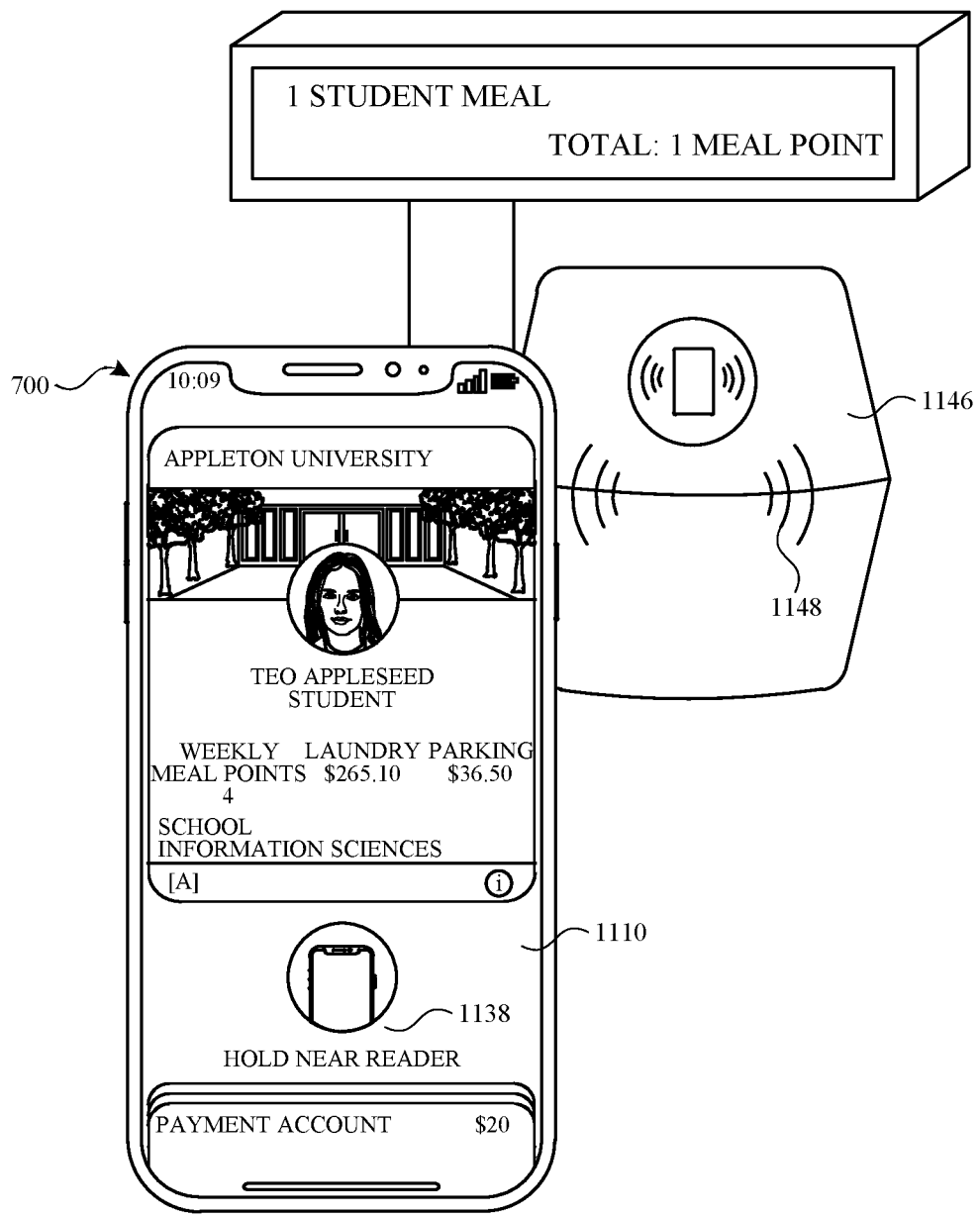

FIG. 11K illustrates electronic device 700 displaying, in transfer application user interface 1110, representation 1116 of the transfer-identification (as the currently-selected account) and hold-near-terminal request 1138 (after having received successful authentication authorizing the device to proceed with a transfer operation using the transfer-identification account).

In FIG. 11K, while displaying transfer application user interface 1110 after having received successful authentication with the transfer-identification account as the currently-selected account, electronic device 700 detects (e.g., via a wireless communication radio of the device) the presence of a field 1148 generated by a transaction terminal 1146 associated with a university dining hall (e.g., a dining hall of Appleton University).

Figure 11L:
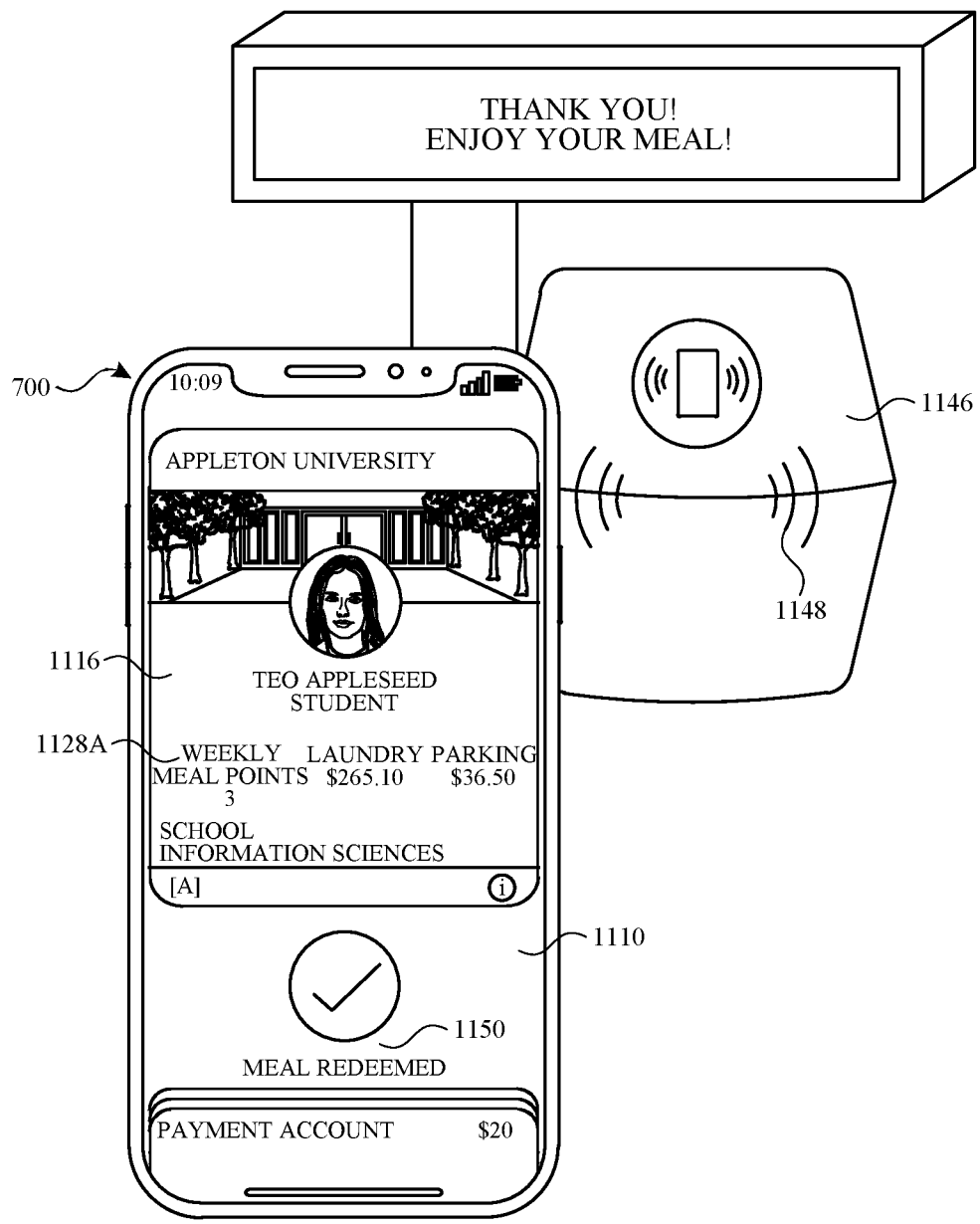

In FIG. 11L, in response (or subsequent to) detecting the presence of field 1148 generated by transaction terminal 1146 of the dining hall, electronic device 700 transmits (e.g., via a wireless communication radio of the device) a credential of the first sub-account (e.g., the meal points account) to transaction terminal 1146 for use in a transfer operation (e.g., a transfer/deduction of meal points from the user's, Teo Appleseed's, meal points account) with transaction terminal 1146. In some embodiments, prior to transmitting the credential of the first sub-account, electronic device 700 automatically selects (e.g., based on an identifier or tag detected based on field 1148 of transaction terminal 1146) the first sub-account from the plurality of sub-accounts associated with/linked to the transfer-identification account for use in the transfer operation.

As shown in FIG. 11L, in response to (or subsequent to) transmitting the credential of the first sub-account to transaction terminal 1146, electronic device 700 updates display of first sub-account balance information 1128A to reflect the remaining balance of the first sub-account (e.g., the meal points account) after the transfer operation (e.g., a use of 1 meal point for a meal at the dining hall—thus, the remaining meal points balance is decreased from 4 to 3). Electronic device 1100 also displays, in transfer application user interface 1110, a success indication 1150 (e.g., stating "Meal Redeemed") indicating that the transfer operation (e.g., involving the use of meal points) has been successfully completed.

Figure 11M:
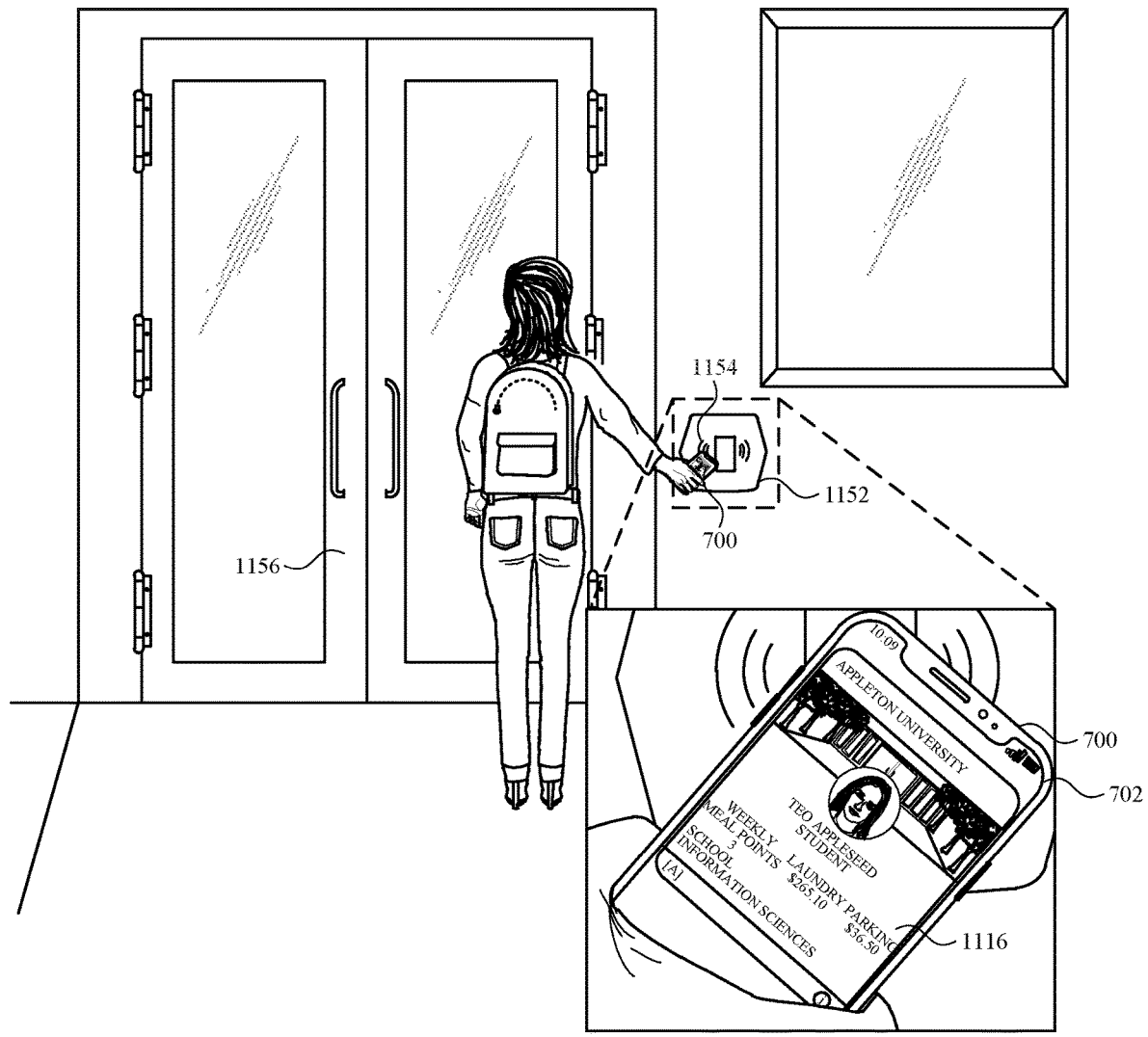

FIG. 11M illustrates electronic device 700 being held by the user of the device near a secure access terminal 1152 (e.g., similar to secure access terminal 930 described above with reference to FIGS. 9I-9K) associated with a secure location (e.g., a secure entrance to a secure location, such as a locked door to a secure room or building). In FIG. 11M, electronic device 700 is displaying transfer application user interface 1110 (with transfer-identification account currently selected for use in a transfer operation, as indicated by representation 1116 of the transfer-identification account). Alternatively, in some embodiments, display 702 of electronic device 700 is in an off state (and thus the device is not displaying transfer application user interface 1110).

In FIG. 11M, electronic device 700 detects (e.g., via a wireless communication radio of the device) the presence of a field 1154 generated by secure access terminal 1152. In some embodiments, secure access terminal 1152 is configured to control access to a secure location (e.g., a room, a building) by locking/unlocking a secure door 1156. In some embodiments, prior to detecting the presence of field 1154 generated by secure access terminal 1152, electronic device 700 receives successful authentication (e.g., biometric authentication, such as facial recognition authentication, fingerprint authentication, or iris/retina scan authentication; passcode or password authentication) to authorize the use of the transfer-identification account in a secure access request. In some embodiments, electronic device 700 does not receive authentication prior to detecting the presence of field 1154 because transfer-identification account is an express account and/or is in express mode, in which authentication is not required to authorize an account for use in a transfer operation.

Figure 11N:
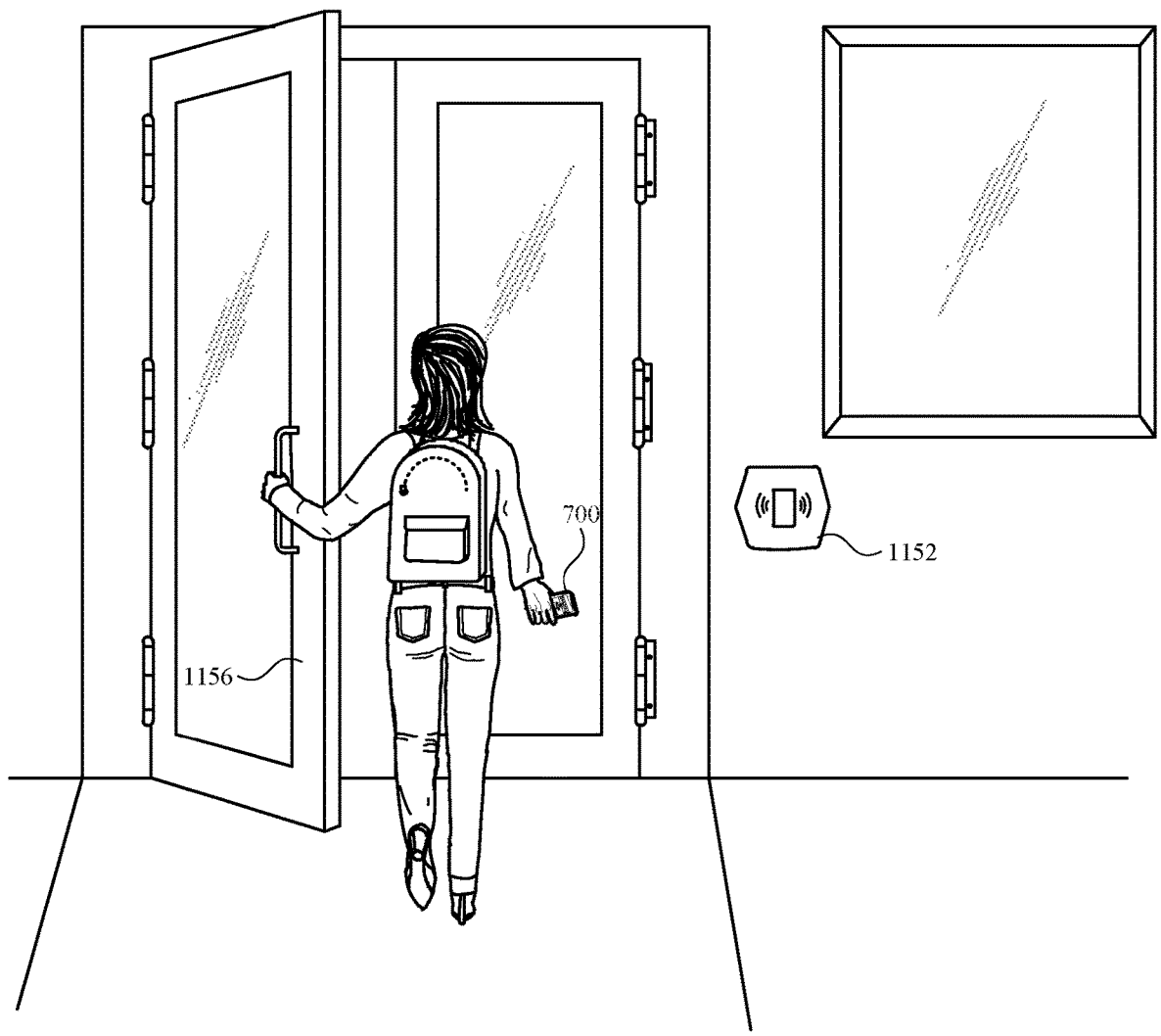

In some embodiments, in response to (or subsequent to, after) detecting the presence of field 1154 generated by secure access terminal 1152, electronic device 700 transmits (e.g., via a wireless communication radio of the device) an access credential of the transfer-identification account to secure access terminal 1152, where the transfer-identification account is pre-configured to be compatible with secure access terminal 1154. As shown in FIG. 11N, transmitting the access credential of the transfer-identification account to secure access terminal 1152 causes secure door 1156 to open, thus enabling the user to enter the secure location.

In some embodiments, if the transfer-identification account is not pre-configured to be compatible with secure access terminal 1152, transmitting the access credential of the transfer-identification account to secure access terminal 1152 does not cause secure door 1156 to open, for a valid (compatible) secure access account was not presented to secure access terminal 1152.

In some embodiments (e.g., if the transfer-identification account is not in express mode), authentication is required for use of the transfer-identification account in a secure access request with secure access terminal 1152—thus, in some embodiments, without receiving successful authentication, transmitting the access credential of the transfer-identification account to secure access terminal 1152 does not cause secure door 1156 to open, even if the transfer-identification account is compatible with secure access terminal 1152.

Figure 11O:
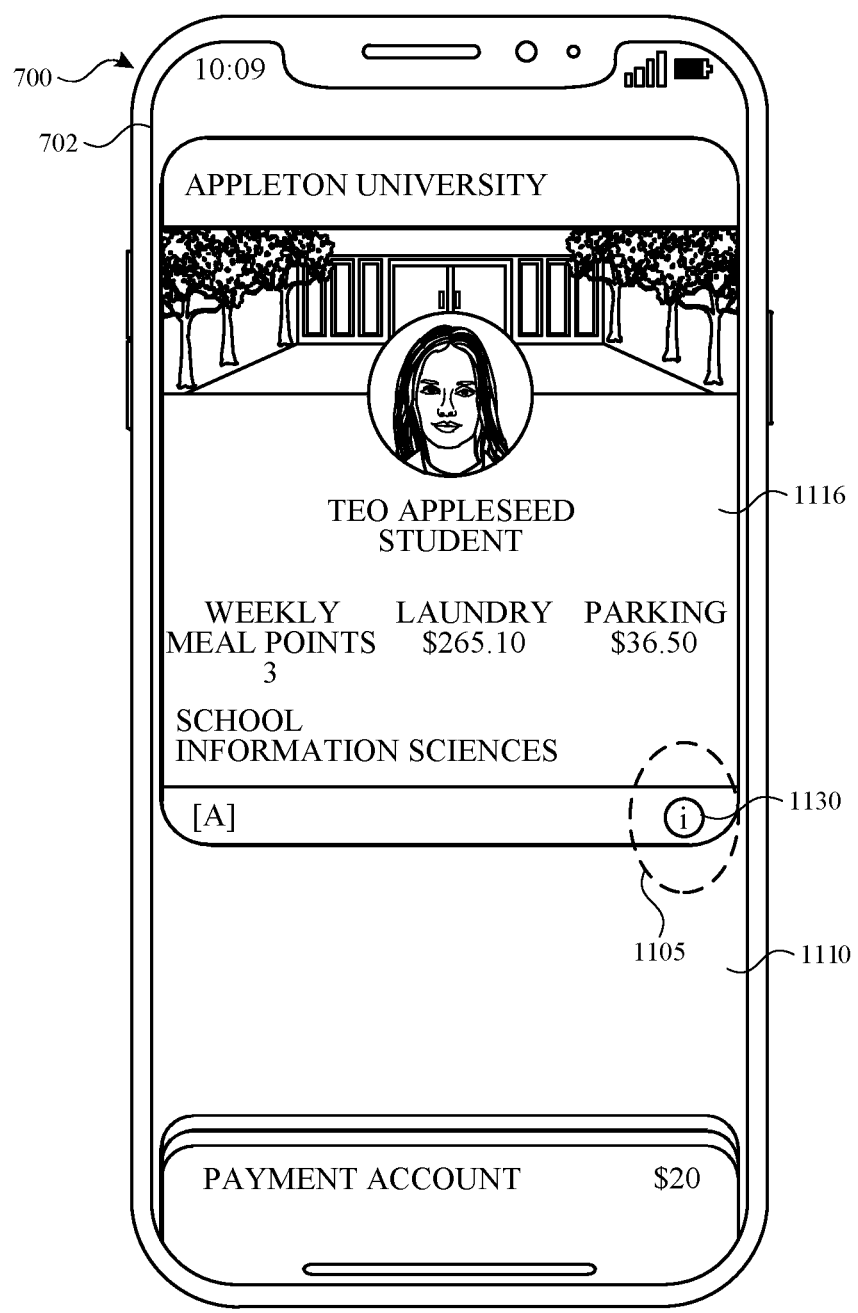

FIG. 11O illustrates electronic device 700 again displaying, on display 702, transfer application user interface 1110 with the transfer-identification account currently selected for use in a transfer operation (as indicated by representation 1116 of the transfer-identification account being displayed in the current account region of the user interface). In FIG. 11O, while displaying representation 1116 of the transfer-identification account, electronic device 700 detects (e.g., via a touch-sensitive surface of display 702) an activation 1105 (e.g., a touch input) of information affordance 1130.

Figure 11P:
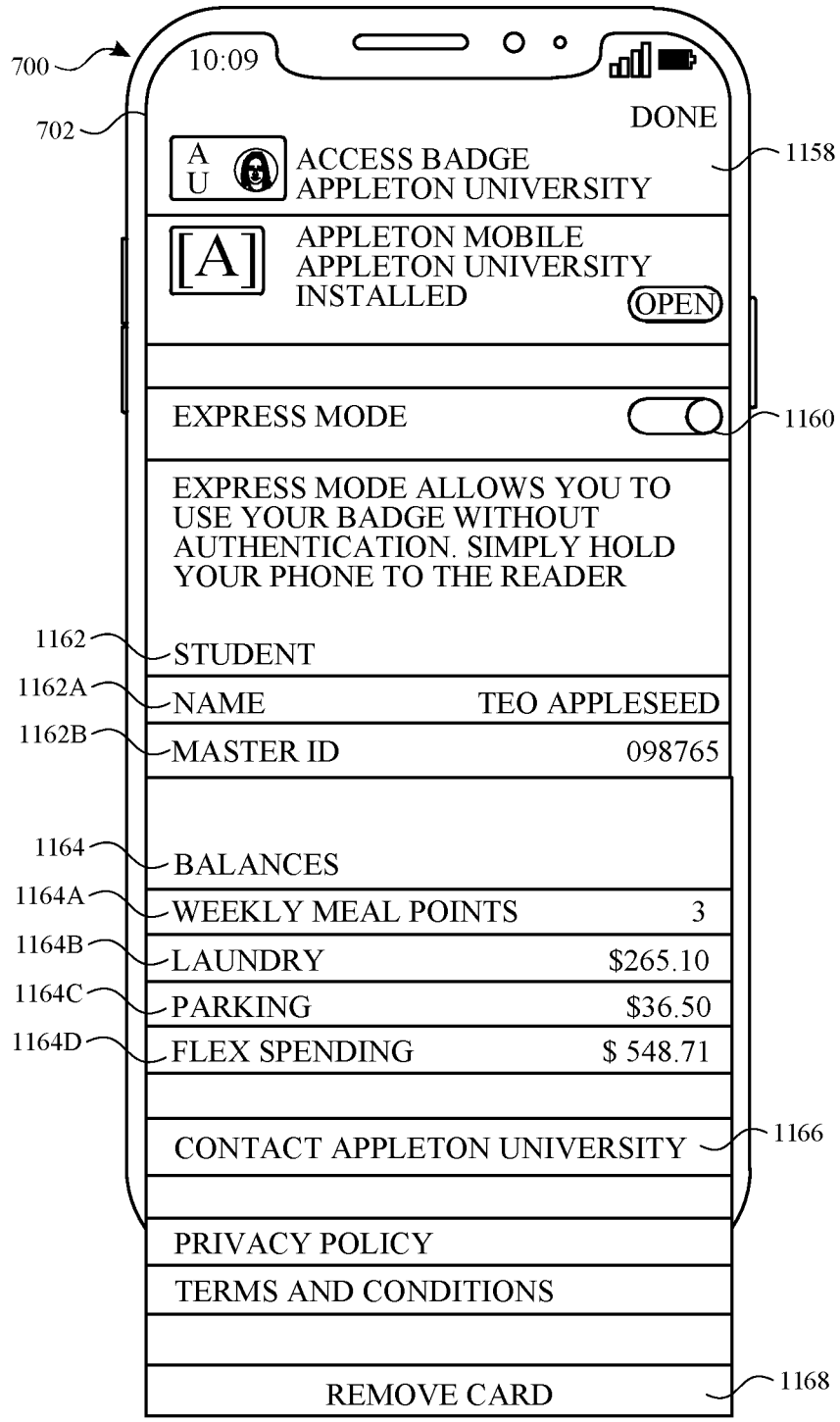

As shown in FIG. 11P, in response to detecting activation 1105 of information affordance 1130, electronic device 700 displays, on display, an accounts details page 1158 that includes a plurality of information items and/or options associated with the transfer-identification account. In some embodiments, accounts details page 1158 includes an express mode affordance (e.g., a toggle with an on state and an off state) that either enables (in the on state) or disables (in the off state) the express mode setting of the transfer-identification account. As discussed above, when express mode is enabled, authentication (e.g., biometric authentication, such as facial recognition authentication, fingerprint authentication, or iris/retina scan authentication; passcode or passcode authentication) is not required to authorize the transfer-identification account for use in a transfer operation (e.g., using a sub-account associated with/linked to the transfer-identification account) or in a secure access request (e.g., using an access credential associated with the transfer-identification account). When express mode is disabled, authentication (e.g., biometric authentication, such as facial recognition authentication, fingerprint authentication, or iris/retina scan authentication; passcode or passcode authentication) is required to authorize the transfer-identification account for use in a transfer operation (e.g., using a sub-account associated with/linked to the transfer-identification account) or in a secure access request (e.g., using an access credential associated with the transfer-identification account)

As shown in FIG. 11P, accounts details page 1158 includes an account-owner information region 1162, including a name 1162A of the account-owner (e.g., Teo Appleseed) and an institutional identification number 1162B of the account-owner (e.g., a student ID number). Accounts details page 1158 also includes a sub-account balance regions 1164 that shows the sub-account(s) associated with/linked to the transfer-identification account and the balance associated with each sub-account. In some embodiments, the transfer-identification account is associated with/linked to 4 sub-accounts, yet representation 1116 of the transfer-identification that is shown in transfer application user interface 1110 includes display of up to a set number (e.g., 3) sub-accounts—thus, in some embodiments, not all of the associated/linked sub-accounts are displayed in representation 1116 but are displayed in sub-account balances region 1164 (e.g., a first sub-account balance 1164A corresponding to the meal points account, a second sub-account balance 1164B corresponding to the laundry credit account, a third sub-account balance 1164C corresponding to the parking credit account, and a fourth sub-account balance 1164D corresponding to a flex spending account).

In FIG. 11P, accounts details page 1158 also includes a contact affordance 1166 for initiating a (wireless) communication (e.g., a phone call, a text message, an email, a chat) with a representation of the institution associated with the transfer-identification account (e.g., Appleton University). Accounts details page 1158 further includes a remove affordance for de-provisioning/de-linking the transfer-identification account from electronic device 700.

Figure 11Q:
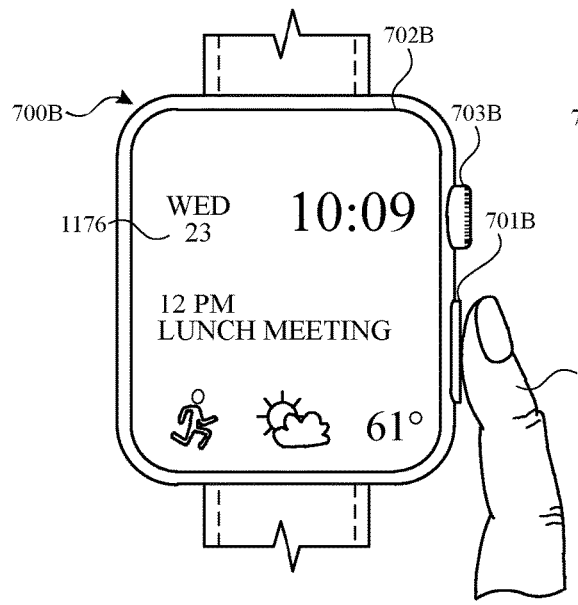

FIG. 11Q illustrates an electronic device 700B (e.g., a smartwatch; e.g., a device having one or more features of device 500) that includes a display 702B and a wireless communication radio (e.g., for NFC, Bluetooth, WiFi, LTE connections) displaying, on display 702B, a time user interface 1176 (e.g., which is also a lock screen). Electronic device 700B includes one or more input devices (e.g., a touch-sensitive surface of display 702B, a rotatable input device 703B, a mechanical input device 701B, a mic) and one or more output devices (e.g., a haptic generator, a speaker).

In FIG. 11Q, while displaying, on display 702B, time user interface 1176, electronic device 700B receives an input 1107 (e.g., a double click/press) on mechanical input button 701B.

Figure 11R:
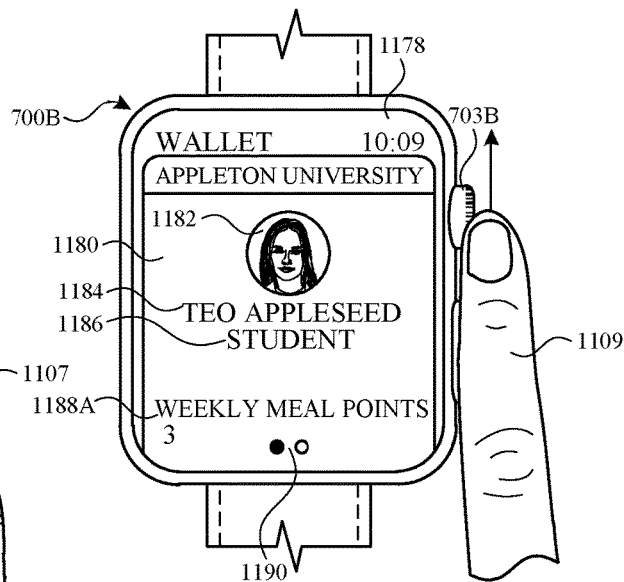

As shown in FIG. 11R, in response to receiving input 1107 on mechanical input button 701B, electronic device 1100 displays, on display 702B, a transfer application user interface 1178 (associated with/related to transfer application user interface 1110 displayed on electronic device 700) of the transfer application (e.g., a first-party electronic wallet application controlled by/directly associated with the operating system of the device). In FIG. 11R, electronic device 700B displays, in transfer application user interface 1178, a representation 1180 of the transfer-identification account (associated with/related to representation 1116 of the transfer-identification account displayed on electronic device 700).

Representation 1180 of the transfer-identification account includes an image 1182, a name 1184 (e.g., Teo Appleseed), and a status 1186 (e.g., student, undergraduate student, graduate student, professor, staff) associated with the account-owner (e.g., Teo Appleseed), similar to how these information are shown in representation 1116 of the transfer-identification account displayed on electronic device 700. Representation 1180 of the transfer-identification account also includes a first sub-account balance information 1188A (e.g., corresponding to the meal points account)—in some embodiments, more sub-account balance information is shown in representation 1116 of the transfer-identification account displayed on electronic device 700 than on representation 1180 of the transfer-identification account displayed on electronic device 700B.

In some embodiments, transfer application use interface 1178 includes one or more indicia elements 1190 corresponding to the number of accounts (including the transfer-identification account) accessible by electronic device 700B and indicating the currently-displayed account (the transfer-identification account).

Figure 11S:
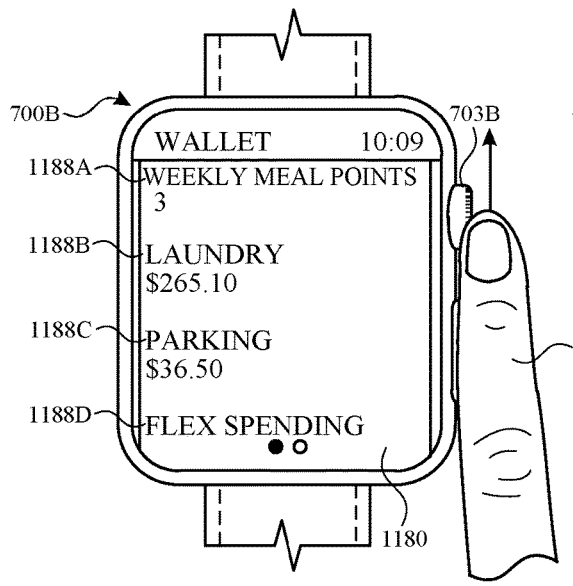
Figure 11T:
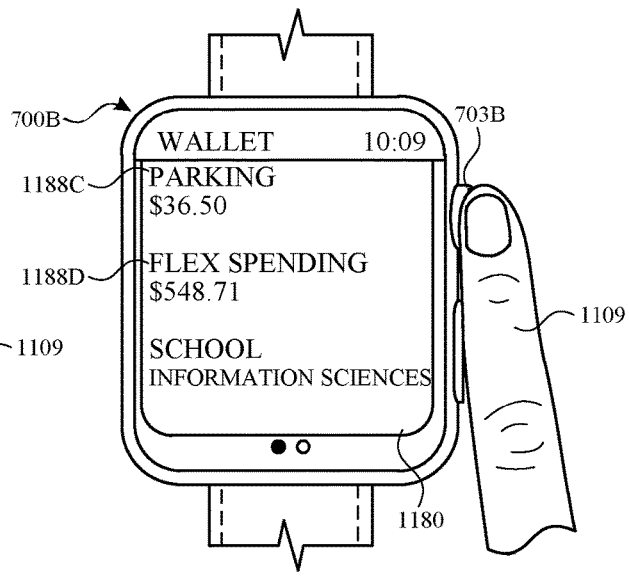

FIGS. 11R-11T illustrate electronic device 700B, while displaying transfer application user interface 1178 showing representation 1180 of the transfer-identification account, receiving an input 1109 (e.g., a rotating input) on rotatable input device 703B (e.g., in a clockwise direction), thus causing representation 1180 of the transfer-identification to be scrolled. In response to detecting input 1109 (or, alternatively, a touch scrolling gesture on a touch-sensitive surface of display 702B), electronic device 700B displays additional information items in representation 1180 of the transfer-identification account (e.g., first sub-account balance 1188A, second sub-account balance 1188B, third sub-account balance 1188C, and fourth sub-account balance 1188D corresponding to first sub-account balance 1164A, second sub-account balance 1164B, third sub-account balance 1164C, and fourth sub-account balance 1164D shown in FIG. 11P, respectively) that was not displayed prior to receiving input 1109 (e.g., because of limited display space of electronic device 700B).

Figure 11U:
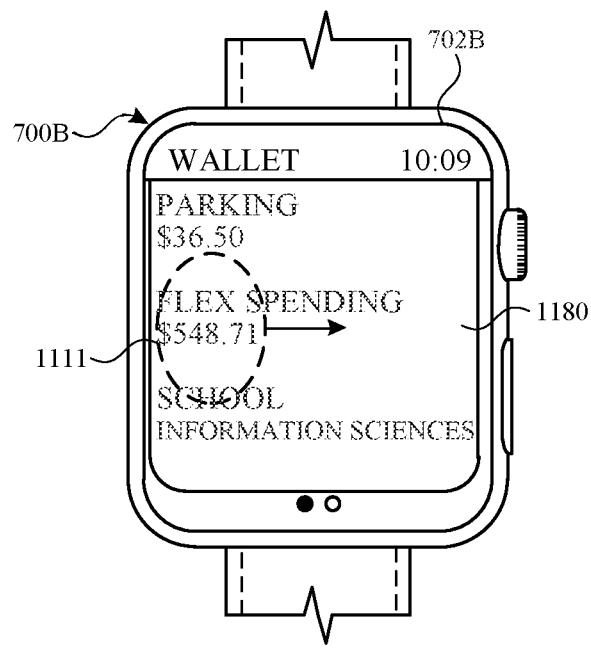

In FIG. 11U, while displaying transfer application user interface 1178 showing representation 1180 of the transfer-application account, electronic device 1100 detects (e.g., via a touch-sensitive surface of display 702B) an input 1111 (e.g., a horizontal swipe gesture on display 702B). As shown in FIG. 11V, in response to detecting input 1111, electronic device 1100 displays (e.g., replaces display of representation 1180 of the transfer-identification account with), in transfer application user interface 1178, a representation 1192 of a transfer account (e.g., a payment account, a stored-value account) different from the transfer-identification account. In some embodiments, further in response to detecting input 1111 (and thus replacing display of representation 1180 of the transfer-identification account with display of representation 1192 of the different transfer account), electronic device 1100 updates display of indicia elements 1190 to indicate that a representation of the different transfer account is currently being displayed (and is currently selected for use in transfer operation).

FIGS. 12A-12C are a flow diagram illustrating a method for managing the use of a transfer account associated with different credentials on an electronic device, in accordance with some embodiments. Method 1200 is performed at a device (e.g., 100, 300, 500, 700, 700B) with a display (e.g., 702, 702B) and a wireless communication radio (e.g., for NFC, Bluetooth, LTE, and/or WiFi connections). Some operations in method 1200 are, optionally, combined, the orders of some operations are, optionally, changed, and some operations are, optionally, omitted.

As described below, method 1200 provides an intuitive way for managing the use of a transfer account associated with different credentials on an electronic device. The method reduces the cognitive burden on a user for managing the use of a transfer account associated with different credentials on an electronic device, thereby creating a more efficient human-machine interface. For battery-operated computing devices, enabling a user to manage the use of a transfer account associated with different credentials faster and more efficiently conserves power and increases the time between battery charges.

The electronic device (e.g., 700, 700B) receives (1202) (e.g., while displaying a user interface (e.g., 1110, 1178) of a transfer application, such an electronic wallet application), via the wireless communication radio (e.g., for a NFC connection), information indicating a request for a credential (e.g., a transaction-type identifier associated with a transfer of items, such as a transfer of points, credits, resources, or funds; or an access-type identifier that is not associated with a transfer of items and is associated with authorizing access/entry to a particular secure location such as a secure room or building) from a second electronic device (e.g., 1140, 1146, 1152, a transaction terminal, a secure access terminal, such as a building access terminal, a card reader).

In response to receiving (1204) the information indicating the request for a credential from the second electronic device (e.g., 1140, 1146, 1152) (e.g., in accordance with a determination (1206) that the information indicating the request for the credential is of a first type (e.g., a transaction type, a payment type, a transfer type, such as a transfer of points, credits, or funds), the electronic device (e.g., 700, 700B) displays (1208), on the display (e.g., 702, 702B), a request (e.g., 1132) for authentication (e.g., biometric authentication, such as facial recognition authentication, fingerprint authentication; passcode or password authentication) to proceed with a transfer operation (e.g., a transfer of points, credits, resources, or funds, such as a payment) using (a credential of the first type associated with) a transfer account (e.g., an account that includes a plurality of different balances, such as funds, meal points, laundry credits, printer credits, and is also associated/linked with an identification card/account) associated with the electronic device. Displaying the request for authentication to proceed with the transfer operation using the transfer account in response to receiving the information indicating the request for a credential from the second electronic device improves feedback by enabling the user to quickly and easily recognize that authentication is required to authorize the device to proceed with the transfer operation. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Requesting authentication to proceed with the transfer operation using the transfer account also enhances device security by preventing fraudulent uses of the device to perform unauthorized transfer operations using the transfer account.

In some embodiments, the transfer account corresponds to a student identification account. In some embodiments, the student identification card is provisioned onto/linked to the electronic device (e.g., 700, 700B) using the provisioning process described above with reference to FIGS. 7A-7O.

In some embodiments, subsequent to (and while) displaying the request for authentication to proceed with a transfer operation using the transfer account, the electronic device (e.g., 700, 700B) receives (1210) (e.g., via one or more input devices and/or sensors of the device, such as a camera, a biometric sensor (e.g., a depth sensor), and/or a fingerprint sensor) authentication information (e.g., biometric authentication information, such as the user's facial features or fingerprint; passcode or password authentication). In some embodiments, in response to receiving (1212) the authentication information, in accordance with a determination that the received authentication information corresponds to registered authentication information (e.g., registered biometric information of the user, such as registered facial features or fingerprint; registered passcode or password), the electronic device proceeds (1214) with the transfer operation (e.g., a transfer of points, credits, resources, or funds, such as a payment) using the transfer account (e.g., using a balance associated with the transfer account). In some embodiments, in response to receiving (1212) the authentication information, in accordance with a determination that the received authentication information does not correspond to registered authentication information, the electronic device forgoes proceeding (1216) with the transfer operation using the transfer account. In some embodiments, in addition to forgoing proceeding with the transfer operation, the electronic device displays an indication that authentication was unsuccessful. In some embodiments, the electronic device further displays an indication that the user re-attempt authentication. Displaying the indication that the authentication was unsuccessful and/or displaying the indication that the user re-attempt authentication improves feedback by enabling the user to quickly and easily recognize that authentication was unsuccessful and that the user must take further action (e.g., re-attempt authentication) to authorize the device to proceed with the transfer operation using the transfer account. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In response to receiving (1204) the information indicating the request for a credential from the second electronic device (e.g., 1140, 1146, 1152), in accordance with a determination (1218) that the information indicating the request for a credential is of a second type (e.g., an access type, such as access to a secure location), the electronic device (e.g., 700, 700B) transmits (1220) (to the second electronic device), via the wireless communication radio, a credential of the second type associated with the transfer account without requesting authentication. (Automatically) transmitting, without further user input, the credential of the second type in accordance with the determination that the information indicating the request for a credential is of a second type and without requesting authentication enables the user to quickly and easily use the device for a transfer operation with minimal input. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device (e.g., 700, 700B) requests authentication prior to transmitting the credential to the second electronic device. Requesting authentication prior to transmitting the credential to the second electronic device enhances device security by preventing fraudulent uses of the device to perform unauthorized transfer operations using the transfer account. Thus, in some embodiments, in accordance with the determination that the information indicating the request for a credential is of the second type (e.g., relating to a secure access authorization), the electronic device displays (e.g., in a user interface of a transfer operation, such as an electronic wallet application) a request (e.g., 1132) for authentication (e.g., biometric authentication, such as facial recognition authentication, fingerprint authentication; passcode or password authentication) to proceed with transmitting the credential to the second electronic device. In some embodiments, in response to performing a successful authentication, the electronic device transmits the credential to the second electronic device.

In some embodiments, in accordance with the determination (1218) that the information indicating the request for a credential is of the second type (e.g., an access type, such as access to a secure location), the electronic device (e.g., 700, 700B) displays (1222), on the display (e.g., 702, 702B) (e.g., in a user interface (e.g., 1110, 1178) of a transfer application, such as an electronic wallet application, where the electronic wallet application is controlled by/directly associated with the operating system of the device), a representation (e.g., 1116, 1180) of the transfer account (e.g., an ID card-account, such as a student-ID card-account) (in addition to transmitting the credential of the second type to the second electronic device). Displaying the representation of the transfer account in accordance with the determination that the information indicating the request for the credential is of the second type improves feedback by enabling the user to quickly and easily recognize that the requested credential (by the second electronic device) is of the second type (and not of the first type). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the information indicating the request for the credential is of the second type and the second electronic device (e.g., 1152) is configured to control access to a secure location (e.g., configured to permit access to a secure location (e.g., by unlocking a secure door 1156) upon receiving a transmission of a credential that satisfy a set of access criteria (e.g., the credential is an authorized credential)).

In some embodiments, prior to receiving the information indicating the request for the credential, the electronic device (e.g., 700, 700B) displays (1224), on the display (e.g., 702, 702B) (e.g., in a user interface (e.g., 1110, 1178) of a transfer application, such as an electronic wallet application, where the electronic wallet application is controlled by/directly associated with the operating system of the device), a representation of the transfer account (e.g., an ID card-account, such as a student ID card-account), where the representation (e.g., 1116, 1180) of the transfer account includes sub-account balances associated with a plurality of sub-accounts (e.g., a meal point account, a laundry credit account, a printer credit account) associated with (e.g., linked to) the transfer account. Displaying the sub-account balances associated with a plurality of sub-accounts associated with the transfer account in the representation of the transfer enables the user to quickly and easily view available balances of the sub-accounts that are associated with the transfer account, thereby enhancing the operability of the device and making the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the representation of the transfer account also includes a name of the person (e.g., the student) associated with the account. In some embodiments, the representation of the transfer account also includes an image (e.g., photo) of the person associated with the account.

In some embodiments, while displaying the request for authentication to proceed with the transfer operation, the electronic device (e.g., 700, 700B) receives (1226) (e.g., via one or more input devices, such as a camera, a biometric sensor (e.g., depth sensor), or a fingerprint sensor) the authentication (e.g., biometric authentication, such as facial recognition authentication, fingerprint authentication, iris/retina scan authentication; passcode or password authentication) to proceed with the transfer operation. In some embodiments, subsequent to (e.g., in response to) receiving the (successful) authentication to proceed with the transfer operation using the transfer account, the electronic device automatically selects (1228), based on the information received from the second electronic device (e.g., a transaction terminal, a payment terminal), a first sub-account (e.g., a meal point account, a laundry credit account, a printer credit account) of the plurality of sub-accounts (e.g., corresponding to balances 1164A-1164D) associated with the transfer account to be used for the transfer operation. In some embodiments, after automatically selecting the first sub-account (e.g., and in response to receiving the (successful) authentication to proceed with the transfer operation using the transfer account), the electronic device proceeds (1230) with the transfer operation using the selected first sub-account.

In some embodiments, the first sub-account is selected from the group consisting of a cash account, a meal point account, a laundry credit account, and a printer credit account.

In some embodiments, in response to receiving (1204) the information indicating the request for a credential from the second electronic device (e.g., 1152), in accordance with the determination (1218) that the information indicating the request for a credential is of the second type (e.g., relating to a secure access authorization) (e.g., and after displaying the request for authentication and receiving successful authentication), the electronic device (e.g., 700, 700B) transmits (1232) (to the second electronic device), via the wireless communication radio, the credential of the second type without causing a change to (any of) the sub-account balances of the plurality of sub-accounts associated with the transfer account. For example, the second electronic device is a secure access terminal (e.g., 1152) to a secure location (e.g., a secure building secured by secure door 1156), and the credential transmitted to the secure access terminal grants access to the secure location (e.g., by unlocking a door) without affecting any of the sub-account balances associated with transfer account. (Automatically) transmitting the credential of the second type to the secure access terminal without affecting any of the sub-account balances associated with the transfer account enables the user to quickly and easily, with minimal input, gain access to the secure location using the electronic device. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the representation (e.g., 1116, 1180) of the transfer account, the electronic device (e.g., 700, 700B) detects (1234) (e.g., via a touch-sensitive surface of the display) an activation (e.g., 1105, a touch input) of an information affordance (e.g., 1130) of the representation of the transfer account. In some embodiments, in response to detecting the activation of the transfer account, the electronic device displays (1236), on the display (e.g., 702, 702B), an information page (e.g., 1158) associated with the transfer account, where the information page includes detailed information about the transfer account (e.g., including different types of information (e.g., information not displayed as part of the representation of the transfer account) and options relating to the account, such as balance information, account numbers, account use history, an contact button for contacting/calling an administrator of the account).

In some embodiments, the information page includes a contact affordance (e.g., 1166) for contacting (e.g., calling) an administrator of the transfer account. Providing the contact affordance for contacting the administrator of the transfer account in the information page associated with the transfer account enables the user to quickly and easily contact the administrator when the need arises, thus enhancing the operability of the device and making the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the transfer account is a student ID account associated with a particular school (e.g., a university), and the administrator is an administrator of that school.

In some embodiments, the information page (e.g., 1158) associated with the transfer account includes an express mode affordance (e.g., 1160, a toggle having an "on" state and an "off" state) associated with changing an authentication requirement for the transfer account, and where displaying the request for authentication to proceed with the transfer operation using the transfer account comprises displaying the request (e.g., 1132) for authentication to proceed with the transfer operation using the transfer account in accordance with a determination that authentication is required for the transfer account (e.g., the express mode affordance is in an off state). Providing the express mode affordance for changing the authentication requirement for a transfer provides the user with more control of the device and enhances device security, thereby enhancing the operability of the device and making the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, when the express mode affordance is in the off state, the electronic device (e.g., 700, 700B) requests authentication (e.g., biometric authentication, such as facial recognition authentication, fingerprint authentication, iris/retina scan authentication; passcode or password authentication) prior to proceeding with a transfer operation using the transfer account. In some embodiments, when the express mode affordance is in the on state, the electronic device does not request authentication prior to proceeding with a transfer operation using the transfer account. In some embodiments, a non-express mode state is the default state. In some embodiments, an express mode state is the default state.

In some embodiments, the representation (e.g., 1116, 1180) of the transfer account is a student identification account (e.g., a student ID card of a university student with one or more different balances, such as meal points, laundry credits, that can be used, for example, for services provided by the university), and the representation of the transfer account includes a plurality of information items associated with the student associated with the student identification account (e.g., a name of the student, a photo of the student, a status (undergraduate or graduate) of the student, a student ID number of the student).

In some embodiments, in response to receiving (1204) the information indicating the request for a credential from the second electronic device (e.g., 1140, 1146, 1152), in accordance with the determination (1206) that the information indicating the request for the credential is of the first type (e.g., and in accordance with a determination that the electronic device (e.g., 700B) is a wearable electronic device, such as a smartwatch, or in accordance with a determination that the size of the display of the electronic device is smaller than a threshold size), the electronic device displays (1238), on the display (e.g., 702B) (e.g., in a user interface (e.g., 1178) of a transfer application, such as an electronic wallet application), a representation (e.g., 1180) of the transfer account (e.g., an ID card-account, such as a student ID card that is also associated with one or more stored-value accounts or transfer accounts), where the representation of the transfer account includes a sub-account balance (e.g., corresponding to 1188A) associated with a first sub-account (e.g., a meal point account, a laundry credit account, a printer credit account) of the transfer account, where the transfer account includes a plurality of sub-accounts including the first sub-account. Providing (only) the first sub-account balance of the transfer account, where the transfer account includes a plurality of sub-accounts including the first sub-account, reduces clustering on the display of the electronic device and thus enables the user to more easily view items of information provided on the display of the electronic device (e.g., particularly if the device has a relatively small display, such as the display of a smartwatch). Providing useful and/or important information items without cluttering the UI with additional displayed controls or items enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the representation of the transfer account (e.g., a student ID account) also includes a name of the person (e.g., the student) associated with the account. In some embodiments, the representation of the transfer account also includes an image (e.g., photo) of the person associated with the account. In some embodiments, in response to detecting a swipe input (e.g., 1111, in a left direction or in a right direction), the electronic device displays (e.g., replaces display of the representation of the transfer with) a representation (e.g., 1192) of an account (different from the transfer account) provisioned on the electronic device.

In some embodiments, while displaying the representation (e.g., 1180) of the transfer account, the electronic device (e.g., 700B) detects (1240) (e.g., via a touch-sensitive surface of the display or via a rotatable input device 703B of the electronic device) an input of a first type (e.g., a scrolling gesture on the display, a rotating gesture 1109 on the rotatable input device). In some embodiments, in response to detecting the input of the first type, the electronic device displays (1242), on the display (e.g., 702B), a sub-account balance (e.g., corresponding to 1188B associated with a second sub-account (e.g., a meal point account, a laundry credit account, a printer credit account) of the transfer account (e.g., concurrently with the sub-account balance associated with the first sub-account). Displaying the sub-account balance associated with the second sub-account in response to detecting the input of the first type enables the user to quickly and easily view other sub-account balances. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, prior to receiving the information indicating the request for a credential from the second electronic device (e.g., 1140, 1146, 1152, a transaction terminal, a secure access terminal), the electronic device (e.g., 700, 700B) detects (e.g., via one or more input devices of the device, such as a mechanical input button) an input of a second type (e.g., activation of a mechanical input element such as a double-click input on the mechanical input button). In some embodiments, in response to detecting the input of the second type, the electronic device displays, on the display (e.g., 702, 702B), a user interface (e.g., 1110, 1178) of a transfer application (e.g., an electronic wallet application, where the electronic wallet application is a first-party application controlled by/directly associated with the operating system of the device), where a representation of a default transfer account (e.g., a default stored-value account, a default credit card) different from the transfer account is displayed in a current-account region of the user interface (e.g., the region of the user interface showing the representation of an account that is currently-selected for use in a transfer operation).

In some embodiments, the user interface (e.g., 1110, 1178) of the transfer application includes, in a selectable-accounts region of the user interface (different from the current-account region of the user interface), a plurality of representations (e.g., of stack 1114) of accounts different from the default transfer account, and where the plurality of representations of accounts different from the default transfer account includes a representation (e.g., 1116, 1180) of the transfer account.

In some embodiments, the user interface (e.g., 1110, 1178) of the transfer application includes, in a selectable-accounts region of the user interface (different from the current-account region of the user interface), a plurality of representations (e.g., of stack 1114) of accounts different from the default transfer account and includes, in a transfer account region of the user interface (different from the current-account region and the selectable-accounts region of the user interface) a representation (e.g., 1116, 1180) of the transfer account. Displaying the representation of the transfer account in the transfer account region of the user interface that is different from the current-account region and the selectable-accounts region of the user interface highlights the transfer account from the other transfer accounts and thus improves feedback by enabling the user to quickly and easily view and select the transfer account for use in a transfer operation. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 1200 (e.g., FIG. 12) are also applicable in an analogous manner to the methods described above. For example, method 800 optionally includes one or more of the characteristics of the various methods described above with reference to method 1200. For example, a transfer-identification account associated can be provisioned on an electronic device using the provisioning processes of method 800. For another example, method 1000 optionally includes one or more of the characteristics of the various methods described above with reference to method 1200. For example, a credential of a transfer-identification account can be used via an electronic device in a low-power state using the processes described in method 1000. For brevity, these details are not repeated below.

FIGS. 13A-13W illustrate exemplary devices and user interfaces for managing the use of credentials on an electronic device, in accordance with some embodiments. The user interfaces in these figures are used to illustrate the processes described below, including the process in FIG. 14.

FIG. 13A illustrates an electronic device 1300 (e.g., a smartwatch, a smartphone, a mobile device) similar to (or the same as) electronic device 700 described above with reference to FIGS. 7A-7O, electronic device 700 described above with reference to FIGS. 9A-9J, and electronic device 700 described above with reference to FIGS. 11A-11V. Electronic device 1300 includes a display 1302 and a wireless communication radio (e.g., for near-field communication (NFC), Bluetooth, WiFi, LTE connections). In some embodiments, electronic device 1300 includes one or more input devices (e.g., a touch-sensitive surface of display 1302, a mechanical input device (e.g., mechanical input button 1301), a rotatable input device 1304), one or more output devices (e.g., an audio speaker), and one or more sensors (e.g., a biometric sensor, such as a depth sensor, a fingerprint sensor).

As will be explained in more detail below, in some embodiments, one or more accounts (e.g., an identification account, a secure access card) provisioned on electronic device 1300 may be set to an "express mode." In some embodiments, an account set to express mode can be used via electronic device 1300 to perform a transfer operation with a second electronic device (e.g., a transaction terminal, such as a secure access terminal) without receiving authentication (e.g., biometric authentication, such as facial recognition authentication, fingerprint authentication, or iris/retina scan authentication; passcode or password authentication) from the user (e.g., without receiving authentication from the user after the electronic device has received, from the second electronic device, a request for credentials of the one or more accounts). In some embodiments, an account that is not set to express mode or an account that is not available for use in express mode requires authentication (e.g., biometric authentication, such as facial recognition authentication, fingerprint authentication, or iris/retina scan authentication; passcode or password authentication, double-press of hardware button while the electronic device is in the unlocked state) from the user to perform the transfer operation (e.g., authentication from the user is required after the electronic device has received, from the second electronic device, a request for credentials of the one or more accounts). In some embodiments, a second electronic device, such as a terminal, can require authentication for an account (e.g., when requesting credentials of the account) of the electronic device even if that account is set to express mode.

FIG. 13A-13G illustrate electronic device 1300 (e.g., a smartwatch worn by a user) that is configured for a university identification account (e.g., a university identification card of the user). In FIGS. 13A-13G, the university identification account is not configured for express mode. At FIG. 13A, electronic device 1300 is being held by the user of the electronic device 1300 near a secure access terminal 1310A associated with a secure location (e.g., a secure entrance to a secure location, such as a locked door to a secure room or building) while no identification accounts provisioned on the electronic device 1300 are set to express mode. As shown, in some embodiments, the display 1302 is in an off-state. In some embodiments, the electronic device 1300 may display one or more user interfaces on the display 1302.

At FIG. 13A, because no identifications accounts of electronic device 1300 are enabled for express mode, the electronic device 1300 is not actively listening, via the wireless communication radio, for a request for credentials of the university identification account. In some embodiments, electronic device 1300 detects (e.g., via a wireless communication radio of the device) the presence of a field 1305A generated by secure access terminal 1310A, but does not receive, process, and/or act on any request for credentials (e.g., request for credentials of the university account). In some embodiments, secure access terminal 1310A is configured to control access to a secure location (e.g., a room, a building) by locking/unlocking a secure door 1312A and is pre-configured to be compatible with an identification account of the electronic device 1300. Accordingly, while detecting the presence of field 1305A, the electronic device 1300 receives a request for a credential (e.g., identification account credential) from the secure access terminal 1310A. Because the requested university identification account is not set to express mode and the university identification account has not been authenticated for a transfer operation, in response to (or subsequent to, after) the request for the credential, the electronic device 1300 forgoes transmitting a credential of the university identification account (or any other account) (e.g., a secure access account) to secure access terminal 1310A. As shown in FIG. 13B, because the credential for the university identification account was not provided to secure access terminal 1310A, secure door 1312A remains locked.

In FIG. 13C, the electronic device 1300 receives an input 1370 (e.g., a double click/press) on mechanical input button 1301. In some embodiments, the electronic device 1300 receives the input 1370 while the display 1302 is in an off state. In some embodiments, the electronic device 1300 receives the input 1370 while the electronic device is displaying, on the display 1302, a user interface, such as a clock application user interface. In some embodiments, in response to receiving input 1370 on mechanical input button 1301, the electronic device authenticates one or more transfer accounts (e.g., identification accounts) provisioned on the electronic device for a transfer operation.

As shown in FIG. 13D, electronic device 1300 determines if electronic device 1300 is in an unlocked state when input 1370 is received. In accordance with not being in the unlocked state, electronic device 1300 does not enable the university identification account to be authenticated for transfer. In accordance with device 1300 being in the unlocked state, electronic device enables the university identification account to be transferred (via authentication). Further in response to input 1370, electronic device 1300 displays, on display 1302, a transfer application user interface 1320 of a transfer application (e.g., a first-party electronic wallet application controlled by/directly associated with the operating system of the device). In some embodiments, transfer application user interface 1320 includes a representation 1322 of the university identification account associated with an account owner of the university identification account. In some embodiments, representation 1322 of the university identification account includes an image 1321, a name 1323 (e.g., Teo Appleseed), and a status 1325 (e.g., student, undergraduate student, graduate student, professor, staff) associated with the account-owner (e.g., Teo Appleseed). Transfer application user interface 1322 of the university identification account also includes hold-near-reader terminal request 1327 (e.g., including a visual indication, such as a graphical animation of the device moving, and/or a textual indication stating "Hold Near Reader") requesting that the electronic device 1300 be placed near a terminal (e.g., a contactless transaction terminal, a transit terminal, a secure access terminal) such that the device can detect (e.g., via a wireless communication radio of the device) a field (e.g., a near-field communication (NFC)-based field) generated by the terminal. In some embodiments, transfer application user interface 1322 includes one or more indicia elements 1329 corresponding to a number of accounts (including the university identification account) accessible by electronic device 1300 (e.g., transfer accounts available to be authenticated in response to input 1370) and indicating the currently-displayed account (the university identification account).

Figure 13E:
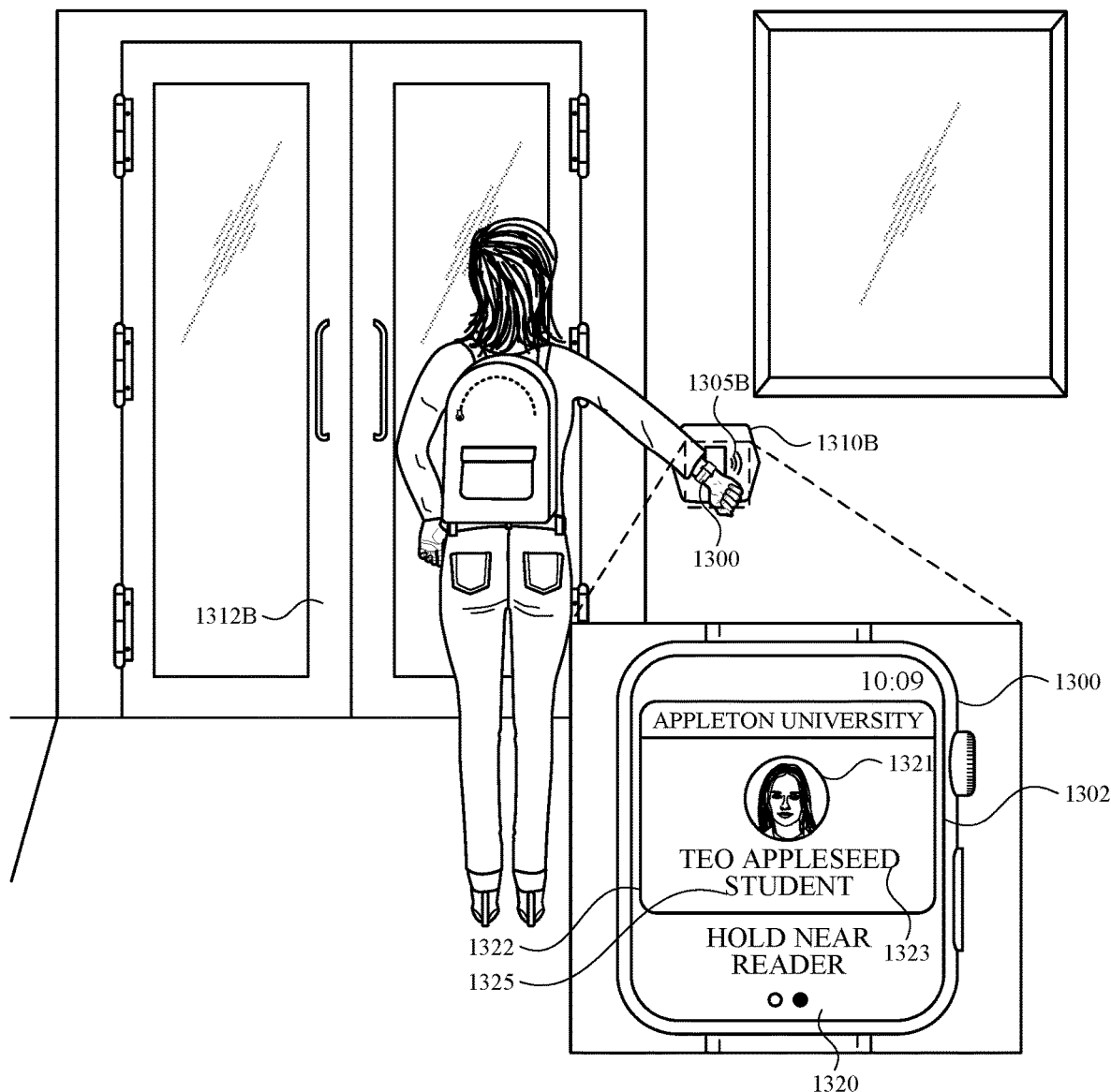

In FIG. 13E, electronic device 1300 detects (e.g., via a wireless communication radio of the device) the presence of a field 1305B generated by secure access terminal 1310B while the university identification account is authenticated (e.g., in response to user input 1370) to use in a transfer operation (e.g., secure access request). In some embodiments, secure access terminal 1310B is configured to control access to a secure location (e.g., a room, a building) by locking/unlocking a secure door 1312B. In some embodiments, the identification account is pre-configured to be compatible with secure access terminal 1310B, and optionally, the university identification account is associated with/controlled by the institution (e.g., Appleton University) associated with secure access terminal 1310B. Accordingly, while detecting the presence of field 1305B, the electronic device 1300 receives a request for a credential of the university identification account from the secure access terminal 1310B (that optionally includes a request for authentication of the university identification account).

Figure 13F:
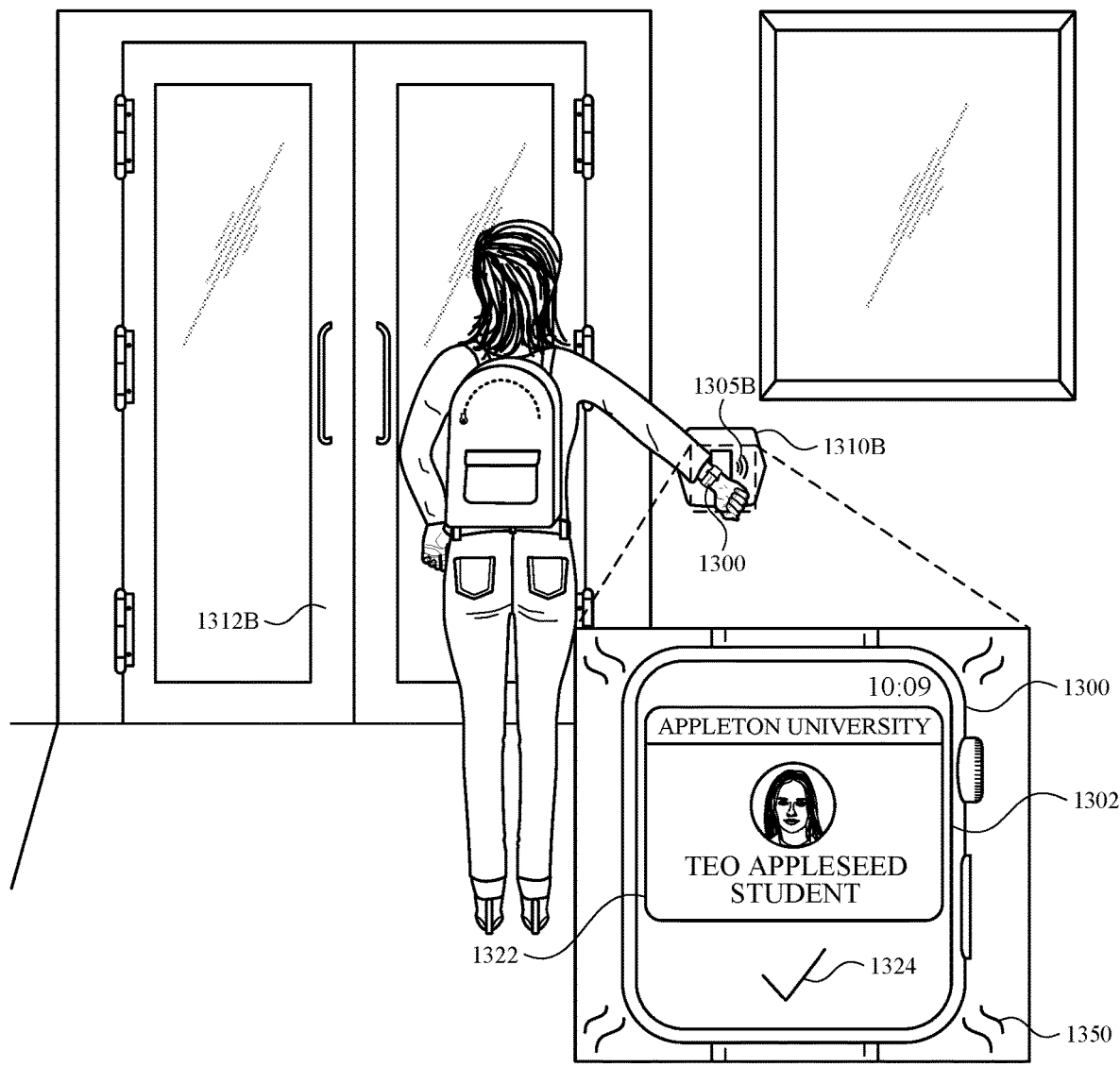
Figure 13G:
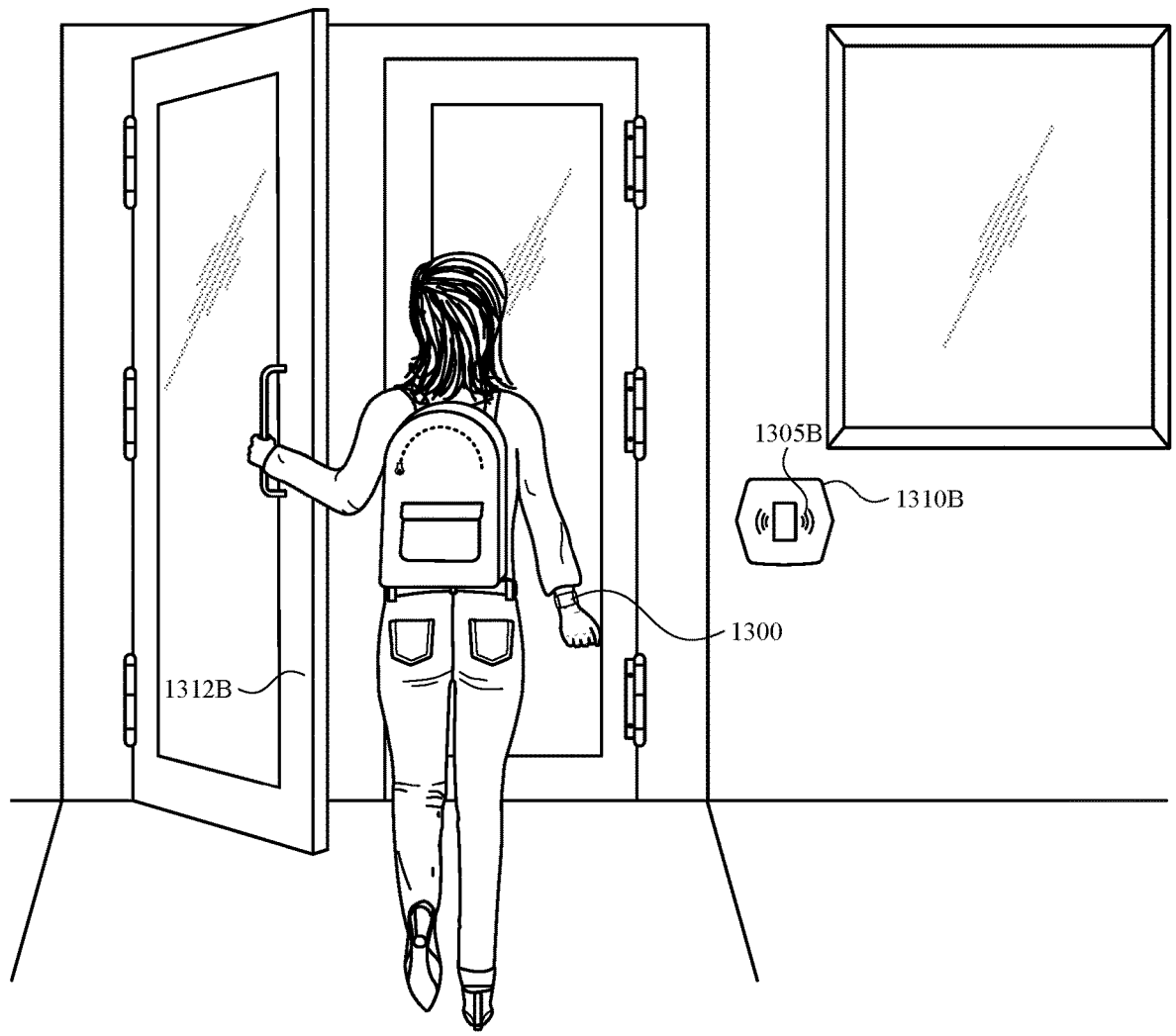

In some embodiments, in response to (or subsequent to, after) receiving the request for the credential from secure access terminal 1310B, electronic device 1300 transmits (e.g., via a wireless communication radio of the device) the credential (e.g., access credential) of the university identification account to secure access terminal 1310B (e.g., without requiring the user to authenticate again, and regardless of whether secure access terminal 1310B has requested authentication for the university identification account). In response, as shown in FIG. 13F, the electronic device displays (e.g., replaces display of hold-near-terminal request 1327 with) success indicator 1324, indicating that the credential has been successfully provided to the secure access terminal 1310B. Device 1300 also provides confirmation audio and confirmation tactile feedback 1350 (e.g., in conjunction with transmitting the credential). As shown in FIG. 13G, transmitting the credential of the university identification account to secure access terminal 1310B causes secure door 1312B to open and/or unlock, thus enabling the user to access the secure location.

Figure 13H:
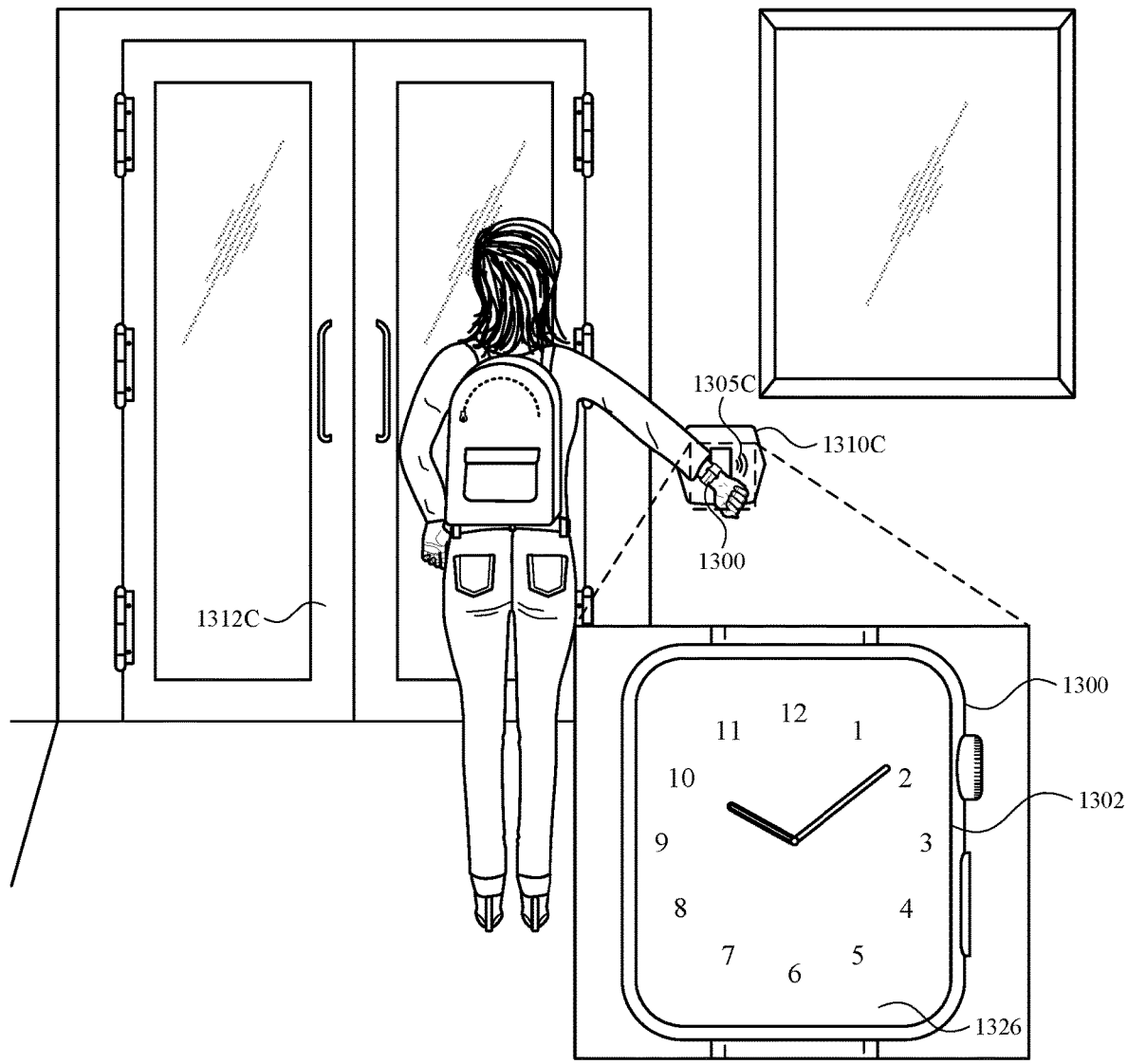
Figure 13I:
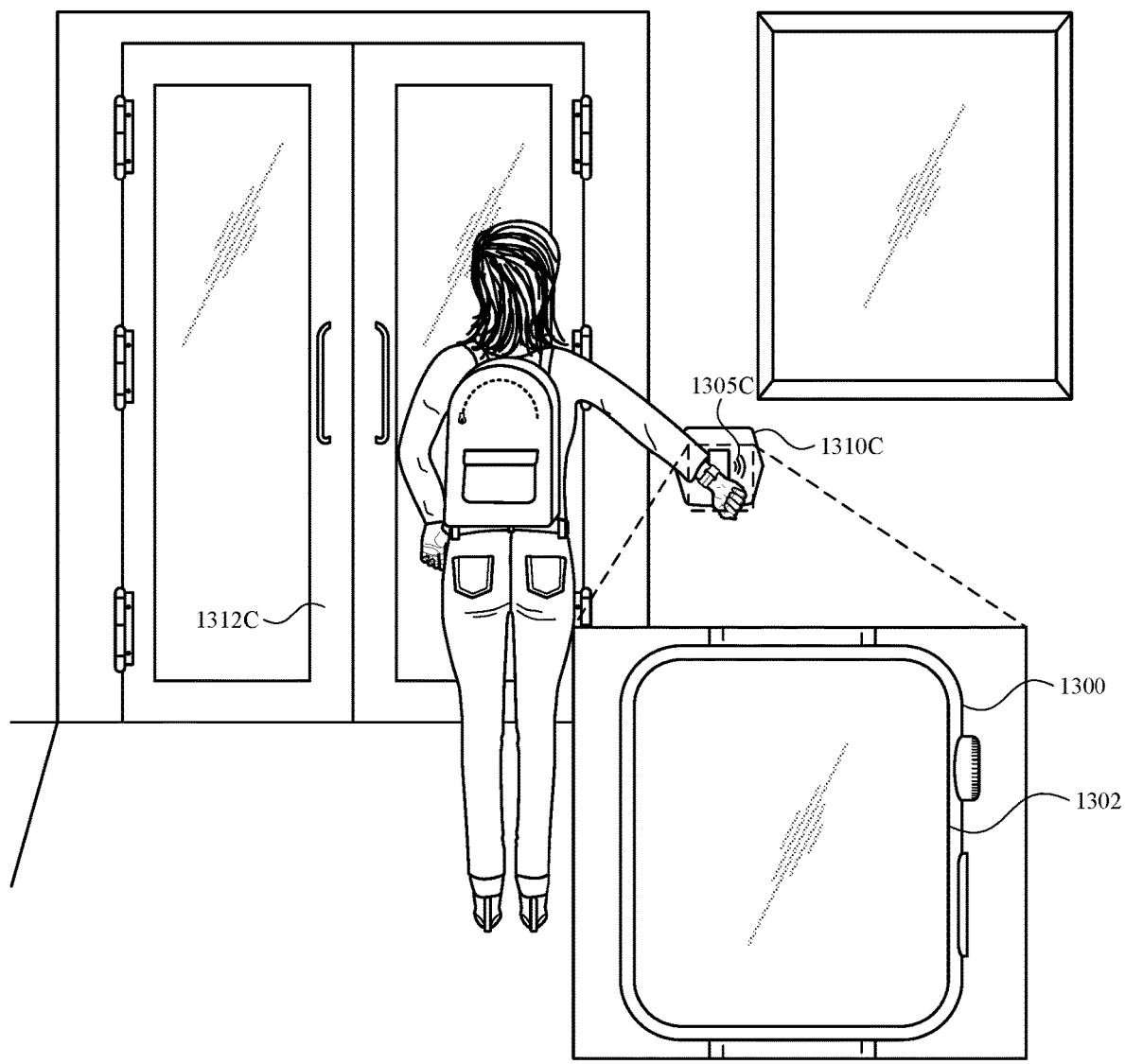

FIG. 13H illustrates electronic device 1300 being held by the user of the electronic device 1300 near a secure access terminal 1310C associated with a secure location (e.g., a secure entrance to a secure location, such as a locked door to a secure room or building) while the university identification account that is provisioned on the electronic device 1300 is set to express mode, and no transfer accounts are separately authenticated for a transfer operation. As shown, in some embodiments, the display 1302 may display one or more user interfaces on the display 1302, such as a clock user interface 1326 when the request for a credential (discussed below) is received. Alternatively, in some embodiments, the display 1302 is in an off state, as shown in FIG. 13I, when the request for a credential (discussed below) is received.

In FIG. 13H (or, alternatively, FIG. 13I), electronic device 1300 detects (e.g., via a wireless communication radio of the device) the presence of a field 1305C generated by secure access terminal 1310A. In some embodiments, secure access terminal 1310C is configured to control access to a secure location (e.g., a room, a building) by locking/unlocking a secure door 1312C and is pre-configured to be compatible with the university identification account of the electronic device 1300. Accordingly, while detecting the presence of field 1305C, the electronic device 1300 receives a request for a credential for the university identification account from the secure access terminal 1310C.

Figure 13J:
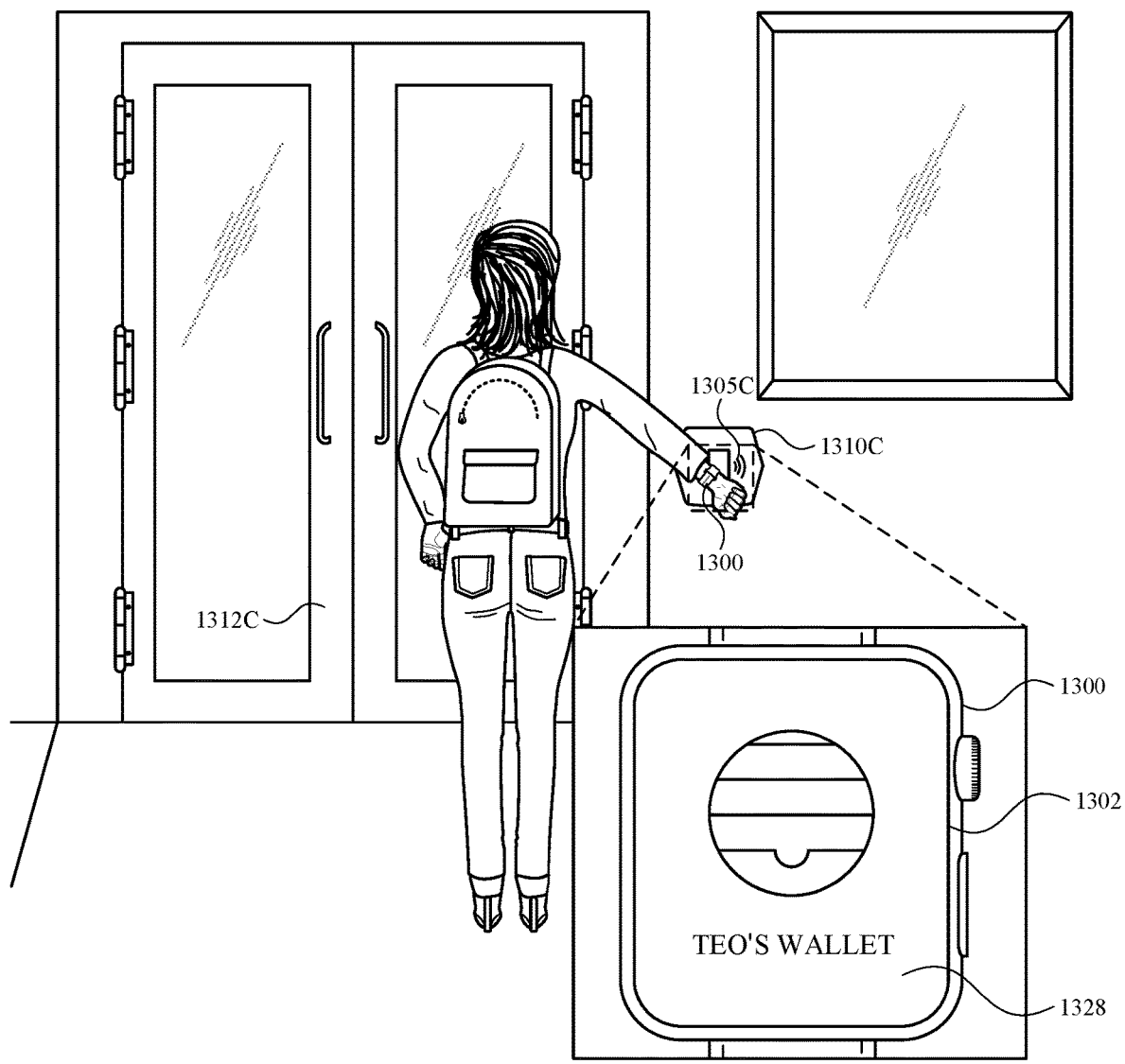

As described, in some instances, a device (e.g., secure access terminal), can require authentication of a transfer account prior to a transfer operation (e.g., as part of a request for credentials for an identification account), even if the requested account is set to express mode. In FIG. 13H, the secure access terminal 1310C indicates (e.g., by way of field 1305C, in the request for the credential of the university identification account), that electronic device 1300 should require authentication before performing the transfer operation of the credential of the university identification account to secure access terminal 1310C. Accordingly, in FIG. 13J, in response (or subsequent to) receiving the request for a credential from secure access terminal 1310C, and further in response to determining that authentication is required for a transfer operation (e.g., in response to an indication from the secure access terminal 1310C), the electronic device 1300 displays (e.g., replaces display of clock interface 1126 with) transfer application user interface 1328 without transmitting the credential for the university identification account.

Figure 13K:
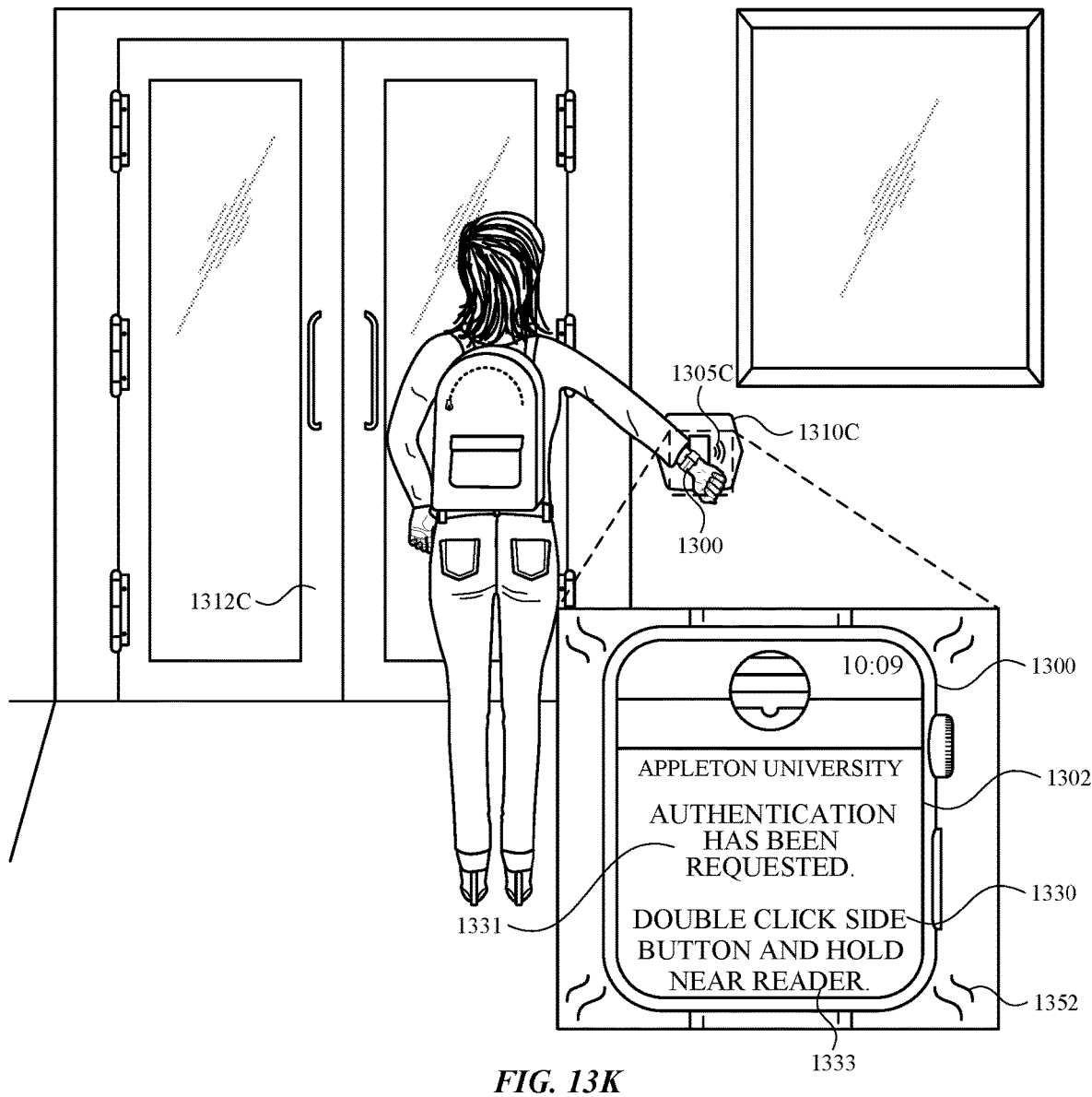

In FIG. 13K, subsequent to (e.g., a predetermined amount of time, such as 0.5 seconds, 1 second, or 3 seconds, after) displaying transfer application user interface 1328, electronic device 1300 displays (e.g., replaces transfer application user interface 1328 with), transfer application user interface 1330. Transfer application user interface 1330 includes authentication request indicator 1331 and an input-and-hold-near-terminal request 1333. In some embodiments, authentication request indicator 1331 indicates that authentication of a transfer account is required, for instance by secure access terminal 1310C, when the device determines that the secure access terminal 1310C has requested authentication (e.g., as part of the request), even if express mode is enabled for the transfer account. The authentication request indicator 1331 may recite, for instance, that "Authentication has been requested."

Figure 13L:
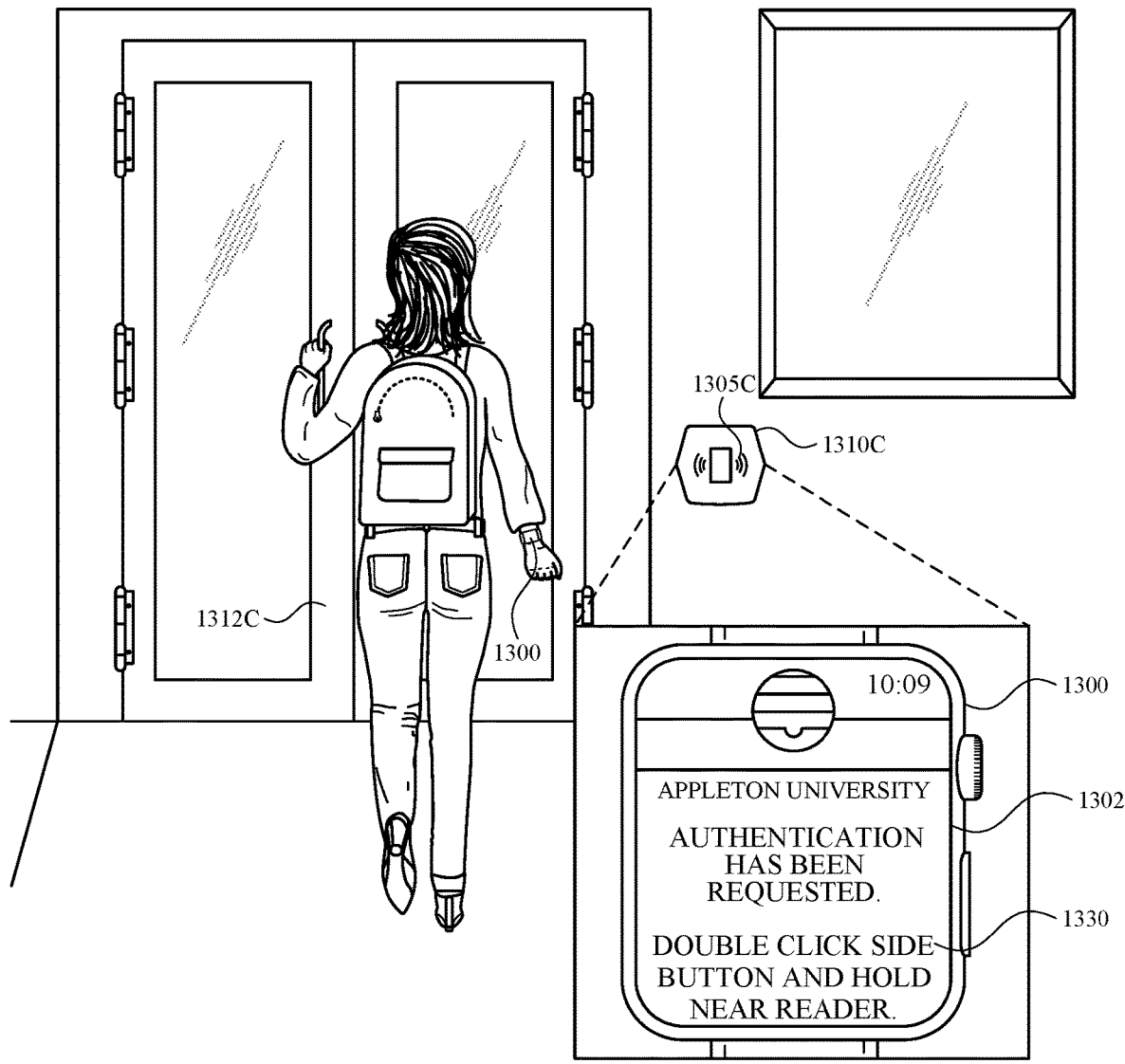

In some embodiments, input-and-hold-near-terminal request 1333 includes a visual indication, such as a graphical animation and/or a textual indication indicating the manner in which the user can perform a transfer operation. A graphical animation may be an animation of a user input (e.g., double press input) and/or movement of the electronic device, and the textual indication may be text stating "Double Click Side Near Reader and Hold". Accordingly, each of the graphical animation or the textual indication can request that the user provide an input (e.g., double press input) and place the device near a terminal (e.g., a contactless transaction terminal, a transit terminal, a secure access terminal) such that the device can detect (e.g., via a wireless communication radio of the device) a field (e.g., a near-field communication (NFC)-based field) generated by the terminal. In some examples, the transfer application user interface 1330 is displayed using a first color scheme corresponding to the institution (e.g., Appleton University) associated with the requested university identification account and/or the secure access terminal 1312C. In some embodiments, in response to receiving the request and in accordance with a determination that the secure access terminal 1312C has requested authentication and/or while displaying the transfer application user interface 1330, the electronic device 1300 provides a haptic output 1352 and/or an audio output to inform the user that authentication is required before the university identification account credential will be transmitted. In FIG. 13L, because secure access terminal 1312C requested authentication for the university identification account, door 1312C remains locked despite the university identification account being set to express mode.

FIGS. 13M-13P illustrate electronic device 1300, while displaying transfer application user interface 1330, receiving a series of inputs to authenticate a transfer account for a transfer operation. In some embodiments, the device authenticates the university identification account in response to detecting a double-press of mechanical input button 1301 (e.g., when the device also determines that the device is unlocked when the double-press is received, but not when the device determines that the device is locked when the double-press is received). As illustrated in FIG. 13M, the electronic device receives an input 1372 (e.g., a rotating input) on rotatable input device 1304 (e.g., in a clockwise direction), thus causing the transfer application user interface 1330 to be scrolled. As shown in FIG. 13N, in some embodiments, scrolling transfer application user interface 1330 in this manner causes the electronic device 1300 to display additional elements of transfer application user interface 1330, including an express mode indicator 1335 and a dismiss affordance 1332. The express mode indicator 1335 indicates, for instance, that express mode is unavailable because the secure access terminal 1310C has indicated (e.g., as part of the request) that authentication is required to perform a transfer operation.

Figure 13O:
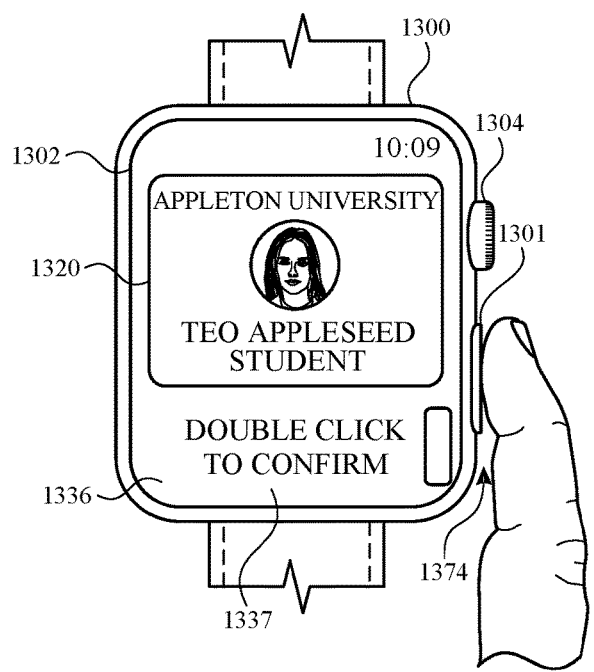
Figure 13P:
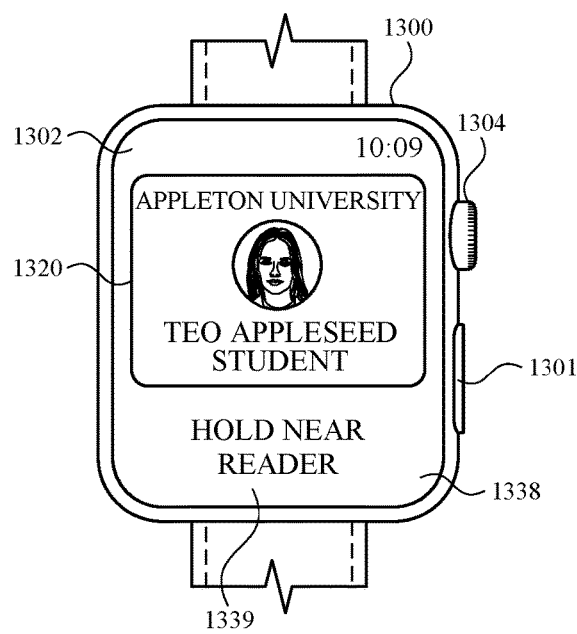

While displaying the transfer application user interface 1330, the electronic device 1300 detects selection (e.g., activation) of dismiss affordance 1332. For example, as shown in FIG. 13N, the selection is a tap gesture 1334. In response to selection of the dismiss affordance 1332, the electronic device displays (e.g., replaces display of the transfer application user interface 1330 with) transfer application user interface 1336, as shown in FIG. 13O. Transfer application user interface 1336 includes representation 1320 associated with the university identification account and confirmation request 1337 requesting that the user provide an input (e.g., double-press of mechanical input button 1301) to authenticate the university identification account for a transfer operation. In the examples of FIG. 13O-13P, the device does not provide an option to easily access other accounts provisioned on electronic device 1300 (e.g., other than the university identification account) because device 1300 has received a request for the university identification account.

While displaying, on display 1302, the transfer application user interface 1336, the electronic device 1300 receives an input (e.g., input requested by confirmation request 1337). For example, the electronic device 1300 receives input 1374 on mechanical input button 1301. As shown in FIG. 13P, in response to input 1374, the electronic device 1300 enables the university identification account for transfer and displays (e.g., replaces display of transfer application user interface 1336 with) transfer application user interface 1338. Transfer application user interface 1338 includes representation 1320 associated with the university identification account and hold-near-reader terminal request 1339 (e.g., including a visual indication, such as a graphical animation of the device moving, and/or a textual indication stating "Hold Near Reader") requesting that the electronic device 1300 be placed near a terminal (e.g., a contactless transaction terminal, a secure access terminal) such that the device can detect (e.g., via a wireless communication radio of the device) a field (e.g., a near-field communication (NFC)-based field) generated by the terminal.

While description is made herein with respect to the electronic device receiving an input authorizing an account for a transfer operation while displaying the transfer application user interface 1336 (e.g., input 1374), in some embodiments, the electronic device 1300 receives an input (e.g., double press input) authorizing a transfer account while displaying one or more other interfaces. By way of example, the electronic device may receive an input authorizing a transfer account for a transfer operation while displaying transfer application user interface 1330 (FIGS. 13L-13N).

Figure 13Q:
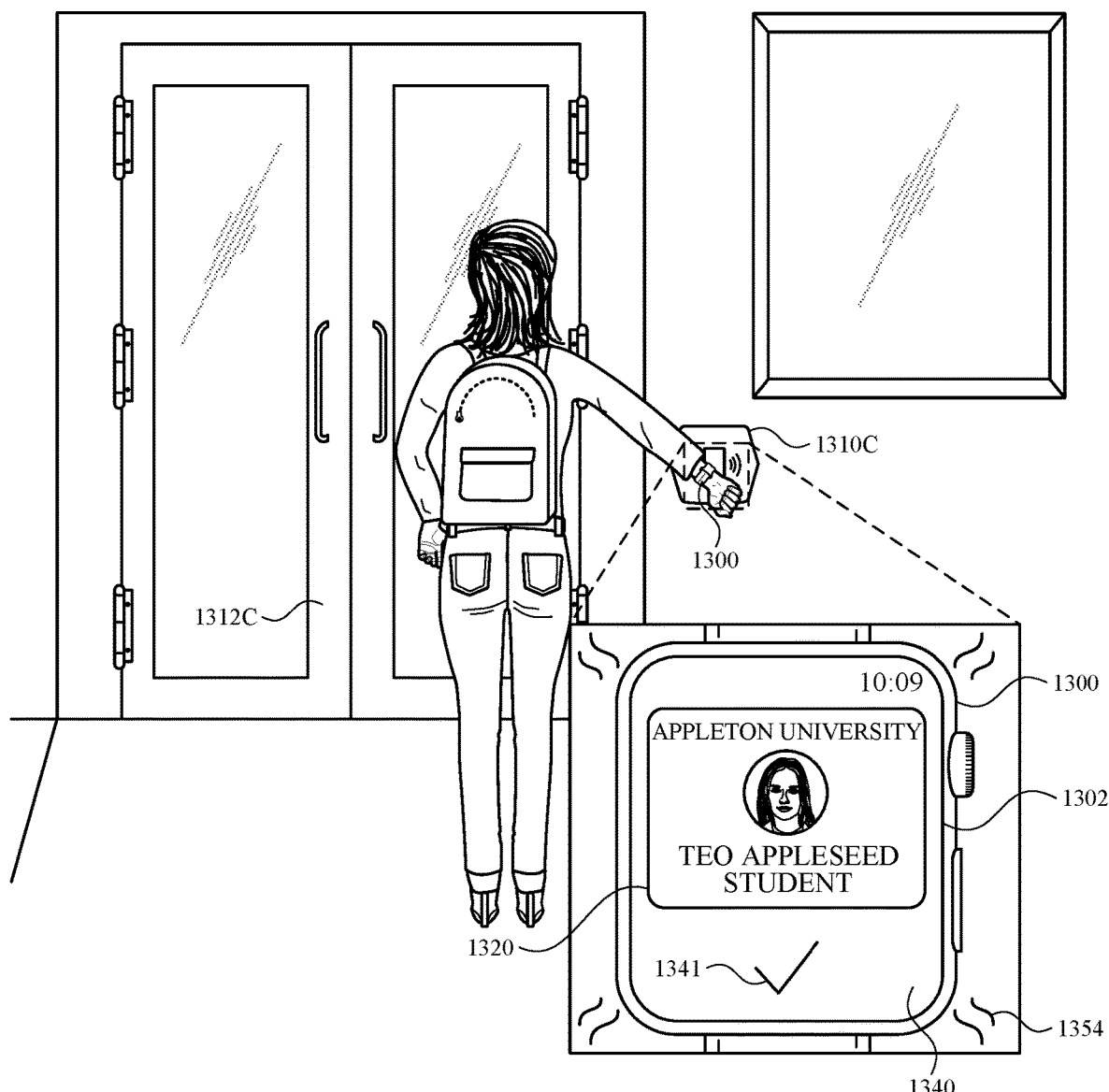
Figure 13R:
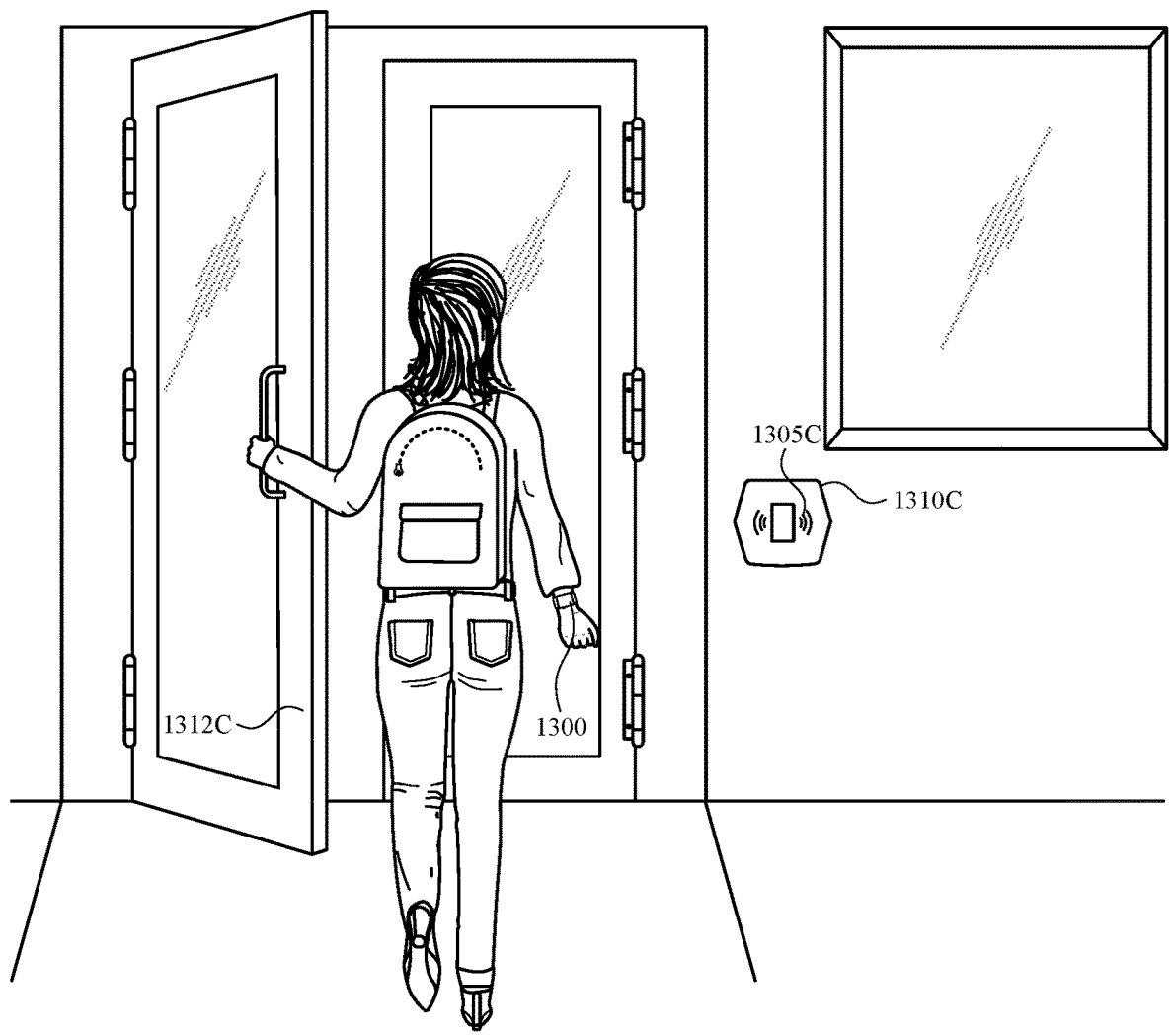

Once a transfer account is authenticated, for instance as described with respect to FIGS. 13M-13P, the user can place the electronic device 1300 near secure access terminal 1310C to perform the transfer operation. For example, as described, the user can place the electronic device near secure access terminal 1310C such that the electronic device receives a request for a credential from the secure access terminal 1310C while detecting field 1305C. As illustrated in FIG. 13Q, once the electronic device 1300 has provided the credential for the requested university identification account, electronic device 1300 displays transfer application user interface 1340. Transfer application user interface 1340 includes representation 1320 associated with the university identification account and success indicator 1341 indicating that the credential has been successfully provided to the secure access terminal 1310C. In some embodiments, while displaying the transfer application user interface 1340, the electronic device 1300 provides a haptic output 1354 and/or an audio output (e.g., in conjunction with transmitting the credential). As shown in FIG. 13R, transmitting the credential of the university identification account to secure access terminal 1310C causes secure door 1312C to open and/or unlock, thus enabling the user to access the secure location.

Figure 13S:
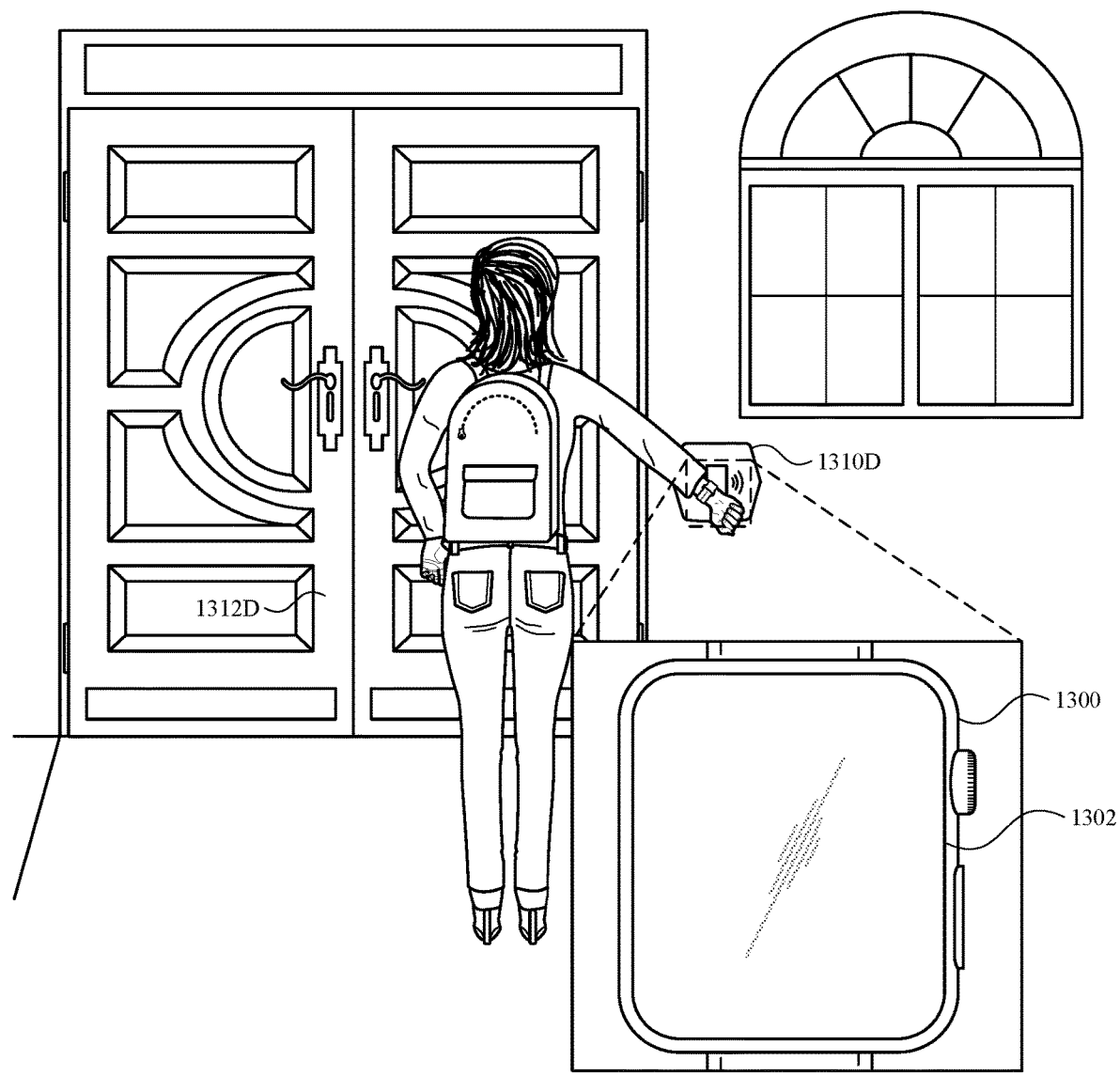

FIG. 13S illustrates electronic device 1300 being held by the user of the electronic device 1300 near a secure access terminal 1310D associated with a secure location (e.g., a secure entrance to a secure location, such as a locked door to a secure room or building) while a transfer account (e.g., a university identification account) provisioned on the electronic device 1300 is set to express mode and no transfer accounts are authenticated. The secure access terminal 1310D is configured to receive credentials for transfer accounts set to express mode and does not require authorization of transfer accounts to perform a transfer operation.

In FIG. 13S, electronic device 1300 detects (e.g., via a wireless communication radio of the device) the presence of a field 1305D generated by secure access terminal 1310D. In some embodiments, secure access terminal 1310D is configured to control access to a secure location (e.g., a room, a building) by locking/unlocking a secure door 1312D and is pre-configured to be compatible with the university identification account of electronic device 1300. Accordingly, while detecting the presence of field 1305D, the electronic device 1300 receives a request for a credential (e.g., identification account credential) of the university identification account from the secure access terminal 1310D. Because the university identification account is set to express mode and secure access terminal 1310D has not requested authentication of the university identification account, in response to (or subsequent to, after) the request for the credential, the electronic device 1300 transmits (e.g., without requiring further user input) a credential of the university identification account (e.g., a secure access account) to secure access terminal 1310D.

Figure 13T:
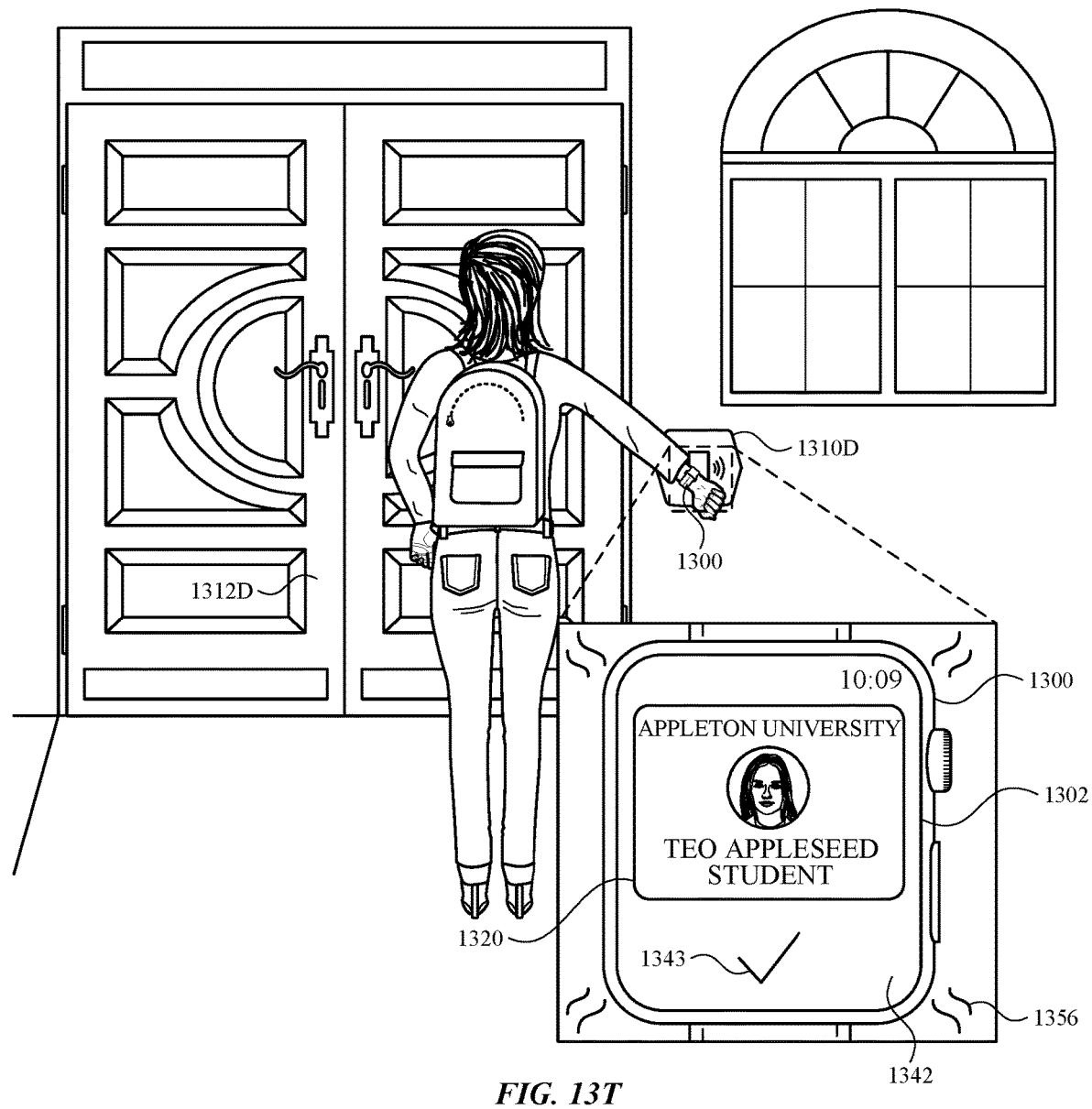
Figure 13U:
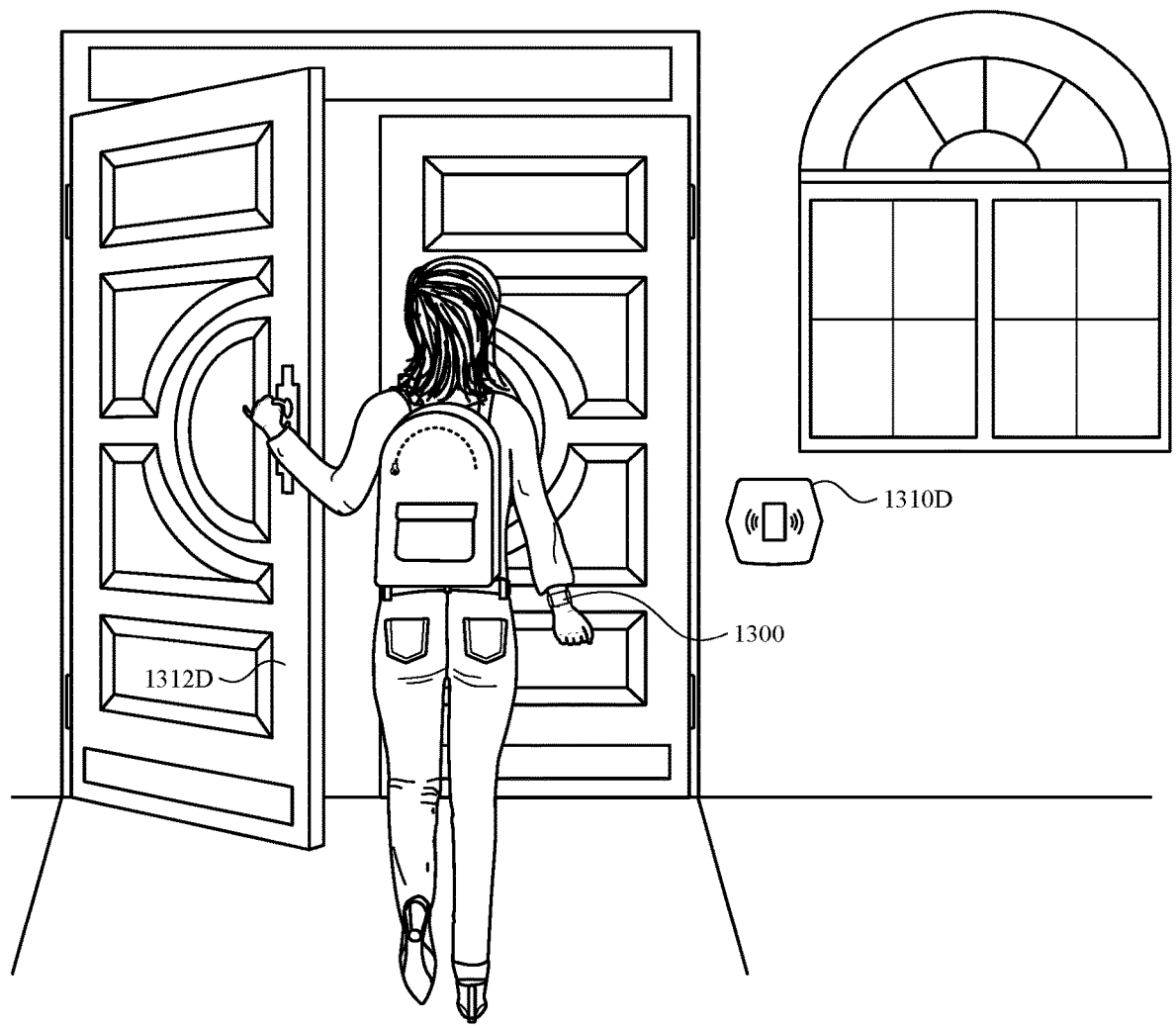

As illustrated in FIG. 13T, once the electronic device 1300 has provided the credential for the university identification request, the electronic device 1300 displays transfer application user interface 1342. Transfer application user interface 1342 includes representation 1320 associated with the university identification account and success indicator 1343 indicating that the credential has been successfully provided to the secure access terminal 1310D. In some embodiments, while displaying the transfer application user interface 1342, the electronic device 1300 provides a haptic output 1356 and/or an audio output (e.g., in conjunction with transmitting the credential). As shown in FIG. 13U, transmitting the credential of the university identification account to secure access terminal 1310D causes secure door 1312D to open and/or unlock, thus enabling the user to access the secure location.

Figure 13V:
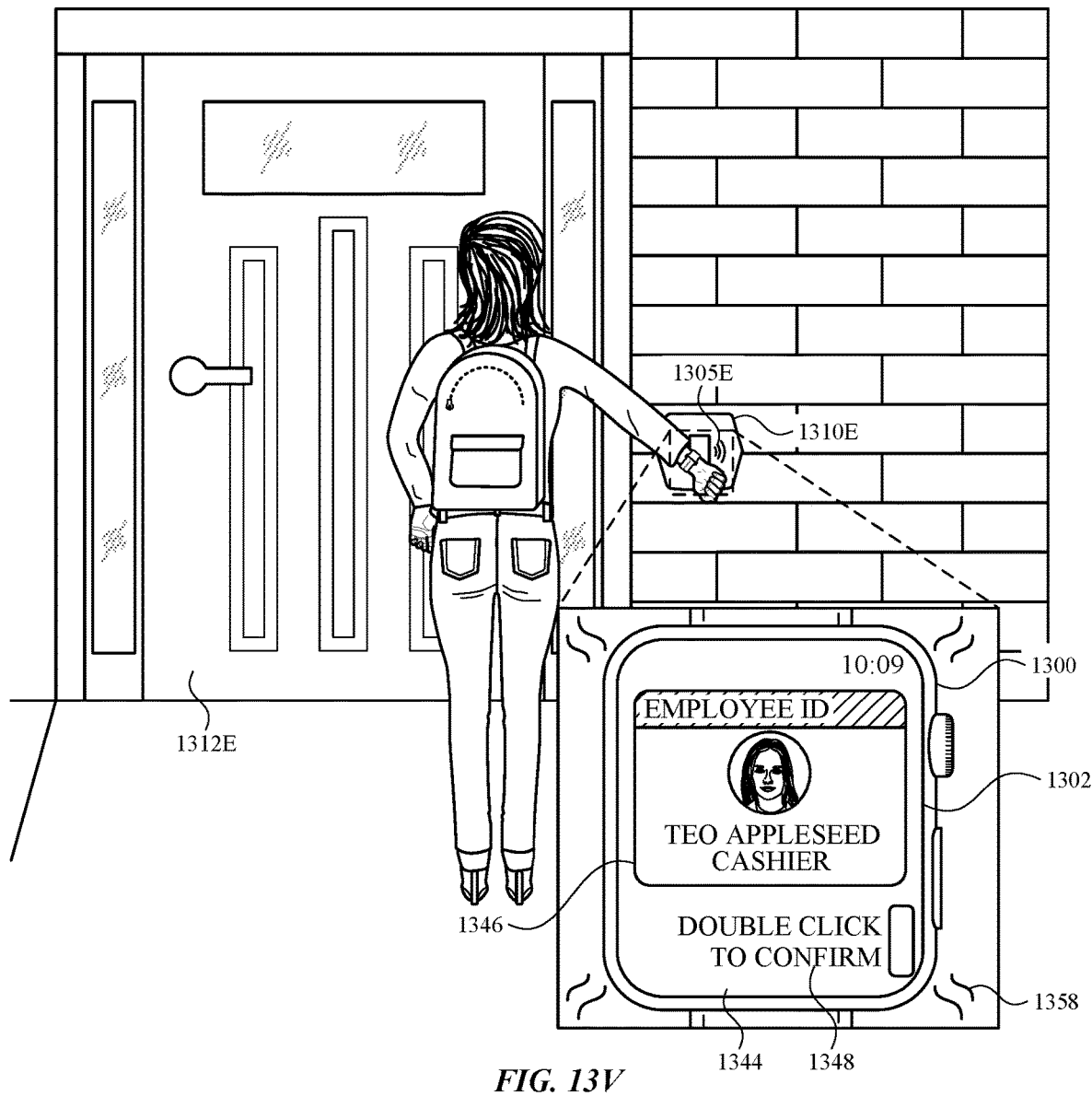
Figure 13W:
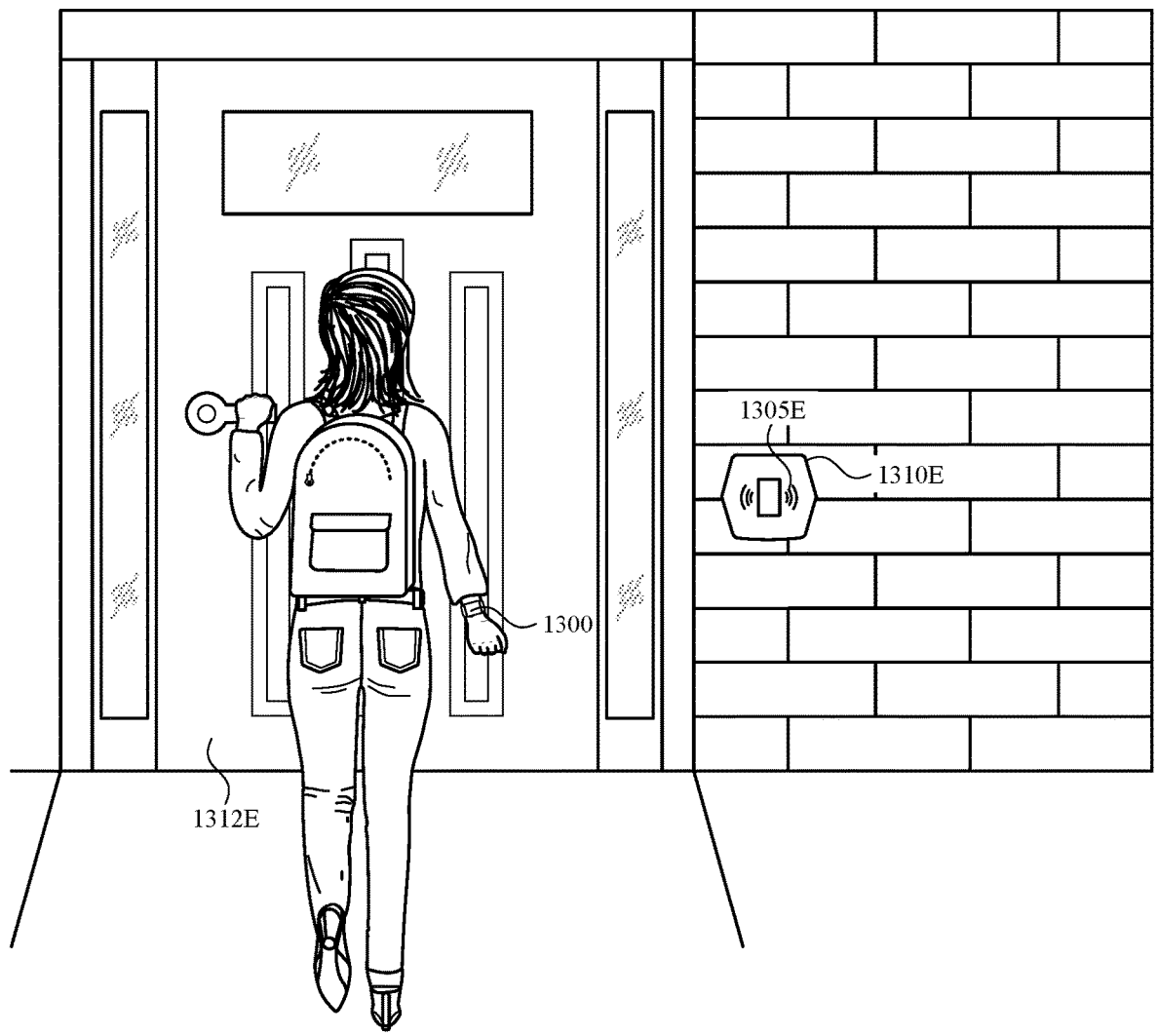

FIG. 13V illustrates electronic device 1300 being held by the user of the electronic device 1300 near a secure access terminal 1311E associated with a secure location (e.g., a secure entrance to a secure location, such as a locked door to a secure room or building) while a first transfer account (e.g., a student university identification account) on the electronic device 1300 is set to express mode, a second transfer account (e.g., an employee identification account) is not set to express mode, and no transfer accounts are authenticated. The secure access terminal 1310E is configured to receive employee identification account credentials and does not require authorization for accounts that are set to express mode.

In FIG. 13V, electronic device 1300 detects (e.g., via a wireless communication radio of the device) the presence of a field 1305E generated by secure access terminal 1310E. In some embodiments, secure access terminal 1310E is configured to control access to a secure location (e.g., a room, a building) by locking/unlocking a secure door 1312E and is pre-configured to be compatible with the employee identification account provisioned onto electronic device 1300. Accordingly, while detecting the presence of field 1305E, the electronic device 1300 receives a request for a credential (e.g., identification account credential) for the employee identification account from the secure access terminal 1310E.

Because the employee identification account is not set to express mode, the electronic device 1300 forgoes transmitting a credential of the employee identification account (e.g., a secure access account) to secure access terminal 1310E, even though the university identification account is set to express mode, and secure door 1312E remains locked, as shown in FIG. 13W. In some examples, further in response to the request, the electronic device displays transfer application user interface 1344. Transfer application user interface 1344 includes representation 1346 associated with the employee identification account and confirmation request 1348 requesting that the user provide an input (e.g., double-press of mechanical input button 1301) to authenticate the employee identification account for a transfer operation. In some embodiments, while displaying the transfer application user interface 1344, the electronic device further provides a haptic output 1358 and/or an audio output (e.g., in conjunction with displaying transfer application user interface 1344). As described, the user may provide an input (e.g., double-press if mechanical input button 1301) to authenticate the employee identification account for a transfer operation. If the user does not provide the requested input, no credential is provided to secure access terminal 1310E, and secure door 1312E remains locked, as shown in FIG. 13W.

FIG. 14 is a flow diagram illustrating a method for managing the use of credentials using an electronic device in accordance with some embodiments. Method 1400 is performed at a device (e.g., 100, 300, 500, 600, 1300) with one or more wireless communication radios. The electronic device is stores (e.g., in a secure element) information (e.g., used to generate credentials) for a first account (e.g., an identification card or account). Some operations in method 1400 are, optionally, combined, the orders of some operations are, optionally, changed, and some operations are, optionally, omitted.

As described below, method 1400 provides an intuitive way for managing the use of credentials. The method reduces the cognitive burden on a user for authenticating accounts and managing credentials, thereby creating a more efficient human-machine interface that is more secure. For battery-operated computing devices, enabling a user to manage use of credentials faster and more efficiently conserves power and increases the time between battery charges.

The electronic device (e.g., 1300) receives (1402) from a communication terminal (e.g., 1310, an NFC card reader device), via the one or more wireless communication radios, a request for a credential (e.g., a request for a credential of the first account). In response (1404) to receiving the request for the credential, in accordance with a determination that authentication has been provided for the first account (e.g., such that the electronic device is in an authentication provided state for the first account) (e.g., authentication to transmit the credential of the first account for a single request, the electronic device has received pre-authentication by detecting a double-press of a hardware button prior to receiving the request for the credential of the first account), the electronic device (e.g., 1300) transmits (1406) (e.g., to the communication terminal, while the device is in the authentication provided state for the first account, regardless of whether the first account is of the first type and regardless of whether the request corresponds to an authentication required request), via the one or more wireless communication radios, the credential of the first account without requesting authentication. Thus, when authentication has been provided, the electronic device does not request authentication in response to receiving the request regardless of whether the request corresponds to a high security request or a low security request.

In response (1404) to receiving the request for the credential, in accordance with a determination that authentication has not been provided for the first account (e.g., such that the electronic device is not in the authentication provided state for the first account), that the first account has been set up at the electronic device to provide credentials without requiring authentication (e.g., an express type, also referred to as an express mode-enabled account), and authentication is required by the communication terminal (e.g., a high security request, the second device is at a high-security location and has requested authentication at the electronic device), the electronic device (e.g., 1300) requests (1408) authentication (e.g., 1333, 1352, displaying a visual request on a display device and/or generating a tactile output) at the electronic device (e.g., 1300) without transmitting the credential of the first account. In some examples, the electronic device determines that the request corresponds to the authentication required request by determining that the request included a request for authentication.

Requesting authentication without transmitting credentials when the communication terminal requests authentication, even when the account has been set up at the device to provide credentials without requiring authentication, provides enhanced security by requiring user authentication at the time that the credential is requested (e.g., after receiving the request). Providing enhanced security makes the accounts stored at the electronic device more secure.

In response (1404) to receiving the request for the credential, in accordance with a determination that authentication has not been provided for the first account such that the electronic device is not in the authentication provided state for the first account, that the first account has been set up at the electronic device to provide credentials without requiring authentication (e.g., an express type, also referred to as an express mode-enabled account), and authentication is not required by the communication terminal (e.g., the second device is not at a high-security location and has not requested authentication at the electronic device), the electronic device (e.g., 1300) transmits (1410) (e.g., to the communication terminal), via the one or more wireless communication radios, the credential of the first account without requesting authentication at the electronic device. In some examples, the electronic device determines that the request does not correspond to the authentication required request by determining that the request does not included a request for authentication.

Transmitting the credentials of the first account when first account has been set up at the electronic device to provide credentials without requiring authentication reduces the number of inputs (e.g., no need for authentication information) to perform the transmitting of the credential. Reducing the number of inputs required enhances the operability of the device and makes the user-device interface more efficient (e.g., by reducing user mistakes when operating/interacting with the device, by reducing false negatives of authentication) which, additionally, reduces power usage and improves battery life of the device by enabling the user to use the device more quickly and efficiently.

In accordance with some embodiments, if the requested account is not pre-armed and the requested card has not been set up for express authentication, the device requests authentication from the user (even when the reader does not request authentication).

In accordance with some embodiments, in response (1404) to receiving the request for the credential, in accordance with a determination that authentication has not been provided for the first account (e.g., such that the electronic device is not in the authentication provided state for the first account) and that the first account has not been set up at the device to provide credentials without requiring authentication (e.g., not an express type), the electronic device (e.g., 1300) requests (1412) authentication (e.g., 1333, 1352, displaying a visual request on a display device and/or generating a tactile output) at the electronic device without transmitting the credential of the first account. Thus, when authentication has not been provided, the electronic device requests authentication in response to receiving the request regardless of whether the request corresponds to a high security request or a low security request. For example, the electronic device is configured with a plurality of accounts (including the first account, and a second account). In accordance with the first account not being express-mode enabled and the second account being express-mode enabled, the electronic device requests authentication for the first account (without transmitting the credentials of the first account) regardless of whether the request corresponds to a low security request or a high security request.

Requesting authentication without transmitting credentials (when the account has not been set up at the device to provide credentials without requiring authentication) provides enhanced security by requiring user authentication at the time that the credential is requested (e.g., after receiving the request). Providing enhanced security makes the accounts stored at the electronic device more secure.

In accordance with some embodiments, if the requested account is pre-armed, electronic device 1300 disarms the account after transmitting credentials for the account (e.g., single-use authentication). In some embodiments, transmitting (e.g., in response to receiving the request for the credential and in accordance with the determination that authentication has been provided for the first account) the credential of the first account without requesting authentication includes: transitioning (e.g., after transmitting the credential of the first account without requesting authentication) the electronic device such that authentication is no longer provided for the first account. Disarming the device (after transmitting when it was pre-armed, by transitioning to a state where such that authentication is no longer provided for the first account provides enhanced security by requiring user authentication again to pre-arm the device. Providing enhanced security makes the accounts stored at the electronic device more secure.

In accordance with some embodiments, in response to receiving the request for the credential (and, optionally, prior to transmitting the credential of the first account and prior to requesting authentication), the electronic device (e.g., 1300) identifies, based on information in the request, the first account (e.g., from among a plurality of accounts stored at the electronic device). Thus, the electronic device analyzes the received request to determine to which account the request corresponds. In some embodiments, communication terminal requests credentials of a particular account (e.g., the first account). Identifying the requested account based on information received from the communication terminal reduces (or removes) the need for the user to provide additional input to select the account. Reducing the number of user inputs required enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, after requesting authentication at the device, the electronic device (e.g., 1300) receives authentication from the user and transmit credentials. In some embodiments, subsequent to requesting authentication at the electronic device (e.g., and without transmitting the credential of the first account), the electronic device (e.g., 1300) receives, via one or more input devices (e.g., biometric input device(s), camera sensor(s), fingerprint reader(s), keyboard(s), or activation of a physical input mechanism such as a button while the device is in an unlocked state, such as an unlocked state that is maintained while the device continues to be worn and/or within a predetermined proximity to the user), authentication information. The electronic device, subsequent to receiving the authentication information (e.g., in response to receiving the authentication information or in response to moving the device within proximity of the communication terminal after the authentication information is received), in accordance with a determination that the received authentication information corresponds to registered authentication information (e.g., the facial recognition confirms the user is authorized, the fingerprint matches/corresponds to a registered fingerprint, the password matches/corresponds to a registered password), transmits (e.g., to the communication terminal, NFC card reader device), via the one or more wireless communication radios, the credential (e.g., of the first account). In accordance with a determination that the received authentication information does not correspond to registered authentication information (e.g., the facial recognition does not confirm the user is authorized, the fingerprint does not match/correspond to a registered fingerprint, the password does not match/correspond to a registered password), foregoing transmitting (e.g., to the communication terminal, NFC card reader device), via the one or more wireless communication radios, the credential (e.g., of the first account) and, optionally, displaying an indication that authentication failed.

In accordance with some embodiments, the electronic device (e.g., 1300) provides, for a pre-determined # of times (e.g., 3 times), the user with an explanation (e.g., 1331) about why authentication is required when account is express mode (e.g., the terminal requested authentication). In some embodiments, requesting authentication at the electronic device without transmitting the credential of the first account (in accordance with the determination that authentication has not been provided for the first account (e.g., such that the electronic device is not in the authentication provided state for the first account) and that the first account has been set up at the electronic device to provide credentials without requiring authentication (e.g., an express type, also referred to as an express mode-enabled account), and authentication is required by the communication terminal), includes: in accordance with a determination that an explanatory user interface has not been displayed more than the (e.g., non-zero) threshold number (e.g., three, four) of times (e.g., when authentication has not been provided, the first account has been set up to provide credentials without requiring authentication, and authentication is required by the communication terminal), displaying the explanation user interface that includes an explanation indicating why authentication is required (e.g., an explanation user interface that includes an indication that the communication terminal required the authentication) (e.g., as part of an authentication user interface, without displaying the authentication user interface). Thus, when the electronic device has provided a sufficient number of explanations to the user of the device about why authentication is required (when the first account is an express mode-enabled account), the device no longer provides the explanation. In some embodiments, requesting authentication at the electronic device without transmitting the credential of the first account includes: in accordance with a determination that an explanatory user interface has been displayed more than a (e.g., non-zero) threshold number of times (e.g., when authentication has not been provided, the first account has been set up to provide credentials without requiring authentication, and authentication is required by the communication terminal), forgoing displaying the explanation user interface (and, optionally, display the authentication user interface, instead) (e.g., without displaying explanation indicating why authentication is required, without displaying the explanation user interface that includes an explanation indicating why authentication is required). In some embodiments, the authentication user interface includes instructions on how to authenticate.

Providing the user with visual explanations about why authentication is required (when the first account is an express mode-enabled account) enables the user to avoid attempting to use the first account at communication terminals that require authentication without first authenticating, thereby reducing the number of transmissions (via the one or more communication terminals) between the electronic device and the communication terminal. Reducing the number of transmissions (via the one or more communication terminals) reduces power usage and improves battery life of the device. Further, the device provides the user with an indication of the error state of the device (why credentials were not transmitted).

In accordance with some embodiments, the electronic device provides a first output (e.g., confirmation output, audio and/or haptic) when transmitting credentials to reader (e.g., when reader does not request authentication). In some embodiments, the electronic device (e.g., 1300) generates, at the electronic device, a confirmation output (e.g., visual output, audio output, and/or tactile output) in conjunction with transmitting the credential of the first account.

In accordance with some embodiments, the electronic device (e.g., 1300) provide second output (e.g., authentication request output, audio and/or haptic) different from first output when authentication is requested by the reader.

In accordance with some embodiments, in response to receiving the request for authentication, the electronic device (e.g., 1300) generates, at the electronic device, a second output (e.g., visual output, audio output, and/or tactile output that is, optionally, different from the confirmation output or alternatively is the same as the confirmation output) indicating that authentication is requested. Providing different outputs provides the user with feedback about whether the transmission was successful or whether authentication is required. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, an account is selected from among a plurality of accounts. In some embodiments, the electronic device stores a plurality of accounts that are specific to a user of the electronic device, the plurality of accounts including the first account and a second account that is different from the first account. In some embodiments, requesting authentication at the electronic device without transmitting the credential of the first account includes displaying an indication of the first account (e.g., 1333) without displaying an indication that other accounts are available for use. Thus, when the communication terminal has requested credentials of the first account, the device displays an indication of the first account without displaying an indication of the second account. While displaying the indication of the first account, the device disables access (e.g., via a single user input) to authenticate the second account. In some embodiments, requesting authentication at the electronic device without transmitting the credential of the first account includes displaying the indication of the first account without displaying an indication of any other account of the plurality of accounts.

In accordance with some embodiments, the electronic device (e.g., 1300) stores a plurality of accounts that are specific to a user of the electronic device, the plurality of accounts including the first account and a second account that is different from the first account. In accordance with some embodiments, at least one of the first account and the second account has been set up at the electronic device to provide credentials without requiring authentication, and at least one of the first account and the second account has not been set up at the electronic device to provide credentials without requiring authentication.

In accordance with some embodiments, the electronic device (e.g., 1300) stores a plurality of accounts that are specific to a user of the electronic device, the plurality of accounts including the first account and a second account that is different from the first account. In accordance with some embodiments, in accordance with a determination that at least one account of the plurality of accounts has been set up at the electronic device to provide credentials without requiring authentication or authentication has been provided for any of the plurality of accounts, the electronic device (e.g., 1300) listens for communications requesting wirelessly transmitted credentials, via the one or more wireless communication radios. In accordance with some embodiments, in accordance with a determination that no account of the plurality of accounts has been set up at the electronic device to provide credentials without requiring authentication and authentication has not been provided for any of the plurality of accounts, the electronic device (e.g., 1300) forgoes listening for communications requesting wirelessly transmitted credentials, via the one or more wireless communication radios (e.g., operating the radios in an active reception mode, automatically (e.g., without user input)).

In accordance with some embodiments, requesting authentication (e.g., displaying a visual request on a display device and/or generating a tactile output) at the electronic device includes: in accordance with a determination that the request corresponds to the first account, displaying a user interface (e.g., explanatory user interface, authentication user interface) using a first color scheme (e.g., that corresponds to a color scheme for a visually displayed card corresponding to the first account); and in accordance with a determination that the request corresponds to a second account, displaying a user interface (e.g., explanatory user interface, authentication user interface) using a second color scheme that is different from the first color scheme (e.g., that corresponds to a color scheme for a visually displayed card corresponding to the second account).

Providing different color schemes based on the request correspondence provides the user with visual feedback about which account the contactless terminal is requesting, enabling the user to decide whether certain actions are appropriate (e.g., whether to provide authorization). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 1400 (e.g., FIG. 14) are also applicable in an analogous manner to the methods described above. For example, method 900 optionally includes one or more of the characteristics of the various methods described above with reference to methods 800, 1000, and 1200. For example, information about a credential (e.g., credential as described in method 1400) can be input on an electronic device using the provisioning processes of method 800. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the use of different types of transfer accounts and different types of credentials associated with a transfer account when performing a transfer operation. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to enable a quicker and more efficient yet secure use of a transfer account for use in a transfer operation. Accordingly, use of such personal information data enables users to rely on quicker and more efficient uses of the electronic device for transfer operations while being assured of device security. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of the use of transfer accounts for transfer operations, the present technology can be configured to allow users to select to "opt in" or "opt out" of participation in the collection of personal information data during registration for services or anytime thereafter. In another example, users can select to provision and use one transfer account that requires that the user provide relatively fewer personal information over a different transfer account that requires that the user provide relatively more personal information. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, transfer accounts, such as an operating system-controlled and maintained first-party transfer account, that require a bare minimum amount of personal information can be provided to the user for use via the electronic device for transfer operations.

What is claimed is:

1. An electronic device, comprising:
one or more wireless communication radios capable of using near-field communication;
one or more processors; and
memory storing one or more programs configured to be executed by the one or more processors,
wherein the electronic device is storing information for a first account, the one or more programs including instructions for:
receiving from a communication terminal, via the one or more wireless communication radios, a request for a credential; and
in response to receiving the request for the credential:
in accordance with a determination that authentication has been provided for the first account, transmitting, via the one or more wireless communication radios, the credential of the first account without requesting authentication;
in accordance with a determination that authentication has not been provided for the first account, that the first account has been set up at the electronic device to provide credentials without requiring authentication, and the request from the communication terminal indicates that authentication is required, requesting authentication at the electronic device without transmitting the credential of the first account; and
in accordance with a determination that authentication has not been provided for the first account such that the electronic device is not in an authentication provided state for the first account, that the first account has been set up at the electronic device to provide credentials without requiring authentication, and the request from the communication terminal indicates that authentication is not required, transmitting, via the one or more wireless communication radios, the credential of the first account without requesting authentication at the electronic device.

2. The electronic device of claim 1, the one or more programs further including instructions for:
in response to receiving the request for the credential:
in accordance with a determination that authentication has not been provided for the first account and that the first account has not been set up at the device to provide credentials without requiring authentication, requesting authentication at the electronic device without transmitting the credential of the first account.

3. The electronic device of claim 1, wherein transmitting the credential of the first account without requesting authentication includes:
transitioning the electronic device such that authentication is no longer provided for the first account.

4. The electronic device of claim 1, the one or more programs further including instructions for:
in response to receiving the request for the credential:
identifying, based on information in the request, the first account.

5. The electronic device of claim 1, the one or more programs further including instructions for:
subsequent to requesting authentication at the electronic device:
receiving, via one or more input devices, authentication information; and
subsequent to receiving the authentication information:
in accordance with a determination that the received authentication information corresponds to registered authentication information, transmitting, via the one or more wireless communication radios, the credential.

6. The electronic device of claim 1, wherein, requesting authentication at the electronic device without transmitting the credential of the first account, includes:
in accordance with a determination that an explanatory user interface has not been displayed more than a threshold number of times, displaying the explanatory user interface that includes an explanation indicating why authentication is required; and in accordance with a determination that an explanatory user interface has been displayed more than the threshold number of times, forgoing displaying the explanatory user interface.

7. The electronic device of claim 1, the one or more programs further including instructions for:
   generating, at the electronic device, a confirmation output in conjunction with transmitting the credential of the first account.

8. The electronic device of claim 1, the one or more programs further including instructions for:
   in response to receiving the request for authentication, generating, at the electronic device, a second output indicating that authentication is requested.

9. The electronic device of claim 1,
   wherein the electronic device stores a plurality of accounts that are specific to a user of the electronic device, the plurality of accounts including the first account and a second account that is different from the first account, and
   wherein requesting authentication at the electronic device without transmitting the credential of the first account includes displaying an indication of the first account without displaying an indication that other accounts are available for use.

10. The electronic device of claim 1,
    wherein the electronic device stores a plurality of accounts that are specific to a user of the electronic device, the plurality of accounts including the first account and a second account that is different from the first account,
    wherein at least one of the first account and the second account has been set up at the electronic device to provide credentials without requiring authentication, and
    wherein at least one of the first account and the second account has not been set up at the electronic device to provide credentials without requiring authentication.

11. The electronic device of claim 1, wherein the electronic device stores a plurality of accounts that are specific to a user of the electronic device, the plurality of accounts including the first account and a second account that is different from the first account, the one or more programs further including instructions for:
    in accordance with a determination that at least one account of the plurality of accounts has been set up at the electronic device to provide credentials without requiring authentication or authentication has been provided for any of the plurality of accounts, listening for communications requesting wirelessly transmitted credentials, via the one or more wireless communication radios; and
    in accordance with a determination that no account of the plurality of accounts has been set up at the electronic device to provide credentials without requiring authentication and authentication has not been provided for any of the plurality of accounts, forgoing listening for communications requesting wirelessly transmitted credentials, via the one or more wireless communication radios.

12. The electronic device of claim 1, wherein requesting authentication at the electronic device includes:
    in accordance with a determination that the request corresponds to the first account, displaying a user interface using a first color scheme; and
    in accordance with a determination that the request corresponds to a second account, displaying a user interface using a second color scheme that is different from the first color scheme.

13. A non-transitory computer-readable storage medium storing one or more programs configured to be executed by one or more processors of an electronic device with one or more wireless communication radios capable of using near-field communication, wherein the electronic device is storing information for a first account, the one or more programs including instructions for:
    receiving from a communication terminal, via the one or more wireless communication radios, a request for a credential; and
    in response to receiving the request for the credential:
       in accordance with a determination that authentication has been provided for the first account, transmitting, via the one or more wireless communication radios, the credential of the first account without requesting authentication;
       in accordance with a determination that authentication has not been provided for the first account, that the first account has been set up at the electronic device to provide credentials without requiring authentication, and the request from the communication terminal indicates that authentication is required, requesting authentication at the electronic device without transmitting the credential of the first account; and
       in accordance with a determination that authentication has not been provided for the first account such that the electronic device is not in an authentication provided state for the first account, that the first account has been set up at the electronic device to provide credentials without requiring authentication, and the request from the communication terminal indicates that authentication is not required, transmitting, via the one or more wireless communication radios, the credential of the first account without requesting authentication at the electronic device.

14. The non-transitory computer-readable storage medium of claim 13, the one or more programs further including instructions for:
    in response to receiving the request for the credential:
       in accordance with a determination that authentication has not been provided for the first account and that the first account has not been set up at the device to provide credentials without requiring authentication, requesting authentication at the electronic device without transmitting the credential of the first account.

15. The non-transitory computer-readable storage medium of claim 13, wherein transmitting the credential of the first account without requesting authentication includes:
    transitioning the electronic device such that authentication is no longer provided for the first account.

16. The non-transitory computer-readable storage medium of claim 13, the one or more programs further including instructions for:
    in response to receiving the request for the credential:
       identifying, based on information in the request, the first account.

17. The non-transitory computer-readable storage medium of claim 13, the one or more programs further including instructions for:
    subsequent to requesting authentication at the electronic device:

receiving, via one or more input devices, authentication information; and subsequent to receiving the authentication information:

in accordance with a determination that the received authentication information corresponds to registered authentication information, transmitting, via the one or more wireless communication radios, the credential.

18. The non-transitory computer-readable storage medium of claim 13, wherein, requesting authentication at the electronic device without transmitting the credential of the first account, includes:

in accordance with a determination that an explanatory user interface has not been displayed more than a threshold number of times, displaying the explanatory user interface that includes an explanation indicating why authentication is required; and in accordance with a determination that an explanatory user interface has been displayed more than the threshold number of times, forgoing displaying the explanatory user interface.

19. The non-transitory computer-readable storage medium of claim 13, the one or more programs further including instructions for:

generating, at the electronic device, a confirmation output in conjunction with transmitting the credential of the first account.

20. The non-transitory computer-readable storage medium of claim 13, the one or more programs further including instructions for:

in response to receiving the request for authentication, generating, at the electronic device, a second output indicating that authentication is requested.

21. The non-transitory computer-readable storage medium of claim 13, wherein the electronic device stores a plurality of accounts that are specific to a user of the electronic device, the plurality of accounts including the first account and a second account that is different from the first account, and wherein requesting authentication at the electronic device without transmitting the credential of the first account includes displaying an indication of the first account without displaying an indication that other accounts are available for use.

22. The non-transitory computer-readable storage medium of claim 13, wherein the electronic device stores a plurality of accounts that are specific to a user of the electronic device, the plurality of accounts including the first account and a second account that is different from the first account, wherein at least one of the first account and the second account has been set up at the electronic device to provide credentials without requiring authentication, and wherein at least one of the first account and the second account has not been set up at the electronic device to provide credentials without requiring authentication.

23. The non-transitory computer-readable storage medium of claim 13, wherein the electronic device stores a plurality of accounts that are specific to a user of the electronic device, the plurality of accounts including the first account and a second account that is different from the first account, the one or more programs further including instructions for:

in accordance with a determination that at least one account of the plurality of accounts has been set up at the electronic device to provide credentials without requiring authentication or authentication has been provided for any of the plurality of accounts, listening for communications requesting wirelessly transmitted credentials, via the one or more wireless communication radios; and in accordance with a determination that no account of the plurality of accounts has been set up at the electronic device to provide credentials without requiring authentication and authentication has not been provided for any of the plurality of accounts, forgoing listening for communications requesting wirelessly transmitted credentials, via the one or more wireless communication radios.

24. The non-transitory computer-readable storage medium of claim 13, wherein requesting authentication at the electronic device includes:

in accordance with a determination that the request corresponds to the first account, displaying a user interface using a first color scheme; and in accordance with a determination that the request corresponds to a second account, displaying a user interface using a second color scheme that is different from the first color scheme.

25. A method, comprising:

at an electronic device with one or more wireless communication radios capable of using near-filed communication, wherein the electronic device is storing information for a first account:

receiving from a communication terminal, via the one or more wireless communication radios, a first request for a credential;

in response to receiving the first request for the credential and based on authentication being provided for the first account:

transmitting, via the one or more wireless communication radios, the credential of the first account without requesting authentication;

receiving from the communication terminal, via the one or more wireless communication radios, a second request for a credential;

in response to receiving the second request for the credential and based on authentication not being provided for the first account, the first account being set up at the electronic device to provide credentials without requiring authentication, and the request from the communication terminal indicating that authentication is required:

requesting authentication at the electronic device without transmitting the credential of the first account;

receiving from the communication terminal, via the one or more wireless communication radios, a third request for a credential; and in response to receiving the third request for the credential and based on authentication not being provided for the first account such that the electronic device is not in an authentication provided state for the first account, the first account being set up at the electronic device to provide credentials without requiring authentication, and the request from the communication terminal indicating that authentication is not required:

transmitting, via the one or more wireless communication radios, the credential of the first account without requesting authentication at the electronic device.

26. The method of claim 25, further comprising:
in response to receiving the request for the credential:
in accordance with a determination that authentication has not been provided for the first account and that the first account has not been set up at the device to provide credentials without requiring authentication, requesting authentication at the electronic device without transmitting the credential of the first account.

27. The method of claim 25, wherein transmitting the credential of the first account without requesting authentication includes:
transitioning the electronic device such that authentication is no longer provided for the first account.

28. The method of claim 25, further comprising:
in response to receiving the request for the credential:
identifying, based on information in the request, the first account.

29. The method of claim 25, further comprising:
subsequent to requesting authentication at the electronic device:
receiving, via one or more input devices, authentication information; and
subsequent to receiving the authentication information:
in accordance with a determination that the received authentication information corresponds to registered authentication information, transmitting, via the one or more wireless communication radios, the credential.

30. The method of claim 25, wherein, requesting authentication at the electronic device without transmitting the credential of the first account, includes:
in accordance with a determination that an explanatory user interface has not been displayed more than a threshold number of times, displaying the explanatory user interface that includes an explanation indicating why authentication is required; and
in accordance with a determination that an explanatory user interface has been displayed more than the threshold number of times, forgoing displaying the explanatory user interface.

31. The method of claim 25, further comprising:
generating, at the electronic device, a confirmation output in conjunction with transmitting the credential of the first account.

32. The method of claim 25, further comprising:
in response to receiving the request for authentication, generating, at the electronic device, a second output indicating that authentication is requested.

33. The method of claim 25,
wherein the electronic device stores a plurality of accounts that are specific to a user of the electronic device, the plurality of accounts including the first account and a second account that is different from the first account, and
wherein requesting authentication at the electronic device without transmitting the credential of the first account includes displaying an indication of the first account without displaying an indication that other accounts are available for use.

34. The method of claim 25,
wherein the electronic device stores a plurality of accounts that are specific to a user of the electronic device, the plurality of accounts including the first account and a second account that is different from the first account,
wherein at least one of the first account and the second account has been set up at the electronic device to provide credentials without requiring authentication, and
wherein at least one of the first account and the second account has not been set up at the electronic device to provide credentials without requiring authentication.

35. The method of claim 25, wherein the electronic device stores a plurality of accounts that are specific to a user of the electronic device, the plurality of accounts including the first account and a second account that is different from the first account, further comprising:
in accordance with a determination that at least one account of the plurality of accounts has been set up at the electronic device to provide credentials without requiring authentication or authentication has been provided for any of the plurality of accounts, listening for communications requesting wirelessly transmitted credentials, via the one or more wireless communication radios; and
in accordance with a determination that no account of the plurality of accounts has been set up at the electronic device to provide credentials without requiring authentication and authentication has not been provided for any of the plurality of accounts, forgoing listening for communications requesting wirelessly transmitted credentials, via the one or more wireless communication radios.

36. The method of claim 25, wherein requesting authentication at the electronic device includes:
in accordance with a determination that the request corresponds to the first account, displaying a user interface using a first color scheme; and
in accordance with a determination that the request corresponds to a second account, displaying a user interface using a second color scheme that is different from the first color scheme.

* * * * *